United States Patent
Pace et al.

(10) Patent No.: US 12,143,182 B1
(45) Date of Patent: Nov. 12, 2024

(54) SYSTEM AND METHOD FOR A DIGITALLY BEAMFORMED PHASED ARRAY FEED

(71) Applicant: BlueHalo, LLC, Huntsville, AL (US)

(72) Inventors: Michael Thomas Pace, Albuquerque, NM (US); David Gregory Baur, Sandia Park, NM (US); Theodore Lyman Schuler-Sandy, Albuquerque, NM (US); William Kennedy, Quincy, MA (US); Jeffrey Gerard Micono, Albuquerque, NM (US); William Louis Walker, Albuquerque, NM (US); Garrett James Newell, Albuquerque, NM (US)

(73) Assignee: BlueHalo, LLC, Huntsville, AL (US)

( * ) Notice: Subject to any disclaimer, the term of this patent is extended or adjusted under 35 U.S.C. 154(b) by 0 days.

(21) Appl. No.: 18/381,031

(22) Filed: Oct. 17, 2023

Related U.S. Application Data

(63) Continuation of application No. 18/117,180, filed on Mar. 3, 2023, now Pat. No. 11,870,159, which is a
(Continued)

(51) Int. Cl.
*H04B 7/06* (2006.01)
*H01Q 3/26* (2006.01)

(52) U.S. Cl.
CPC ......... *H04B 7/0617* (2013.01); *H01Q 3/2605* (2013.01); *H01Q 3/2658* (2013.01)

(58) Field of Classification Search
CPC ..... G01S 3/04; G01S 3/38; G01S 3/40; G01S 3/42; H01Q 1/02; H01Q 3/08; H01Q 3/20;
(Continued)

(56) References Cited

U.S. PATENT DOCUMENTS

| | | | | |
|---|---|---|---|---|
| 1,525,853 A | * | 2/1925 | Corthesy | F01D 1/34 416/189 |
| 1,532,633 A | * | 4/1925 | Noble | E01F 9/529 404/6 |

(Continued)

FOREIGN PATENT DOCUMENTS

| | | |
|---|---|---|
| AU | 2012364908 B2 | 8/2017 |
| AU | 2014211015 B2 | 11/2017 |

(Continued)

OTHER PUBLICATIONS

H. Hand et al. A Millimeter-Wave Wide Band, Wide Scanning Phased Array-Fed Reflector, IEEE, 2021 (Year: 2021).*
(Continued)

*Primary Examiner* — Berhanu Tadese
(74) *Attorney, Agent, or Firm* — Amster, Rothstein & Ebenstein LLP

(57) ABSTRACT

Systems and methods are provided for a digital beamformed phased array feed. The system may include a radome configured to allow electromagnetic waves to propagate; a multi-band software defined antenna array tile; a power and clock management subsystem configured to manage power and time of operation; a thermal management subsystem configured to dissipate heat generated by the multi-band software defined antenna array tile; and an enclosure assembly. The multi-band software defined antenna array tile may include a plurality of coupled dipole array antenna elements; a plurality of frequency converters; and a plurality of digital beamformers.

10 Claims, 60 Drawing Sheets

Related U.S. Application Data continuation of application No. 17/679,817, filed on Feb. 24, 2022, now Pat. No. 11,670,855.

(60) Provisional application No. 63/262,124, filed on Oct. 5, 2021, provisional application No. 63/188,959, filed on May 14, 2021, provisional application No. 63/200,260, filed on Feb. 24, 2021.

(58) Field of Classification Search
CPC .. H01Q 3/22; H01Q 3/26; H01Q 3/34; H01Q 3/38; H01Q 5/28; H01Q 5/48; H01Q 15/16; H01Q 19/10; H01Q 19/13; H01Q 21/00; H01Q 21/06; H01Q 19/02; H04B 7/04; H04B 7/06; H04B 7/08; H04B 17/23; H04B 7/10; H04B 17/12
See application file for complete search history.

(56) References Cited

U.S. PATENT DOCUMENTS

| | | | | |
|---|---|---|---|---|
| 1,624,102 | A * | 4/1927 | Kennedy | B63C 9/1255 5/644 |
| 1,650,990 | A * | 11/1927 | Kennedy | A24B 1/06 414/26 |
| 1,677,583 | A * | 7/1928 | Cromwell, Jr. | B65D 29/00 383/119 |
| 2,013,495 | A | 9/1935 | Kennedy | |
| 2,044,686 | A * | 6/1936 | Harrison | E02B 9/08 405/76 |
| 2,485,328 | A * | 10/1949 | Spraker | G06M 1/08 235/98 R |
| 2,536,015 | A * | 12/1950 | Konrad | B26B 19/14 30/346.51 |
| 3,170,652 | A * | 2/1965 | Kennedy | A47K 10/40 242/599.1 |
| 3,200,279 | A * | 8/1965 | Janssens | C23D 3/00 313/506 |
| 3,266,116 | A * | 8/1966 | Rush | F27D 5/0018 432/259 |
| 3,767,838 | A * | 10/1973 | McConnell | H01B 9/0655 174/120 FP |
| 4,135,493 | A * | 1/1979 | Kennedy | F24S 30/425 126/696 |
| 4,903,033 | A * | 2/1990 | Tsao | H01Q 15/244 343/700 MS |
| 5,001,492 | A * | 3/1991 | Shapiro | H01P 5/187 333/116 |
| 5,061,943 | A * | 10/1991 | Rammos | H01Q 21/0075 343/789 |
| 5,274,384 | A * | 12/1993 | Hussain | H01Q 3/26 342/373 |
| 5,371,506 | A * | 12/1994 | Yu | H01Q 3/2611 342/149 |
| 5,469,851 | A * | 11/1995 | Lipschutz | G01S 15/8909 600/447 |
| 5,541,607 | A * | 7/1996 | Reinhardt | H01Q 3/26 342/372 |
| 5,553,621 | A * | 9/1996 | Otterson | G01S 15/584 600/455 |
| 5,600,675 | A * | 2/1997 | Engeler | G01S 15/89 375/240 |
| 5,673,699 | A * | 10/1997 | Trahey | G01S 7/52049 600/447 |
| 5,676,148 | A * | 10/1997 | Koo | G01S 15/584 600/447 |
| 5,955,966 | A * | 9/1999 | Jeffryes | E21B 47/12 340/856.4 |
| 6,104,673 | A * | 8/2000 | Cole | G01S 7/52046 367/138 |
| 6,240,324 | B1 * | 5/2001 | Preska | G05B 13/024 700/8 |
| 6,456,251 | B1 * | 9/2002 | Rao | H01Q 3/02 343/781 P |
| 6,456,672 | B1 * | 9/2002 | Uchiki | H04L 27/2332 375/269 |
| 6,527,720 | B1 * | 3/2003 | Ustuner | A61B 8/0858 600/443 |
| 6,609,013 | B1 * | 8/2003 | Oh | H04W 52/42 455/562.1 |
| 6,692,439 | B1 * | 2/2004 | Walker | G01S 15/8927 600/443 |
| 7,034,749 | B2 * | 4/2006 | Leeper | H01Q 3/02 343/754 |
| 7,245,880 | B1 * | 7/2007 | Jacobsen | H04W 52/146 455/452.2 |
| 7,260,141 | B2 * | 8/2007 | Bierly | H01Q 3/26 375/295 |
| 7,402,136 | B2 * | 7/2008 | Hossack | G01S 7/52085 600/447 |
| 7,430,165 | B2 * | 9/2008 | Michida | H04L 1/22 370/220 |
| 7,671,785 | B1 * | 3/2010 | Walker | G01S 7/03 343/766 |
| 7,705,761 | B2 * | 4/2010 | Tietjen | H04B 7/0617 341/155 |
| 7,719,458 | B1 * | 5/2010 | Walker | G01S 13/87 343/766 |
| 7,830,982 | B2 * | 11/2010 | Mesecher | H01Q 3/2611 375/299 |
| 7,859,459 | B2 * | 12/2010 | McCune, Jr. | H01Q 3/38 342/372 |
| 7,873,326 | B2 * | 1/2011 | Sadr | H01Q 21/29 370/335 |
| 8,180,275 | B2 * | 5/2012 | Eastman | H04B 17/23 455/3.06 |
| 8,184,052 | B1 * | 5/2012 | Wu | H01Q 3/40 342/368 |
| 8,248,298 | B2 * | 8/2012 | Lalezari | H01Q 21/24 342/120 |
| 8,326,228 | B2 * | 12/2012 | Lewis | H04W 4/80 455/67.11 |
| 8,401,334 | B2 * | 3/2013 | Neville | H04N 1/00198 382/284 |
| 8,553,340 | B2 * | 10/2013 | Drost | G03B 3/02 359/798 |
| 8,571,465 | B2 * | 10/2013 | Eastman | H04H 20/28 455/3.02 |
| 8,604,976 | B1 * | 12/2013 | Chang | H01Q 3/26 342/368 |
| 8,744,155 | B2 * | 6/2014 | Walker | G06T 5/70 382/131 |
| 8,745,281 | B2 * | 6/2014 | Petzen | H04L 61/5038 710/9 |
| 8,754,811 | B1 * | 6/2014 | Uscinowicz | H01Q 3/267 342/375 |
| 8,849,429 | B2 * | 9/2014 | Ojha | G05B 19/042 700/86 |
| 8,885,066 | B2 * | 11/2014 | Rindfuss | G06V 10/141 348/370 |
| 8,897,403 | B2 * | 11/2014 | Stirland | H01Q 3/26 342/368 |
| 8,900,141 | B2 * | 12/2014 | Smith | G16Z 99/00 600/300 |
| 8,948,541 | B2 * | 2/2015 | Neville | H04N 1/00188 382/284 |
| 8,977,372 | B2 * | 3/2015 | Ojha | G05B 19/41865 700/15 |
| 9,244,160 | B2 * | 1/2016 | Blalock | G01S 7/5208 |
| 9,272,280 | B2 * | 3/2016 | Viola | G01N 33/86 |
| 9,350,402 | B1 * | 5/2016 | Corbalis | H04B 1/123 |
| 9,373,896 | B2 * | 6/2016 | Runyon | H01Q 3/30 |
| 9,410,971 | B2 * | 8/2016 | Viola | G01N 29/222 |
| 9,484,971 | B2 * | 11/2016 | Corbalis | H04B 7/0617 |
| 9,525,769 | B1 * | 12/2016 | Bauer | G06F 3/0484 |
| 9,548,882 | B2 * | 1/2017 | Dark | H04L 7/0087 |
| 9,592,032 | B2 * | 3/2017 | Rothberg | A61B 8/4494 |
| 9,627,779 | B2 * | 4/2017 | Legay | H01Q 21/00 |

(56) References Cited

U.S. PATENT DOCUMENTS

| | | | | |
|---|---|---|---|---|
| 9,733,549 | B2* | 8/2017 | Drost | G03B 3/02 |
| 9,769,006 | B2* | 9/2017 | Dark | H04W 24/08 |
| 9,853,668 | B2* | 12/2017 | Corbalis | H04B 7/08 |
| 9,941,895 | B2* | 4/2018 | Fan | H03M 3/462 |
| 9,976,844 | B2* | 5/2018 | Lloret Soler | G02B 6/30 |
| 9,977,039 | B2* | 5/2018 | Viola | G01N 29/024 |
| 9,979,585 | B2* | 5/2018 | Dark | H04W 24/08 |
| 10,031,144 | B2* | 7/2018 | Viola | B01L 3/5027 |
| 10,109,917 | B2* | 10/2018 | Pace | H01Q 21/062 |
| 10,161,944 | B2* | 12/2018 | Viola | B01L 3/527 |
| 10,200,081 | B2* | 2/2019 | Snow | H01Q 3/38 |
| 10,298,253 | B1 | 5/2019 | Fan | H03M 3/462 |
| 10,333,218 | B2* | 6/2019 | Runyon | H01Q 1/288 |
| 10,340,593 | B2* | 7/2019 | Micono | H01Q 3/005 |
| 10,368,248 | B2* | 7/2019 | Tidhar | H04B 17/27 |
| 10,382,076 | B2* | 8/2019 | Noda | H01Q 21/06 |
| 10,481,168 | B2* | 11/2019 | Viola | B01L 3/5027 |
| 10,483,654 | B2* | 11/2019 | Werntz | H01Q 21/061 |
| 10,523,478 | B1* | 12/2019 | Ma | H04B 7/0452 |
| 10,553,947 | B2* | 2/2020 | Scarborough | H01Q 1/288 |
| 10,651,866 | B1* | 5/2020 | Fan | H04B 7/0617 |
| 10,680,693 | B1* | 6/2020 | Cohen | H04B 7/0617 |
| 10,698,083 | B2* | 6/2020 | Thompson | G01S 7/4026 |
| 10,740,359 | B1* | 8/2020 | Browne | G06F 16/9535 |
| 10,804,604 | B2* | 10/2020 | Ling | H01Q 3/34 |
| 10,931,345 | B2* | 2/2021 | Cohen | H04B 17/12 |
| 10,958,336 | B2* | 3/2021 | Fang | H04W 16/28 |
| 10,985,833 | B2* | 4/2021 | Mendelsohn | H01Q 3/18 |
| 11,082,055 | B1* | 8/2021 | Fan | H03M 1/1245 |
| 11,128,331 | B2* | 9/2021 | Rainov | H01Q 3/38 |
| 11,165,151 | B2* | 11/2021 | Runyon | H01Q 3/30 |
| 11,196,184 | B2* | 12/2021 | Jordan | H01Q 21/0093 |
| 11,258,185 | B2* | 2/2022 | Ling | H04B 1/04 |
| 11,310,800 | B2* | 4/2022 | Sikri | H04W 16/28 |
| 11,411,324 | B2* | 8/2022 | Fillion | H01Q 15/08 |
| 11,424,539 | B2* | 8/2022 | Alpman | H01L 24/20 |
| 11,487,015 | B2* | 11/2022 | Smolin | G01K 3/14 |
| 11,507,604 | B1* | 11/2022 | Browne | G06F 16/285 |
| 11,664,594 | B2* | 5/2023 | Pace | H01Q 3/20 |
| | | | | 342/422 |
| 11,670,855 | B2* | 6/2023 | Pace | H01Q 15/16 |
| | | | | 375/267 |
| 11,693,432 | B1* | 7/2023 | Clark | G05D 1/693 |
| | | | | 701/120 |
| 11,695,209 | B2* | 7/2023 | Pace | H01Q 3/38 |
| | | | | 343/702 |
| 11,721,900 | B2* | 8/2023 | Pace | H01Q 3/22 |
| | | | | 343/702 |
| 11,742,578 | B2* | 8/2023 | Pace | G01S 3/42 |
| | | | | 342/372 |
| 11,742,579 | B2* | 8/2023 | Pace | H01Q 3/34 |
| | | | | 343/702 |
| 11,777,215 | B2* | 10/2023 | Pace | H01Q 21/062 |
| | | | | 342/422 |
| 11,784,412 | B2* | 10/2023 | Pace | H01Q 21/0068 |
| | | | | 343/702 |
| 11,791,557 | B2* | 10/2023 | Pace | G01S 3/40 |
| | | | | 343/702 |
| 11,817,636 | B2* | 11/2023 | Pace | H04B 17/23 |
| 11,824,279 | B2* | 11/2023 | Pace | H04B 7/0695 |
| 11,824,280 | B2* | 11/2023 | Pace | H01Q 3/22 |
| 11,843,188 | B2* | 12/2023 | Pace | H01Q 15/16 |
| 11,862,871 | B2* | 1/2024 | Pace | H04B 7/10 |
| 11,870,159 | B2* | 1/2024 | Pace | H04B 7/0408 |
| 11,955,727 | B2* | 4/2024 | Pace | H01Q 21/062 |
| 11,996,634 | B2* | 5/2024 | Pace | H01Q 3/38 |
| 12,009,606 | B2* | 6/2024 | Pace | G01S 3/42 |
| 2002/0154687 | A1 | 10/2002 | Bierly et al. | |
| 2003/0085833 | A1* | 5/2003 | Yu | G01S 13/4463 |
| | | | | 342/380 |
| 2005/0030228 | A1* | 2/2005 | Judd | H01Q 21/06 |
| | | | | 342/383 |
| 2005/0110472 | A1* | 5/2005 | Harris | H02M 3/1584 |
| | | | | 323/271 |
| 2007/0016022 | A1* | 1/2007 | Blalock | A61B 8/4488 |
| | | | | 600/437 |
| 2008/0012710 | A1 | 1/2008 | Sadr | |
| 2009/0251368 | A1 | 10/2009 | McCune, Jr. | |
| 2010/0161502 | A1* | 6/2010 | Kumazawa | G06Q 30/018 |
| | | | | 705/317 |
| 2012/0294767 | A1* | 11/2012 | Viola | G01N 29/222 |
| | | | | 422/73 |
| 2013/0000495 | A1* | 1/2013 | Posselius | A01F 15/10 |
| | | | | 100/88 |
| 2013/0053987 | A1* | 2/2013 | Galt | G05B 19/0423 |
| | | | | 700/12 |
| 2014/0327576 | A1* | 11/2014 | Kumar | H04B 7/086 |
| | | | | 342/367 |
| 2016/0020844 | A1* | 1/2016 | Hart | H04B 7/0617 |
| | | | | 370/280 |
| 2016/0173227 | A1* | 6/2016 | Kikuma | H04L 1/0003 |
| | | | | 455/63.4 |
| 2016/0268676 | A1* | 9/2016 | Chang | H01Q 3/06 |
| 2016/0327641 | A1* | 11/2016 | Madia | H01Q 1/34 |
| 2017/0135676 | A1* | 5/2017 | Rothberg | A61B 8/488 |
| 2018/0069610 | A1* | 3/2018 | Alexander | H04B 7/18504 |
| 2018/0166750 | A1* | 6/2018 | Chang | H01M 10/44 |
| 2018/0248598 | A1* | 8/2018 | Gambahaya | H01Q 3/40 |
| 2018/0254805 | A1* | 9/2018 | Sadri | H01Q 5/28 |
| 2018/0254808 | A1* | 9/2018 | Kobayashi | H04B 7/088 |
| 2018/0348375 | A1 | 12/2018 | Smolin et al. | |
| 2019/0067814 | A1 | 2/2019 | Thompson et al. | |
| 2019/0273524 | A1* | 9/2019 | Rainov | H04B 1/16 |
| 2019/0353139 | A1* | 11/2019 | Sheldon-Coulson | |
| | | | | F03B 13/142 |
| 2019/0372656 | A1 | 12/2019 | Fang et al. | |
| 2020/0058996 | A1* | 2/2020 | Reddy | H01Q 3/40 |
| 2020/0091608 | A1* | 3/2020 | Alpman | H03L 7/145 |
| 2020/0132701 | A1* | 4/2020 | Viola | G01N 33/86 |
| 2020/0302131 | A1* | 9/2020 | Sadr | G01S 13/762 |
| 2020/0366066 | A1* | 11/2020 | Landles | H01S 5/4062 |
| 2020/0388916 | A1* | 12/2020 | Kahrizi | H04B 3/52 |
| 2021/0005958 | A1* | 1/2021 | Difonzo | H01Q 1/246 |
| 2021/0016155 | A1* | 1/2021 | Bruce | G07F 17/326 |
| 2021/0143546 | A1* | 5/2021 | Lau | H01Q 19/10 |
| 2021/0194524 | A1* | 6/2021 | Mehrnia | H04L 7/0033 |
| 2021/0203085 | A1 | 7/2021 | Jordan et al. | |
| 2021/0208286 | A1* | 7/2021 | Turpin | G01S 3/74 |
| 2021/0399419 | A1* | 12/2021 | Hayes | H01Q 9/32 |
| 2022/0020063 | A1* | 1/2022 | Mengle | G06Q 30/0269 |
| 2022/0179032 | A1* | 6/2022 | Hancharik | G01S 3/38 |
| 2022/0200637 | A1* | 6/2022 | Harris | H04B 1/0014 |
| 2022/0268869 | A1* | 8/2022 | Pace | H01Q 5/28 |
| 2022/0268870 | A1* | 8/2022 | Pace | G01S 3/42 |
| 2022/0268871 | A1* | 8/2022 | Pace | H01Q 19/026 |
| 2022/0271427 | A1* | 8/2022 | Pace | H04B 7/0617 |
| 2022/0271428 | A1* | 8/2022 | Pace | H01Q 19/108 |
| 2022/0271430 | A1* | 8/2022 | Pace | H04B 17/12 |
| 2022/0271431 | A1* | 8/2022 | Pace | G01S 3/38 |
| 2022/0271439 | A1* | 8/2022 | Pace | G01S 3/043 |
| 2022/0271825 | A1* | 8/2022 | Pace | H01Q 3/2658 |
| 2022/0276330 | A1 | 9/2022 | Pace et al. | |
| 2022/0278455 | A1* | 9/2022 | Pace | G01S 3/42 |
| 2022/0278463 | A1* | 9/2022 | Pace | H01Q 3/22 |
| 2022/0278735 | A1* | 9/2022 | Pace | H01Q 19/108 |
| 2022/0290254 | A1* | 9/2022 | Kudryashova | G16B 40/30 |
| 2023/0000472 | A1* | 1/2023 | Rothberg | A61B 8/56 |
| 2023/0084209 | A1* | 3/2023 | Smolin | G01K 3/14 |
| | | | | 356/28.5 |
| 2023/0170973 | A1* | 6/2023 | Nilsson | H04B 7/086 |
| | | | | 375/262 |
| 2023/0187828 | A1* | 6/2023 | Pace | G01S 3/38 |
| 2023/0208026 | A1* | 6/2023 | Wiegner | H01Q 3/24 |
| | | | | 342/374 |
| 2023/0223692 | A1* | 7/2023 | Pace | H04B 7/0617 |
| 2023/0268669 | A1* | 8/2023 | Park | H04B 1/48 |
| | | | | 455/566 |
| 2023/0282980 | A1* | 9/2023 | Pace | H01Q 21/062 |
| 2023/0291104 | A1* | 9/2023 | Pace | H01Q 19/108 |
| 2023/0327320 | A1* | 10/2023 | Franson | H01Q 1/2283 |
| 2023/0352836 | A1* | 11/2023 | Pace | H04B 7/0408 |
| 2023/0361471 | A1* | 11/2023 | Pace | H04B 17/12 |

(56) References Cited

U.S. PATENT DOCUMENTS

| | | | | |
|---|---|---|---|---|
| 2023/0378650 | A1* | 11/2023 | Pace | H01Q 1/02 |
| 2023/0387593 | A1* | 11/2023 | Pace | H01Q 21/0068 |
| 2024/0006765 | A1* | 1/2024 | Pace | G01S 3/046 |
| 2024/0006766 | A1* | 1/2024 | Pace | H01Q 3/20 |
| 2024/0047875 | A1* | 2/2024 | Pace | H01Q 15/16 |
| 2024/0047876 | A1* | 2/2024 | Pace | H01Q 19/026 |
| 2024/0047877 | A1* | 2/2024 | Pace | H01Q 19/026 |
| 2024/0063542 | A1* | 2/2024 | Pace | H01Q 3/34 |

FOREIGN PATENT DOCUMENTS

| | | | | |
|---|---|---|---|---|
| AU | 2017248548 | A1 | 11/2017 | |
| AU | 2017248548 | B2 | 12/2018 | |
| AU | 2019201621 | A1 | 4/2019 | |
| AU | 2017409520 | A1 | 9/2019 | |
| AU | 2020257183 | A1 | 9/2021 | |
| AU | 2019201621 | B2 | 10/2021 | |
| AU | 2017409520 | B2 | 3/2022 | |
| AU | 2020406407 | A1 | 7/2022 | |
| AU | 2021206131 | A1 | 7/2022 | |
| AU | 2020476995 | A1 | 6/2023 | |
| AU | 2022226969 | A1* | 9/2023 | G01S 3/043 |
| BR | 112019021133 | A2 | 5/2020 | |
| BR | 112013020675 | B1 | 1/2022 | |
| CA | 2708340 | A1 | 5/2009 | |
| CA | 2782177 | A1 | 6/2011 | |
| CA | 2803201 | A1 | 12/2011 | |
| CA | 2862729 | A1 | 8/2013 | |
| CA | 2513422 | C | 12/2013 | |
| CA | 2513446 | C | 8/2014 | |
| CA | 2803201 | C | 9/2018 | |
| CA | 3054698 | A1 | 10/2018 | |
| CA | 2862729 | C | 7/2020 | |
| CA | 3135109 | A1 | 10/2020 | |
| CA | 3209399 | A1* | 9/2022 | G01S 3/043 |
| CN | 1217625 | A | 5/1999 | |
| CN | 1103171 | C | 3/2003 | |
| CN | 101803113 | A | 8/2010 | |
| CN | 103268640 | A | 8/2013 | |
| CN | 101803113 | B | 9/2013 | |
| CN | 103454618 | A | 12/2013 | |
| CN | 103454618 | B | 7/2015 | |
| CN | 103268640 | B | 2/2016 | |
| CN | 105372648 | A | 3/2016 | |
| CN | 105843721 | A | 8/2016 | |
| CN | 106329152 | A | 1/2017 | |
| CN | 106341141 | A | 1/2017 | |
| CN | 106558761 | A | 4/2017 | |
| CN | 104144374 | B | 3/2018 | |
| CN | 106341141 | B | 10/2018 | |
| CN | 109075848 | A | 12/2018 | |
| CN | 109565286 | A | 4/2019 | |
| CN | 109639403 | A | 4/2019 | |
| CN | 109856605 | A | 6/2019 | |
| CN | 110447146 | A | 11/2019 | |
| CN | 110571531 | A | 12/2019 | |
| CN | 106716720 | B | 2/2020 | |
| CN | 110927680 | A | 3/2020 | |
| CN | 110940969 | A | 3/2020 | |
| CN | 111052503 | A | 4/2020 | |
| CN | 108183738 | B | 5/2020 | |
| CN | 112219355 | A | 1/2021 | |
| CN | 112600573 | A | 4/2021 | |
| CN | 113796024 | A | 12/2021 | |
| CN | 110582892 | B | 2/2022 | |
| CN | 112219355 | B | 4/2022 | |
| CN | 109565286 | B | 5/2023 | |
| DE | 102016216412 | A1 | 3/2018 | |
| DE | 112017006442 | T5 | 9/2019 | |
| DE | 112020002365 | T5 | 1/2022 | |
| EP | 0355898 | A1 | 2/1990 | |
| EP | 0363841 | A2 | 4/1990 | |
| EP | 2022946 | A1 | 2/2009 | |
| EP | 1620015 | B1 | 1/2011 | |
| EP | 2403067 | A1 | 1/2012 | |
| EP | 1622514 | B1 | 5/2012 | |
| EP | 2485328 | A1 | 8/2012 | |
| EP | 2782177 | A1 | 9/2014 | |
| EP | 2807702 | B1 | 4/2017 | |
| EP | 3200279 | A1 | 8/2017 | |
| EP | 2586097 | B1 | 10/2017 | |
| EP | 3236599 | A1 | 10/2017 | |
| EP | 3266116 | A1 | 1/2018 | |
| EP | 2951884 | B1 | 3/2018 | |
| EP | 2485328 | B1 | 11/2018 | |
| EP | 3522300 | A1 | 8/2019 | |
| EP | 3357125 | B1 | 9/2020 | |
| EP | 3200279 | B1 | 11/2020 | |
| EP | 2676136 | B1 | 12/2020 | |
| EP | 3767838 | A1 | 1/2021 | |
| EP | 3795998 | A1 | 3/2021 | |
| EP | 3266116 | B1 | 5/2021 | |
| EP | 3610536 | B1 | 11/2021 | |
| EP | 3955384 | A2 | 2/2022 | |
| EP | 3807998 | B1 | 11/2022 | |
| ES | 2679671 | T3 | 8/2018 | |
| ES | 2854873 | T3 | 9/2021 | |
| ES | 2901210 | T3 | 3/2022 | |
| ES | 2925632 | T3 | 10/2022 | |
| FR | 2986377 | A1 | 8/2013 | |
| GB | 2312063 | A | 10/1997 | |
| GB | 2485328 | A | 5/2012 | |
| GB | 2536015 | A | 9/2016 | |
| GB | 2602991 | A | 7/2022 | |
| IL | 183453 | A | 2/2011 | |
| JP | 2003013288 | A | 1/2003 | |
| JP | 2010146387 | A | 7/2010 | |
| JP | 4903033 | B2 | 3/2012 | |
| JP | 4988845 | B2 | 8/2012 | |
| JP | 5001492 | B2 | 8/2012 | |
| JP | 2013090337 | A | 5/2013 | |
| JP | 3200279 | U | 10/2015 | |
| JP | 5916238 | B2 | 5/2016 | |
| JP | 2016106631 | A | 6/2016 | |
| JP | 5955966 | B2 | 7/2016 | |
| JP | 6127067 | B2 | 5/2017 | |
| JP | 6290792 | B2 | 3/2018 | |
| JP | 2020112541 | A | 7/2020 | |
| JP | 2021016155 | A | 2/2021 | |
| JP | 2021121936 | A | 8/2021 | |
| JP | 6983333 | B2 | 12/2021 | |
| JP | 7127053 | B2 | 8/2022 | |
| JP | 2022182868 | A | 12/2022 | |
| KR | 1175234 | B1 | 8/2012 | |
| KR | 20210016155 | A | 2/2021 | |
| RU | 2485328 | C2 | 6/2013 | |
| RU | 2491685 | C2 | 8/2013 | |
| RU | 2741489 | C1 | 1/2021 | |
| RU | 2019126577 | A | 4/2021 | |
| TW | 202101934 | A | 1/2021 | |
| WO | 1995025769 | A1 | 9/1995 | |
| WO | 2001001866 | A1 | 1/2001 | |
| WO | 2002069443 | A1 | 9/2002 | |
| WO | 2004064619 | A2 | 8/2004 | |
| WO | 2004065978 | A2 | 8/2004 | |
| WO | 2005010713 | A2 | 2/2005 | |
| WO | 2005011047 | A2 | 2/2005 | |
| WO | 2008005368 | A2 | 1/2008 | |
| WO | 2008053686 | A1 | 5/2008 | |
| WO | 2009061671 | A1 | 5/2009 | |
| WO | 2009084384 | A1 | 7/2009 | |
| WO | 2009137254 | A1 | 11/2009 | |
| WO | 2010146387 | A1 | 12/2010 | |
| WO | 2011023617 | A1 | 3/2011 | |
| WO | 2011161198 | A1 | 12/2011 | |
| WO | 2012159021 | A2 | 11/2012 | |
| WO | 2013105986 | A2 | 7/2013 | |
| WO | 2013110793 | A1 | 8/2013 | |
| WO | 2014118433 | A1 | 8/2014 | |
| WO | 2016106631 | A1 | 7/2016 | |
| WO | 2017058289 | A1 | 4/2017 | |
| WO | 2017146789 | A1 | 8/2017 | |
| WO | 2017153984 | A1 | 9/2017 | |
| WO | 2018041467 | A1 | 3/2018 | |

(56) References Cited

FOREIGN PATENT DOCUMENTS

| | | | | |
|---|---|---|---|---|
| WO | 2018119153 | A2 | 6/2018 | |
| WO | 2018190794 | A1 | 10/2018 | |
| WO | 2018236821 | A1 | 12/2018 | |
| WO | 2019040131 | A1 | 2/2019 | |
| WO | 2019240292 | A1 | 12/2019 | |
| WO | 2020112541 | A1 | 6/2020 | |
| WO | 2020214674 | A1 | 10/2020 | |
| WO | 2020225903 | A1 | 11/2020 | |
| WO | 2020231658 | A1 | 11/2020 | |
| WO | 2021016155 | A1 | 1/2021 | |
| WO | 2021029929 | A2 | 2/2021 | |
| WO | 2021121936 | A1 | 6/2021 | |
| WO | 2021125384 | A1 | 6/2021 | |
| WO | 2021140451 | A1 | 7/2021 | |
| WO | 2021223892 | A1 | 11/2021 | |
| WO | 2022103402 | A1 | 5/2022 | |
| WO | WO-2022182869 | A1 * | 9/2022 | ............ G01S 3/043 |
| WO | 2023045293 | A1 | 3/2023 | |

OTHER PUBLICATIONS

Wang et al. Design_of_multiband_broadband_software-defined_super-sparse_digital_beam_forming_array_for_down-link_satellite_communications, IEEE 2004 (Year: 2004).*

H. Hand, J. M. Torres, T. Nielsen, J. D. Gustafson and P. D. Moschetti, "A Millimeter-Wave Wide Band, Wide Scanning Phased Array-Fed Reflector Architecture," 2021 IEEE International Symposium on Antennas and Propagation and USNC-URSI Radio Science Meeting (APS/URSI), 2021, pp. 1407-1408, (Year: 2021).

J. J. H. Wang, R. A. Swistak, D. J. Triplett and C. J. Stevens, "Design of multiband/broadband software-defined supersparse digital beam forming array for down-link satellite communications," IEEE Antennas and Propagation Society Symposium, 2004., 2004, pp. 3992-3995 vol. 4 (Year: 2004).

Ribo et al., A Software-Defined GNSS Reflectometry Recording Receiver with Wide-Bandwidth, Multi-Band Capability and Digital Beam-Forming. May 6, 2017 (May 6, 2017); (Retrieved online on Apr. 27, 2022 (Apr. 27, 2022)], [Downloaded from URL: 'https://www.mdpi.com/2072-4292/9/5/450/pdf]; entire document.

Ruey-Shi Chu, Kuan Min Lee and A. T. S. Wang, "Multiband phased-array antenna with interleaved tapered-elements and waveguide radiators," IEEE Antennas and Propagation Society International Symposium. 1996 Digest, 1996, pp. 1616-1619 vol. 3, doi: 10.1109/APS.1996.549909. (Year: 1996).

A. van Ardenne, J. D. Bregman, W. A. van Cappellen, G. W. Kant and J. G. Bij de Vaate, "Extending the Field of View With Phased Array Techniques: Results of European SKA Research," in Proceedings of the IEEE, vol. 97, No. 8, pp. 1531-1542, Aug. 2009, doi: 10.1109/JPROC.2009.2021594. (Year: 2009).

M. Cooley, "Phased Array Fed Reflector (PAFR) antenna architectures for space-based sensors," 2015 IEEE Aerospace Conference, Big Sky, MT, USA, 2015, pp. 1-11, doi: 10.1109/AERO.2015.7118963. (Year: 2015).

Y. Wu, K. F. Warnick and C. Jin, "Design Study of an L-Band Phased Array Feed for Wide-Field Surveys and Vibration Compensation on FAST," in IEEE Transactions on Antennas and Propagation, vol. 61, No. 6, pp. 3026-3033, Jun. 2013, doi: 10.1109/TAP.2013.2254438. (Year: 2013).

XC.A. Recknagel and N. A. Goodman, "Simulation and Adaptive Sub-Array Packing for an All-Digital Phased-Array Radar," 2019 IEEE Radar Conference (RadarConf), Boston, MA, USA, 2019, pp. 1-6, doi: 10.1109/RADAR.2019.8835795. (Year: 2019).

Phasor, Connectivity Demand, https://www.hanwha-phasor.com/connectivity-demands, accessed Jul. 12, 2021, internet.

Phasor, Digital Beam-Steering, https://www.hanwha-phasor.com/digital-beam-steering, accessed Jul. 12, 2021, internet.

Focus—COTM Challenge, MilsatMagazine by Peter Woodhead, www.milsatmagazine.com/story.php?number=571820705, accessed Jul. 14, 2021, internet.

Phasor, Phasor's Technology, Very Low Profile, Electronically Steered, High Gain, Phased Array, https://www.hanwha-phasor.com/phasors-technology, accessed Jul. 12, 2021, internet.

Phasor, the Basics: Phased Arrays and Satcoms, Conventional Satcoms, https://www.hanwha-phasor.com/the-basics-phased-arrays-and-satcoms, accessed Jul. 12, 2021, internet.

Phasor, Thin & Conformable, https://www.hanwha-phasor.com/thin-conformable, accessed Jul. 12, 2021, internet.

Wang et al., Design of Multiband/Broadband Software-defined Super-sparse Digital Beam Forming Array for Down-link Satellite Communications, Sep. 13, 2004 {Sep. 13, 2004), (Retrieved online on Apr. 27, 2022 (Apr. 27, 2022)], [Downloaded from URL: https://ieeexplore.ieee.org/document/1330225] entire document, especially: fig. 2, 3; pp. 3993, first para, second para.

Budinger, Ka-band Technologies for Small Spacecraft Communications via Relays and Direct Data Downlink, Aug. 7, 2016 (Aug. 7, 2016}, [Retrieved online on Apr. 27, 2022 (Apr. 27, 2022)], [Downloaded from URL: https:f/digitalcommons; entire document.

Ribo et al., A Software-Defined GNSS Reflectometry Recording Receiver with Wide-Bandwidth, Mufti-Band Capability and Digital Beam-Forming. May 6, 2017 (May 6, 2017); {Retrieved online on Apr. 27, 2022 (Apr. 27, 2022)), [Downloaded from URL: https:f/www.mdpi.com/2072-4292/9/5/450/pdf]; entire document.

International Search Report and Written Opinion issued in PCT Application PCT/US2022/017696, dated May 13, 2022.

U.S. Appl. No. 17/679,817, filed Feb. 24, 2022, US 2022-0271825 A1, Aug. 25, 2022, Issued as U.S. Pat. No. 11,670,855.

U.S. Appl. No. 17/690,732, filed Mar. 9, 2022, US 2022-0271427 A1, Aug. 25, 2022, Issued as U.S. Pat. No. 11,791,557.

U.S. Appl. No. 17/690,747, filed Mar. 9, 2022, US 2022-0271428 A1, Aug. 25, 2022, Abandoned—Notice of Abandonment mailed May 31, 2023.

U.S. Appl. No. 17/690,761, filed Mar. 9, 2022, US 2022-0268871 A1, Aug. 25, 2022, Issued as U.S. Pat. No. 11,817,636.

U.S. Appl. No. 17/690,769, filed Mar. 9, 2022, US 2022-0271439 A1, Aug. 25, 2022, Issued as U.S. Pat. No. 11,824,279.

U.S. Appl. No. 17/690,779, filed Mar. 9, 2022, US 2022-0278455 A1, Sep. 1, 2022, Issued as U.S. Pat. No. 11,721,900.

U.S. Appl. No. 17/690,824, filed Mar. 9, 2022, US 2022-0271430 A1, Aug. 25, 2022, Issued as U.S. Pat. No. 11,784,412.

U.S. Appl. No. 17/690,830, filed Mar. 9, 2022, US 2022-0268869 A1, Aug. 25, 2022, Issued as U.S. Pat. No. 11,742,578.

U.S. Appl. No. 17/690,841, filed Mar. 9, 2022, US 2022-0268870 A1, Aug. 25, 2022, Issued as U.S. Pat. No. 11,777,215.

U.S. Appl. No. 17/690,849, filed Mar. 9, 2022, US 2022-0271431 A1, Aug. 25, 2022, Issued as U.S. Pat. No. 11,695,209.

U.S. Appl. No. 17/690,852, filed Mar. 9, 2022, US 2022-0276330 A1, Sep. 1, 2022, Issued as U.S. Pat. No. 11,664,594.

U.S. Appl. No. 17/690,860, filed Mar. 9, 2022, US 2022-0278463 A1, Sep. 1, 2022, Issued as U.S. Pat. No. 11,742,579.

U.S. Appl. No. 17/690,870, filed Mar. 9, 2022, US 2022-0278735 A1, Sep. 1, 2022, Issued as U.S. Pat. No. 11,843,188.

U.S. Appl. No. 18/117,180, filed Mar. 3, 2023, US 2023-0223692 A1, Jul. 13, 2023, Granted—USP to Issue Jan. 9, 2024.

U.S. Appl. No. 18/104,624, filed Feb. 1, 2023, US 2023-0307835 A1, Sep. 28, 2023, Issued as U.S. Pat. No. 11,862,871.

U.S. Appl. No. 18/104,630, filed Feb. 1, 2023, US 2023-0187828 A1, Jun. 15, 2023, Issued as U.S. Pat. No. 11,824,280.

U.S. Appl. No. 18/368,840, filed Sep. 15, 2023, Pending—Ready for Examination.

U.S. Appl. No. 18/236,525, filed Aug. 22, 2023, Pending—Ready for Examination.

U.S. Appl. No. 18/196,568, filed May 12, 2023, US 2023-0291104 A1, Sep. 14, 2023, Allowed—Notice of Allowance Mailed Dec. 11, 2023.

U.S. Appl. No. 18/226,576, filed Jul. 26, 2023, US 2023-0378650 A1, Nov. 23, 2023, Pending—Ready for Examination.

U.S. Appl. No. 18/141,944, filed May 1, 2023, US 2023-0282980 A1, Sep. 7, 2023, Notice of Allowance Mailed Nov. 15, 2023.

U.S. Appl. No. 18/368,850, filed Sep. 15, 2023, Pending—Ready for Examination.

U.S. Appl. No. 18/229,900, filed Aug. 3, 2023, US 2023-0387593 A1, Nov. 30, 2023, Pending—Ready for Examination.

(56) References Cited

OTHER PUBLICATIONS

U.S. Appl. No. 18/216,231, filed Jun. 29, 2023, US 2023-0352836 A1, Nov. 2, 2023, Notice of Allowance Mailed Jan. 17, 2024.
U.S. Appl. No. 18/217,468, filed Jun. 30, 2023, US 2023-0361471 A1, Nov. 9, 2023, Pending—Ready for Examination.
U.S. Appl. No. 18/378,017, filed Oct. 9, 2023, Pending—Ready for Examination.
U.S. Appl. No. 18/378,022, filed Oct. 9, 2023, Pending—Ready for Examination.
U.S. Appl. No. 18/378,045, filed Oct. 9, 2023, Pending—Ready for Examination.
U.S. Appl. No. 17/679,817, filed Feb. 24, 2022.
U.S. Appl. No. 17/690,732, filed Mar. 9, 2022.
U.S. Appl. No. 17/690,747, filed Mar. 9, 2022.
U.S. Appl. No. 17/690,761, filed Mar. 9, 2022.
U.S. Appl. No. 17/690,769, filed Mar. 9, 2022.
U.S. Appl. No. 17/690,779, filed Mar. 9, 2022.
U.S. Appl. No. 17/690,824, filed Mar. 9, 2022.
U.S. Appl. No. 17/690,830, filed Mar. 9, 2022.
U.S. Appl. No. 17/690,841, filed Mar. 9, 2022.
U.S. Appl. No. 17/690,849, filed Mar. 9, 2022.
U.S. Appl. No. 17/690,852, filed Mar. 9, 2022.
U.S. Appl. No. 17/690,860, filed Mar. 9, 2022.
U.S. Appl. No. 17/690,870, filed Mar. 9, 2022.
U.S. Appl. No. 18/117,180, filed Mar. 3, 2023.
U.S. Appl. No. 18/104,624, filed Feb. 1, 2023.
U.S. Appl. No. 18/104,630, filed Feb. 1, 2023.
U.S. Appl. No. 18/368,840, filed Sep. 15, 2023.
U.S. Appl. No. 18/236,525, filed Aug. 22, 2023.
U.S. Appl. No. 18/196,568, filed May 12, 2023.
U.S. Appl. No. 18/226,576, filed Jul. 26, 2023.
U.S. Appl. No. 18/141,944, filed May 1, 2023.
U.S. Appl. No. 18/368,850, filed Sep. 15, 2023.
U.S. Appl. No. 18/229,900, filed Aug. 3, 2023.
U.S. Appl. No. 18/216,231, filed Jun. 29, 2023.
U.S. Appl. No. 18/217,468, filed Jun. 30, 2023.
U.S. Appl. No. 18/378,017, filed Oct. 9, 2023.
U.S. Appl. No. 18/378,022, filed Oct. 9, 2023.
U.S. Appl. No. 18/378,045, filed Oct. 9, 2023.
U.S. Appl. No. 18/381,031, filed Oct. 17, 2023.
U.S. Appl. No. 18/620,553, filed Mar. 28, 2024.
U.S. Appl. No. 18/600,445, filed Mar. 8, 2024.
U.S. Appl. No. 18/609,219, filed Mar. 19, 2024.
U.S. Appl. No. 18/648,991, filed Apr. 29, 2024.
U.S. Appl. No. 18/732,164, filed Jun. 3, 2024.
U.S. Appl. No. 18/732,225, filed Jun. 3, 2024.

\* cited by examiner

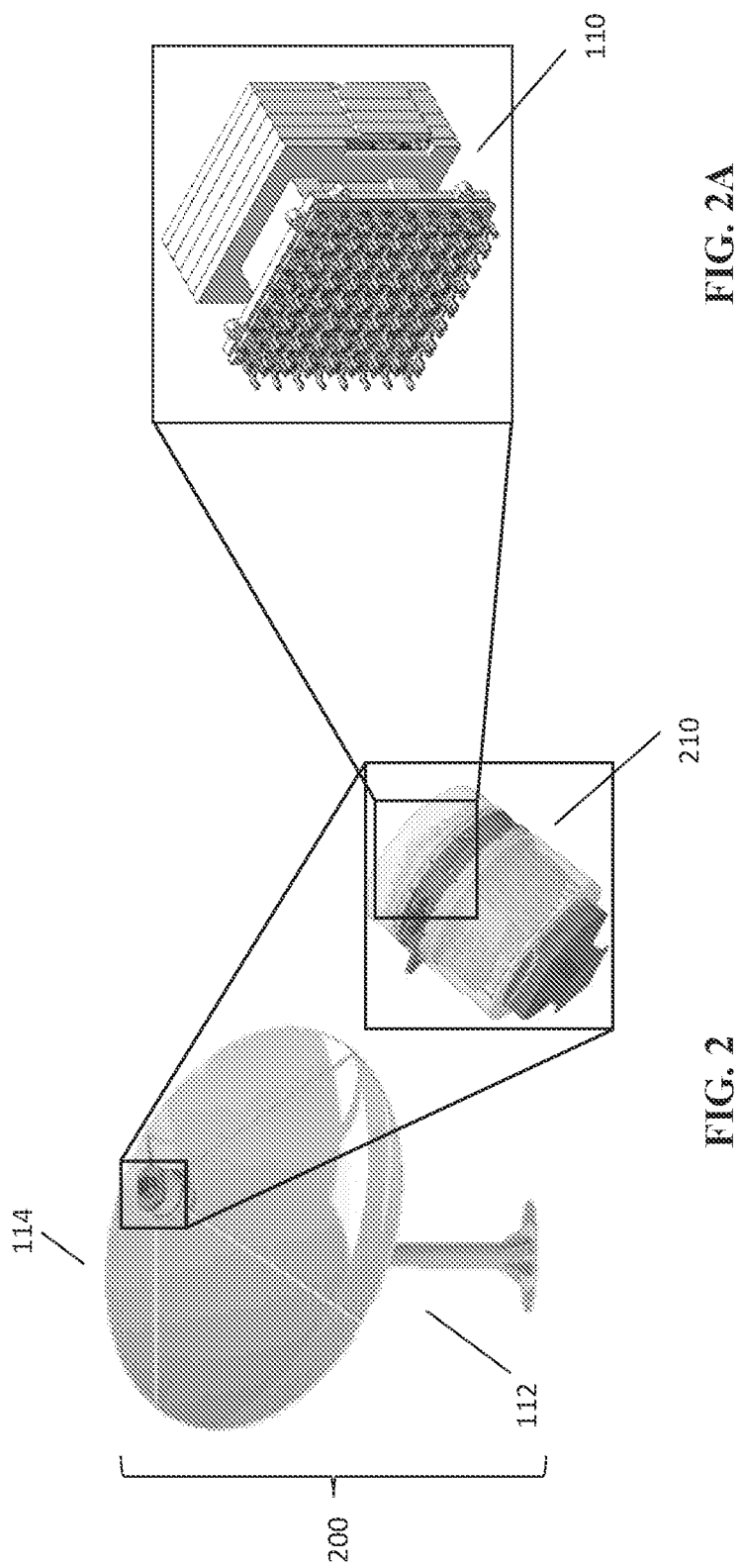

Uniform Taper

Beam Broadening Taper

| Mission Frequency | Local Oscillator | Intermediate Frequency | Tuner Channel | Offset |
|---|---|---|---|---|
| 4,398 MHz | 1: 4,900 MHz | 502 MHz | 3: 468.75 MHz | 33.25 MHz |
| 4,250 MHz | 1: 4,900 MHz | 650 MHz | 4: 675 MHz | -25.0 MHz |
| 1,900 MHz | 2: 3,000 MHz | 1,100 MHz | 7: 1,093.75 MHz | 6.25 MHz |
| 1,975 MHz | 2: 3,000 MHz | 1,175 MHz | 7: 1,093.75 MHz | 81.25 MHz |

FIG. 18

S1902: receiving, from a digital software system interface via a system controller by memory of the digitally beamformed phased array system, the respective mission center radio frequency S1904: storing, by memory operatively connected to the system controller, the respective mission center radio frequency S1906: transporting, from the memory to the respective polarization frequency converter and the respective orthogonal polarization frequency converter, the respective mission center radio frequency

FIG. 19

S2302: receiving, from the digital software system interface via the system controller by memory of the digitally beamformed phased array system, the respective oscillating signal frequency S2304: storing, by memory operatively connected to the system controller, the respective oscillating signal frequency S2306: transporting, from the memory to the respective digital beamformer, the respective oscillating signal frequency for the respective principal polarization component and the respective orthogonal polarization component

FIG. 23

S2400: receiving, by a first coupled dipole array antenna element, a plurality of respective modulated signals associated with a plurality of respective radio frequencies S2402A: receiving, by a first principal polarization frequency converter of a first pair of frequency converters, from a first principal polarization component of the first coupled dipole array antenna element, respective first modulated signals associated with the respective radio frequencies S2404A: converting, by the first principal polarization frequency converter, the respective first modulated signals into respective second modulated signals having a first intermediate frequency S2406A: receiving, by a first digital beamformer, from the first principal polarization frequency converter, the respective second modulated signals associated with the first intermediate frequency S2408A: converting, by the first digital beamformer, the respective second modulated signal from an analog signal to a digital data format S2410A: generating, by the first digital beamformer, a first plurality of channels of first digital data by decimating the first digital data using a first polyphase channelizer and filtering using a first plurality of cascaded halfband filters Continue to FIG. 24B

FIG. 24A

S2400: receiving, by a first coupled dipole array antenna element, a plurality of respective modulated signals associated with a plurality of respective radio frequencies S2402B: receiving, by a first orthogonal polarization frequency converter of the first pair of frequency converters, from a first orthogonal polarization component of the first coupled dipole array antenna element, respective third modulated signals associated with the respective radio frequencies S2404B: converting, by the first orthogonal polarization frequency converter, the respective third modulated signals into respective fourth modulated signals having the first intermediate frequency S2406B: receiving, by a second digital beamformer, from the first orthogonal polarization frequency converter, the respective fourth modulated signals associated with the first intermediate frequency S2408B: converting, by the second digital beamformer, the respective fourth modulated signal from an analog signal to a digital data format S2410B: generating, by the second digital beamformer, a second plurality of channels of second digital data by decimating the second digital data using a second polyphase channelizer and filtering using a second plurality of cascaded halfband filters Continue to FIG. 24D

FIG. 24C

S2500A: receiving, by a first digital beamformer, a first partial beam of a first beam along with a first set of a plurality of other partial beams of the first beam from a digital software system interface via a data transport bus S2502A: applying, by the first digital beamformer, a first weighting factor to first transmit digital data associated with the first partial beam of the first beam of the plurality of beams S2504A: transmitting, by the first digital beamformer, the first transmit digital data to a first digital to analog converter S2506A: converting, by the first digital to analog converter, the first transmit digital data from a digital signal to an analog signal having a first intermediate frequency S2508A: receiving, by a first principal polarization frequency converter of a first pair of frequency converters, respective first modulated signals associated with the first intermediate frequency from the first digital beamformer S2510A: converting, by the first principal polarization frequency converter, the respective first modulated signals associated with the first intermediate frequency into respective second modulated signals having a radio frequency S2412B: transmitting, by the first principal polarization frequency converter, the respective second modulated signals from the first principal polarization frequency converter to a first principal polarization component of a first coupled dipole array antenna element S2414A: transmitting, by the first principal polarization component, the second modulated signals associated with the respective radio frequencies

FIG. 25A

S2500B: receiving, by a second digital beamformer, a second partial beam of the first beam along with a third set of a plurality of other partial beams of the first beam from the digital software system interface via the data transport bus S2502B: applying, by the second digital beamformer, a second weighting factor to second transmit digital data associated with the second partial beam of the first beam S2504B: transmitting, by the second digital beamformer, the second transmit digital data to a second digital to analog converter S2506B: converting, using the second digital to analog converter, the second transmit digital data from a digital signal to an analog signal having the first intermediate frequency S2508B: receiving, by a first orthogonal polarization frequency converter of the first pair of frequency converters, respective third modulated signals associated with the first intermediate frequency from the second digital beamformer S2510B: converting, by the first orthogonal polarization frequency converter, the respective third modulated signals associated with the first intermediate frequency into respective fourth modulated signals having a radio frequency S2412B: transmitting, by the first orthogonal polarization frequency converter, the respective fourth modulated signals from the first orthogonal polarization frequency converter to a first orthogonal polarization component of the first coupled dipole array antenna element S2414B: transmitting, by the first orthogonal polarization component, the fourth modulated signals associated with the respective radio frequencies

FIG. 25B

S3102: generating, by a digital software system, a graphical display during a first time period S3102A: receiving, by the digital software system via a pedestal controller operatively connected to a first parabolic reflector, first angular direction information comprising a first azimuth axis component and a first elevation axis component associated with the first parabolic reflector S3102B: receiving, by the digital software system via a system controller from a plurality of antenna array elements, a first set of respective first digital data streams associated with a first plurality of partial beams S3102C: processing, by the digital software system, the first set of respective first digital data streams associated with the first plurality of partial beams to generate a second set of respective second digital data stream associated with the first plurality of beams S3102D: processing, by the digital software system, the second set of respective second digital data streams associated with the first plurality of beams to determine respective location information for each of a first set of at least one object S3102E: generating, by the digital software system, the graphical display S3102F: displaying, by the digital software system, at least a portion of the graphical display Continue to FIG. 31B

FIG. 31A

```
Continued from FIG. 31A
```

S3104: selecting and assigning, using the digital software system, the first object and associated priority information S3104A: selecting, using the digital software system, the first object displayed by the graphical display S3104B: assigning, using the digital software system, first priority information to the first object S3104C: assigning, by the digital software system, a first beam of the first plurality of beams to the first object

Continued from FIG. 31B

S3106: providing, by the digital software system, respective direction information associated with the first beam and the first parabolic reflector S3106A: generating, by the digital software system, a respective first weighting factor associated with the first beam as part of a first array of weighting factors associated with the first plurality of beams S3106B: generating, by the digital software system display, second angular direction information comprising a second azimuth axis component and a second elevation axis component associated with the first parabolic reflector S3106C: transmitting, from the digital software system via the system controller to a respective digital beamformer, the respective first weighting factor associated with the first beam S3106D: transmitting, by the digital software system display via the pedestal controller to the first parabolic reflector, the second angular direction information Continue to FIG. 31D

FIG. 31C

Continued from FIG. 31C

S3108: updating, by the digital software system, the graphical display

S3108A: receiving, by the digital software system via the pedestal controller, third angular direction information comprising a third azimuth axis component and a third elevation axis component associated with the first parabolic reflector S3108B: receiving, by the digital software system via the system controller from the plurality of antenna array elements, a third set of respective third digital data streams associated with the first plurality of partial beams S3108C: processing, by the digital software system, the third set of respective third digital data streams associated with the first plurality of partial beams to generate a fourth set of a respective fourth digital data streams associated with the first plurality of beams S3108D: processing, by the digital software system, fourth set of respective fourth digital data streams associated with the first plurality of beams to generate first object movement information associated with the first object S3108E: updating, by the digital software system, the graphical display Continue to FIG. 31E

FIG. 31D

Continued from FIG. 31D

S3110: providing, by the digital software system, respective updated direction information associated with the first beam and the first parabolic reflector S3110A: generating, by the digital software system, fourth angular direction information comprising a fourth azimuth axis component and a fourth elevation axis component associated with the first parabolic reflector S3110B: generating, by the digital software system, a respective second weighting factor associated with the first beam as part of a second array of weighting factors associated with the first plurality of beams S3110C: transmitting, by the digital software system via the pedestal controller to the first parabolic reflector, the fourth angular direction information S3110D: transmitting, from the digital software via the system controller to the respective digital beamformer, the respective second weighting factor

FIG. 31E

Continued from step S3110 of FIG. 31E

S3110A: generating, by the digital software system, fourth angular direction information comprising a fourth azimuth axis component and a fourth elevation axis component associated with the first parabolic reflector S3110A-1: determining a first angular direction trajectory associated with the respective angular direction of the first parabolic reflector S3110A-2: determining whether the first parabolic reflector is projected to exceed a maximum elevation angle based on the first angular direction trajectory Yes / No S3110A-4: determining whether the second elevation axis has exceeded a first threshold elevation angle S3110A-3: generating the fourth angular direction information based on the first beam and the first angular direction trajectory Yes / No S3110A-6: calculating a first tangent trajectory associated with the respective angular direction of the first parabolic reflector S3110A-5: generating the fourth angular direction information based on the first beam and the first angular direction trajectory S3110A-7: generating the fourth angular direction information based on the first beam and the first tangent trajectory

Continued with step S3110B of FIG. 31E

FIG. 31F

Continued from step S3204C of FIG. 32A

S3306: providing, by the digital software system, respective direction information associated with the first beam, the second beam, and the first parabolic reflector S3306A: generating, by the digital software system, a respective first weighting factor associated with the first beam as part of a first array of weighting factors associated with the first plurality of beams S3306B: generating, by the digital software system, a respective second weighting factor associated with a second beam as part of the first array of weighting factors associated with the first plurality of beams S3306C: generating, by the digital software system display, second angular direction information comprising a second azimuth axis component and a second elevation axis component associated with the first parabolic reflector S3306D: transmitting, from the digital software system via the system controller to a first respective digital beamformer, the respective first weighting factor associated with the first beam S3306E: transmitting, from the digital software system via the system controller to a second respective digital beamformer, the respective second weighting factor associated with the first beam S3306F: transmitting, by the digital software system display via the pedestal controller to the first parabolic reflector, the second angular direction information Continue to step 3308 of FIG. 33

FIG. 33A

Continued from FIG. 33A

S3308: updating, by the digital software system, the graphical display

S3308A: receiving, by the digital software system via the pedestal controller, third angular direction information comprising a third azimuth axis component and a third elevation axis component associated with the first parabolic reflector S3308B: receiving, by the digital software system via the system controller from the plurality of antenna array elements, a third set of respective third digital data streams associated with the first plurality of partial beams S3308C: processing, by the digital software system, the third set of respective third digital data streams associated with the first plurality of partial beams to generate a fourth set of respective fourth digital data streams associated with the first plurality of beams S3308D: processing, by the digital software system, the fourth set of respective fourth digital data streams associated with the first plurality of beams to generate first object movement information associated with the first object and second object movement information associated with the second object S3308E: updating, by the digital software system, the graphical display Continue to step S3310 of FIG. 33

FIG. 33B

Continued from step 3310A of FIG. 33C

S3312: providing, by the digital software system, respective updated direction information associated with the first beam, the second beam, and the first parabolic reflector S3312A: generating, by the digital software system, fourth angular direction information comprising a fourth azimuth axis component and a fourth elevation axis component associated with the first parabolic reflector S3312B: generating, by the digital software system, a respective third weighting factor associated with the first beam as part of a second array of weighting factors associated with the first plurality of beams S3312C: generating, by the digital software system, a respective fourth weighting factor associated with the first beam as part of a second array of weighting factors associated with the first plurality of beams S3312D: transmitting, by the digital software system via the pedestal controller to the first parabolic reflector, the fourth angular direction information S3312E: transmitting, from the digital software via the system controller to the first respective digital beamformer, the respective third weighting factor S3312F: transmitting, from the digital software via the system controller to the second respective digital beamformer, the respective fourth weighting factor

FIG. 33D

Continued from step S3310 of FIG. 33C

S3312A: generating, by the digital software system, fourth angular direction information comprising a fourth azimuth axis component and a fourth elevation axis component associated with the first parabolic reflector S3312A-1: determining a first angular direction trajectory associated with the respective angular direction of the first parabolic reflector S3312A-2: determining whether the first parabolic reflector is projected to exceed a maximum elevation angle based on the first angular direction trajectory Yes → S3312A-4: determining whether the second elevation axis has exceeded a first threshold elevation angle No → S3312A-3: generate the fourth angular direction information based on the first beam, the second beam and the first angular direction trajectory Yes → S3312A-6: calculating a first tangent trajectory associated with the respective angular direction of the first parabolic reflector No → S3312A-5: generate the fourth angular direction information based on the first beam, the second beam and the first angular direction trajectory S3312A-7: generate the fourth angular direction information based on the first beam, the second beam and the first tangent trajectory Continued with step S3312B of FIG. 33D

FIG. 33E

SYSTEM AND METHOD FOR A DIGITALLY BEAMFORMED PHASED ARRAY FEED

RELATED APPLICATIONS

This application is a continuation of U.S. patent application Ser. No. 18/117,180, filed on Mar. 3, 2023, and entitled "SYSTEM AND METHOD FOR A DIGITALLY BEAMFORMED PHASED ARRAY FEED", which is a continuation of U.S. patent application Ser. No. 17/679,817, filed Feb. 24, 2022, and entitled "SYSTEM AND METHOD FOR A DIGITALLY BEAMFORMED PHASED ARRAY FEED", which claims the benefit and priority to U.S. Provisional Patent Application No. 63/200,260, filed on Feb. 24, 2021, and entitled "SYSTEM AND METHOD FOR A DIGITALLY BEAMFORMED PHASED ARRAY FEED", U.S. Provisional Patent Application No. 63/188,959, filed on May 14, 2021, and entitled "SYSTEM AND METHOD FOR A DIGITALLY BEAMFORMED PHASED ARRAY FEED" and U.S. Provisional Patent Application No. 63/262,124, filed on Oct. 5, 2021, and entitled "SYSTEM AND METHOD FOR A DIGITALLY BEAMFORMED PHASED ARRAY FEED", the entire contents of each of which are incorporated by reference herein.

FIELD OF THE INVENTION

The present invention generally relates to systems and methods for a digitally beamformed phased array feed. In embodiments, the digitally beamformed phased array feed may be used in conjunction with a parabolic reflector. In embodiments, the present invention generally relates to systems and methods for a large form-factor phased array utilizing a plurality of multi-band software defined antenna array tiles.

BACKGROUND

Satellite communications are made between communications satellites and parabolic reflector antennas of ground stations on Earth. Most traditional satellite communications require satellites to maintain geostationary orbit 22,236 miles above the equator so that the parabolic reflector antennas can be aimed permanently at that spot and the parabolic surfaces and/or reflectors do not have to move in order to track the flight object. In this existing system, wherever the parabolic reflector antenna is mechanically pointing is where the antenna beam is pointing and therefore the target flight object must be located within the beam in order for the antenna to track or communicate with the object.

The current state of satellite communication has a number of problems. For example, existing parabolic reflector antennas are fitted for single band signals and because of traditional beamforming techniques, a parabolic reflector antenna may only communicate with one flight object at a time. The existing state of the art is a static technology, where one antenna is designed specifically for one reflector. Further, the application of existing satellite antennas fixed to moving objects such as ships and fast-moving aircraft remains difficult due to the significant design challenges involved in stabilizing the reflector such that the antenna beam remains fixed on the desired target.

It would therefore be beneficial to implement a digital beamforming technique which includes digital sampling and processing of antenna element data to steer the direction of the antenna beam to allow for simultaneous tracking of multiple flight objects with a single antenna array. It would be further beneficial to permit rapid configuration and multi-band operations from a single antenna array.

SUMMARY

In view of the above, it is the object of the present disclosure to provide a technological solution to address the long felt need and technological challenges faced in conventional satellite communication systems in which traditional antennas are designed for receiving and transmitting single band signals to and from one flight object at time. The present disclosure provides for a system of a digitally beamformed phased array feed that allows for receiving and transmitting signals within multiple bandwidths for multiple flight objects simultaneously.

In embodiments, a method for digital beamforming may include: (a) receiving, by a first coupled dipole array antenna element of a plurality coupled dipole array antenna elements of a multi-band software defined antenna array tile, a plurality of respective modulated signals associated with a plurality of respective radio frequencies, wherein each coupled dipole array antenna element of the plurality of coupled dipole array antenna elements includes a respective principal polarization component oriented in a first direction and a respective orthogonal polarization component oriented in a second direction; (b) receiving, by a first principal polarization frequency converter of a first pair of frequency converters of a plurality of pairs of frequency converters of the multi-band software defined antenna array tile, from a first principal polarization component of the first coupled dipole array antenna element of the plurality of coupled dipole array antenna elements, respective first modulated signals associated with the respective radio frequencies of the plurality of respective radio frequencies, wherein each pair of frequency converters of the plurality of pairs frequency converters is operatively connected to a respective coupled dipole array antenna element, and wherein each pair of frequency converters of the plurality of pairs frequency converters includes a respective principal polarization converter corresponding to a respective principal polarization component and a respective orthogonal polarization converter corresponding to a respective orthogonal polarization component; (c) converting, by the first principal polarization frequency converter of the first pair of frequency converters, the respective first modulated signals associated with the respective radio frequencies of the plurality of radio frequencies into respective second modulated signals having a first intermediate frequency; (d) receiving, by a first digital beamformer of a plurality of digital beamformers of the multi-band software defined antenna array tile, from the first principal polarization frequency converter, the respective second modulated signals associated with the first intermediate frequency, wherein the plurality of digital beamformers are operatively connected to the plurality of pairs of frequency converters, and wherein each digital beamformer is operatively connected to one of the respective principal polarization frequency converter and the respective orthogonal polarization frequency converter; (e) converting, by the first digital beamformer, the respective second modulated signal from an analog signal to a digital data format; (f) generating, by the first digital beamformer, a first plurality of channels of first digital data by decimating the first digital data using a first polyphase channelizer and filtering using a first plurality of cascaded halfband filters; (g) selecting, by the first digital beamformer, a first channel of the first plurality of channels; (h) applying, by the first digital beamformer, a first weighting factor to the first digital data associated with the first channel to generate a first intermediate partial beamformed data stream; (i) combining, by the first digital beamformer, the first intermediate partial beamformed data stream with the plurality of other intermediate partial beamformed data streams to generate a first partial beamformed data stream; (j) applying, by the first digital beamformer, a first oscillating signal to the first partial beamformed data stream to generate a first oscillating partial beamformed data stream; (k) applying, by the first digital beamformer, a first three-stage halfband filter to the first oscillating partial beamformed data stream to generate a first filtered partial beamformed data stream; (l) applying, by the first digital beamformer, a first time delay to the first filtered partial beamformed data stream to generate a first partial beam; and (m) transmitting, by the first digital beamformer via a data transport bus to a digital software system interface, the first partial beam of a first beam, which is transmitted via the data transport bus along with a first set of a plurality of other partial beams of the first beam.

In embodiments, the method further includes, prior to step (a), the steps of: reflecting, from a surface of a parabolic reflector mounted on a support pedestal, the plurality of respective modulated signals and transmitting the reflected plurality of respective modulated signals through a radome to the first coupled dipole array antenna element.

In embodiments, the plurality of coupled dipole array antenna elements are tightly coupled relative to the wavelength of operation.

In embodiments, the plurality of coupled dipole array antenna elements are spaced at less than half a wavelength.

In embodiments, the plurality of pairs of frequency converters further includes thermoelectric coolers configured to actively manage thermally the system noise temperature and increase the system gain over temperature.

In embodiments, the plurality of pairs of frequency converters further include a plurality of spatially distributed high power amplifiers so as to increase the effective isotropic radiated power.

In embodiments, the first intermediate frequency is between 50 MHz and 1250 MHz.

In embodiments, the radio frequencies are between 900 MHz and 6000 MHz.

In embodiments, the radio frequencies are between 2000 MHz and 12000 MHz.

In embodiments, the radio frequencies are between 10000 MHZ and 50000 MHz.

In embodiments, the method further includes converting, by the first digital beamformer the respective modulated signal from an analog signal to a digital data format by performing First-Nyquist sampling.

In embodiments, the method further includes selecting, by the first digital beamformer, the first channel of the first plurality of channels using a first multiplexer.

In embodiments, the method further includes transmitting, by the first digital beamformer via the data transport bus to the digital software system interface, the first partial beam of the first beam, which is transmitted via the data transport bus along with a second set of a plurality of other partial beams of a second beam.

In embodiments, the method further includes, after step (a): (n) receiving, by a first orthogonal polarization frequency converter of the first pair of frequency converters of the plurality of pairs of frequency converters of the multi-band software defined antenna array tile, from a first orthogonal polarization component of the first coupled dipole array antenna element of the plurality of coupled dipole array antenna elements, respective third modulated signals associated with the respective radio frequencies of the plurality of respective radio frequencies; (o) converting, by the first orthogonal polarization frequency converter of the first pair of frequency converters, the respective third modulated signals associated with the respective radio frequencies of the plurality of radio frequencies into respective fourth modulated signals having the first intermediate frequency; (p) receiving, by a second digital beamformer of the plurality of digital beamformers of the multi-band software defined antenna array tile, from the first orthogonal polarization frequency converter of the first pair of frequency converters, the respective fourth modulated signals associated with the first intermediate frequency; (q) converting, by the second digital beamformer, the respective fourth modulated signal from an analog signal to a digital data format; (r) generating, by the second digital beamformer, a second plurality of channels of second digital data by decimating the second digital data using a second polyphase channelizer and filtering using a second plurality of cascaded halfband filters; (s) selecting, by the second digital beamformer, a second channel of the second plurality of channels; (t) applying, by the second digital beamformer, a second weighting factor to the second digital data associated with the second channel to generate a second intermediate partial beamformed data stream; (u) combining, by the second digital beamformer, the second intermediate partial beamformed data stream with the plurality of other intermediate partial beamformed data streams to generate a second partial beamformed data stream; (v) applying, by the second digital beamformer, a second oscillating signal to the second partial beamformed data stream to generate a second oscillating partial beamformed data stream; (w) applying, by the second digital beamformer, a second three-stage halfband filter to the second oscillating partial beamformed data stream to generate a second filtered partial beamformed data stream; (x) applying, by the second digital beamformer, a second time delay to the second filtered partial beamformed data stream to generate a second partial beam; and (y) transmitting, by the second digital beamformer via the data transport bus to the digital software system interface, the second partial beam of the first beam, which is transmitted via the data transport bus along with a third set of a plurality of other partial beams of the first beam.

In embodiments, the method further includes converting, by the second digital beamformer, the respective modulated signal from an analog signal to a digital data format by performing First-Nyquist sampling.

In embodiments, the method further includes selecting, by the second digital beamformer, the second channel of the second plurality of channels using a second multiplexer.

In embodiments, the second oscillating signal is the same as the first oscillating signal.

In embodiments, the second channel is the same as the first channel.

In embodiments, the method further includes transmitting, by the second digital beamformer via the data transport bus to the digital software system interface, the second partial beam of the second beam, which is transmitted via the data transport bus along with a fourth set of a plurality of other partial beams of the second beam.

In embodiments, a respective intermediate frequency is associated with a respective mission center radio frequency.

In embodiments, the respective mission center radio frequency is obtained by the steps of: (a) receiving, from the digital software system interface via a system controller by memory of the multi-band software defined antenna array tile, for the respective coupled dipole array antenna element of the plurality of respective coupled dipole array antenna elements, the respective mission center radio frequency; (b) storing, by memory operatively connected to the system controller, the respective mission center radio frequency for the respective coupled dipole antenna array element; and (c) transporting, from the memory to the respective principal polarization frequency converter and the respective orthogonal polarization frequency converter, the respective mission center frequency for the respective coupled dipole array antenna element.

In embodiments, the respective intermediate frequency is a respective mission intermediate frequency corresponding to the respective mission center radio frequency and is obtained by the steps of: (a) receiving, from the digital software system interface via the system controller by memory of the multi-band software defined antenna array tile, for the respective coupled dipole array antenna element of the plurality of respective coupled dipole array antenna elements, the respective mission intermediate frequency; (b) storing, by memory operatively connected to the system controller, the respective mission intermediate frequency for the respective coupled dipole array antenna element; and (c) transporting, from the memory to the respective principal polarization frequency converter and the respective orthogonal polarization frequency converter, the respective mission intermediate frequency for the respective coupled dipole array antenna element.

In embodiments, a respective channel is selected by the steps of: (a) receiving, from the digital software system interface via the system controller by memory of the multi-band software defined antenna array tile, for the respective principal polarization component and the respective orthogonal polarization component of the respective coupled dipole array antenna element of the plurality of respective coupled dipole array antenna elements, the respective channel selection; (b) storing, by memory operatively connected to the system controller, the respective channel selection for the respective principal polarization component and the respective orthogonal polarization component of the respective coupled dipole array antenna element; and (c) transporting, from the memory to the respective digital beamformer, the respective channel selection for the respective principal polarization component and the respective orthogonal polarization component of the respective coupled dipole array element.

In embodiments, the respective channel selection is associated with a respective tuner channel frequency.

In embodiments, the respective tuner channel frequency corresponds to the respective mission intermediate frequency.

In embodiments, a respective weighting factor is part of an array of weighting factors obtained by the steps of: (a) receiving, from the digital software system interface via the system controller by memory of the multi-band software defined antenna array tile, for the respective principal polarization component and the respective orthogonal polarization component of the respective coupled dipole array antenna element of the plurality of respective coupled dipole array antenna elements, the respective weighting factor; (b) storing, by memory operatively connected to the system controller, the respective weighting factor for the respective principal polarization component and the respective orthogonal polarization component of the respective coupled dipole array antenna element of the plurality of respective coupled dipole array antenna elements; and (c) transporting, from the memory to the respective digital beamformer, the respective weighting factor for the respective principal polarization component and the respective orthogonal polarization component of the respective coupled dipole array antenna element of the plurality of respective coupled dipole array antenna elements.

In embodiments, the respective weighting factor is generated for the respective principal polarization component and the respective orthogonal polarization component of the respective coupled dipole array antenna element as a function of: i. a respective tuning parameter; ii. a respective power parameter; and iii. a respective location of the respective principal polarization component and the respective orthogonal polarization component of the respective coupled dipole array antenna element with respect to the center of the multi-band software defined antenna array tile.

In embodiments, the digital software system interface generates the array of weighting factors by using the formula:

$$w_{m,n} = \frac{A_{m,n}}{\overline{\left(A_{m,n}^{tap} * A_{m,n}^{cal}\right)}} * e^{-j*\overline{\left(\theta_{m,n}^{steer} + \theta_{m,n}^{tap} + \theta_{m,n}^{cal}\right)}}$$

wherein $w_{m,n}$ is a weighting factor associated with each position in the antenna array expressed as a horizontal position m and a vertical position n, $A_{m,n}$ is an amplitude weighting factor associated with each position in the antenna array expressed as a horizontal position m and a vertical position n, $A^{tap}$ is a tapered amplitude weighting factor associated with each position in the antenna array expressed as a horizontal position m and a vertical position n, $A^{cal}$ is a calibration weighting factor associated with each position in the antenna array expressed as a horizontal position m and a vertical position n, $\theta_{m,n}$ is a phase factor associated with each position in the antenna array expressed as a horizontal position m and a vertical position n, and $\theta^{cal}$ is a steering phase factor associated with each position in the antenna array expressed as a horizontal position m and a vertical position n, $\theta^{tap}$ is a taper phase factor associated with each position in the antenna array expressed as a horizontal position m and a vertical position n, and $\theta^{cal}$ is a calibration phase factor associated with each position in the antenna array expressed as a horizontal position m and a vertical position n.

In embodiments, the digital software system interface generates the respective weighting factor by using the formula:

$$w(t) = \left(\frac{\cosh\left(\pi\alpha * \sqrt{1-4t^2}\right)}{\cosh(\pi\alpha)}\right)^P$$

wherein w(t) is the respective weighting factor at a location t, where t is defined by an array associated with a location of the respective principal polarization component and the respective orthogonal polarization component of the respective coupled dipole array antenna element, a is the respective tuning parameter, and P is the respective power parameter.

In embodiments, the digital software system interface receives specific mission parameters for the plurality of coupled dipole array antenna elements as an input, and wherein the digital software system interface uses the specific mission parameters to generate the array of weighting factors.

In embodiments, the respective weighting factor is selected from the array of weighting factors.

In embodiments, a respective oscillating signal is associated with a respective oscillating signal frequency.

In embodiments, the respective oscillating signal frequency is obtained by performing the steps of: (a) receiving, from the digital software system interface via the system controller by memory of the multi-band software defined antenna array tile, for the respective principal polarization component and the respective orthogonal polarization component of the respective coupled dipole array antenna element of the plurality of respective coupled dipole array antenna elements, the respective oscillating signal frequency; (b) storing, by memory operatively connected to the system controller, the respective oscillating signal frequency for the respective principal polarization component and the respective orthogonal polarization component of the respective coupled dipole array element; and (c) transporting, from the memory to the respective digital beamformer, the respective oscillating signal frequency for the respective principal polarization component and the respective orthogonal polarization component of the respective coupled dipole array element.

In embodiments, the respective oscillating signal frequency corresponds to the respective tuner channel frequency.

In embodiments, a plurality of oscillating signal frequencies may be received for a plurality of principal polarization components and a plurality of orthogonal polarization components of the plurality of respective coupled dipole array antenna elements.

In embodiments, the digital software system interface receives specific mission parameters for respective coupled dipole array antenna elements as an input, and wherein the digital software system interface uses the specific mission parameters to generate the respective oscillating signal frequency.

In embodiments, a method may include (a) receiving, from a digital software system interface via a system controller by memory of a multi-band software defined antenna array tile, for a respective coupled dipole array antenna element of a plurality of respective coupled dipole array antenna elements of the multi-band software defined antenna array tile: i. a respective mission center radio frequency; ii. a respective mission intermediate frequency, wherein each coupled dipole array antenna element of the plurality of coupled dipole array antenna elements includes a respective principal polarization component oriented in a first direction and a respective orthogonal polarization component oriented in a second direction; (b) receiving, from the digital software system interface via the system controller by the memory of the multi-band software defined antenna array tile, for a respective principal polarization component and a respective orthogonal polarization component of the respective coupled dipole array antenna element of the plurality of respective coupled dipole array antenna elements: i. a respective channel selection; ii. a respective weighting factor as part of an array of weighting factors; iii. a respective oscillating signal frequency; (c) storing, by the memory operatively connected to the system controller: i. a respective channel selection; ii. the respective mission intermediate frequency for the respective coupled dipole array antenna element; iii. the respective channel selection for the respective principal polarization component and the respective orthogonal polarization component of the respective coupled dipole array antenna element; iv. each respective weighting factor of the array of weighting factors for the respective principal polarization component and the respective orthogonal polarization component of the respective coupled dipole array antenna element of the plurality of respective coupled dipole array antenna elements; and v. the respective oscillating signal frequency for the respective principal polarization component and the respective orthogonal polarization component of the respective coupled dipole array element; (d) transporting, from the memory to a respective principal polarization frequency converter and a respective orthogonal polarization frequency converter: i. the respective mission center radio frequency for the respective coupled dipole array antenna element; ii. the respective mission intermediate frequency for the respective coupled dipole array antenna element, wherein the respective principal polarization frequency converter and the respective orthogonal polarization frequency converter are a part of a respective pair of frequency converters of a plurality of pairs of frequency converters of the multi-band software defined antenna array tile, wherein each pair of frequency converters of the plurality of pairs frequency converters is operatively connected to a respective coupled dipole array antenna element, and wherein each pair of frequency converters of the plurality of pairs frequency converters includes the respective principal polarization converter corresponding to a respective principal polarization component and the respective orthogonal polarization converter corresponding to a respective orthogonal polarization component; (e) transporting, from the memory to a respective digital beamformer of a plurality of digital beamformers: i. the respective channel selection for the respective principal polarization component and the respective orthogonal polarization component of the respective coupled dipole array element; ii. each respective weighting factor of the array of weighting factors for the respective principal polarization component and the respective orthogonal polarization component of the respective coupled dipole array antenna element of the plurality of respective coupled dipole array antenna elements; iii. the respective oscillating signal frequency for the respective principal polarization component and the respective orthogonal polarization component of the respective coupled dipole array element, wherein the plurality of digital beamformers are operatively connected to the plurality of pairs of frequency converters, and wherein each digital beamformer is operatively connected to one of the respective principal polarization frequency converter and the respective orthogonal polarization frequency converter; (f) receiving, by a first coupled dipole array antenna element of the plurality coupled dipole array antenna elements of the multi-band software defined antenna array tile, a plurality of respective modulated signals associated with a plurality of respective radio frequencies, wherein the plurality of respective radio frequencies is associated with the respective mission center radio frequency, (g) receiving, by a first principal polarization frequency converter of a first pair of frequency converters of the plurality of pairs of frequency converters of the multi-band software defined antenna array tile, from a first principal polarization component of the first coupled dipole array antenna element of the plurality of coupled dipole array antenna elements, respective first modulated signals associated with the respective radio frequencies of the plurality of respective radio frequencies, (h) converting, by the first principal polarization frequency converter of the first pair of frequency converters, the respective first modulated signals associated with the respective radio frequencies of the plurality of radio frequencies into respective second modulated signals having a first intermediate frequency, wherein the first intermediate frequency is associated with the respective mission intermediate frequency; (i) receiving, by a first digital beamformer of the plurality of digital beamformers of the multi-band software defined antenna array tile, from the first principal polarization frequency converter, the respective second modulated signals associated with the first intermediate frequency, (j) converting, by the first digital beamformer, the respective second modulated signal from an analog signal to a digital data format; (k) generating, by the first digital beamformer, a first plurality of channels of first digital data by decimating the first digital data using a first polyphase channelizer and filtering using a first plurality of cascaded halfband filters; (l) selecting, by the first digital beamformer, a first channel of the first plurality of channels, wherein the first channel is associated with the respective channel selection; (m) applying, by the first digital beamformer, a first weighting factor to the first digital data associated with the first channel to generate a first intermediate partial beamformed data stream, wherein the first weighting factor is associated with the array of weighting factors; (n) combining, by the first digital beamformer, the first intermediate partial beamformed data stream with the plurality of other intermediate partial beamformed data streams to generate a first partial beamformed data stream; (o) applying, by the first digital beamformer, a first oscillating signal to the first partial beamformed data stream to generate a first oscillating partial beamformed data stream, wherein the first oscillating signal is associated with the respective oscillating signal frequency; (p) applying, by the first digital beamformer, a first three-stage halfband filter to the first oscillating partial beamformed data stream to generate a first filtered partial beamformed data stream; (q) applying, by the first digital beamformer, a first time delay to the first filtered partial beamformed data stream to generate a first partial beam; and (r) transmitting, by the first digital beamformer via a data transport bus to a digital software system interface, the first partial beam of a first beam, which is transmitted via the data transport bus along with a first set of a plurality of other partial beams of the first beam.

In embodiments, a method may include: (a) receiving, by a first digital beamformer of a plurality of digital beamformers of a multi-band software defined antenna array tile, a first partial beam of a first beam of a plurality of beams along with a first set of the plurality of other partial beams of the first beam from a digital software system interface via a data transport bus, (b) applying, by the first digital beamformer, a first weighting factor to first transmit digital data associated with the first partial beam of the first beam of the plurality of beams; (c) transmitting, by the first digital beamformer, the first transmit digital data to a first digital to analog converter; (d) converting, using the first digital to analog converter, the first transmit digital data from a digital signal to an analog signal having a first intermediate frequency; (e) receiving, by a first principal polarization frequency converter of a first pair of frequency converters of a plurality of pairs of frequency converters of the multi-band software defined antenna array tile, respective first modulated signals associated with the first intermediate frequency from the first digital beamformer of the plurality of digital beamformers, wherein each pair of frequency converters of the plurality of pairs frequency converters includes a respective principal polarization converter corresponding to a respective principal polarization component and a respective orthogonal polarization converter corresponding to a respective orthogonal polarization component, wherein the plurality of digital beamformers are operatively connected to the plurality of pairs of frequency converters, and wherein each digital beamformer is operatively connected to one of the respective principal polarization frequency converter and the respective orthogonal polarization frequency converter; (f) converting, by the first principal polarization frequency converter of the first pair of frequency converters, the respective first modulated signals associated with the first intermediate frequency into respective second modulated signals associated with a respective radio frequency; (g) transmitting, from the first principal polarization frequency converter of the first pair of frequency converters, the respective second modulated signals associated with the respective radio frequency to a respective coupled dipole array antenna element of a plurality of coupled dipole array antenna elements, wherein each pair of frequency converters of the plurality of pairs frequency converters is operatively connected to a respective coupled dipole array antenna element of the plurality of coupled dipole array antenna elements, and wherein each coupled dipole array antenna element of the plurality of coupled dipole array antenna elements includes a respective principal polarization component oriented in a first direction and a respective orthogonal polarization component oriented in a second direction; and (h) transmitting, by the respective coupled dipole array antenna element, the respective second modulated signals associated with the respective radio frequency.

In embodiments, the transmitting step h) includes the steps of transmitting the respective second modulated signals associated with the respective radio frequency through a radome and reflecting the respective second modulated signals from the surface of a parabolic reflector mounted on a support pedestal.

In embodiments, the method may further include, after step (a): (i) receiving, by a second digital beamformer of the plurality of digital beamformers of a multi-band software defined antenna array tile, a second partial beam of the first beam of the plurality of beams along with a second set of the plurality of other partial beams of the first beam from the digital software system interface via the data transport bus, (j) applying, by the second digital beamformer, a second weighting factor to second transmit digital data associated with the second partial beam of the first beam of the plurality of beams; (k) transmitting, by the second digital beamformer, the second transmit digital data to a second digital to analog converter; (l) converting, using the second digital to analog converter, the second transmit digital data from a digital signal to an analog signal having the first intermediate frequency; (m) receiving, by a first orthogonal polarization frequency converter of the first pair of frequency converters of the plurality of pairs of frequency converters of the multi-band software defined antenna array tile, respective third modulated signals associated with the first intermediate frequency from the second digital beamformer of the plurality of digital beamformers, (n) converting, by the first orthogonal polarization frequency converter of the first pair of frequency converters, the respective third modulated signals associated with the first intermediate frequency into respective fourth modulated signals associated with the respective radio frequency; (o) transmitting, from the first orthogonal polarization frequency converter of the first pair of frequency converters, the respective fourth modulated signals associated with the respective radio frequency to the respective coupled dipole array antenna element of the plurality of coupled dipole array antenna elements; and (p) transmitting, by the respective coupled dipole array antenna element, the respective fourth modulated signals associated with the respective radio frequency.

In embodiments, a multi-band software defined antenna array tile may include: (a) a plurality of coupled dipole array antenna elements, wherein each coupled dipole array antenna element includes a principal polarization component oriented in a first direction and an orthogonal polarization component oriented in a second direction, and is configured to receive and transmit a plurality of respective first modulated signals associated with a plurality of respective radio frequencies; (b) a plurality of pairs of frequency converters, each pair of frequency converters associated with a respective coupled dipole array antenna element and including a respective principal polarization converter corresponding to a respective principal polarization component and a respective orthogonal polarization converter corresponding to a respective orthogonal polarization component, and each principal polarization converter and each respective orthogonal polarization converter is configured to: (1) receive respective first modulated signals associated with the respective radio frequencies of the plurality of radio frequencies from the respective coupled dipole array antenna element, wherein the respective radio frequencies are associated with a respective mission center radio frequency received from memory operatively connected to a system controller; and (2) convert the respective first modulated signals associated with the respective radio frequencies of the plurality of radio frequencies into respective second modulated signals having a first intermediate frequency, wherein the first intermediate frequency is associated with a respective mission intermediate frequency received from the memory operatively connected to the system controller; and (c) a plurality of digital beamformers operatively connected to the plurality of pairs of frequency converters wherein each digital beamformer is operatively connected to one of the respective principal polarization frequency converter and the respective orthogonal polarization frequency converter and each digital beamformer is configured to: (1) receive the respective second modulated signals associated with the first intermediate frequency; (2) convert the respective second modulated signal from an analog signal to a digital data format; (3) generate a plurality of channels of the digital data by decimation of the digital data using a polyphase channelizer and filter using a plurality of cascaded halfband filters; (4) select one of the plurality of channels, wherein the selected one of the plurality of channels is associated with a respective channel selection received from the memory operatively connected to the system controller; (5) apply a first weighting factor to the digital data associated with the selected one of the plurality of channels to generate a first intermediate partial beamformed data stream, wherein the first weighting factor is a respective weighting factor associated with an array of weighting factors received from the memory operatively connect to the system controller; (6) combine the first intermediate partial beamformed data stream with the plurality of other intermediate partial beamformed data streams to generate a first partial beamformed data stream; (7) apply an oscillating signal to the first partial beamformed data stream to generate a first oscillating partial beamformed data stream, wherein the oscillating signal is associated with a respective oscillating signal frequency received from the memory operatively connected to the system controller; (8) apply a three-stage halfband filter to the first oscillating partial beamformed data stream to generate a first filtered partial beamformed data stream; (9) apply a time delay to the first filtered partial beamformed data stream to generate a first partial beam; and (10) transmit the first partial beam of a first beam along with a first set of a plurality of other partial beams of the first beam to a digital software system interface via a data transport bus.

In embodiments, each digital beamformer has a transmit mode of operation associated with converting a plurality of transmit digital data from a digital signal to an analog signal having a plurality of respective intermediate frequencies, and wherein each digital beamformer is further configured to: (11) receive the first partial beam of the first beam along with the first set of the plurality of other partial beams of the first beam from the digital software system interface via the data transport bus; (12) apply a second weighting factor to first transmit digital data associated with the first partial beam of the first beam of the plurality of beams; (13) transmit the first transmit digital data to a first digital to analog converter; and (14) convert, using the first digital to analog converter, the first transmit digital data from a digital signal to an analog signal having the first intermediate frequency.

In embodiments, each digital beamformer is further configured to receive the first partial beam of the first beam along with the second set of a plurality of other beams of the second beam from the digital software system interface via the data transport bus.

In embodiments, each digital beamformer is further configured to convert, using the first digital to analog converter, the first transmit digital data from a digital signal to an analog signal having the first intermediate frequency by performing First-Nyquist sampling.

In embodiments, each principal polarization converter and each respective orthogonal polarization converter have a transmit mode of operation associated with transmitting respective modulated signals associated with a plurality of radio frequencies, and wherein each principal polarization converter and its respective orthogonal polarization converter is further configured to: (3) receive respective third modulated signals associated with the first intermediate frequency from the respective digital beamformer of the plurality of digital beamformers; (4) convert the respective third modulated signals associated with the first intermediate frequency into respective fourth modulated signals having a radio frequency; and (5) transmit the respective fourth modulated signals associated with the respective radio frequencies of the plurality of radio frequencies from each principal polarization converter and each orthogonal polarization converter of the respective pair of frequency converters of the plurality of pairs of frequency converters to the respective coupled dipole array antenna element of the plurality of coupled dipole array antenna elements.

In embodiments, each digital beamformer has a transmit mode of operation associated with converting a plurality of transmit digital data from a digital signal to an analog signal having a plurality of respective intermediate frequencies, and wherein each digital beamformer is further configured to: (15) receive a third partial beam of a third beam along with a third set of a plurality of other partial beams of the third beam from the digital software system interface via the data transport bus; (16) apply a third weighting factor to second transmit digital data associated with the third partial beam of the third beam; (17) transmit the second transmit digital data to a second digital to analog converter; and (18) convert, using the second digital to analog converter, the second transmit digital data from a digital signal to an analog signal having a second intermediate frequency.

In embodiments, each digital beamformer is further configured to receive the third partial beam of the third beam along with a fourth set of a plurality of other beams of a fourth beam from the digital software system interface via the data transport bus.

In embodiments, the second intermediate frequency is between 50 MHz and 1250 MHz.

In embodiments, the second intermediate frequency is the same as the first intermediate frequency.

In embodiments, each digital beamformer is further configured to convert, using the second digital to analog converter, the second transmit digital data from a digital signal to an analog signal having a second intermediate frequency by performing First-Nyquist sampling.

In embodiments, each principal polarization converter and each respective orthogonal polarization converter have a transmit mode of operation associated with transmitting respective modulated signals associated with a plurality of radio frequencies, and wherein each principal polarization converter and its respective orthogonal polarization converter is further configured to:

In embodiments, each principal polarization converter and each respective orthogonal polarization converter have a transmit mode of operation associated with transmitting respective modulated signals associated with a plurality of radio frequencies, and wherein each principal polarization converter and its respective orthogonal polarization converter is further configured to: (6) receive respective fifth modulated signals associated with the second intermediate frequency from the respective digital beamformer of the plurality of digital beamformers; (7) convert the respective fifth modulated signals associated with the second intermediate frequency into respective sixth modulated signals having a radio frequency; and (8) transmit the respective sixth modulated signals associated with the respective radio frequencies of the plurality of radio frequencies from each principal polarization converter and each orthogonal polarization converter of the respective pair of frequency converters of the plurality of pairs of frequency converters to each principal polarization component and each orthogonal polarization component of the respective coupled dipole antenna element of the plurality of coupled dipole antenna elements.

In embodiments, each coupled dipole antenna array element has a transmit mode of operation associated with transmitting a plurality of respective radio frequencies, and wherein each principal polarization component and each orthogonal polarization component of the respective coupled dipole antenna array element is further configured to transmit the respective sixth modulated signals associated with the respective radio frequencies of the plurality of radio frequencies.

In embodiments, the respective mission center radio frequency is obtained by the steps of: (a) receiving, from the digital software system interface via the system controller by the memory of the multi-band software defined antenna array tile, for the respective coupled dipole array antenna element of the plurality of respective coupled dipole array antenna elements, the respective mission center radio frequency; (b) storing, by the memory operatively connected to the system controller, the respective mission center radio frequency for the respective coupled dipole antenna array element; and (c) transporting, from the memory to the respective principal polarization frequency converter and the respective orthogonal polarization frequency converter, the respective mission center frequency for the respective coupled dipole array antenna element.

In embodiments, the respective mission intermediate frequency corresponds to the respective mission center radio frequency and is obtained by the steps of: (a) receiving, from the digital software system interface via the system controller by the memory of the multi-band software defined antenna array tile, for the respective coupled dipole array antenna element of the plurality of respective coupled dipole array antenna elements, the respective mission intermediate frequency; (b) storing, by the memory operatively connected to the system controller, the respective mission intermediate frequency for the respective coupled dipole array antenna element; and (c) transporting, from the memory to the respective principal polarization frequency converter and the respective orthogonal polarization frequency converter, the respective mission intermediate frequency for the respective coupled dipole array antenna element.

In embodiments, a respective channel is selected by the steps of: (a) receiving, from the digital software system interface via the system controller by the memory of the multi-band software defined antenna array tile, for the respective principal polarization component and the respective orthogonal polarization component of the respective coupled dipole array antenna element of the plurality of respective coupled dipole array antenna elements, the respective channel selection; (b) storing, by the memory operatively connected to the system controller, the respective channel selection for the respective principal polarization component and the respective orthogonal polarization component of the respective coupled dipole array antenna element; and (c) transporting, from the memory to the respective digital beamformer, the respective channel selection for the respective principal polarization component and the respective orthogonal polarization component of the respective coupled dipole array element.

In embodiments, the respective channel selection is associated with a respective tuner channel frequency.

In embodiments, the respective tuner channel frequency corresponds to the respective mission intermediate frequency.

In embodiments, each respective weighting factor of the array of weighting factors is obtained by the steps of: (a) receiving, from the digital software system interface via the system controller by the memory of the multi-band software defined antenna array tile, for the respective principal polarization component and the respective orthogonal polarization component of the respective coupled dipole array antenna element of the plurality of respective coupled dipole array antenna elements, the respective weighting factor; (b) storing, by the memory operatively connected to the system controller, the respective weighting factor for the respective principal polarization component and the respective orthogonal polarization component of the respective coupled dipole array antenna element of the plurality of respective coupled dipole array antenna elements; and (c) transporting, from the memory to the respective digital beamformer, the respective weighting factor for the respective principal polarization component and the respective orthogonal polarization component of the respective coupled dipole array antenna element of the plurality of respective coupled dipole array antenna elements.

In embodiments, the respective weighting factor is generated for the respective principal polarization component and the respective orthogonal polarization component of the respective coupled dipole array antenna element as a function of: i. a respective tuning parameter; ii. a respective power parameter; and iii. a respective location of the respective principal polarization component and the respective orthogonal polarization component of the respective coupled dipole array antenna element with respect to the center of the multi-band software defined antenna array tile.

In embodiments, the digital software system interface generates the array of weighting factors by using the formula:

$$w_{m,n} = \overline{\left(A_{m,n}^{tap} * A_{m,n}^{cal}\right)} * e^{-j*\overline{\left(\theta_{m,n}^{steer} + \theta_{m,n}^{tap} + \theta_{m,n}^{cal}\right)}}$$

wherein $w_{m,n}$ is the respective weighting factor associated with each position in the antenna array expressed as a horizontal position m and a vertical position n, $A_{m,n}$ is an amplitude weighting factor associated with each position in the antenna array expressed as a horizontal position m and a vertical position n, $A^{tap}$ is a tapered amplitude weighting factor associated with each position in the antenna array expressed as a horizontal position m and a vertical position n, $A^{cal}$ is a calibration weighting factor associated with each position in the antenna array expressed as a horizontal position m and a vertical position n, $\theta_{m,n}$ is a phase factor associated with each position in the antenna array expressed as a horizontal position m and a vertical position n, $\theta^{steer}$ is a steering phase factor associated with each position in the antenna array expressed as a horizontal position m and a vertical position n, $\theta^{tap}$ is a taper phase factor associated with each position in the antenna array expressed as a horizontal position m and a vertical position n, and $\theta^{cal}$ is a calibration phase factor associated with each position in the antenna array expressed as a horizontal position m and a vertical position n.

In embodiments, the digital software system interface generates the respective weighting factor by using the formula:

$$w(t) = \left(\frac{\cosh(\pi\alpha * \sqrt{1-4t^2})}{\cosh(\pi\alpha)}\right)^P$$

wherein w(t) is the respective weighting factor at a location t, where t is defined by an array associated with a location of the respective principal polarization component and the respective orthogonal polarization component of the respective coupled dipole array antenna element, a is the respective tuning parameter, and P is the respective power parameter.

In embodiments, the digital software system interface receives specific mission parameters for the plurality of coupled dipole array antenna elements as an input, and wherein the digital software system interface uses the specific mission parameters to generate the array of weighting factors.

In embodiments, the respective weighting factor is selected from the array of weighting factors.

In embodiments, the respective oscillating signal frequency is obtained by performing the steps of: (a) receiving, from the digital software system interface via the system controller by the memory of the multi-band software defined antenna array tile, for the respective principal polarization component and the respective orthogonal polarization component of the respective coupled dipole array antenna element of the plurality of respective coupled dipole array antenna elements, the respective oscillating signal frequency; (b) storing, by memory operatively connected to the system controller, the respective oscillating signal frequency for the respective principal polarization component and the respective orthogonal polarization component of the respective coupled dipole array element; (c) transporting, from the memory to the respective digital beamformer, the respective oscillating signal frequency for the respective principal polarization component and the respective orthogonal polarization component of the respective coupled dipole array element.

In embodiments, the respective oscillating signal frequency corresponds to the respective tuner channel frequency.

In embodiments, a plurality of oscillating signal frequencies may be received for a plurality of principal polarization components and a plurality of orthogonal polarization components of the plurality of respective coupled dipole array antenna elements.

In embodiments, the digital software system interface receives specific mission parameters for respective coupled dipole array antenna elements as an input, and wherein the digital software system interface uses the specific mission parameters to generate the respective oscillating signal frequency.

In embodiments, the multi-band software defined antenna array tile is used as part of a large form-factor phased array system including a plurality of multi-band software defined antenna array tiles.

In embodiments, the large form-factor phased array system is stationary.

In embodiments, the large form-factor phased array system is mounted on a vehicle.

In embodiments, the vehicle is an aerial vehicle.

In embodiments, the vehicle is a nautical vehicle.

In embodiments, the vehicle is a terrestrial vehicle.

In embodiments, the multi-band software defined antenna array tile is used in conjunction with a wide area scanning parabolic apparatus including a digitally beamformed phased array and a parabolic reflector mounted on a support pedestal.

In embodiments, the digitally beamformed phased array includes a radome configured to allow electromagnetic waves to propagate, the multi-band software defined antenna array tile, a power and clock management subsystem configured to manage power and time of operation, a thermal management subsystem configured to dissipate heat generated by the multi-band software defined antenna array tile; and an enclosure assembly.

In embodiments, a method may include: (a) generating, by a digital software system, a graphical display during a first time period by the steps of: i. receiving, by the digital software system via a pedestal controller operatively connected to a first parabolic reflector, first angular direction information including a first azimuth axis component and a first elevation axis component associated with the first parabolic reflector; ii. receiving, by the digital software system via a data transport bus, a first set of respective first digital data streams associated with a first plurality of partial beams, wherein each respective partial beam of the first plurality of partial beams is associated with a respective first digital data stream and data in the respective first digital data stream is associated with a first plurality of respective modulated radio frequency signals received by a plurality of antenna array elements; iii. processing, by the digital software system, the first set of respective first digital data streams associated with the first plurality of partial beams to generate a second set of respective second digital data streams associated with the first plurality of beams, wherein each beam of the first plurality of beams is based on at least two respective first digital data streams; iv. processing, by the digital software system, the second set of respective second digital data streams associated with the first plurality of beams to determine respective location information for each object of a first set of objects associated with the first plurality of beams including at least a first object; v. generating, by the digital software system, the graphical display which displays: (1) the first plurality of beams; (2) the first set of objects including at least the first object; (3) a first azimuth axis based on the first azimuth axis component; and (4) a first elevation axis based on the first elevation axis component; and vi. displaying, by the digital software system, at least a portion of the graphical display on a display operably connected to the digital software system; (b) assigning, by the digital software system, priority information to the first object by the steps of: i. selecting the first object displayed by the graphical display; ii. assigning first priority information to the first object; and iii. assigning a first beam of the first plurality of beams to the first object; (c) providing, by the digital software system, respective direction information associated with the first beam and the first parabolic reflector by the steps of: i. generating, by the digital software system, a respective first weighting factor associated with the first beam as part of a first array of weighting factors associated with the first plurality of beams based on: (1) the respective location information associated with the first object; (2) the first azimuth axis; and (3) the first elevation axis; ii. generating, by the digital software system, second angular direction information including a second azimuth axis component and a second elevation axis component associated with the first parabolic reflector based on: (1) the first beam; (2) the respective location information associated with the first object; (3) the first azimuth axis; and (4) the first elevation axis; iii. transmitting, from the digital software system via a system controller to a respective digital beamformer of a plurality of digital beamformers operatively connected to the plurality of antenna array elements and the system controller, the respective first weighting factor associated with the first beam; and iv. transmitting, by the digital software system via the pedestal controller to the first parabolic reflector, the second angular direction information; (d) updating, by the digital software system, the graphical display during a second time period by the steps of: i. receiving, by the digital software system via the pedestal controller, third angular direction information including a third azimuth axis component and a third elevation axis component associated with the first parabolic reflector; ii. receiving, by the digital software system via the data transport bus, a third set of respective third digital data streams associated with the first plurality of partial beams, wherein each respective partial beam of the first plurality of partial beams is associated with a respective third digital data stream and data in the respective third digital data stream is associated with a second plurality of respective modulated radio frequency signals received by the plurality of antenna array elements; iii. processing, by the digital software system, the third set of respective third digital data streams associated with the first plurality of partial beams to generate a fourth set of respective fourth digital data streams associated with the first plurality of beams, wherein each beam of the first plurality of beams is based on at least two respective fourth digital data streams; iv. processing, by the digital software system, the fourth set of respective fourth digital data streams associated with the first plurality of beams to generate first object movement information associated with the first object, wherein the first object movement information includes a first object angular velocity and a first object angular direction, and wherein the first object angular direction includes a first object elevation angle component and a first object azimuth angle component; v. updating, by the digital software system, the graphical display to display: (1) the first plurality of beams; (2) the first set of objects including at least the first object based at least on the first object movement information; (3) a second azimuth axis based on the third azimuth axis component; and (4) a second elevation axis based on the third elevation axis component; and (e) providing, by the digital software system, respective updated direction information associated with the first beam and the first parabolic reflector by the steps of: i. generating, by the digital software system, fourth angular direction information including a fourth azimuth axis component and a fourth elevation axis component associated with the first parabolic reflector by the steps of: a. determining, by the digital software system, a first angular direction trajectory associated with the respective angular direction of the first parabolic reflector based on: 1. the respective location information associated with the first object; 2. the first object movement information; 3. the third angular direction information; 4. the second azimuth axis; and 5. the second elevation axis; b. determining, by the digital software system, whether the first parabolic reflector is projected to exceed a maximum elevation angle based on the first angular direction trajectory; c. in the case where the first parabolic reflector is not projected to exceed the maximum elevation angle, generating, by the digital software system, the fourth angular direction information based on: 1. the first beam; and 2. the first angular direction trajectory; d. in the case where the first parabolic reflector is projected to exceed the maximum elevation angle, determining, by the digital software system, whether the second elevation axis has exceeded a first threshold elevation angle; e. in the case where the second elevation axis has not exceeded the first threshold elevation angle, generating, by the digital software system, the fourth angular direction information based on: 1. the first beam; and 2. the first angular direction trajectory; f. in the case where the second elevation axis has exceeded the first threshold elevation angle, calculating, by the digital software system, a first tangent trajectory associated with the respective angular direction of the first parabolic reflector based on the first angular direction trajectory, wherein the first tangent trajectory includes a first azimuth trajectory component and a first elevation trajectory component; and g. generating, by the digital software system, the fourth angular direction information based on: 1. the first beam; and 2. the first tangent trajectory; ii. generating, by the digital software system, a respective second weighting factor associated with the first beam as part of a second array of weighting factors associated with the first plurality of beams based on: (1) the first angular direction trajectory; (2) the fourth angular direction information; (3) the first object movement information; (4) the second azimuth axis, and (5) the second elevation axis; iii. transmitting, by the digital software system via the pedestal controller to the first parabolic reflector, the fourth angular direction information, wherein the pedestal controller adjusts the respective angular direction associated with the first parabolic reflector based on the fourth angular direction information; and iv. transmitting, from the digital software via the system controller to the respective digital beamformer of the plurality of digital beamformers, the respective second weighting factor.

In embodiments, each partial beam is formed by a respective digital beamformer of the plurality of digital beamformers.

In embodiments, each of the first plurality of beams includes 2 partial beams.

In embodiments, the selecting step (b)(i) is performed manually by a user using one or more input elements operably connected to the digital software system.

In embodiments, the selecting step (b)(i) is performed automatically by the digital software system based on characteristics of the first object.

In embodiments, the assigning step (b)(ii) is performed manually by a user using one or more input elements operably connected to the digital software system.

In embodiments, the assigning step (b)(ii) is performed automatically by the digital software system based on characteristics of the first object.

In embodiments, the first priority information is a primary object weight.

In embodiments, the first priority information is a secondary object weight.

In embodiments, the first priority information is a ternary object weight.

In embodiments, a method may include: (a) updating, by a digital software system, a graphical display during a first time period by the steps of: i. receiving, by the digital software system via a pedestal controller operatively connected to a first parabolic reflector, first angular direction information including a first azimuth axis component and a first elevation axis component associated with the first parabolic; ii. receiving, by the digital software system via a data transport bus, a first set of respective first digital data streams associated with a first plurality of partial beams, wherein each respective partial beam of the first plurality of partial beams is associated with a respective first digital data stream and data in the respective first digital data stream is associated with a first plurality of respective modulated radio frequency signals received by a plurality of antenna array elements; iii. processing, by the digital software system, the first set of respective first digital data streams associated with the first plurality of partial beams to generate a second set of respective second digital data streams associated with the first plurality of beams, wherein each beam of the first plurality of beams is based on at least two respective first digital data streams; iv. processing, by the digital software system, the second set of respective second digital data streams associated with the first plurality of beams to generate first location information and first object movement information associated with a first object associated with a first beam of the first plurality of beams, wherein the first object movement information includes a first object angular velocity and a first object angular direction, and wherein the first object angular direction includes a first object elevation angle component and a first object azimuth angle component; and v. updating, by the digital software system, the graphical display to display: (1) the first plurality of beams; (2) the first object based at least on the first object movement information; (3) a first azimuth axis based on the first azimuth axis component; and (4) a first elevation axis based on the first elevation axis component; (b) providing, by the digital software system, respective updated direction information associated with the first beam and the first parabolic reflector by the steps of: i. generating, by the digital software system, second angular direction information including a second azimuth axis component and a second elevation axis component associated with the first parabolic reflector by the steps of: a. determining, by the digital software system, a first angular direction trajectory associated with the respective angular direction of the first parabolic reflector based on: 1. the first location information associated with the first object; 2. the first object movement information; 3. the first angular direction information; 4. the first azimuth axis; and 5. the first elevation axis; b. determining, by the digital software system, whether the first parabolic reflector is projected to exceed a maximum elevation angle based on the first angular direction trajectory; c. in the case where the first parabolic reflector is not projected to exceed the maximum elevation angle, generating, by the digital software system, the second angular direction information based on: 1. the first beam; and 2. the first angular direction trajectory; d. in the case where the first parabolic reflector is projected to exceed the maximum elevation angle, determining, by the digital software system, whether the first elevation axis has exceeded a first threshold elevation angle; e. in the case where the first elevation axis has not exceeded the first threshold elevation angle, generating, by the digital software system, the second angular direction information based on: 1. the first beam; and 2. the first angular direction trajectory; f. in the case where the first elevation axis has exceeded the first threshold elevation angle, calculating, by the digital software system, a first tangent trajectory associated with the respective angular direction of the first parabolic reflector based on the first angular direction trajectory, wherein the first tangent trajectory includes a first azimuth trajectory component and a first elevation trajectory component; and g. generating, by the digital software system, the second angular direction information based on: 1. the first beam; and 2. the first tangent trajectory; ii. generating, by the digital software system, a respective first weighting factor associated with the first beam as part of a first array of weighting factors associated with the first plurality of beams based on: (1) the first angular direction trajectory; (2) the second angular direction information; (3) the first object movement information; (4) the first azimuth axis, and (5) the first elevation axis; iii. transmitting, by the digital software system via the pedestal controller to the first parabolic reflector, the second angular direction information, wherein the pedestal controller adjusts the respective angular direction associated with the first parabolic reflector based on the second angular direction information; and iv. transmitting, from the digital software via the system controller to a respective digital beamformer of a plurality of digital beamformers operatively connected to the plurality of antenna array elements and the system controller, the respective second weighting factor.

In embodiments, each partial beam is formed by a respective digital beamformer of the plurality of digital beamformers.

In embodiments, each of the first plurality of beams includes 2 partial beams.

In embodiments, a method may include: (a) generating, by a digital software system, a graphical display during a first time period by the steps of: i. receiving, by the digital software system via a pedestal controller operatively connected to a first parabolic reflector, first angular direction information including a first azimuth axis component and a first elevation axis component associated with the first parabolic reflector; ii. receiving, by the digital software system via a data transport bus, a first set of respective first digital data streams associated with a first plurality of partial beams, wherein each respective partial beam of the first plurality of partial beams is associated with a respective first digital data stream and data in the respective first digital data stream is associated with a first plurality of respective modulated radio frequency signals received by a plurality of antenna array elements; iii. processing, by the digital software system, the first set of respective first digital data streams associated with the first plurality of partial beams to generate a second set of respective second digital data streams associated with the first plurality of beams, wherein each beam of the first plurality of beams is based on at least two respective first digital data streams; iv. processing, by the digital software system, the second set of respective second digital data streams associated with the first plurality of beams to determine respective location information for each object of a first set of objects associated with the first plurality of beams including at least a first object and a second object; v. generating, by the digital software system, the graphical display which displays: (1) the first plurality of beams; (2) the first set of objects including at least the first object and the second object; (3) a first azimuth axis based on the first azimuth axis component; and (4) a first elevation axis based on the first elevation axis component; and vi. displaying, by the digital software system, at least a portion of the graphical display on a display operably connected to the digital software system; (b) assigning, by the digital software system, priority information to the first object and the second object by the steps of: i. selecting the first object displayed by the graphical display; ii. assigning first priority information to the first object; iii. assigning a first beam of the first plurality of beams to the first object; iv. selecting the second object displayed by the graphical display; v. assigning second priority information to the second object; and vi. assigning a second beam of the first plurality of beams to the second object; (c) providing, by the digital software system, respective direction information associated with the first beam, the second beam and the first parabolic reflector by the steps of: i. generating, by the digital software system, a respective first weighting factor associated with the first beam as part of a first array of weighting factors associated with the first plurality of beams based on: (1) the respective location information associated with the first object; (2) the first azimuth axis; and (3) the first elevation axis; ii. generating, by the digital software system, a respective second weighting factor associated with the second beam as part of the first array of weighting factors associated with the first plurality of beams based on: (1) the respective location information associated with the second object; (2) the first azimuth axis; and (3) the first elevation axis; iii. generating, by the digital software system, second angular direction information including a second azimuth axis component and a second elevation axis component associated with the first parabolic reflector based on: (1) the first beam; (2) the second beam; (3) the respective location information associated with the first object; (4) the respective location information associated with the second object; (5) the first priority information; (6) the second priority information; (7) the first azimuth axis; and (8) the first elevation axis; iv. transmitting, from the digital software via a system controller to a first respective digital beamformer of a plurality of digital beamformers operatively connected to the plurality of antenna array elements and the system controller, the respective first weighting factor associated with the first beam; v. transmitting, from the digital software via the system controller to a second respective digital beamformer of the plurality of digital beamformers operatively connected to the plurality of antenna array elements and the system controller, the respective second weighting factor associated with the second beam; and vi. transmitting, by the digital software system via the pedestal controller to the first parabolic reflector, the second angular direction information; (d) updating, by the digital software system, the graphical display during a second time period by the steps of: i. receiving, by the digital software system via the pedestal controller, third angular direction information including a third azimuth axis component and a third elevation axis component associated with the first parabolic reflector; ii. receiving, by the digital software system via the data transport bus, a third set of respective third digital data streams associated with the first plurality of partial beams, wherein each respective partial beam of the first plurality of partial beams is associated with a respective third digital data stream and data in the respective third digital data stream is associated with a second plurality of respective modulated radio frequency signals received by the plurality of antenna array elements; iii. processing, by the digital software system, the third set of respective third digital data streams associated with the first plurality of partial beams to generate a fourth set of respective fourth digital data streams associated with the first plurality of beams, wherein each beam of the first plurality of beams is based on at least two respective fourth digital data streams; iv. processing, by the digital software system, the fourth set of respective fourth digital data streams associated with the first plurality of beams to generate first object movement information associated with the first object and second object movement information associated with the second object, wherein the first object movement information includes a first object angular velocity and a first object angular direction, and wherein the first object angular direction includes a first object elevation angle component and a first object azimuth angle component, and wherein the second object movement information includes a second object angular velocity and a second object angular direction, and wherein the second object angular direction includes a second object elevation angle component and a second object azimuth angle component; and v. updating, by the digital software system, the graphical display to display: (1) the first plurality of beams; (2) the first set of objects including the first object and the second object based at least on the first object movement information and the second object movement information; (3) a second azimuth axis based on the third azimuth axis component; and (4) a second elevation axis based on the third elevation axis component; (e) determining, by the digital software system, whether to unassign the first beam from the first object or the second beam from the second object by the steps of i. determining, by the digital software system, whether one of the first object and the second object has exceeded a first maximum distance from the second elevation axis and the second azimuth axis based on: (1) the respective location information associated with the first object; (2) the respective location information associated with the second object; (3) the first object movement information; (4) the second object movement information; (5) the second azimuth axis; and (6) the second elevation axis; and (f) in the case where one of the first object and the second object has not exceeded the first maximum distance, providing, by the digital software system, respective updated direction information associated with the first beam, the second beam and the first parabolic reflector by the steps of: i. generating, by the digital software system, fourth angular direction information including a fourth azimuth axis component and a fourth elevation axis component associated with the first parabolic reflector by the steps of: a. determining, by the digital software system, a first angular direction trajectory associated with the respective angular direction of the first parabolic reflector based on: i. the respective location information associated with the first object; ii. the respective location information associated with the second object; iii. the first priority information; iv. the second priority information; v. the first object movement information; vi. the second object movement information; vii. the third angular direction information; viii. the second azimuth axis; ix. the second elevation axis; b. determining, by the digital software system, whether the first parabolic reflector is projected to exceed a maximum elevation angle based on the first angular direction trajectory; c. in the case where the first parabolic reflector is not projected to exceed the maximum elevation angle, generating, by the digital software system, the fourth angular direction information based on: 1. the first beam; 2. the second beam; and 3. the first angular direction trajectory; d. in the case where the first parabolic reflector is projected to exceed the maximum elevation angle, determining, by the digital software system, whether the second elevation axis has exceeded a first threshold elevation angle; e. in the case where the second elevation has not exceeded the first threshold elevation angle, generating, by the digital software system, the fourth angular direction information based on: 1. the first beam; 2. the second beam; and 3. the first angular direction trajectory; f. in the case where the second elevation axis has exceeded the first threshold elevation angle, calculating, by the digital software system, a first tangent trajectory associated with the respective angular direction of the first parabolic reflector based on the first angular direction trajectory, wherein the first tangent trajectory includes a first azimuth trajectory component and a first elevation trajectory component; and g. generating, by the digital software system, the fourth angular direction information based on: 1. the first beam; 2. the second beam; and 3. the first tangent trajectory; ii. generating, by the digital software system, a respective third weighting factor associated with the first beam as part of a second array of weighting factors associated with the first plurality of beams based on: (1) the first angular direction trajectory; (2) the fourth angular direction information; (3) the first object movement information; (4) the second azimuth axis; and (5) the second elevation axis; iii. generating, by the digital software system, a respective fourth weighting factor associated with the second beam as part of the second array of weighting factors associated with the first plurality of beams based on: (1) the first angular direction trajectory; (2) the fourth angular direction information; (3) the second object movement information; (4) the second azimuth axis; and (5) the second elevation axis; iv. transmitting, by the digital software system via the pedestal controller to the first parabolic reflector, the fourth angular direction information, wherein the pedestal controller adjusts the respective angular direction associated with the first parabolic reflector based on the fourth angular direction information; v. transmitting, from the digital software via the system controller to the first respective digital beamformer of the plurality of digital beamformers, the respective third weighting factor; and vi. transmitting, from the digital software system via the system controller to the second respective digital beamformer of the plurality of digital beamformers, the respective fourth weighting factor.

In embodiments, each partial beam is formed by a respective digital beamformer of the plurality of digital beamformers.

In embodiments, each of the first plurality of beams includes 2 partial beams.

In embodiments, the selecting step (b)(i) is performed manually by a user using one or more input elements operably connected to the digital software system.

In embodiments, the selecting step (b)(i) is performed automatically by the digital software system based on characteristic of the first object.

In embodiments, the assigning step (b)(ii) is performed manually by a user using one or more input elements operably connected to the digital software system.

In embodiments, the assigning step (b)(ii) is performed automatically by the digital software system based on characteristics of the first object.

In embodiments, the first priority information is a primary object weight.

In embodiments, the first priority information is a secondary object weight.

In embodiments, the first priority information is a ternary object weight.

In embodiments, the selecting step (b)(iv) is performed manually by a user using one or more input elements operably connected to the digital software system.

In embodiments, the selecting step (b)(iv) is performed automatically by the digital software system based on characteristic of the second object.

In embodiments, the assigning step (b)(v) is performed manually by a user using one or more input elements operably connected to the digital software system.

In embodiments, the assigning step (b)(v) is performed automatically by the digital software system based on characteristics of the second object.

In embodiments, the second priority information is a primary object weight.

In embodiments, the second priority information is a secondary object weight.

In embodiments, the second priority information is a ternary object weight.

In embodiments, the second priority information is a primary object weight.

In embodiments, the second priority information is a secondary object weight.

In embodiments, the second priority information is a ternary object weight.

In embodiments, the second priority information is a primary object weight.

In embodiments, the second priority information is a secondary object weight.

In embodiments, the second priority information is a ternary object weight.

In embodiments, a method may include: (a) generating, by a digital software system, a graphical display during a first time period by the steps of: i. receiving, by the digital software system via a pedestal controller operatively connected to a first parabolic reflector, first angular direction information including a first azimuth axis component and a first elevation axis component associated with the first parabolic reflector; ii. receiving, by the digital software system via a data transport bus, a first set of respective first digital data streams associated with a first plurality of partial beams, wherein each respective partial beam of the first plurality of partial beams is associated with a respective first digital data stream and data in the respective first digital data stream is associated with a first plurality of respective modulated radio frequency signals received by a plurality of antenna array elements; iii. processing, by the digital software system, the first set of respective first digital data streams associated with the first plurality of partial beams to generate a second set of respective second digital data streams associated with the first plurality of beams, wherein each beam of the first plurality of beams is based on at least two respective first digital data streams; iv. processing, by the digital software system, the second set of respective second digital data streams associated with the first plurality of beams to determine respective location information for each object of a first set of objects associated with the first plurality of beams including at least a first object and a second object; v. generating, by the digital software system, the graphical display which displays: (1) the first plurality of beams; (2) the first set of objects including at least the first object and the second object; (3) a first azimuth axis based on the first azimuth axis component; and (4) a first elevation axis based on the first elevation axis component; and vi. displaying, by the digital software system, at least a portion of the graphical display on a display operably connected to the digital software system; (b) assigning, by the digital software system, priority information to the first object and the second object by the steps of: i. selecting the first object displayed by the graphical display; ii. assigning first priority information to the first object; iii. assigning a first beam of the first plurality of beams to the first object; iv. selecting the second object displayed by the graphical display; v. assigning second priority information to the second object; and vi. assigning a second beam of the first plurality of beams to the second object; (c) providing, by the digital software system, respective direction information associated with the first beam, the second beam and the first parabolic reflector by the steps of: i. generating, by the digital software system, a respective first weighting factor associated with the first beam as part of a first array of weighting factors associated with the first plurality of beams based on: (1) the respective location information associated with the first object; (2) the first azimuth axis; and (3) the first elevation axis; ii. generating, by the digital software system, a respective second weighting factor associated with the second beam as part of the first array of weighting factors associated with the first plurality of beams based on: (1) the respective location information associated with the second object; (2) the first azimuth axis; and (3) the first elevation axis; iii. generating, by the digital software system, second angular direction information including a second azimuth axis component and a second elevation axis component associated with the first parabolic reflector based on: (1) the first beam; (2) the second beam; (3) the respective location information associated with the first object; (4) the respective location information associated with the second object; (5) the first priority information; (6) the second priority information; (7) the first azimuth axis; and (8) the first elevation axis; iv. transmitting, from the digital software via a system controller to a first respective digital beamformer of a plurality of digital beamformers operatively connected to the plurality of antenna array elements and the system controller, the respective first weighting factor associated with the first beam; v. transmitting, from the digital software via the system controller to a second respective digital beamformer of the plurality of digital beamformers operatively connected to the plurality of antenna array elements and the system controller, the respective second weighting factor associated with the second beam; and vi. transmitting, by the digital software system via the pedestal controller to the first parabolic reflector, the second angular direction information; (d) updating, by the digital software system, the graphical display during a second time period by the steps of: i. receiving, by the digital software system via the pedestal controller, third angular direction information including a third azimuth axis component and a third elevation axis component associated with the first parabolic reflector; ii. receiving, by the digital software system via the system controller, a third set of respective third digital data streams associated with the first plurality of partial beams, wherein each respective partial beam of the first plurality of partial beams is associated with a respective third digital data stream and data in the respective first digital data stream is associated with a second plurality of respective modulated radio frequency signals received by the plurality of antenna array elements; iii. processing, by the digital software system, the third set of respective third digital data streams associated with the first plurality of partial beams to generate a fourth set of a respective fourth digital data streams associated with the first plurality of beams, wherein each beam of the first plurality of beams is based on at least two respective fourth digital data streams; iv. processing, by the digital software system, the fourth set of respective fourth digital data streams associated with the first plurality of beams to generate first object movement information associated with the first object and second object movement information associated with the second object, wherein the first object movement information includes a first object angular velocity and a first object angular direction, and wherein the first object angular direction includes a first object elevation angle component and a first object azimuth angle component, and wherein the second object movement information includes a second object angular velocity and a second object angular direction, and wherein the second object angular direction includes a second object elevation angle component and a second object azimuth angle component; and v. updating, by the digital software system, the graphical display to display: (1) the first plurality of beams; (2) the first set of objects including at least the first object and the second object based at least on the first object movement information and the second object movement information; (3) a second azimuth axis based on the third azimuth axis component; and (4) a second elevation axis based on the third elevation axis component; (e) determining, by the digital software system, whether to unassign the first beam from the first object or the second beam from the second object by the steps of: i. determining, by the digital software system, whether one of the first object and the second object has exceeded a first maximum distance from the second elevation axis and the second azimuth axis based on: (1) the respective location information associated with the first object; (2) the respective location information associated with the second object; (3) the first object movement information; (4) the second object movement information; (5) the second azimuth axis; and (6) the second elevation axis; ii. in the case where the one of the first object and the second object has exceeded the first maximum distance, determining, by the digital software system, whether the first object or the second object has higher priority based on the first priority information and the second information; iii. in the case where the first object has higher priority than the second object, unassigning, by the digital software system, the second beam of the first plurality of beams from the second object; and iv. in the case where the second object has higher priority than the first object, unassigning, by the digital software system, the first beam of the plurality of beams from the first object; (f) in the case where the second beam is unassigned from the second object, providing, by the digital software system, respective updated direction information associated with the first beam and the first parabolic reflector by the steps of: i. generating, by the digital software system, fourth angular direction information including a fourth azimuth axis component and a fourth elevation axis component associated with the first parabolic reflector by the steps of: a. determining, by the digital software system, a first angular direction trajectory associated with the respective angular direction of the first parabolic reflector based on: 1. the respective location information associated with the first object; 2. the first object movement information; 3. the third angular direction information; 4. the second azimuth axis; and 5. the second elevation axis; b. determining, by the digital software system, whether the first parabolic reflector is projected to exceed a maximum elevation angle based on the first angular direction trajectory; c. in the case where the first parabolic reflector is not projected to exceed the maximum elevation angle, generating, by the digital software system, the fourth angular direction information based on: 1. the first beam; and 2. the first angular direction trajectory; d. in the case where the first parabolic reflector is projected to exceed the maximum elevation angle, determining, by the digital software system, whether the second elevation axis has exceeded a first threshold elevation angle; e. in the case where the second elevation axis has not exceeded the first threshold elevation angle, generating, by the digital software system, the fourth angular direction information based on: 1. the first beam; and 2. the first angular direction trajectory; f. in the case where the second elevation axis has exceeded the first threshold elevation angle, calculating, by the digital software system, a first tangent trajectory associated with the respective angular direction of the first parabolic reflector based on the first angular direction trajectory, wherein the first tangent trajectory includes a first azimuth trajectory component and a first elevation trajectory component; and g. generating, by the digital software system, the fourth angular direction information based on: 1. the first beam; and 2. the first tangent trajectory; ii. generating, by the digital software system, a respective third weighting factor associated with the first beam as part of a second array of weighting factors associated with the first plurality of beams based on: (1) the first angular direction trajectory; (2) the fourth angular direction information; (3) the first object movement information; (4) the second azimuth axis, and (5) the second elevation axis; iii. transmitting, by the digital software system via the pedestal controller to the first parabolic reflector, the fourth angular direction information, wherein the pedestal controller adjusts the respective angular direction associated with the first parabolic reflector based on the fourth angular direction information; and iv. transmitting, from the digital software via the system controller to the first respective digital beamformer of the plurality of digital beamformers, the respective third weighting factor; and (g) in the case where the first beam is unassigned from the first object, providing, by the digital software system, respective updated direction information associated with the second beam and the first parabolic reflector by the steps of: i. generating, by the digital software system, the fourth angular direction information including the fourth azimuth axis component and the fourth elevation axis component associated with the first parabolic reflector by the steps of: a. determining, by the digital software system, the first angular direction trajectory associated with the respective angular direction of the first parabolic reflector based on: 1. the respective location information associated with the second object; 2. the second object movement information; 3. the third angular direction information; 4. the second azimuth axis; and 5. the second elevation axis; b. determining, by the digital software system, whether the first parabolic reflector is projected to exceed the maximum elevation angle based on the first angular direction trajectory; c. in the case where the first parabolic reflector is not projected to exceed the maximum elevation angle, generating, by the digital software system, the fourth angular direction information based on: 1. the second beam; and 2. the first angular direction trajectory; d. in the case where the first parabolic reflector is projected to exceed the maximum elevation angle, determining, by the digital software system, whether the second elevation axis has exceeded the first threshold elevation angle; e. in the case where the second elevation axis has not exceeded the first threshold elevation angle, generating, by the digital software system, the fourth angular direction information based on: 1. the second beam; and 2. the first angular direction trajectory; f. in the case where the second elevation axis has exceeded the first threshold elevation angle, calculating, by the digital software system, the first tangent trajectory associated with the respective angular direction of the first parabolic reflector based on the first angular direction trajectory, wherein the first tangent trajectory includes the first azimuth trajectory component and the first elevation trajectory component; and g. generating, by the digital software system, the fourth angular direction information based on: 1. the second beam; and 2. the first tangent trajectory; ii. generating, by the digital software system, the respective fourth weighting factor associated with the second beam as part of the second array of weighting factors associated with the first plurality of beams based on: (1) the first angular direction trajectory; (2) the fourth angular direction information; (3) the second object movement information; (4) the second azimuth axis, and (5) the second elevation axis; iii. transmitting, by the digital software system via the pedestal controller to the first parabolic reflector, the fourth angular direction information, wherein the pedestal controller adjusts the respective angular direction associated with the first parabolic reflector based on the fourth angular direction information; and iv. transmitting, from the digital software via the system controller to the second respective digital beamformer of the plurality of digital beamformers, the respective fourth weighting factor.

In embodiments, each partial beam is formed by a respective digital beamformer of the plurality of digital beamformers.

In embodiments, each of the first plurality of beams includes 2 partial beams.

In embodiments, the selecting step (b)(i) is performed manually by a user using one or more input elements operably connected to the digital software system.

In embodiments, the selecting step (b)(i) is performed automatically by the digital software system based on characteristics of the first object.

In embodiments, the assigning step (b)(ii) is performed manually by a user using one or more input elements operably connected to the digital software system.

In embodiments, the assigning step (b)(ii) is performed automatically by the digital software system based on characteristics of the first object.

In embodiments, the first priority information is a primary object weight.

In embodiments, the first priority information is a secondary object weight.

In embodiments, the first priority information is a ternary object weight.

In embodiments, the selecting step (b)(iv) is performed manually by a user using one or more input elements operably connected to the digital software system.

In embodiments, the selecting step (b)(iv) is performed automatically by the digital software system based on characteristics of the second object.

In embodiments, the assigning step (b)(v) is performed manually by a user using one or more input elements operably connected to the digital software system.

In embodiments, the assigning step (b)(v) is performed automatically by the digital software system based on characteristics of the second object.

In embodiments, the second priority information is a primary object weight.

In embodiments, the second priority information is a secondary object weight.

In embodiments, the second priority information is a ternary object weight.

In embodiments, the second priority information is a primary object weight.

In embodiments, the second priority information is a secondary object weight.

In embodiments, the second priority information is a ternary object weight.

In embodiments, the second priority information is a primary object weight.

In embodiments, the second priority information is a secondary object weight.

In embodiments, the second priority information is a ternary object weight.

In embodiments, a method may include: (a) updating, by a digital software system, a graphical display during a first time period by the steps of: i. receiving, by the digital software system via a pedestal controller operatively connected to a first parabolic reflector, first angular direction information including a first azimuth axis component and a first elevation axis component associated with the first parabolic reflector; ii. receiving, by the digital software system via a data transport bus, a first set of respective first digital data streams associated with a first plurality of partial beams, wherein each respective partial beam of the first plurality of partial beams is associated with a respective first digital data stream and data in the respective first digital data stream is associated with a first plurality of respective modulated radio frequency signals received by a plurality of antenna array elements; iii. processing, by the digital software system, the first set of respective first digital data streams associated with the first plurality of partial beams to generate a second set of respective second digital data streams associated with the first plurality of beams, wherein each beam of the first plurality of beams is based on at least two respective first digital data streams, and wherein a first beam is assigned to a first object and a second beam is assigned to a second object; iv. processing, by the digital software system, the second set of respective second digital data streams associated with the first plurality of beams to generate: (1) first location information associated with the first object; (2) second location information associated with the second object; (3) first object movement information associated with the first object; and (4) second object movement information associated with the second object, wherein the first object movement information includes a first object angular velocity and a first object angular direction, and wherein the first object angular direction includes a first object elevation angle component and a first object azimuth angle component, wherein the second object movement information includes a second object angular velocity and a second object angular direction, and wherein the second object angular direction includes a second object elevation angle component and a second object azimuth angle component, and wherein the first object is associated with first priority information and the second object is associated with second priority information; and v. updating, by the digital software system, the graphical display to display: (1) the first plurality of beams; (2) the first object based at least on the first object movement information; (3) the second object based at least on the second object movement information; (4) a first azimuth axis based on the first azimuth axis component; and (5) a first elevation axis based on the first elevation axis component; (b) determining, by the digital software system, whether to unassign the first beam from the first object or the second beam from the second object by the steps of: i. determining, by the digital software system, whether one of the first object and the second object has exceeded a first maximum distance from the second elevation axis and the second azimuth axis based on: (1) the first location information associated with the first object; (2) the second location information associated with the second object; (3) the first object movement information; (4) the second object movement information; (5) the first azimuth axis; and (6) the first elevation axis; and (c) in the case where one of the first object and the second object has not exceeded the first maximum distance, providing, by the digital software system, respective updated direction information associated with the first beam, the second beam and the first parabolic reflector by the steps of: i. generating, by the digital software system, second angular direction information including a second azimuth axis component and a second elevation axis component associated with the first parabolic reflector by the steps of: a. determining, by the digital software system, a first angular direction trajectory associated with the respective angular direction of the first parabolic reflector based on: i. the first location information associated with the first object; ii. the second location information associated with the second object; iii. the first priority information; iv. the second priority information; v. the first object movement information; vi. the second object movement information; vii. the first angular direction information; viii. the first azimuth axis; ix. the first elevation axis; b. determining, by the digital software system, whether the first parabolic reflector is projected to exceed a maximum elevation angle based on the first angular direction trajectory; c. in the case where the first parabolic reflector is not projected to exceed the maximum elevation angle, generating, by the digital software system, the second angular direction information based on: i. the first beam; ii. the second beam; and iii. the first angular direction trajectory; d. in the case where the first parabolic reflector is projected to exceed the maximum elevation angle, determining, by the digital software system, whether the second elevation axis has exceeded a first threshold elevation angle; e. in the case where the second elevation has not exceeded the first threshold elevation angle, generating, by the digital software system, the second angular direction information based on: i. the first beam; ii. the second beam; and iii. the first angular direction trajectory; f. in the case where the second elevation axis has exceeded the first threshold elevation angle, calculating, by the digital software system, a first tangent trajectory associated with the respective angular direction of the first parabolic reflector based on the first angular direction trajectory, wherein the first tangent trajectory includes a first azimuth trajectory component and a first elevation trajectory component; g. generating, by the digital software system, the second angular direction information based on: i. the first beam; ii. the second beam; and iii. the first tangent trajectory; ii. generating, by the digital software system, a respective first weighting factor associated with the first beam as part of a first array of weighting factors associated with the first plurality of beams based on: (1) the first angular direction trajectory; (2) the second angular direction information; (3) the first object movement information; (4) the first azimuth axis; and (5) the first elevation axis; iii. generating, by the digital software system, a respective second weighting factor associated with the second beam as part of the first array of weighting factors associated with the first plurality of beams based on: (1) the first angular direction trajectory; (2) the second angular direction information; (3) the second object movement information; (4) the first azimuth axis; and (5) the first elevation axis; iv. transmitting, by the digital software system via the pedestal controller to the first parabolic reflector, the second angular direction information, wherein the pedestal controller adjusts the respective angular direction associated with the first parabolic reflector based on the second angular direction information; v. transmitting, from the digital software via a system controller to a first respective digital beamformer of a plurality of digital beamformers operatively connected to the plurality of antenna array elements and the system controller, the respective first weighting factor; and vi. transmitting, from the digital software system via the system controller to a second respective digital beamformer of the plurality of digital beamformers operatively connected to the plurality of antenna array elements and the system controller, the respective second weighting factor.

In embodiments, each partial beam is formed by a respective digital beamformer of the plurality of digital beamformers.

In embodiments, each of the first plurality of beams includes 2 partial beams.

In embodiments, the first priority information is a primary object weight.

In embodiments, the first priority information is a secondary object weight.

In embodiments, the first priority information is a ternary object weight.

In embodiments, the second priority information is a primary object weight.

In embodiments, the second priority information is a secondary object weight.

In embodiments, the second priority information is a ternary object weight.

In embodiments, the second priority information is a primary object weight.

In embodiments, the second priority information is a secondary object weight.

In embodiments, the second priority information is a ternary object weight.

In embodiments, the second priority information is a primary object weight.

In embodiments, the second priority information is a secondary object weight.

In embodiments, the second priority information is a ternary object weight.

In embodiments, a method may include: (a) updating, by a digital software system, a graphical display during a first time period by the steps of: i. receiving, by the digital software system via a pedestal controller operatively connected to a first parabolic reflector, first angular direction information including a first azimuth axis component and a first elevation axis component associated with the first parabolic reflector; ii. receiving, by the digital software system via a data transport bus, a first set of respective first digital data streams associated with a first plurality of partial beams, wherein each respective partial beam of the first plurality of partial beams is associated with a respective first digital data stream and data in the respective first digital data stream is associated with a first plurality of respective modulated radio frequency signals received by a plurality of antenna array elements; iii. processing, by the digital software system, the first set of respective first digital data streams associated with the first plurality of partial beams to generate a second set of respective second digital data streams associated with the first plurality of beams, wherein each beam of the first plurality of beams is based on at least two respective first digital data streams, and wherein a first beam is assigned to a first object and a second beam is assigned to a second object; iv. processing, by the digital software system, the second set of respective second digital data streams associated with the first plurality of beams to generate: (1) first location information associated with the first object; (2) second location information associated with the second object; (3) first object movement information associated with the first object; and (4) second object movement information associated with the second object, wherein the first object movement information includes a first object angular velocity and a first object angular direction, and wherein the first object angular direction includes a first object elevation angle component and a first object azimuth angle component, wherein the second object movement information includes a second object angular velocity and a second object angular direction, and wherein the second object angular direction includes a second object elevation angle component and a second object azimuth angle component, and wherein the first object is associated with first priority information and the second object is associated with second priority information; and v. updating, by the digital software system, the graphical display to display: (1) the first plurality of beams; (2) the first object based at least on the first object movement information; (3) the second object based at least on the second object movement information; (4) a first azimuth axis based on the first azimuth axis component; and (5) a first elevation axis based on the first elevation axis component; (b) determining, by the digital software system, whether to unassign the first beam from the first object or the second beam from the second object by the steps of: i. determining, by the digital software system, whether one of the first object and the second object has exceeded a first maximum distance from the second elevation axis and the second azimuth axis based on: (1) the first location information associated with the first object; (2) the second location information associated with the second object; (3) the first object movement information; (4) the second object movement information; (5) the first azimuth axis; and (6) the first elevation axis; ii. in the case where the one of the first object and the second object has exceeded the first maximum distance, determining, by the digital software system, whether the first object or the second object has higher priority based on the first priority information and the second priority information; iii. in the case where the first object has higher priority than the second object, unassigning, by the digital software system, the second beam of the first plurality of beams from the second object; and iv. in the case where the second object has higher priority than the first object, unassigning, by the digital software system, the first beam of the plurality of beams from the first object; (c) in the case where the second beam is unassigned from the second object, providing, by the digital software system, respective updated direction information associated with the first beam and the first parabolic reflector by the steps of: i. generating, by the digital software system, second angular direction information including a second azimuth axis component and a second elevation axis component associated with the first parabolic reflector by the steps of: a. determining, by the digital software system, a first angular direction trajectory associated with the respective angular direction of the first parabolic reflector based on: i. the first location information associated with the first object; ii. the first object movement information; iii. the first angular direction information; iv. the first azimuth axis; and v. the first elevation axis; b. determining, by the digital software system, whether the first parabolic reflector is projected to exceed a maximum elevation angle based on the first angular direction trajectory; c. in the case where the first parabolic reflector is not projected to exceed the maximum elevation angle, generating, by the digital software system, the second angular direction information based on: i. the first beam; and ii. the first angular direction trajectory; d. in the case where the first parabolic reflector is projected to exceed the maximum elevation angle, determining, by the digital software system, whether the first elevation axis has exceeded a first threshold elevation angle; e. in the case where the second elevation axis has not exceeded the first threshold elevation angle, generating, by the digital software system, the second angular direction information based on: i. the first beam; and ii. the first angular direction trajectory; f. in the case where the second elevation axis has exceeded the first threshold elevation angle, calculating, by the digital software system, a first tangent trajectory associated with the respective angular direction of the first parabolic reflector based on the first angular direction trajectory, wherein the first tangent trajectory includes a first azimuth trajectory component and a first elevation trajectory component; and g. generating, by the digital software system, the second angular direction information based on: i. the first beam; and ii. the first tangent trajectory; ii. generating, by the digital software system, a respective first weighting factor associated with the first beam as part of a first array of weighting factors associated with the first plurality of beams based on: (1) the first angular direction trajectory; (2) the second angular direction information; (3) the first object movement information; (4) the first azimuth axis, and (5) the first elevation axis; iii. transmitting, by the digital software system via the pedestal controller to the first parabolic reflector, the second angular direction information, wherein the pedestal controller adjusts the respective angular direction associated with the first parabolic reflector based on the second angular direction information; and iv. transmitting, from the digital software via a system controller to a first respective digital beamformer of a plurality of digital beamformers operatively connected to the plurality of antenna array elements and the system controller, the respective first weighting factor; and (d) in the case where the first beam is unassigned from the first object, providing, by the digital software system, respective updated direction information associated with the second beam and the first parabolic reflector by the steps of: i. generating, by the digital software system, the second angular direction information including the second azimuth axis component and the second elevation axis component associated with the first parabolic reflector by the steps of: a. determining, by the digital software system, the first angular direction trajectory associated with the respective angular direction of the first parabolic reflector based on: i. the second location information associated with the second object; ii. the second object movement information; iii. the first angular direction information; iv. the first azimuth axis; and v. the first elevation axis; b. determining, by the digital software system, whether the first parabolic reflector is projected to exceed the maximum elevation angle based on the first angular direction trajectory; c. in the case where the first parabolic reflector is not projected to exceed the maximum elevation angle, generating, by the digital software system, the second angular direction information based on: i. the second beam; and ii. the first angular direction trajectory; d. in the case where the first parabolic reflector is projected to exceed the maximum elevation angle, determining, by the digital software system, whether the first elevation axis has exceeded the first threshold elevation angle; e. in the case where the first elevation axis has not exceeded the first threshold elevation angle, generating, by the digital software system, the second angular direction information based on: i. the second beam; and ii. the first angular direction trajectory; f. in the case where the first elevation axis has exceeded the first threshold elevation angle, calculating, by the digital software system, the first tangent trajectory associated with the respective angular direction of the first parabolic reflector based on the first angular direction trajectory, wherein the first tangent trajectory includes the first azimuth trajectory component and the first elevation trajectory component; and g. generating, by the digital software system, the second angular direction information based on: i. the second beam; and ii. the first tangent trajectory; ii. generating, by the digital software system, a respective second weighting factor associated with the second beam as part of the second array of weighting factors associated with the first plurality of beams based on: (1) the first angular direction trajectory; (2) the second angular direction information; (3) the second object movement information; (4) the first azimuth axis, and (5) the first elevation axis; iii. transmitting, by the digital software system via the pedestal controller to the first parabolic reflector, the second angular direction information, wherein the pedestal controller adjusts the respective angular direction associated with the first parabolic reflector based on the second angular direction information; and iv. transmitting, from the digital software via the system controller to a second respective digital beamformer of the plurality of digital beamformers operatively connected to the plurality of antenna array elements and the system controller, the respective second weighting factor.

In embodiments, each partial beam is formed by a respective digital beamformer of the plurality of digital beamformers.

In embodiments, each of the first plurality of beams includes 2 partial beams.

In embodiments, the first priority information is a primary object weight.

In embodiments, the first priority information is a secondary object weight.

In embodiments, the first priority information is a ternary object weight.

In embodiments, the second priority information is a primary object weight.

In embodiments, the second priority information is a secondary object weight.

In embodiments, the second priority information is a ternary object weight.

In embodiments, the second priority information is a primary object weight.

In embodiments, the second priority information is a secondary object weight.

In embodiments, the second priority information is a ternary object weight.

In embodiments, the second priority information is a primary object weight.

In embodiments, the second priority information is a secondary object weight.

In embodiments, the second priority information is a ternary object weight.

BRIEF DESCRIPTION OF THE DRAWINGS

The above and related objects, features and advantages of the present disclosure will be more fully understood by reference to the following detailed description of the preferred, albeit illustrative, embodiments of the present invention when taken in conjunction with the accompanying figures, wherein:

FIGS. 2-2A is a schematic illustration of a system for a digitally beamformed phased array feed in conjunction with a parabolic reflector in accordance with embodiments of the present invention.

FIG. 18 is a table illustrating exemplary mission parameters used by a digitally beamformed phased array system in accordance with embodiments of the present invention.

FIGS. 19-23 are schematic diagrams for process flows of a system for a digitally beamformed phased array feed in accordance with embodiments of the present invention.

FIGS. 24A-D are schematic diagrams for process flows of a system for a digitally beamformed phased array feed in accordance with embodiments of the present invention.

FIGS. 25A-B are schematic diagrams for process flows of a system for a digitally beamformed phased array feed in accordance with embodiments of the present invention.

FIGS. 31, 31A-F are schematic diagrams for process flows of a method for fine loop pointing in accordance with embodiments of the present invention.

FIGS. 33, 33A-E are schematic diagrams for process flows of a method for fine loop pointing in accordance with embodiments of the present invention.

DETAILED DESCRIPTION OF THE EXEMPLARY EMBODIMENTS

The present invention generally relates to systems and methods for a digitally beamformed phased array feed. In embodiments, the digitally beamformed phased array feed may be used in conjunction with a parabolic reflector. In embodiments, the present invention generally relates to systems and methods for a large form-factor phased array utilizing a plurality of multi-band software defined antenna array tiles.

Digital Beamforming

Figure 1:
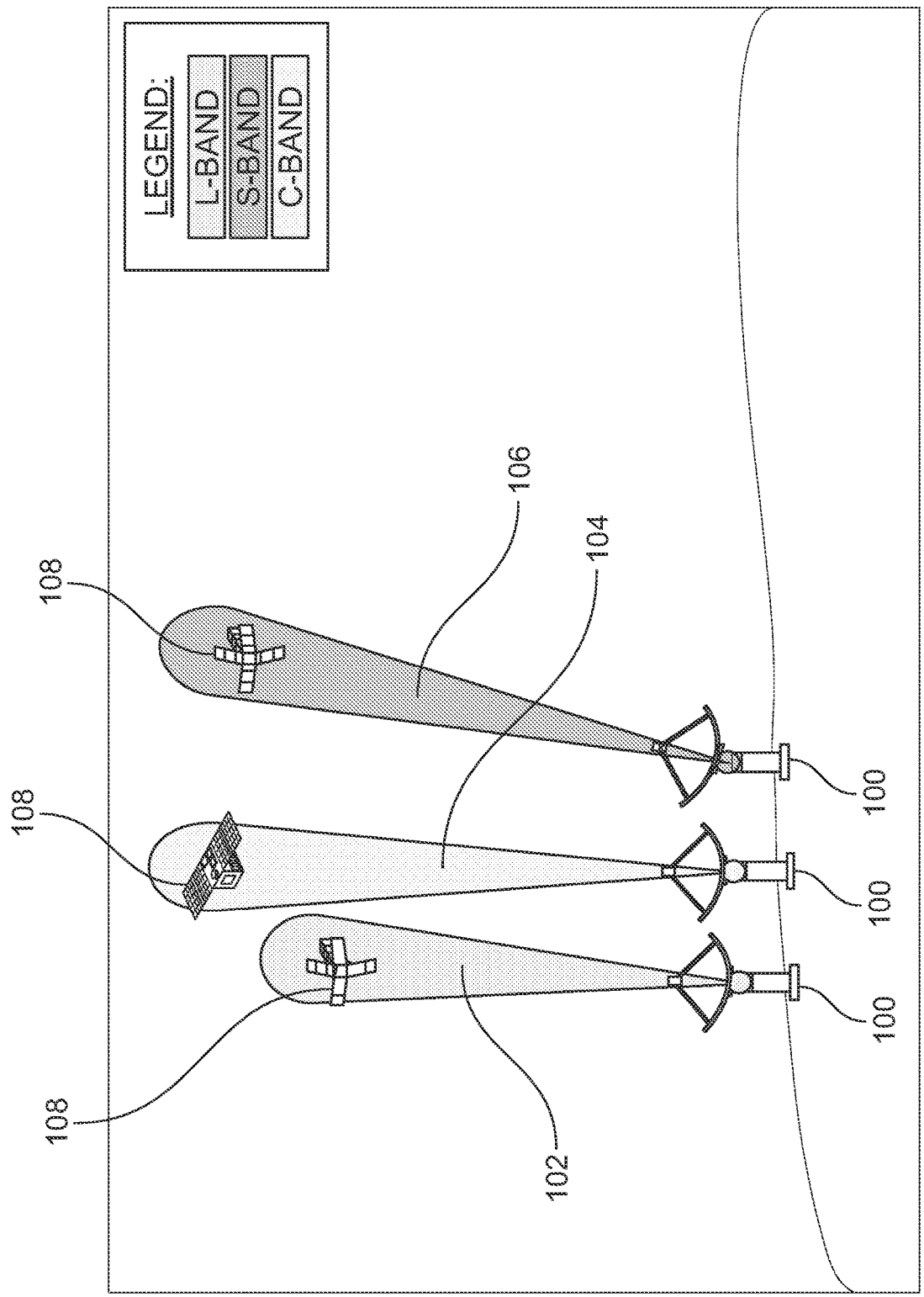
FIG. 1 is a schematic illustration of the current state of practice for antenna beamforming technology.

FIG. 1 is a schematic illustration of the current state of practice for antenna beamforming technology. Existing satellite antennas 100 are designed to receive or transmit radio waves to or from a flight object 108. As used here, the term flight object 108 refers to satellites, flight test assets, missiles, and airplanes, to name a few. Each satellite antenna 100 is designed to receive electromagnetic waves having a specific frequency range. For example, a satellite antenna 100 having an L-band 102 transmission may receive and transmit frequencies ranging from 1.0 to 2.0 gigahertz (GHz); an antenna 100 having a C-band 104 transmission may receive and transmit frequencies ranging from 4.0 to 8.0 GHz; and an antenna 100 having an S-band 106 transmission may receive and transmit frequencies ranging from 2.0 to 4.0 GHz. Because of the current limitations on antenna beamforming technology, each satellite antenna 100 may receive or transmit electromagnetic waves in one frequency range at a time. Additionally, due to existing beamforming techniques, each satellite antenna 100 may only communicate with one flight object 108 at a time.

Figure 12:
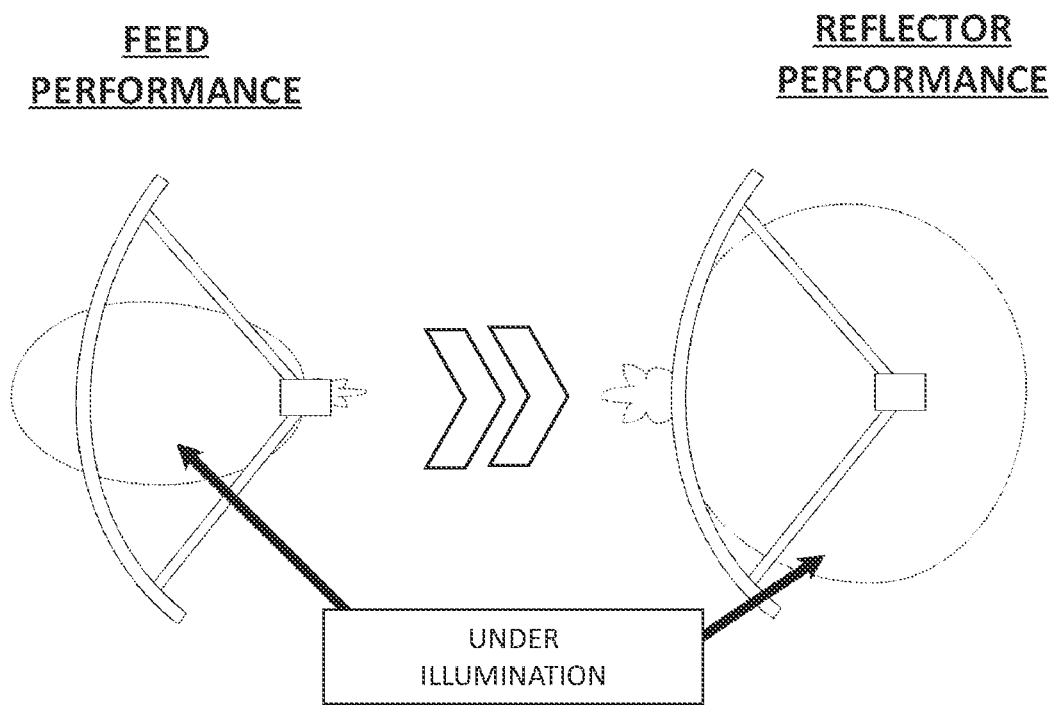
FIGS. 12-14 are schematic illustrations of the current state of practice for antenna beamforming technology.
Figure 13:
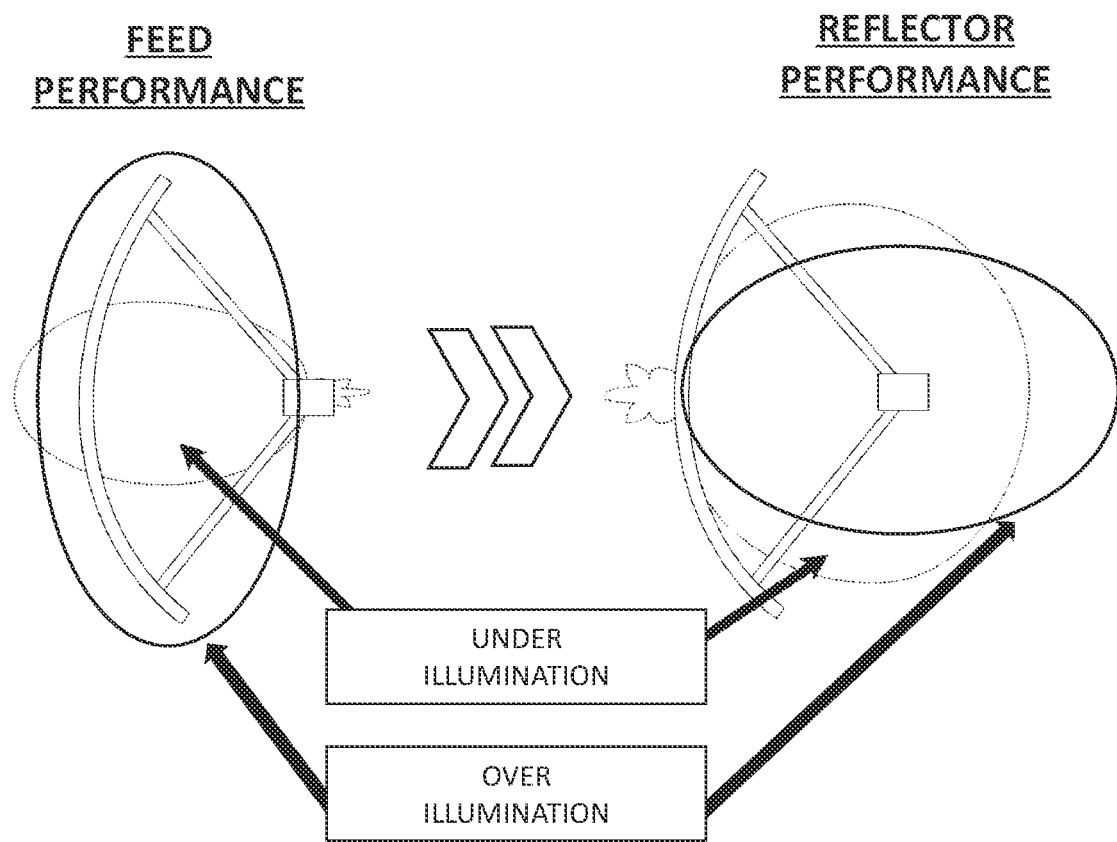
Figure 14:
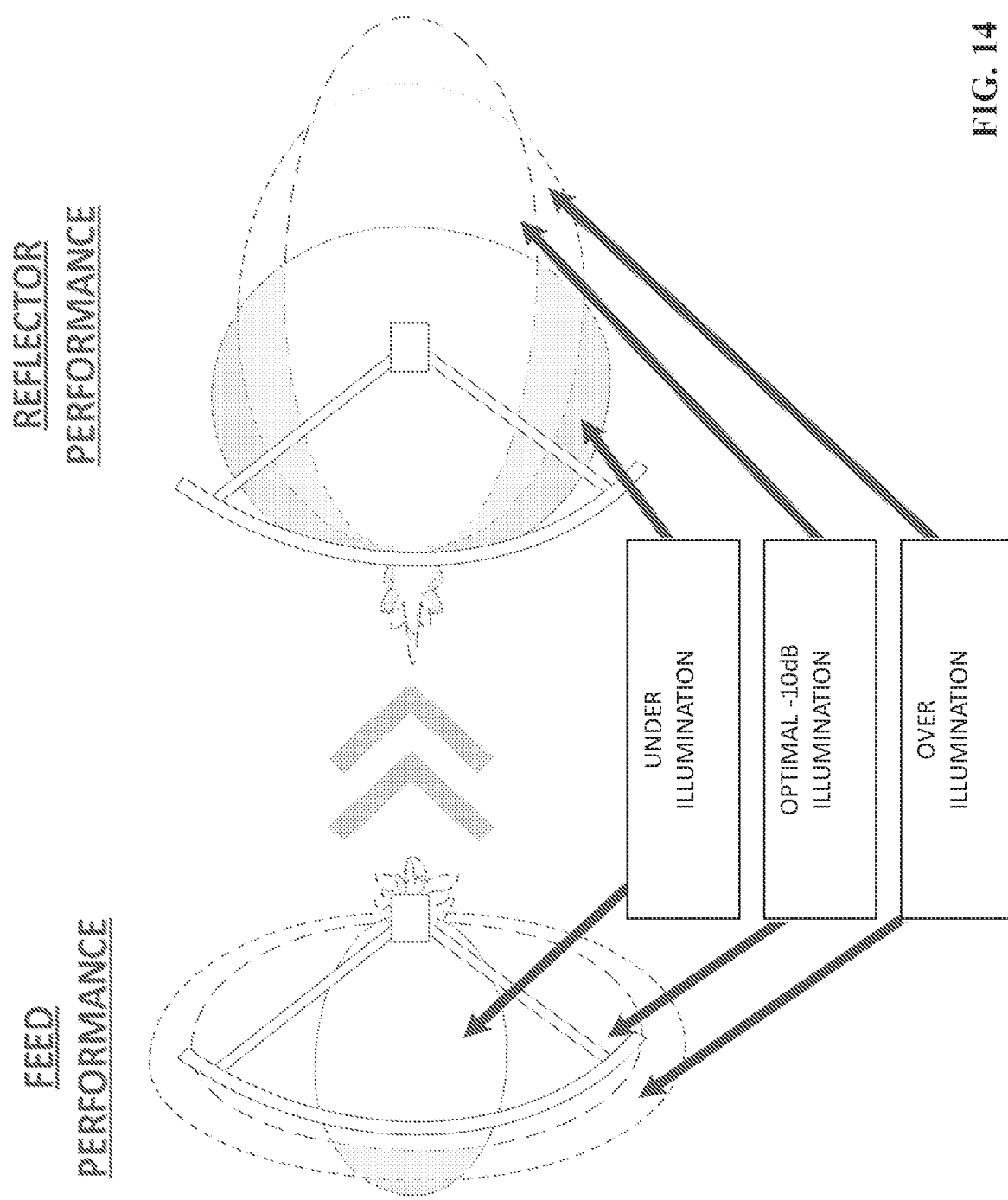

FIGS. 12-14 are schematic illustrations of the current state of practice for antenna beamforming technology. The efficiency and directive qualities of an antenna may be measured by its gain. Gain is the ratio of the power received by the antenna from a source along its beam axis to the power received by a hypothetical lossless isotropic antenna, which is equally sensitive to signals from all directions. The gain of a parabolic antenna is:

$$G = \frac{4\pi A}{\lambda^2} e_A$$

where A is the area of the antenna aperture; $\lambda$ is the wavelength of the radio waves; and $e_A$ is aperture efficiency, a dimensionless parameter between 0 and 1 which measures how effective an antenna is at receiving the power of electromagnetic radiation. The ratio is typically expressed in decibels-isotropic (dBi). Referring to FIG. 12, when a parabolic surface is under-illuminated, the feed pattern is tight and directive, thereby only illuminating the center of the parabolic surface.

Referring to FIG. 13, in the case of over illumination of a parabolic surface, radiation from the feed falls outside of the edges of the parabolic surface. This "spillover" of the feed is wasted, reducing the gain of the antenna and increasing the sidelobes of the radiation pattern, which represent unwanted radiation in undesired directions. Spillover may also cause the side lobes to pick up interfering signals, creating high system noise temperature which causes a decrease in performance and aperture efficiency.

Referring to FIG. 14, for most antenna feeds, the optimal illumination is achieved when the power radiated by the feed horn is 10 dB less at the edge of the dish than its maximum value at the center of the dish. In traditional antenna systems, a parabolic reflector and antenna may be fitted for transmitting and receiving frequencies within a specific bandwidth (e.g., an L-band transmission may have a range of 1.0 to 2.0 GHz) in order to achieve optimal illumination. This means that the antenna and parabolic surface are designed with a focal length to diameter ratio that creates optimal system gain at frequencies within a desired bandwidth. For example, a typical focal length to diameter ratio may range from 0.3 to 0.4, depending on the desired bandwidth. However, these systems are static in that they cannot be adjusted to receive and transmit frequencies at varying bandwidths while maintaining optimal illumination, without physically replacing the feed of the antenna.

In embodiments, the digitally beamformed phased array system may use amplitude tapering to broaden an antenna beam, as discussed in further detail below. Traditionally, phased array tapering has provided a method to reduce antenna sidelobes at some expense to increasing the antenna gain and the main lobe beam width. However, it is the object of this invention, in embodiments, to broaden the main lobe beam as much as possible, such that the main lobe of the beam may be controlled and directed to a plurality of frequencies within a plurality of bandwidths simultaneously. Phased array tapering in accordance with embodiments of this invention may be used to apply a complex taper across the aperture to shape the sum main lobe beam based on mission requirements. In embodiments, amplitude tapering through beam broadening tapering may provide a solution to the narrow applicability problem of traditional antenna systems. In embodiments, the digitally beamformed array system may use beam broadening tapering to receive and transmit a plurality of signals having frequencies within a plurality of bandwidths simultaneously. In embodiments, the digitally beamformed phased array system may use amplitude tapering to maximize beam broadening so as to optimize performance of the system.

Figure 1A:
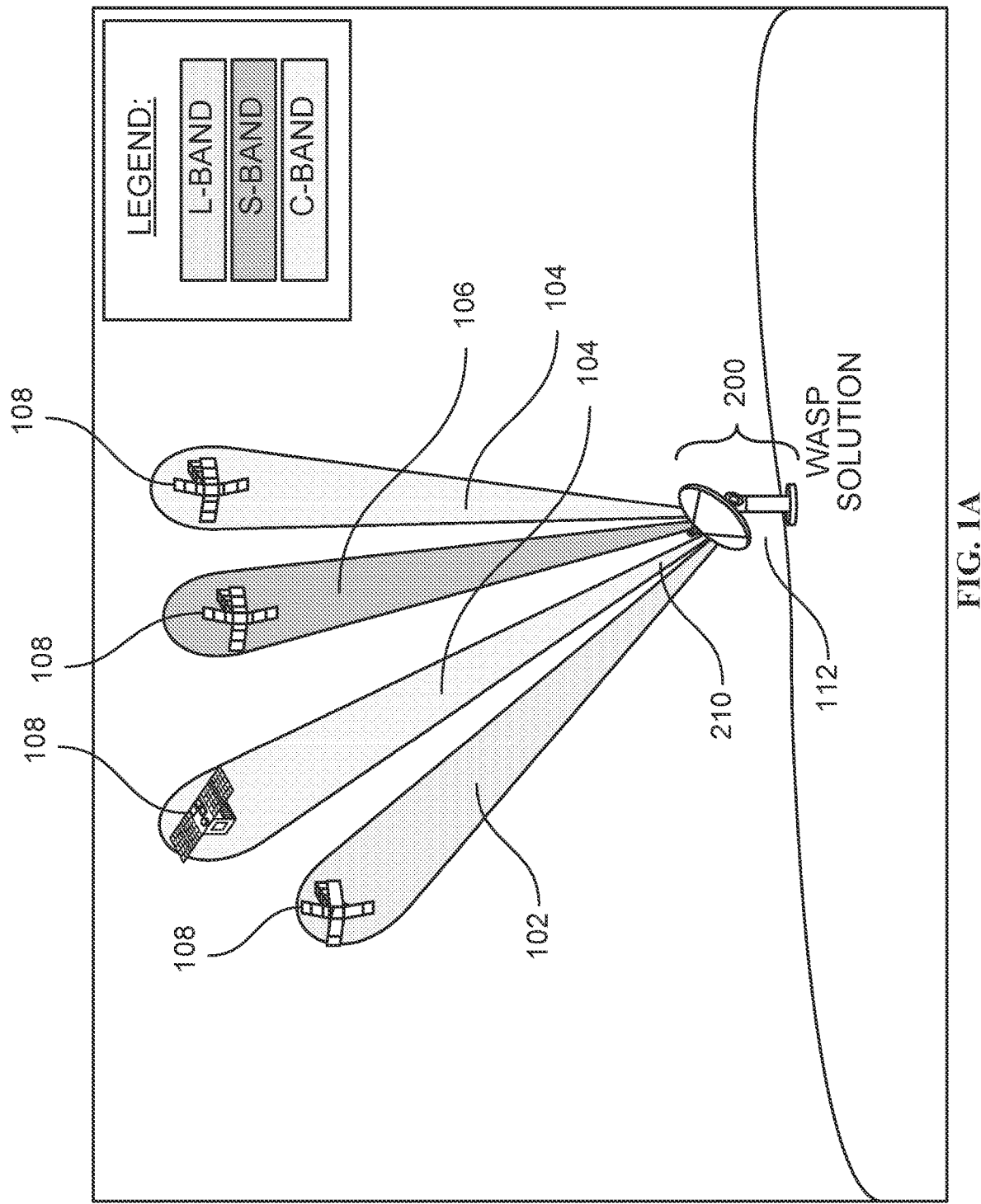
FIGS. 1A-1B are schematic illustrations of a system for a digitally beamformed phased array feed in accordance with embodiments of the present invention.
Figure 1B:
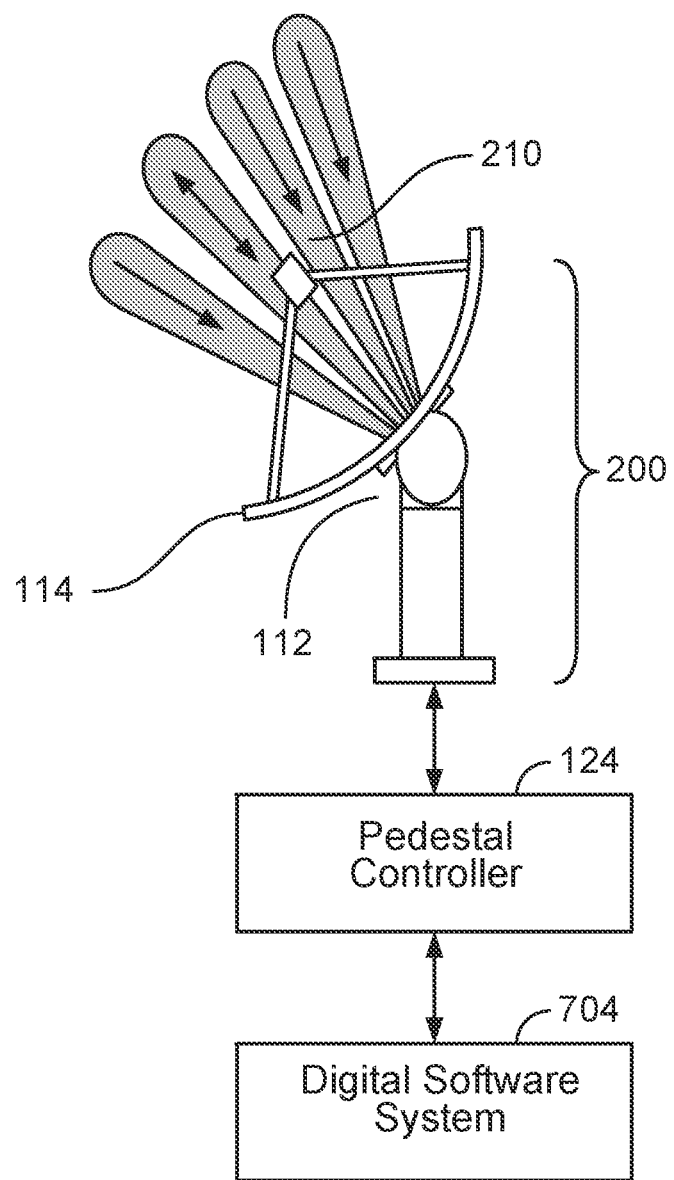

FIGS. 1A-1B are schematic illustrations of a system for a digitally beamformed phased array feed 210 in accordance with embodiments of the present invention. In embodiments, a wide area scanning parabolic apparatus 200 which implements the digitally beamformed phased array feed 210 may receive or transmit frequencies having various transmission bandwidths. In embodiments, for example, the digitally beamformed phased array feed 210 may receive and transmit L-band 102, C-band 104, and S-band 106 frequencies simultaneously. In embodiments, the digitally beamformed phased array feed 210 may receive and transmit frequencies to and from a plurality of flight objects 108 (e.g., 4 in this example) at the same time. In embodiments, the digitally beamformed phased array feed 210 may be fitted on an existing parabolic reflector system having a parabolic reflector 114 and support pedestal 112. In embodiments, the parabolic reflector system may be operatively connected to a digital software system 704 via a pedestal controller 124. In embodiments, parabolic reflector system may receive and transmit angular direction information associated with the parabolic reflector system from the digital software system 704 via the pedestal controller 124. In embodiments, the pedestal controller 124 may be used to control the movement and rotation of the parabolic reflector system based on the angular direction information transmitted by the digital software system 704.

Figure 1C:
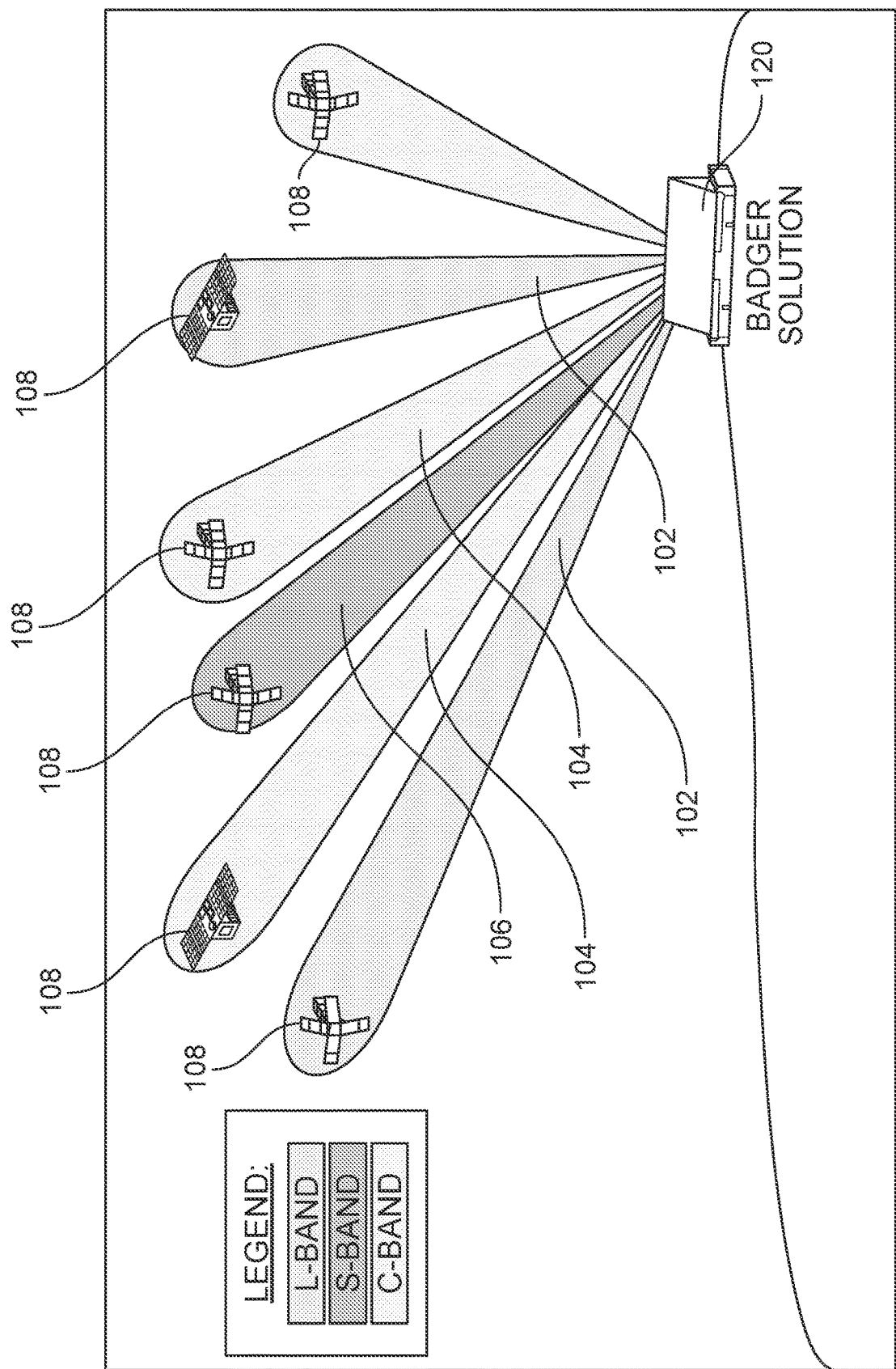
FIG. 1C is a schematic illustration of a system for a digitally beamformed phased array feed in accordance with another embodiment of the present invention.

FIG. 1C is a schematic illustration of a system for a digitally beamformed phased array feed 210 in accordance with another embodiment of the present invention. In embodiments, the digitally beamformed phased array feed 210 may be implemented by a large form-factor phased array terminal 120 which includes a plurality of utilizing a plurality of multi-band software defined antenna array tiles 110, which may be used to scale the scanning capabilities of the system. In embodiments, for example, the plurality of multi-band software defined antenna array tiles 110 may receive and transmit a plurality of L-band 102, C-band 104, and S-band 106 frequencies simultaneously. In embodiments, the plurality of multi-band software defined antenna array tiles 110 may receive and transmit frequencies to and from various flight objects 108 at the same time.

FIGS. 2-2A is a schematic illustration of a system for a digitally beamformed phased array feed 210 in conjunction with a wide area scanning parabolic apparatus 200 in accordance with embodiments of the present invention. In embodiments, the digitally beamformed phased array feed 210 of the wide area scanning parabolic apparatus 200 may include a multi-band software defined antenna tile 110.

Figure 2B:
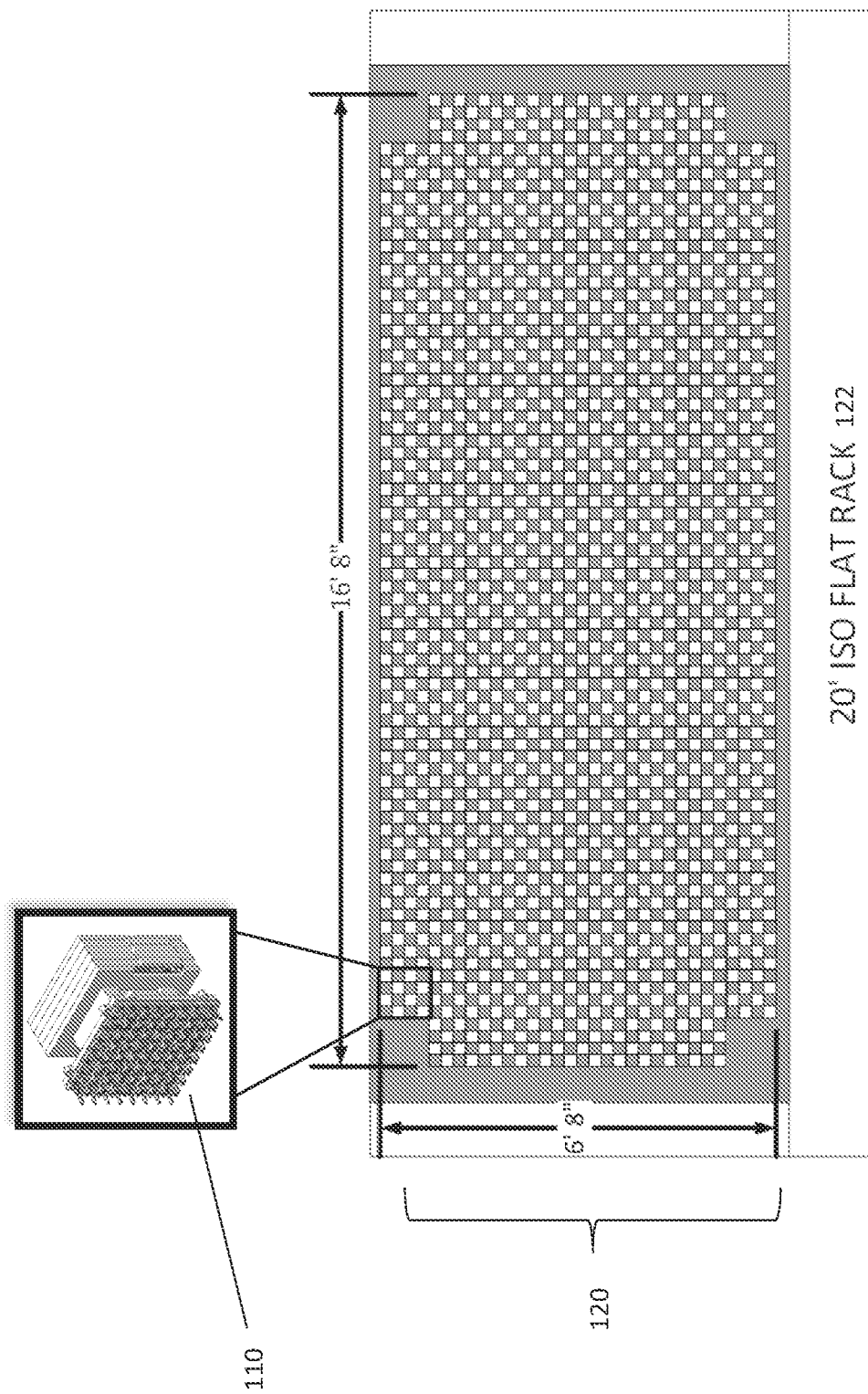
FIG. 2B is a schematic illustration of a system for a digitally beamformed phased array feed in conjunction with a large form-factor phased array in accordance with another embodiment of the present invention.

FIG. 2B is a schematic illustration of a system for a digitally beamformed phased array feed 210 in conjunction with a large form-factor phased array 120 in accordance with another embodiment of the present invention. In embodiments, the large form-factor phased array 120 may include the plurality of operatively connected multi-band software defined antenna tiles 110. In embodiments, the large form-factor phased array 120, may for example, be 16 ft. 8 in. long and 6 ft. 8 in. wide. In embodiments, the large form-factor phased array 120 may be mounted on a flat rack 122.

Figure 3:
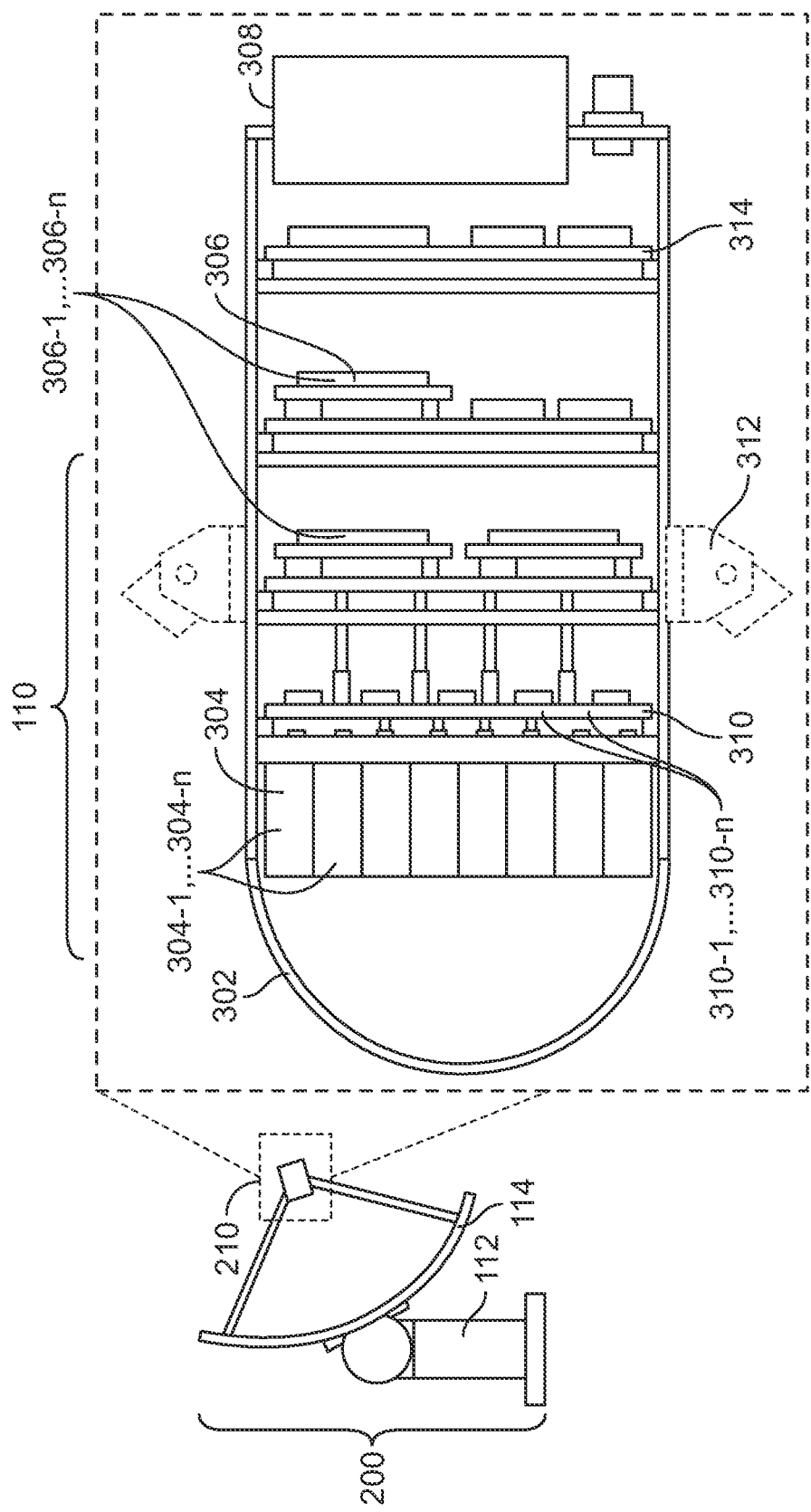
FIG. 3 is a schematic illustration of a cross sectional view of a digitally beamformed phased array feed system in conjunction with a parabolic reflector in accordance with embodiments of the present invention.

FIG. 3 is a schematic illustration of a cross sectional view of a system for a digitally beamformed phased array feed 210 in conjunction with a parabolic reflector in accordance with embodiments of the present invention. In embodiments, the digitally beamformed phased array feed 210 may include a radome 302, a multi-band software defined antenna tile 110, a thermal management subsystem 308, and a power and clock management subsystem 314.

In embodiments, the radome 302 may be configured to allow electromagnetic waves to propagate through it. In embodiments the radome 302 may be configured to protect the elements of the digitally beamformed phased array feed system 210 from weather or other hazards.

In embodiments, the multi-band software defined antenna tile 110 may include a plurality of coupled dipole array antenna elements 304, a plurality of frequency converters 310, and a plurality of digital beamformers 306. In embodiments, the plurality of coupled dipole array elements 304 may be configured to receive and transmit a plurality of respective first modulated signals associated with a plurality of respective radio frequencies. In embodiments the plurality of coupled dipole array antenna elements may be tightly coupled relative to the wavelength of operation. In embodiments, the plurality of coupled dipole array antenna elements may be spaced at less than half a wavelength. In embodiments, each coupled dipole array antenna element 304 may include a principal polarization component 304-P oriented in a first direction and an orthogonal polarization component 304-O oriented in a second direction.

In embodiments, a first pair of the frequency converters 310-1 of the plurality of frequency converters 310 may be operatively connected to a respective coupled dipole array element 304-1 of the plurality of coupled dipole array antenna elements 304. In embodiments, the plurality of frequency converters 310 may include a plurality of pairs of frequency converters 310. In embodiments, each pair of frequency converters 310-n of the plurality of pairs of frequency converters 310 may include a principal polarization converter corresponding to a respective principal polarization component 310-P of a respective coupled dipole array antenna element 304-P, and an orthogonal polarization converter 310-O corresponding to a respective orthogonal polarization component 304-O of a respective coupled dipole array antenna element. In embodiments, a second pair of frequency converters 310-2 of the plurality of frequency converters 310 may be operatively connected to a respective coupled dipole array element 304-2 of the plurality of coupled dipole array antenna elements 304. In embodiments, the second pair of frequency converters 310-2 may include a principal polarization converter 310-2P and an orthogonal polarization converter 310-2O. In embodiments, the plurality of pairs of frequency converters 310 may include thermoelectric coolers which may be configured to actively manage thermally the system noise temperature and increase the system gain over temperature. In embodiments, each respective principal polarization frequency converter 310-P and each respective orthogonal polarization frequency converter 310-O may include a thermoelectric cooler. In embodiments, the plurality of pairs of frequency converters 310 may further include a plurality of spatially distributed high-power amplifiers so as to increase the effective isotropic radiated power. In embodiments, each principal polarization converter 310-P and each orthogonal polarization converter 310-O may be configured to receive respective first modulated signals associated with the respective radio frequencies of the plurality of radio frequencies from the respective coupled dipole array antenna elements 304-n of the plurality of antenna elements 304. In embodiments, the respective radio frequencies may be between 900 MHz and 6000 MHz. In embodiments, the respective radio frequencies may be between 2000 MHz and 12000 MHz. In embodiments, the respective radio frequencies may be between 10000 MHz and 50000 MHz.

In embodiments, each principal polarization converter 310-P and each respective orthogonal polarization converter 310-O may be configured to convert the respective first modulated signals associated with the respective radio frequencies of the plurality of radio frequencies into respective second modulated signals having a first intermediate frequency. In embodiments, the first intermediate frequency may be between 50 MHz and 1250 MHz.

In embodiments, a respective intermediate frequency may be associated with a mission center radio frequency. In embodiments, the mission center radio frequency may be a desired frequency of operation for receiving and transmitting modulated signals associated with a respective coupled dipole array antenna element 304-n. For example, in embodiments, a first antenna element 304-1 may correspond to a desired frequency of operation associated with a first mission center radio frequency, and a second antenna element 304-2 may correspond to a desired frequency of operation associated with a second mission center radio frequency. Referring to FIG. 19, in embodiments, the process of obtaining the mission center radio frequency associated with a respective coupled dipole array antenna element 304 may begin with step S1902. At step S1902, in embodiments, the process may include receiving, from a digital software system interface 704 via a system controller 412 by memory of the digitally beamformed phased array system 210, for the respective coupled dipole array antenna element 304-n of the plurality of respective coupled dipole array antenna elements 304, the respective mission center radio frequency. At step S1904, in embodiments, the process of obtaining the mission center radio frequency may continue with step of storing, by memory operatively connected to the system controller 412, the respective mission center radio frequency for the respective coupled dipole antenna array element 304-n. At step S1906, in embodiments, the process of obtaining the mission center radio frequency may continue with the step of transporting, from the memory to the respective principal polarization frequency converter 310-P and the respective orthogonal polarization frequency converter 310-O, the respective mission center radio frequency for the respective coupled dipole array antenna element 304-n.

Figure 20:
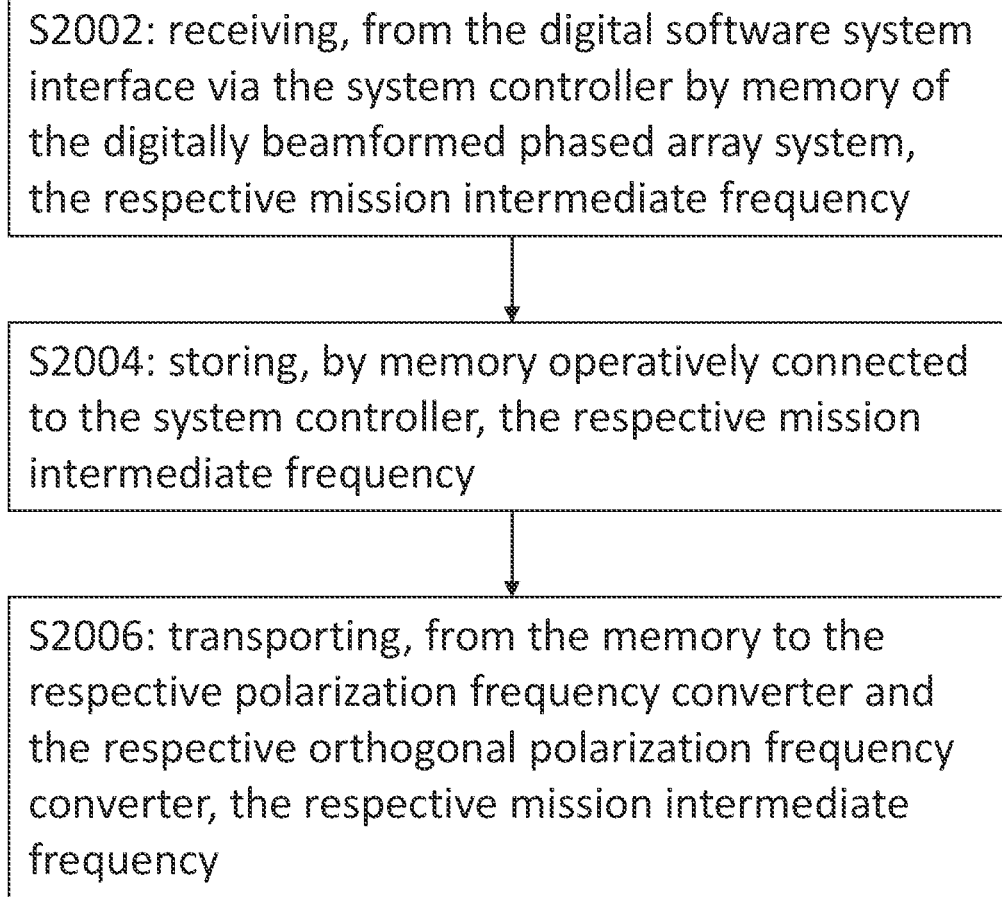

In embodiments, the respective intermediate frequency may be a respective mission intermediate frequency corresponding to the respective mission center radio frequency. Referring to FIG. 20, in embodiments, the process of obtaining the respective mission intermediate frequency associated with a respective antenna element 304 may begin with step S2002. At step S2002, in embodiments, the process may include receiving, from the digital software system interface 704 via the system controller 412 by memory of the digitally beamformed phased array system 210, for the respective coupled dipole array antenna element 304-n of the plurality of respective coupled dipole array antenna elements 304, the respective mission intermediate frequency. At step S2004, in embodiments, the process of obtaining the mission intermediate frequency may continue with step of storing, by memory operatively connected to the system controller 412, the respective mission intermediate frequency for the respective coupled dipole antenna array element 304-n. At step S2006, in embodiments, the process of obtaining the mission intermediate frequency may continue with the step of transporting, from the memory to the respective principal polarization frequency converter 310-P and the respective orthogonal polarization frequency converter 310-O, the respective mission intermediate frequency for the respective coupled dipole array antenna element 304-*n*.

In embodiments, the plurality of digital beamformers 306 may be operatively connected to the plurality of pairs of frequency converters 310 wherein each digital beamformer 306-*n* may be operatively connected to one of the respective principal polarization converter 310-P and the respective orthogonal polarization converter 310-O. In embodiments, each digital beamformer 306-*n* may be configured to receive the respective second modulated signals associated with the first intermediate frequency. In embodiments, each digital beamformer 306-*n* may be configured to convert the respective second modulated signal from an analog signal to a digital data format. In embodiments, the digital beamformer 306-*n* may be configured to convert the respective second modulated signal from an analog signal to a digital data format by performing First-Nyquist sampling. In embodiments, each digital beamformer 306-*n* may be configured to generate a plurality of channels of the digital data by decimation of the digital data using a polyphase channelizer and filter using a plurality of cascaded halfband filters. In embodiments, each digital beamformer 306-*n* may be configured to select one of the plurality of channels. In embodiments, each digital beamformer 306-*n* may be configured to select one of the plurality of channels using a multiplexer. In embodiments, the multiplexer selection may be provided by the system controller 412.

Figure 21:
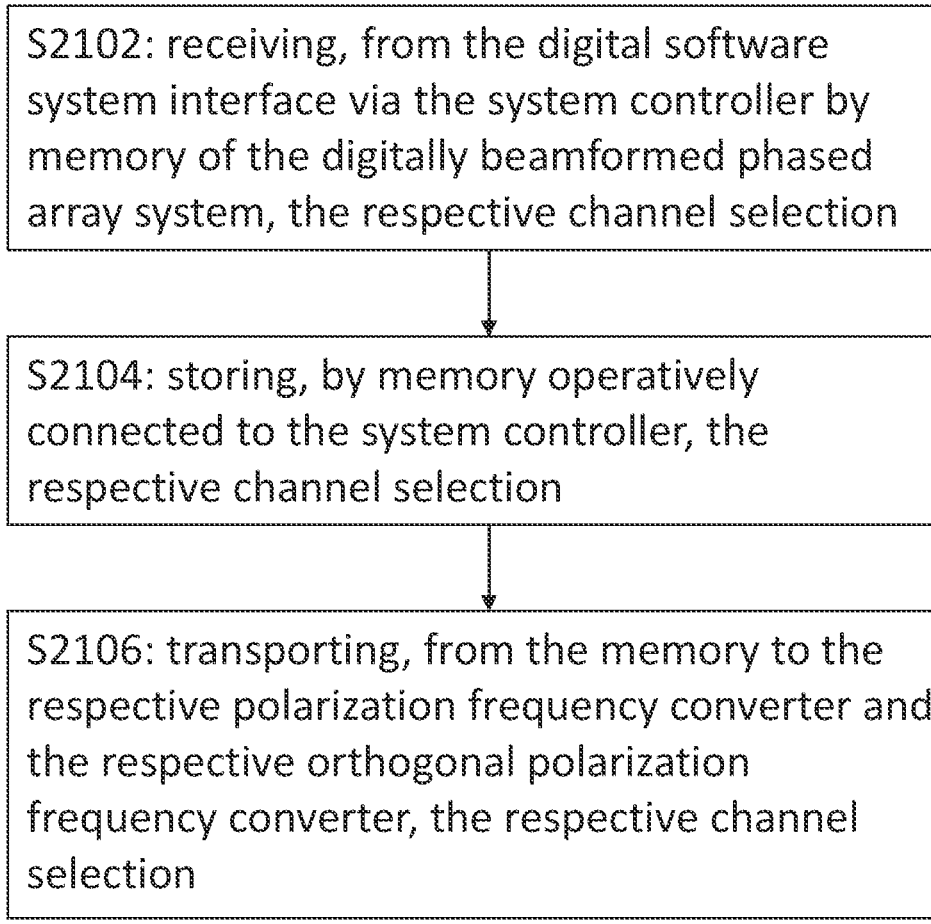

Referring to FIG. 21, in embodiments, the process of selecting a respective channel may begin with step S2102. At step 2102, in embodiments, the process may include receiving, from the digital software system interface 704 via the system controller 412 by memory of the digitally beamformed phased array system 210, for the respective principal polarization component 304-P and the respective orthogonal polarization component 304-O of the respective coupled dipole array antenna element 304-*n* of the plurality of respective coupled dipole array antenna elements 304, the respective channel selection. At step S2104, in embodiments, the process of selecting the respective channel may continue with step of storing, by memory operatively connected to the system controller 412, the respective mission channel selection for the respective principal polarization component 310-P and the respective orthogonal polarization component 310-O of the respective coupled dipole antenna array element 304-*n*. At step S2106, in embodiments, the process of selecting the respective channel may continue with step of transporting, the respective channel selection for the respective principal polarization component 304-P and the respective orthogonal polarization component 304-O of the respective coupled dipole array antenna element 304-*n*. In embodiments, the respective channel selection may be associated with a respective tuner channel frequency. In embodiments, the respective tuner channel frequency may correspond to the respective mission intermediate frequency.

Figure 22:
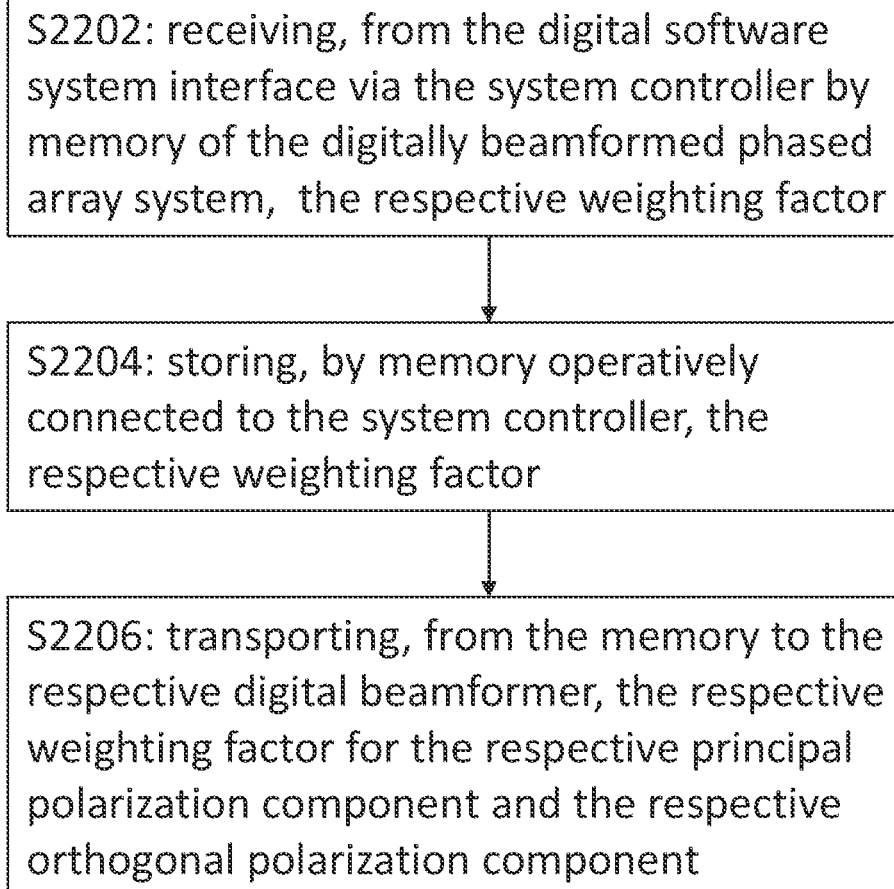

In embodiments, each digital beamformer 306-*n* may be configured to apply a first weighting factor to the digital data associated with the selected one of the plurality of channels to generate a first intermediate partial beamformed data stream. In embodiments, a respective weighting factor may be a part of an array of weighting factors. Referring to FIG. 22, in embodiments, the process of obtaining the respective weighting factor may begin with step S2202. At step S2202, in embodiments, the process may include receiving, from the digital software system interface 704 via the system controller 412 by memory of the digitally beamformed array system 210, for the respective principal polarization component 304-P and the respective orthogonal polarization component 304-O of the respective coupled dipole array antenna element 304-*n* of the plurality of respective coupled dipole array antenna elements 304, the respective weighting factor. In embodiments, the array of weighting factors may be generated using a beam broadening tapering formula. In embodiments, the digital software system interface 704 may calculate and generate the array of weighting factors by using the formula:

$$w_{m,n} = \frac{A_{m,n}}{\left(A_{m,n}^{tap} * A_{m,n}^{cal}\right)} * e^{-j*\left(\theta_{m,n}^{steer} + \theta_{m,n}^{tap} + \theta_{m,n}^{cal}\right)}$$

wherein $w_{m,n}$ is a weighting factor associated with each position in the antenna array expressed as a horizontal position m and a vertical position n, $A_{m,n}$ is an amplitude weighting factor associated with each position in the antenna array expressed as a horizontal position m and a vertical position n, $A^{tap}$ is a tapered amplitude weighting factor associated with each position in the antenna array expressed as a horizontal position m and a vertical position n, $A^{cal}$ is a calibration weighting factor associated with each position in the antenna array expressed as a horizontal position m and a vertical position n, $\theta_{m,n}$ is a phase factor associated with each position in the antenna array expressed as a horizontal position m and a vertical position n, $\theta^{steer}$ is a steering phase factor $\theta^{steer}$ associated with each position in the antenna array expressed as a horizontal position m and a vertical position n, $\theta^{tap}$ is a taper phase factor associated with each position in the antenna array expressed as a horizontal position m and a vertical position n and $\theta^{cal}$ is a calibration phase factor associated with each position in the antenna array expressed as a horizontal position m and a vertical position n.

In embodiments, each respective weighting factor may be generated using a beam broadening tapering formula. In embodiments, the digital software system interface 704 may calculate and generate the respective weighting factor by using the formula:

$$w(t) = \left(\frac{\cosh(\pi\alpha * \sqrt{1 - 4t^2})}{\cosh(\pi\alpha)}\right)^P$$

wherein w(t) is the respective weighting factor at a location t, where t is defined by an array associated with a location of the respective principal polarization component and the respective orthogonal polarization component of the respective coupled dipole array antenna element, a is the respective tuning parameter, and P is the respective power parameter. In embodiments, the respective tuning parameter and the respective power parameter may be applied by the beam broadening tapering formula in the two-dimensional x-y direction of the tapering plane in order to tune the respective digital data or respective transmit digital data to be specific to the desired frequency of operation (e.g., L-band, S-band, and/or C-band, to name a few) for the respective coupled dipole array antenna element 304-*n*. In embodiments, the respective tuning parameter and the respective power parameter may be applied by the beam broadening tapering formula in order to the tune the respective digital data based on the geometry of the parabolic surface that the digitally beamformed phased array system 210 may be applied to. In embodiments, by applying the beam broadening tapering formula above to generate the respective weighting factors, the system 210 may achieve maximum amplitude beam broadening for receiving and transmitting a plurality of modulated signals within any desired bandwidth simultaneously.

Figure 15A:
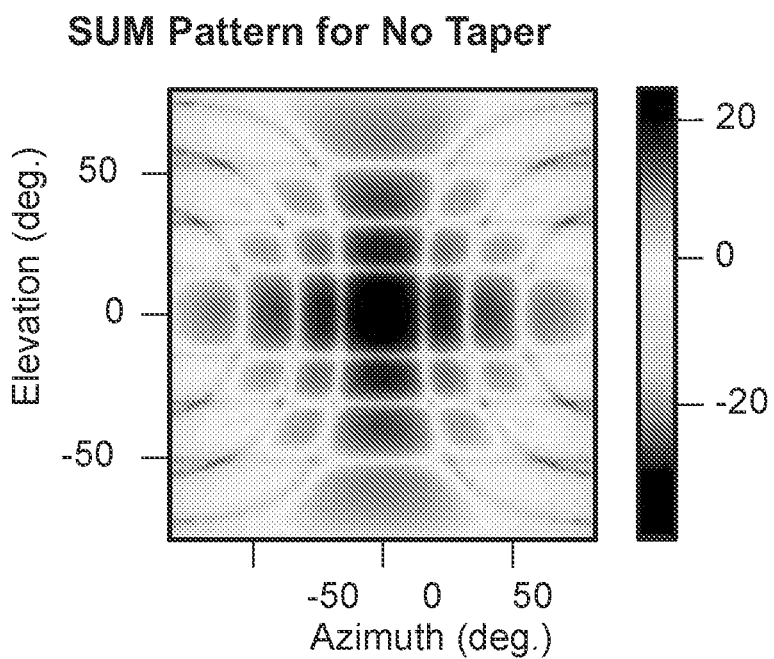
FIGS. 15A-B depict exemplary beam amplitude tapering plots illustrating beam amplitude tapering by a digitally beamformed phased array system in accordance with embodiments of the present invention.
Figure 15B:
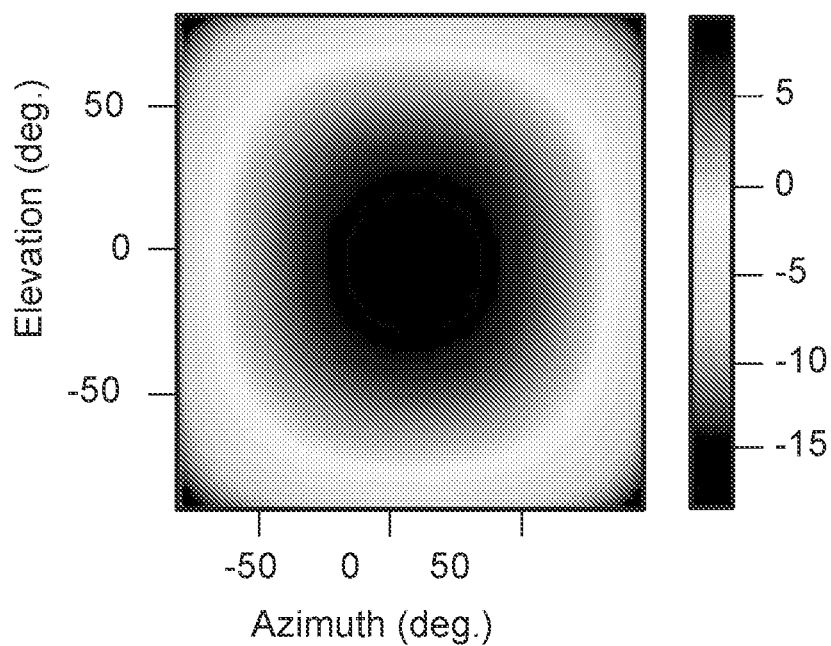
Figure 16A:
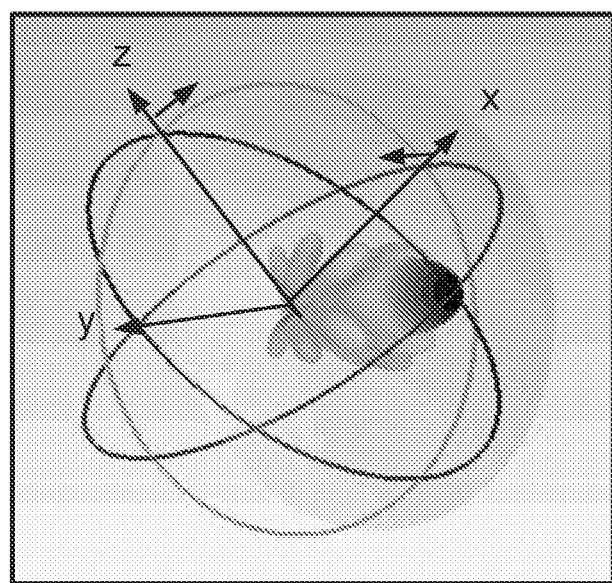
FIG. 16A-B depict exemplary beam amplitude tapering plots illustrating beam amplitude tapering by a digitally beamformed phased array system in accordance with embodiments of the present invention.
Figure 16B:
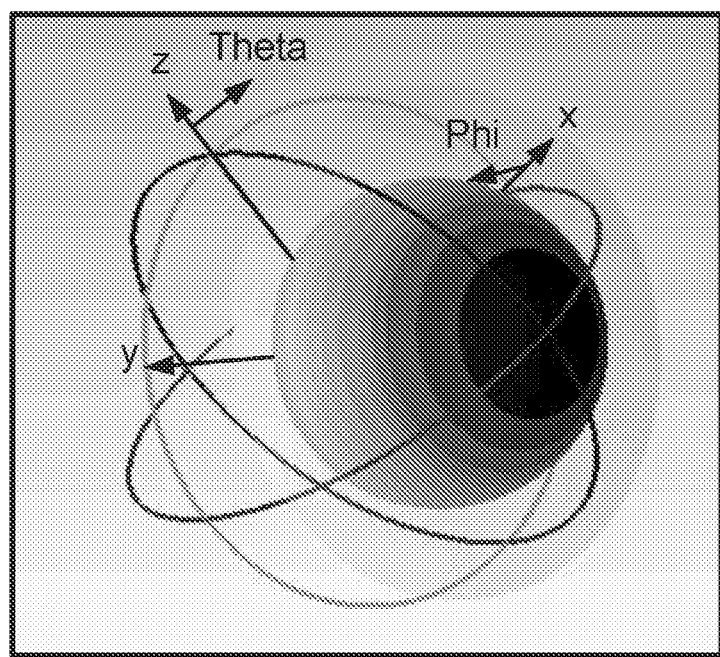
Figure 17:
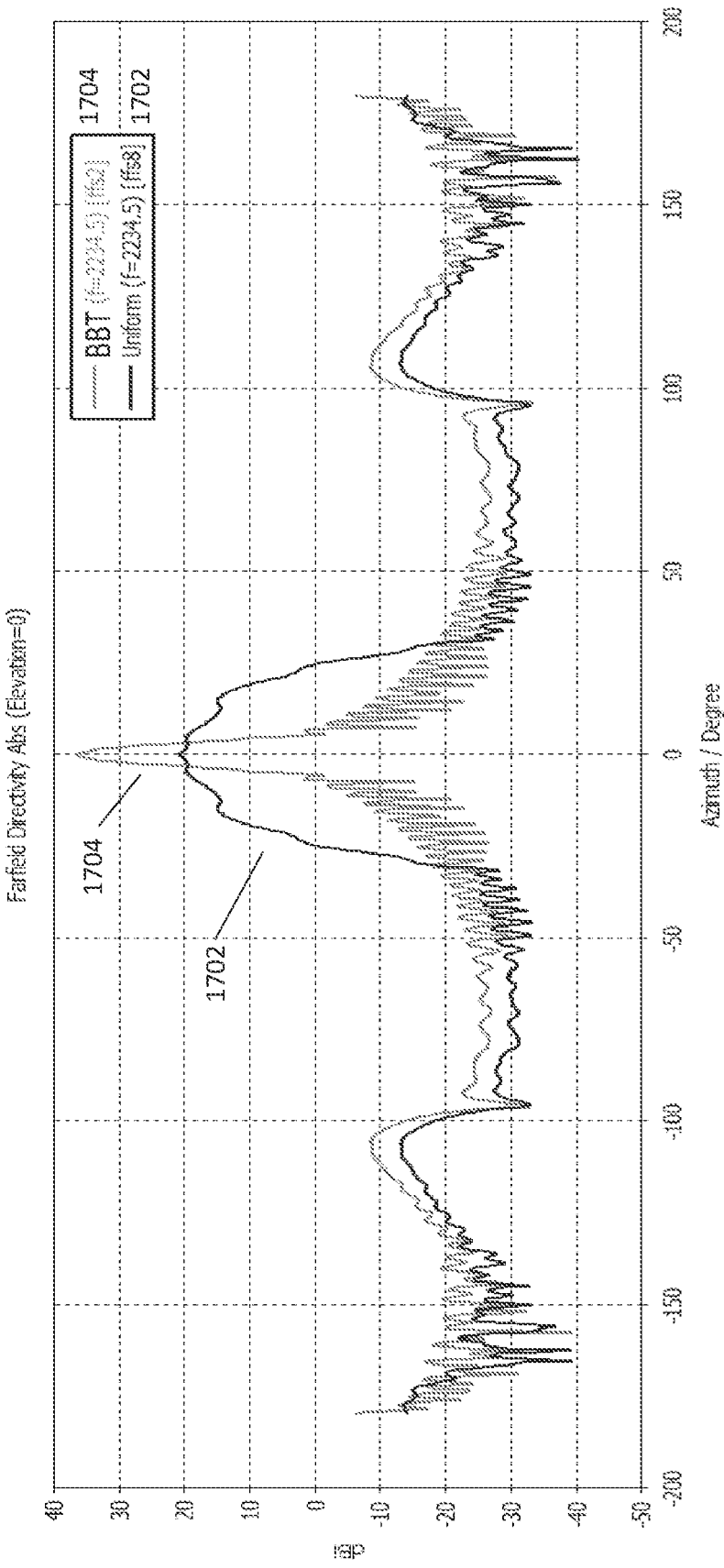
FIG. 17 depicts exemplary beam amplitude tapering plots illustrating beam amplitude tapering by a digitally beamformed phased array system in accordance with embodiments of the present invention.

In embodiments, for example, FIGS. 15-16 depicts exemplary two-dimensional beam amplitude tapering plots illustrating beam amplitude tapering by a digitally beamformed phased array system 210 in accordance with embodiments of the present invention. In embodiments, by applying the beam broadening taper seen in FIG. 15B to the respective beam, the sum of the respective main lobe beam may be shaped so as to maximize the central lobe width of the main beam. Referring to FIG. 15A, by applying a uniform beam taper to the respective beam, the central lobe width of the main beam is drastically reduced compared to the beam broadening taper. Similarly, FIG. 16B depicts an exemplary three-dimensional beam amplitude tapering plot illustrating beam amplitude tapering by a digitally beamformed phased array system 210 in accordance with embodiments of the present invention. In embodiments, the uniform taper depicted by FIG. 16A shows a drastically reduced main central lobe width compared to the sum beam pattern created by the beam broadening taper in FIG. 16B. FIG. 17 depicts exemplary beam amplitude tapering plots illustrating beam amplitude tapering by a digitally beamformed phased array system with respect to the application of a uniform taper to a respective beam 1702, and the application of a beam broadening taper 1704 to the respective beam. In embodiments, the beam broadening taper 1704 creates greater Fairfield directivity relative to the respective geometry of the respective parabolic surface than the uniform taper 1702.

At step S2204, in embodiments, the process of obtaining the respective weighting factor may continue with the step of storing, by memory operatively connected to the system controller 412, the respective weighting factor for the respective principal polarization component 304-P and the respective orthogonal polarization component 304-O of the respective coupled dipole array antenna element 304-n of the plurality of respective coupled dipole array antenna elements 304. At step S2206, in embodiments, the process of obtaining the respective weighting factor may continue with the step of transporting, from the memory to the respective digital beamformer 306-n, the respective weighting factor for the respective principal polarization component 304-P and the respective orthogonal polarization component 304-O of the respective coupled dipole array antenna element 304-n of the plurality of respective coupled dipole array antenna elements 304. In embodiments, the digital software system interface 704 may receive specific mission parameters (e.g., the respective mission center radio frequency, the respective mission intermediate frequency, and/or the respective channel selection, to name a few) for the plurality of coupled dipole array antenna elements as an input. In embodiments, the digital software system interface 704 may use the specific mission parameters to generate the array of weighting factors.

In embodiments, each digital beamformer 306-n may be configured to combine the first intermediate partial beamformed data stream with the plurality of other intermediate partial beamformed data streams to generate a first partial beamformed data stream. In embodiments, each digital beamformer 306-n may be configured to apply an oscillating signal to the first partial beamformed data stream to generate a first oscillating partial beamformed data stream. In embodiments, the oscillating signal may be provided by the system controller 412.

In embodiments, a respective oscillating signal may be associated with a respective oscillating signal frequency. Referring to FIG. 23, in embodiments, the process of obtaining the respective oscillating signal frequency may begin with step S2302. At step S2302, in embodiments, the process of obtaining the respective oscillating signal frequency may include receiving, from the digital software system interface 704 via the system controller 412 by memory of the digitally beamformed phased array system 210, for the respective principal polarization component 304-P and the respective orthogonal polarization component 304-O of the respective coupled dipole array antenna element 304-n of the plurality of respective coupled dipole array antenna elements 304, the respective oscillating signal frequency. At step S2304, in embodiments, the process of obtaining the respective oscillating signal frequency may continue with the step of storing, by memory operatively connected to the system controller 412, the respective oscillating signal frequency for the respective principal polarization component 304-P and the respective orthogonal polarization component 304-O of the respective coupled dipole array element 304-n. At step S2306, in embodiments, the process of obtaining the respective oscillating signal frequency may continue with the step of transporting, from the memory to the respective digital beamformer 306-n, the respective oscillating signal frequency for the respective principal polarization component 304-P and the respective orthogonal polarization component 304-O of the respective coupled dipole array element 304-n. In embodiments, the respective oscillating signal frequency may correspond to the respective tuner channel frequency. In embodiments, a plurality of oscillating signal frequencies may be received for a plurality of principal polarization components and a plurality of orthogonal polarization components of the plurality of respective coupled dipole array antenna elements 304. In embodiments, the digital software system interface 704 may receive specific mission parameters (e.g., the respective mission center radio frequency, the respective mission intermediate frequency, and/or the respective channel selection, to name a few) for respective coupled dipole array antenna elements 304 as an input, the digital software system interface 704 may use the specific mission parameters to generate the respective oscillating signal frequency.

FIG. 18 is a table illustrating exemplary mission parameters used by a digitally beamformed phased array feed system in accordance with embodiments of the present invention. In embodiments, for example, the mission center radio frequency (e.g., 4,398 MHz) may be received as a mission parameter via the system controller 412 corresponding to a respective coupled dipole array antenna element 304-n. Continuing this example, in embodiments, a local oscillator having a respective local oscillator frequency (e.g., 4,900 MHz) may be selected via the system controller 412. In embodiments, the mission intermediate frequency (e.g., 502 MHz) may be received as a mission parameter via the system controller 412 corresponding to the respective coupled dipole array antenna element 304-n. In embodiments, the mission intermediate frequency value may be dependent on the other mission parameters received with respect the respective coupled dipole array antenna element 304-n (e.g., mission center radio frequency, local oscillator selection, to name a few). In embodiments, the tuner channel selection (e.g., 3) provided by the multiplexer and corresponding to a tuner channel frequency (e.g., 468.75 MHz)

may be received as a mission parameter via the system controller 412 corresponding to the respective coupled dipole array antenna element 304-*n*. In embodiments, the tuner channel frequency may be dependent on the other mission parameters received with respect to the respective coupled dipole array antenna element 304-*n* (e.g., mission center radio frequency, local oscillator selection, mission intermediate frequency, to name a few). In embodiments, the oscillating signal frequency (e.g., 33.25 MHz) corresponding to the oscillating signal may be received as a mission parameter via the system controller 412 corresponding to the respective coupled dipole array antenna element 304-*n*. In embodiments, the oscillating signal frequency may be provided to a numerically controlled oscillator. In embodiments, the numerically controlled oscillator may be used to apply the oscillating signal as an offset frequency value based on the tuner channel selection to the first partial beamformed data stream. In embodiments, the oscillating signal frequency may be dependent on the other mission parameters received with respect to the respective coupled dipole array antenna element 304-*n*.

In embodiments, each digital beamformer 306-*n* may be configured to apply a three-stage halfband filter to the first oscillating partial beamformed data stream to generate a first filtered partial beamformed data stream. In embodiments, each digital beamformer 306-*n* may be configured to apply a time delay to the first filtered partial beamformed data stream to generate a first partial beam. In embodiments, each digital beamformer 306-*n* may be configured to transmit the first partial beam along with a first set of a plurality of other partial beams of the first beam to a digital software system interface 704 via a data transport bus 702. In embodiments, each digital beamformer may be configured to transmit the first partial beam of the first beam along with a second set of a plurality of other partial beams of a second beam to the digital software system interface 704 via the data transport bus 702.

In embodiments, each digital beamformer 306-*n* may have a transmit mode of operation associated with converting a plurality of transmit digital data from a digital signal to an analog signal having a plurality of respective intermediate frequencies. In embodiments, each digital beamformer 306-*n* may be configured to operate in the transmit mode of operation before operating in the receive mode of operation. In embodiments, each digital beamformer 306-*n* may be configured to operate only in the receive mode of operation. In embodiments, each digital beamformer 306-*n* may be configured to operate only in the transmit mode of operation. In embodiments, each digital beamformer 306-*n* may be configured to receive the first partial beam of the first beam along with the first set of the plurality of other partial beams of the first beam from the digital software system interface 704 via the data transport bus 702. In embodiments, each digital beamformer 306-*n* may be configured to receive the first partial beam of the first beam along with the second set of a plurality of other beams of the second beam from the digital software system interface 704 via the data transport bus 702. In embodiments, each digital beamformer 306-*n* may be configured to apply a second weighting factor to first transmit digital data associated with the first partial beam of the first beam selected beam of the plurality of beams. In embodiments, each digital beamformer 306-*n* may be configured to transmit the first transmit digital data to a first digital to analog converter. In embodiments, each digital beamformer 306-*n* may be configured to convert, using the first digital to analog converter, the first transmit digital data from a digital signal to an analog signal having the first intermediate frequency. In embodiments, each digital beamformer 306-*n* may be configured to convert, using the first digital to analog converter, the first transmit digital data from a digital signal to an analog signal having the first intermediate frequency by performing First-Nyquist sampling.

In embodiments, each principal polarization converter 310-P and each respective orthogonal polarization converter 310-O may have a transmit mode of operation associated with transmitting respective modulated signals associated with a plurality of radio frequencies. In embodiments, each principal polarization converter 310-P and each respective orthogonal polarization converter 310-O may be configured to operate in the transmit mode of operation before operating in the receive mode of operation. In embodiments, each principal polarization converter 310-P and each respective orthogonal polarization converter 310-O may be configured to operate only in the receive mode of operation. In embodiments, each principal polarization converter 310-P and each respective orthogonal polarization converter 310-O may be configured to operate only in the transmit mode of operation. In embodiments, each principal polarization converter 310-P and each respective orthogonal polarization converter 310-O may be configured to receive respective third modulated signals associated with the first intermediate frequency from the respective digital beamformer 306-*n* of the plurality of digital beamformers 306. In embodiments, each principal polarization converter 310-P and each respective orthogonal polarization converter 310-O may be configured to convert the respective third modulated signals associated with the first intermediate frequency into respective fourth modulated signals having a radio frequency. In embodiments, each principal polarization converter 310-P and each respective orthogonal polarization converter 310-O may be configured to transmit the respective fourth modulated signals associated with the respective radio frequencies of the plurality of radio frequencies from each principal polarization converter 310-P and each respective orthogonal polarization converter 310-O of the respective pair of frequency converters 310-*n* of the plurality of pairs of frequency converters 310 to each principal polarization component and each orthogonal polarization component of the respective coupled dipole array antenna element 304-*n* of the plurality of coupled dipole array antenna elements 304.

In embodiments, each digital beamformer 306-*n* may be configured to receive a third partial beam of a third beam along with a third set of a plurality of other partial beams of the third beam from the digital software system 704 interface via the data transport bus 702. In embodiments, each digital beamformer 306-*n* may be configured to receive the third partial beam of the third beam along with a fourth set of a plurality of other beams of a fourth beam from the digital software system interface via the data transport bus. In embodiments, each digital beamformer 306-*n* may be configured to apply a second weighting factor to second transmit digital data associated with the third partial beam of the third beam. In embodiments, each digital beamformer 306-*n* may be configured to transmit the second transmit digital data to a second digital to analog converter. In embodiments, each digital beamformer 306-*n* may be configured to convert, using the second digital to analog converter, the second transmit digital data from a digital signal to an analog signal having a second intermediate frequency. In embodiments, the second intermediate frequency may be between 50 MHz and 1250 MHz. In embodiments, the second intermediate frequency may be the same as the first intermediate frequency. In embodiments, each digital beamformer 306-*n* may be configured to convert, using the second digital to analog converter, the second digital data from a digital signal to an analog signal having a second intermediate frequency by performing First-Nyquist sampling.

In embodiments, each principal polarization converter 310-P and each respective orthogonal polarization converter 310-O may be configured to receive respective fifth modulated signals associated with the second intermediate frequency from the respective digital beamformer 306-n of the plurality of digital beamformers 306. In embodiments, each principal polarization converter 310-P and each respective orthogonal polarization converter 310-O may be configured to convert the respective fifth modulated signals associated with the second intermediate frequency into respective sixth modulated signals having a radio frequency. In embodiments, each principal polarization converter 310-P and each respective orthogonal polarization converter 310-O may be configured to transmit the respective sixth modulated signals associated with the respective radio frequencies of the plurality of radio frequencies from each principal polarization converter 310-P and each respective orthogonal polarization converter 310-O of the respective pair of frequency converters 310-n of the plurality of pairs of frequency converters 310 to each principal polarization component 304-P and each orthogonal polarization component 304-O of the respective coupled dipole antenna element 304-n of the plurality of coupled dipole antenna elements 304.

In embodiments, each coupled dipole antenna array element 304-n may have a transmit mode of operation associated with transmitting a plurality of respective radio frequencies. In embodiments, each principal polarization component 304-P and each respective orthogonal polarization component 304-O may be configured to operate in the transmit mode of operation before operating in the receive mode of operation. In embodiments, each principal polarization component 304-P and each respective orthogonal polarization component 304-O may be configured to operate only in the receive mode of operation. In embodiments, each principal polarization component 304-P and each respective orthogonal polarization component 304-O may be configured to operate only in the transmit mode of operation. In embodiments, each principal polarization component 304-P and each respective orthogonal polarization component 304-O of the respective coupled dipole antenna array element 304-n may be configured to transmit the respective sixth modulated signals associated with the respective radio frequencies of the plurality of radio frequencies.

In embodiments, the power and clock management subsystem 314 may be configured to manage power and time of operation.

In embodiments the thermal management subsystem 308 may be configured to dissipate heat generated by the multi-band software defined antenna array tile 110.

Figure 4:
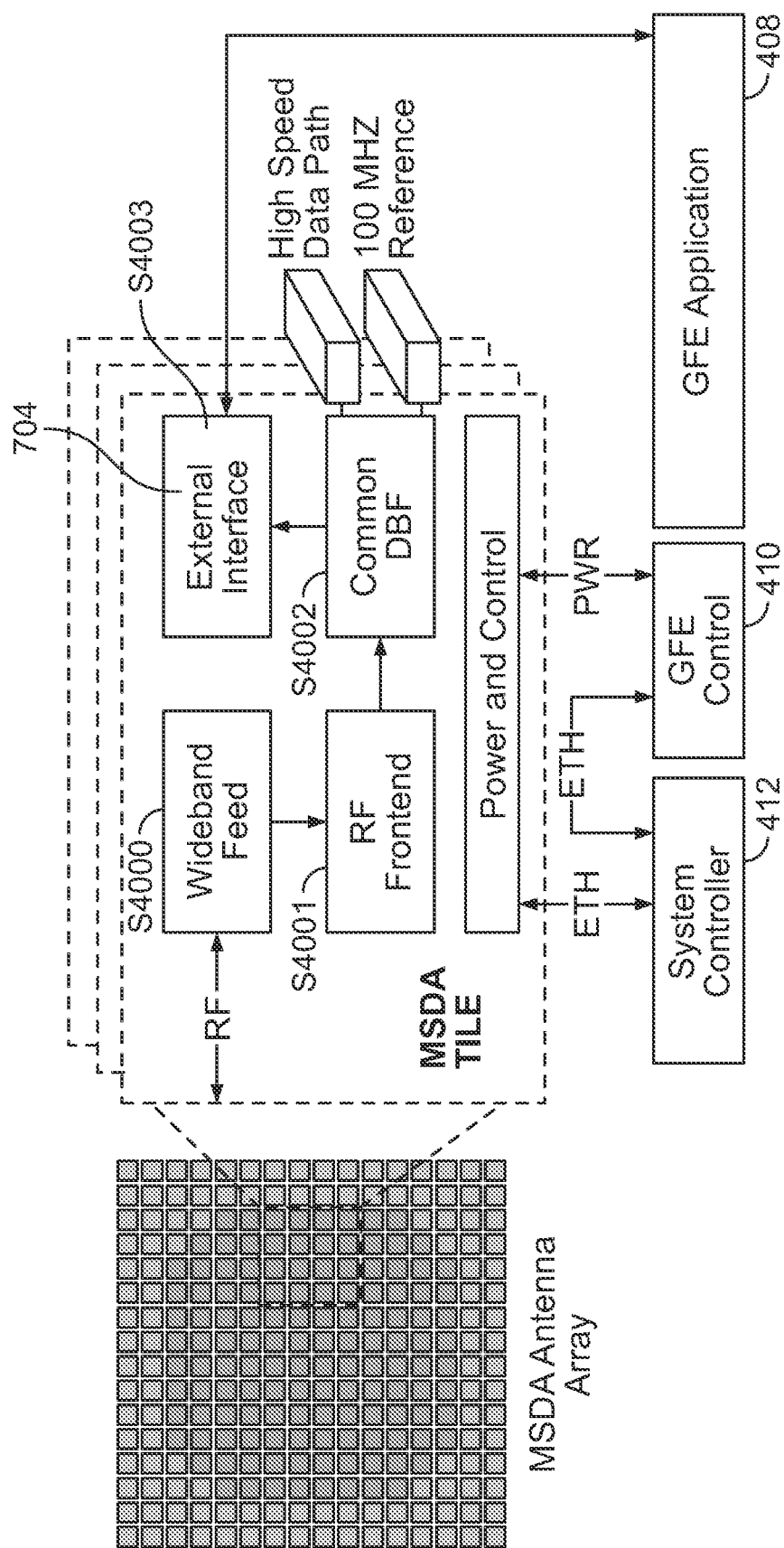
FIG. 4 is a schematic illustration of a multi-band software defined antenna array tile in accordance with embodiments of the present invention.

FIG. 4 is a schematic illustration of a multi-band software defined antenna array tile 110 in accordance with embodiments of the present invention. In embodiments, the multi-band software defined antenna array tile 110 may receive a plurality of radio frequencies via a plurality of antenna elements 304 in a wide band feed (S4000). In embodiments, a radio frequency frontend system including a plurality of pairs of frequency converters 310 may receive the radio frequencies. In embodiments, the radio frequency frontend may convert the respective radio frequencies into a first intermediate frequency (S4001). In embodiments, a common digital beamformer 306 may receive the first intermediate frequency from the radio frequency frontend. In embodiments, the common digital beamformer 306 may generate a first partial beam (S4002), which may be transmitted to an external digital software system interface 704 along with a plurality of other partial beams (S4003). In embodiments, the external digital software system interface 704 may include a Government Furnish Equipment (GFE) application 408, GFE control 410, and a system controller 412.

Figure 5:
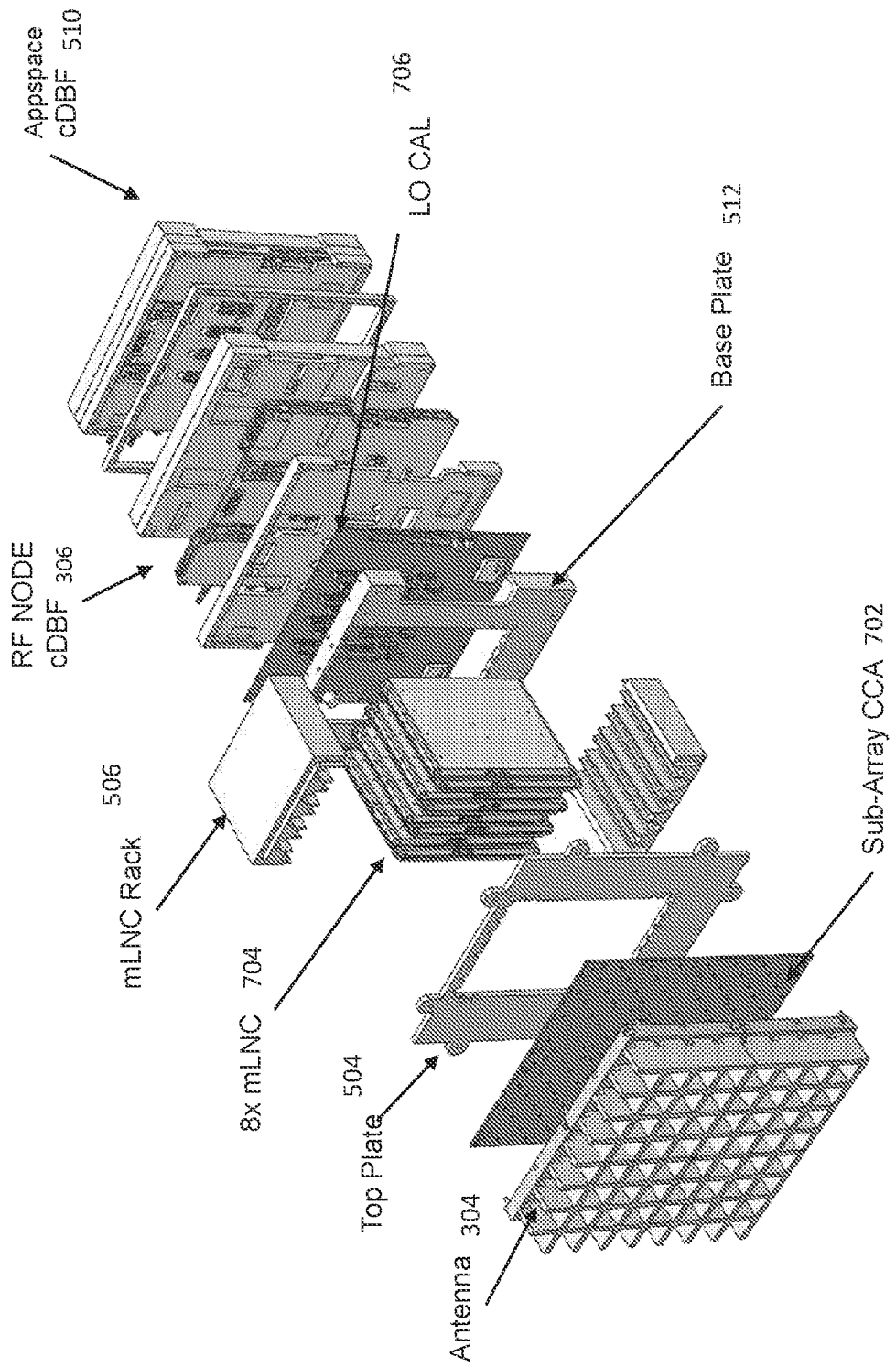
FIG. 5 is a schematic illustration of an exploded view of a multi-band software defined antenna array tile in accordance with embodiments of the present invention.

FIG. 5 is a schematic illustration of an exploded view of a multi-band software defined antenna array tile 110 in accordance with embodiments of the present invention. In embodiments, the multi-band software defined antenna array tile 110 may include a plurality of antenna elements 304, a sub-array circuit card assembly (sub-array CCA) 702, a top plate 504, a plurality of mini low noise channelizer circuit card assemblies (mLNC) 704, a local oscillator/calibration circuit card assembly (LO/CAL) 706, a top plate 504, an mLNC rack 506, a base plate 512, an RF node common digital beamformer 306, and a common digital beamformer 510. In embodiments, for example, the multi-band software defined antenna array tile 110 may include 8 mLNCs.

Figure 6:
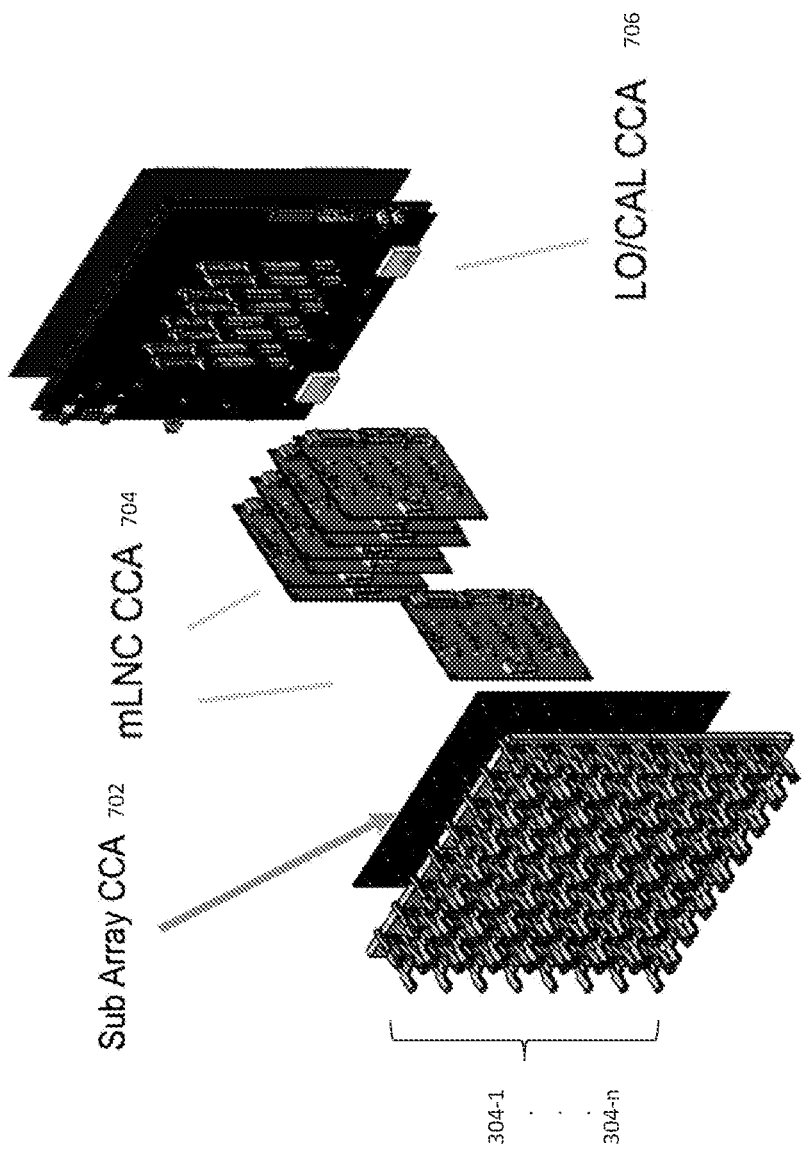
FIG. 6 is a schematic illustration of an exploded view of the radio frequency system of a multi-band software defined antenna array tile in accordance with embodiments of the present invention.

FIG. 6 is a schematic illustration of an exploded view of the radio frequency system of a multi-band software defined antenna array tile 110 in accordance with embodiments of the present invention. In embodiments, the radio frequency system may include the plurality of antenna elements 304, the sub array circuit card assembly (sub-array CCA) 702, the plurality of mini low noise channelizer circuit card assemblies (mLNC) 704, and the local oscillator/calibration circuit card assembly (LO/CAL) 706. In embodiments, the sub-array CCA 702 may accept input modulated signals associated with respective radio frequencies from the plurality of antenna elements 304 and forms sub-arrays of the modulated signals to be output to the plurality of mLNCs 704. In embodiments, for example, if the radio frequency includes 64 antenna elements, the sub-array CCA 702 may receive 64 radio frequency input signals from the respective antenna elements 304. In embodiments, the plurality of mLNCs 704 may receive the sub-arrays of the modulated signals from the sub-array CCA 702 and may convert the modulated signals associated with respective radio frequencies into modulated signals having an intermediate frequency. In embodiments, the plurality of mLNCs 704 may output the modulated signals having an intermediate frequency to the LO/CAL 706. In embodiments, the LO/CAL 706 may take a 100 MHz reference oscillator and creates local oscillator and calibration signals and distribute the signals to the each of the respective modulated signals having an intermediate frequency received from the respective mLNCs 704. In embodiments, the LO/CAL 706 may pass through the respective modulated signals having an intermediate frequency to the digital beamformer 306. In embodiments, the LO/CAL 706 may provide power to the radio frequency system of the multi-band software defined antenna array tile 110.

Figure 7:
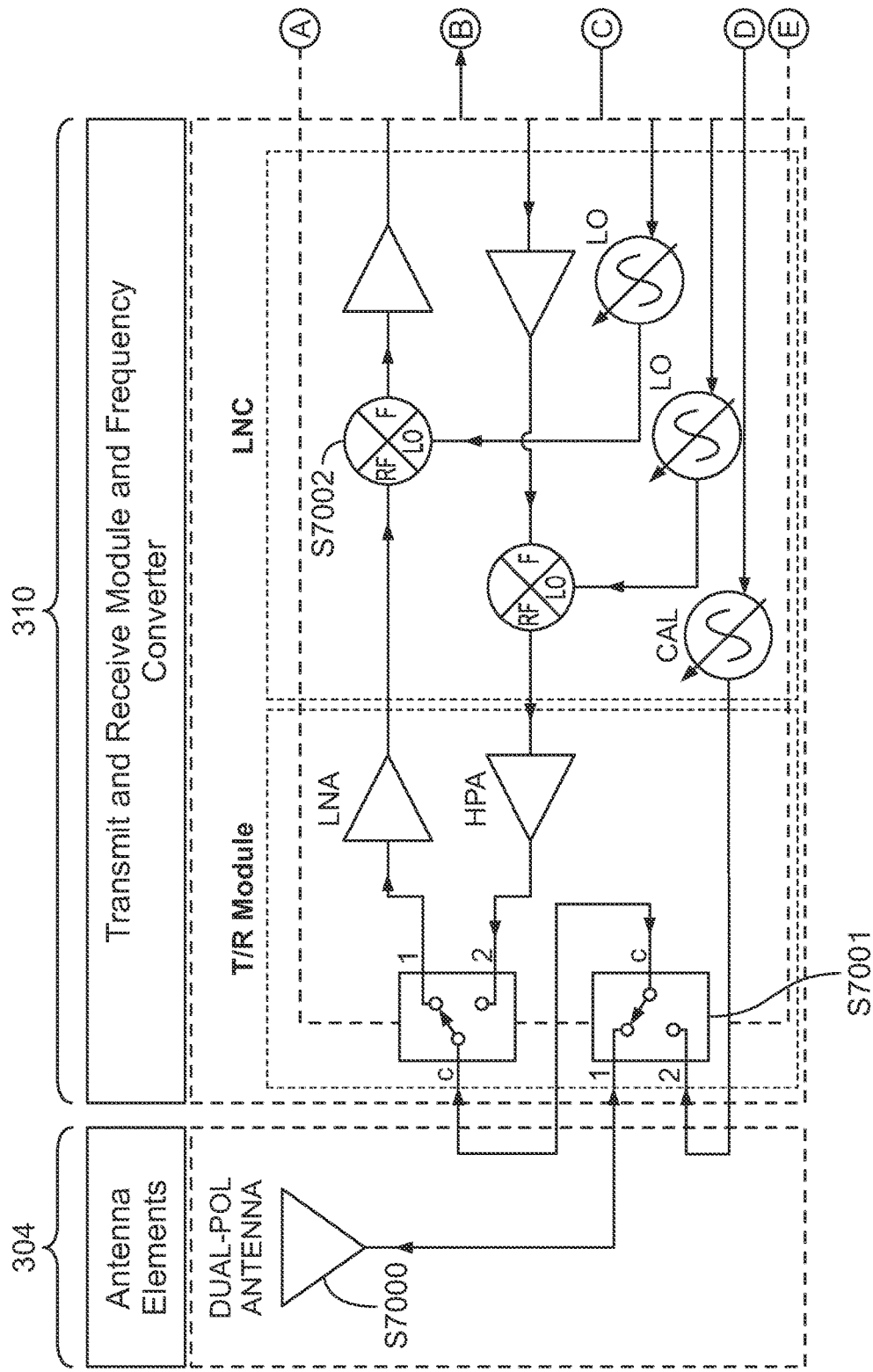
FIG. 7 is a schematic diagram of a process flow of a multi-band software defined antenna array tile in accordance with embodiments of the present invention.
Figure 7:
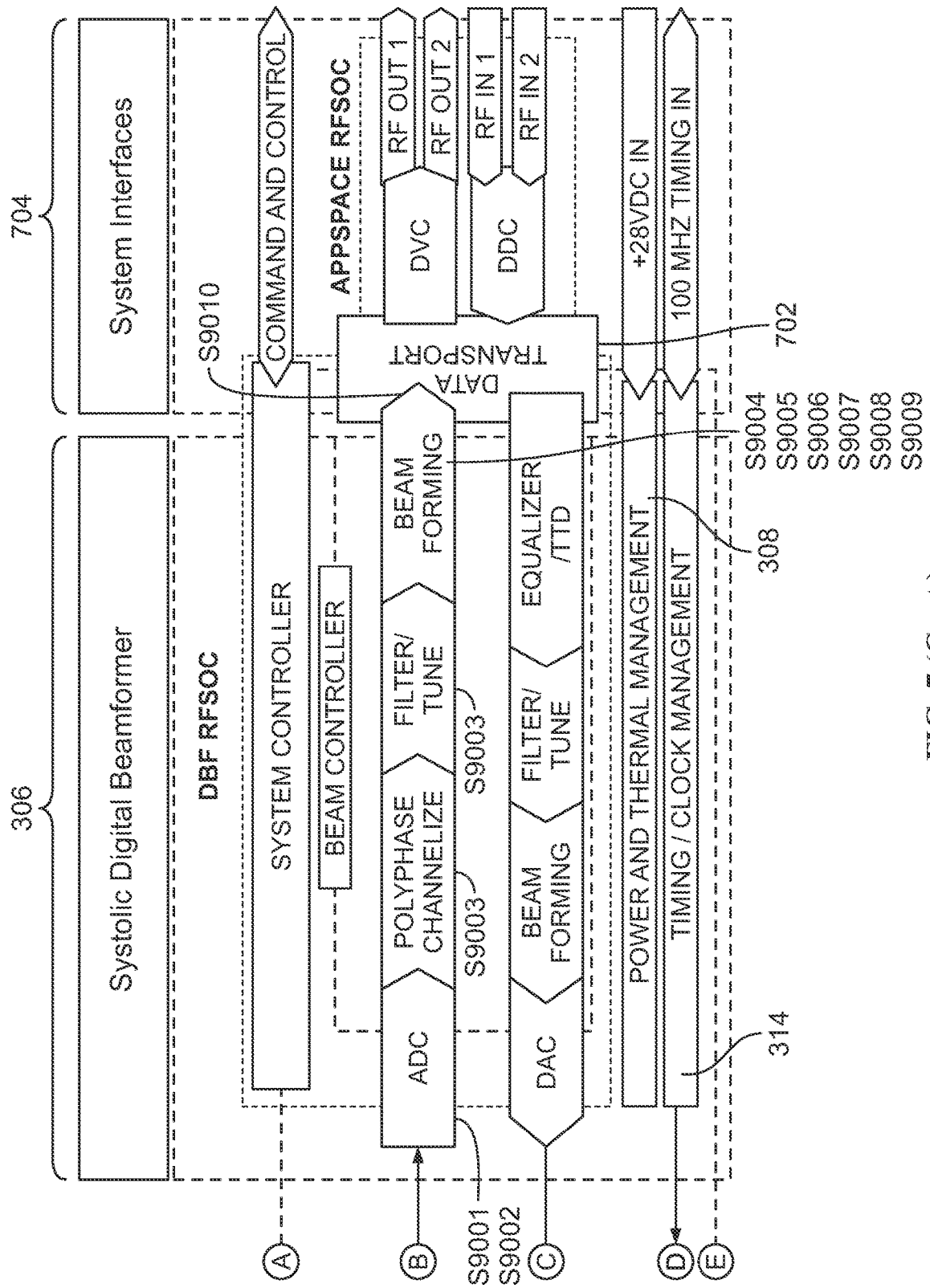
Figure 8:
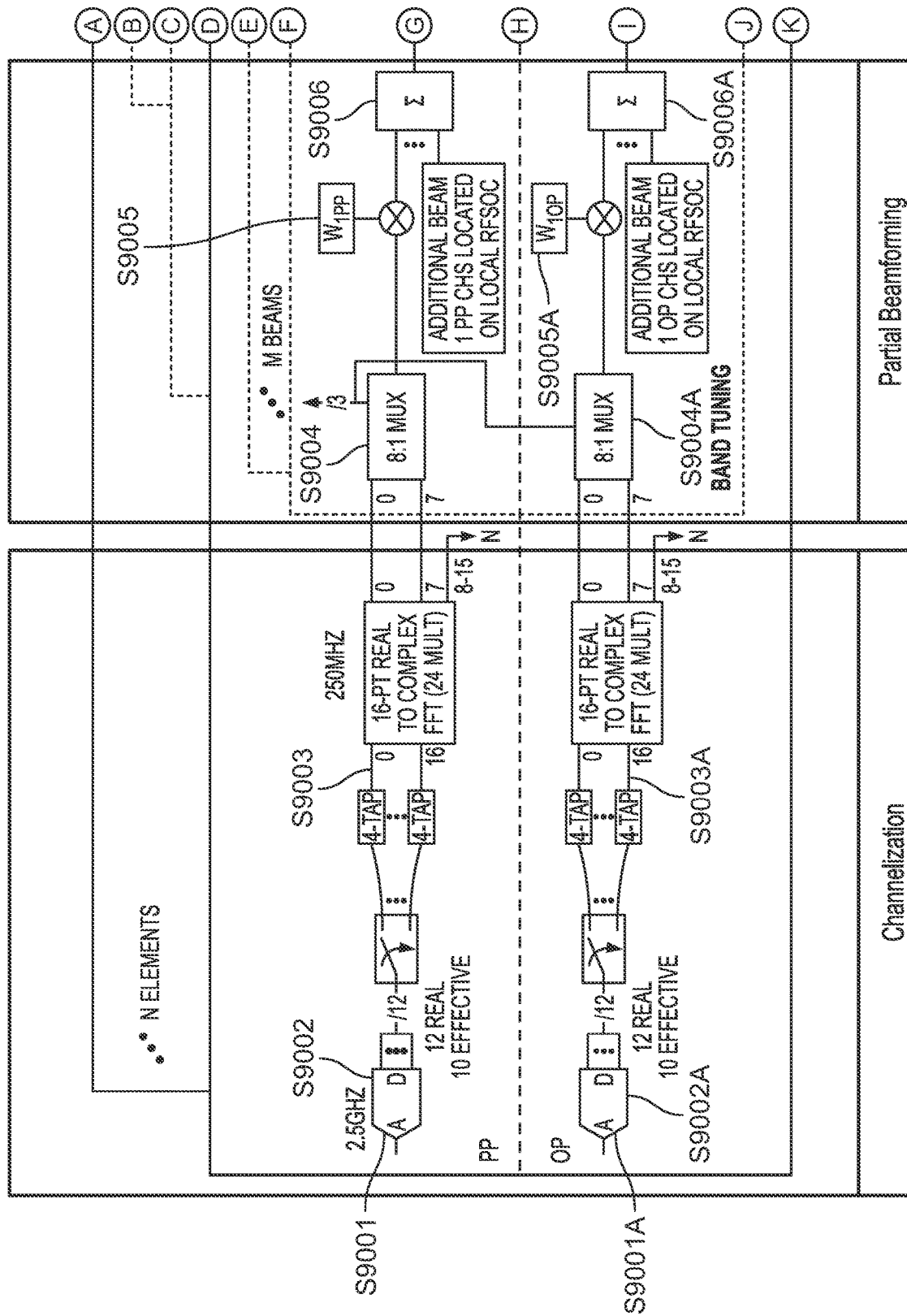
FIG. 8 is schematic diagram of a process flow of a system for a digitally beamformed phased array feed in accordance with embodiments of the present invention.
Figure 8:
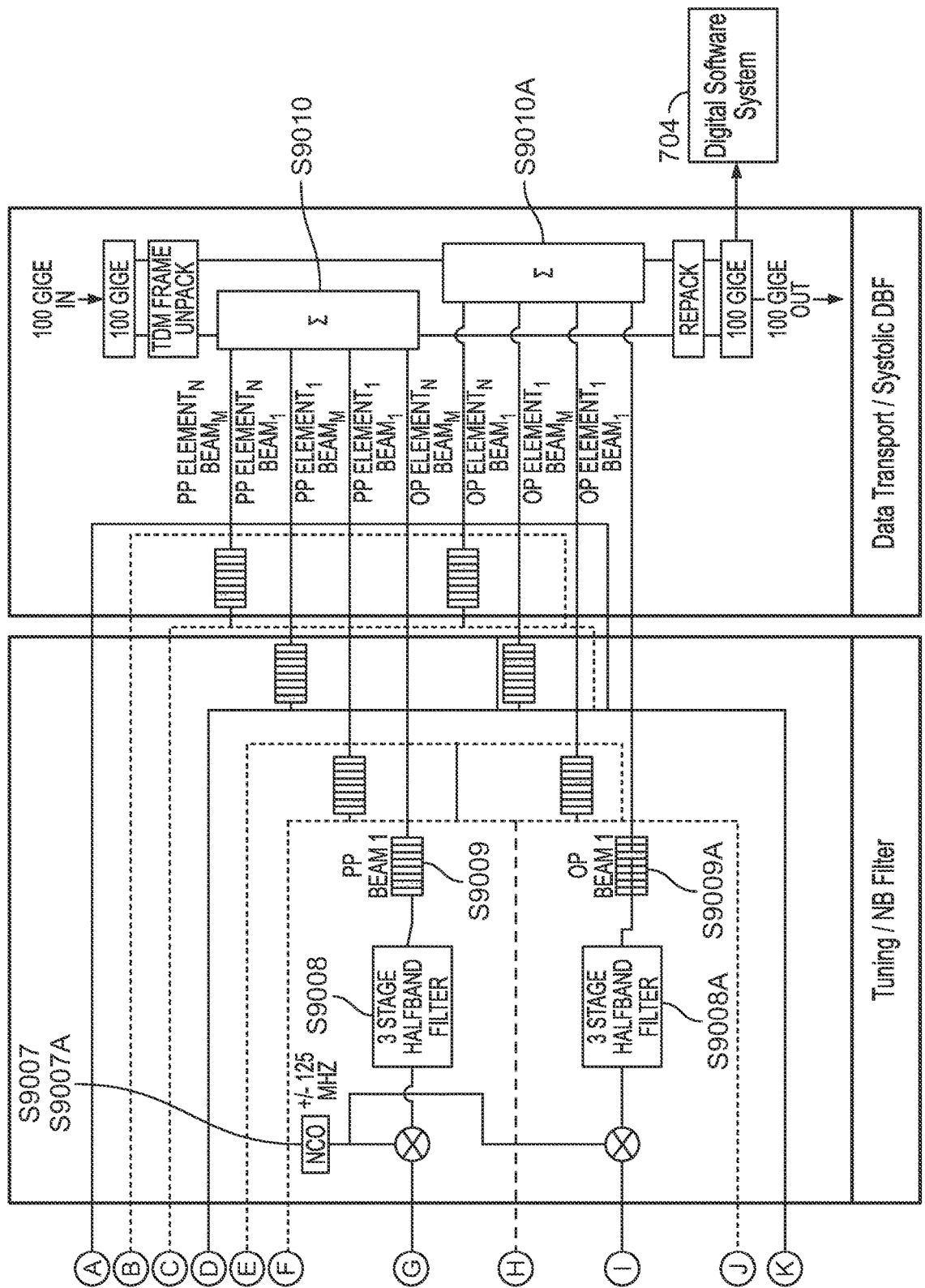
Figure 9:
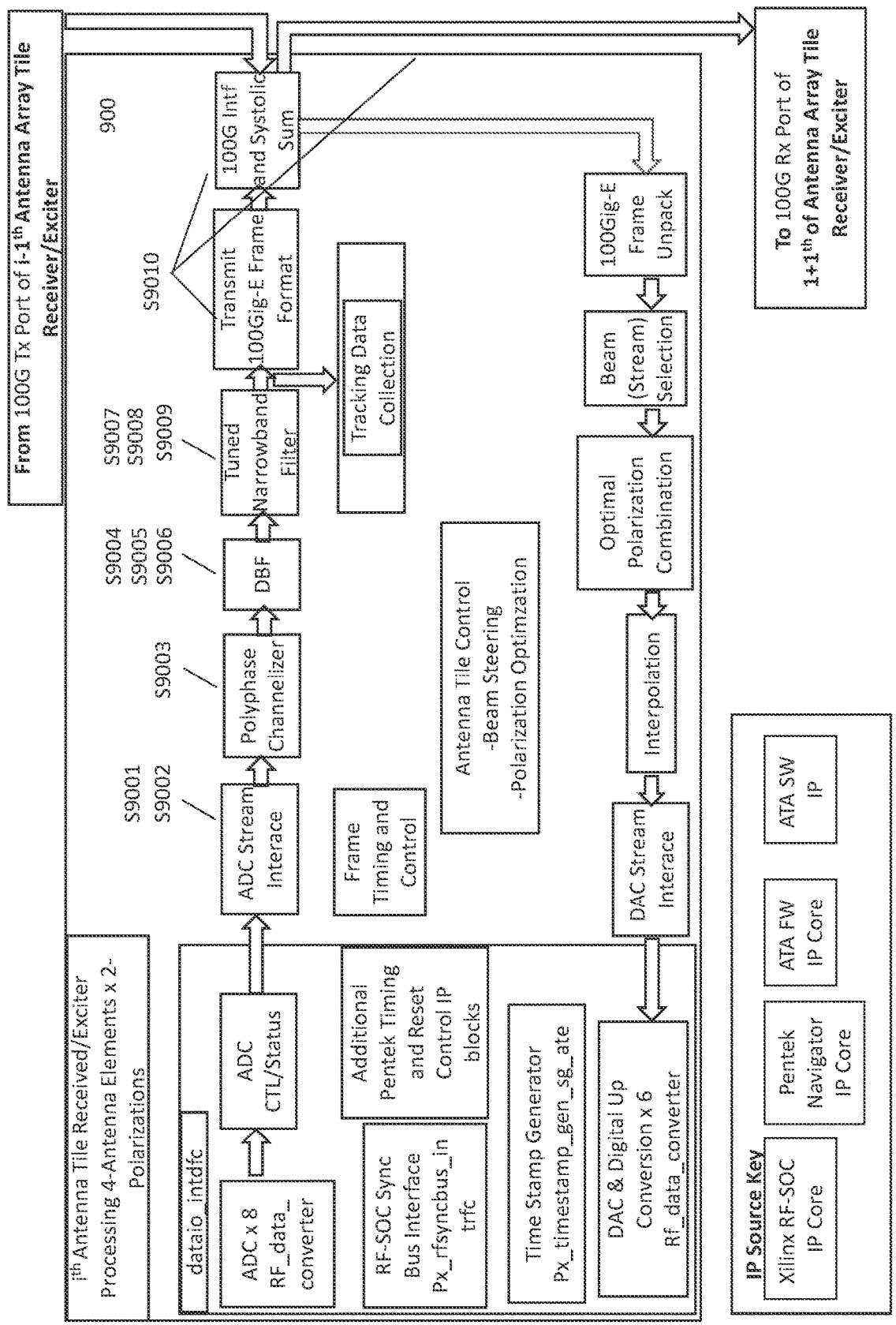
FIG. 9 is a schematic diagram of a process flow of a system for a digitally beamformed phased array feed in accordance with embodiments of the present invention.

FIG. 7 is a schematic diagram of a process flow of a multi-band software defined antenna array tile 110 in accordance with embodiments of the present invention. FIG. 8 is schematic diagram of a process flow of a system for a digitally beamformed phased array feed 310 in accordance with embodiments of the present invention. FIG. 9 is a schematic diagram of a process flow of a system for a digitally beamformed phased array feed 210 in accordance with embodiments of the present invention. FIGS. 24A-D are schematic diagrams for process flows of a system for a digitally beamformed phased array feed 210 in accordance with embodiments of the present invention. Referring to FIGS. 7, 8, 9, and 24A-D together, in embodiments, the method for digital beamforming may include, at step S2400 of FIG. 24A, receiving, by a first coupled dipole array antenna element 304-1 of a plurality coupled dipole array antenna elements 304 of a multi-band software defined digital antenna array tile 110, a plurality of respective modulated signals associated with a plurality of respective radio frequencies (see also step S7000 of FIG. 7). In embodiments, the method may further include, prior to the receiving step (a), the steps of: reflecting from a surface of a parabolic reflector 114 mounted on a support pedestal 112, the plurality of respective modulated signals and transmitting the reflected plurality of respective modulated signals through a radome 302 to the first coupled dipole array antenna element 304-1 of the plurality of coupled dipole array antenna elements 304. In embodiments, each coupled dipole array antenna element 304-$n$ of the plurality of coupled dipole array antenna elements 304 may include a respective principal polarization component 304-P oriented in a first direction and a respective orthogonal polarization component 304-O oriented in a second direction. In embodiments, the plurality of coupled dipole array antenna elements 304 may be tightly coupled relative to the wavelength of operation. In embodiments, the plurality of coupled dipole array antenna elements 304 may be spaced at less than half a wavelength.

In embodiments, at step 2402A of FIG. 24A, the method may include receiving, by a first principal polarization frequency converter 310-1P of a first pair of frequency converters 310-1 of a plurality of frequency converters 310 of the multi-band software defined digital antenna array tile 110, from a first principal polarization component 304-1P of the first coupled dipole array antenna element 304-1 of the plurality of coupled dipole array antenna elements 304 respective first modulated signals associated with the respective radio frequencies of the plurality of radio frequencies (see also step S7001 of FIG. 7). In embodiments, each pair of frequency converters 310-$n$ of the plurality of pairs of frequency converters 310 may be operatively connected to a respective coupled dipole array antenna element 304-$n$. In embodiments, each pair of frequency converters 310-$n$ of the plurality of pairs of frequency converters 310 may include a respective principal polarization converter 310-P corresponding to a respective principal polarization component 304-P and a respective orthogonal polarization converter 310-O corresponding to a respective orthogonal polarization component 304-O.

In embodiments, the method may further include receiving, by a second pair of frequency converters 310-2 of the multi-band software defined digital antenna array tile 110, from a second coupled dipole array antenna element 304-2 of the plurality of antenna elements 304, respective modulated signals associated with the respective radio frequencies of the plurality of radio frequencies. In embodiments, each one of the principal polarization frequency converter 310-2P and the orthogonal polarization frequency converter 310-2O of the second pair of frequency converters 310-2 may be operatively connected to a respective principal polarization component 304-2P and a respective orthogonal polarization component 304-2O of the second coupled dipole array antenna element 304-2 of the plurality of coupled dipole array antenna elements 304.

In embodiments, the plurality of pairs of frequency converters 310 may include thermoelectric coolers which may be configured to actively manage thermally the system noise temperature and increase the system gain over temperature. In embodiments, each respective principal polarization frequency converter 310-P and each orthogonal polarization frequency converter 310-O may include a thermoelectric cooler. In embodiments, the plurality of pairs of frequency converters may further include a plurality of spatially distributed high-power amplifiers so as to increase the effective isotropic radiated power.

In embodiments, at step 2404A of FIG. 24A, the method may include converting, by the first principal polarization frequency converter 310-1P of the first pair of frequency converters 310-1, the respective first modulated signals associated with the respective radio frequencies of the plurality of radio frequencies into respective second modulated signals having a first intermediate frequency (see also step S7002 of FIG. 7). In embodiments, the first intermediate frequency may be between 50 MHz and 1250. In embodiments, the radio frequencies may be between 900 MHz and 6000 MHz. In embodiments, the radio frequencies may be between 2000 MHz and 12000 MHz. In embodiments, the radio frequencies may be between 10000 MHz and 50000 MHz.

In embodiments, at step 2406A of FIG. 24A, the method may include receiving, by a first digital beamformer 306-1 of a plurality of digital beamformers 306 of the multi-band software defined digital antenna array tile 110 from the first principal polarization frequency converter 310-1P, the respective second modulated signals associated with the first intermediate frequency (see also step S9001 of FIGS. 8 and 9). In embodiments, the plurality of digital beamformers 306 may be operatively connected to the plurality of pairs of frequency converters 310. In embodiments, each digital beamformer 306-$n$ may be operatively connected to one of the respective principal polarization frequency converter 310-P and the respective orthogonal polarization frequency converter 310-O.

In embodiments, at step 2408A of FIG. 24A, the method may include converting, by the first digital beamformer 306-1, the respective second modulated signal from an analog signal to a digital data format (see also step S9002 of FIGS. 8 and 9). In embodiments, the method may further include converting, by the first digital beamformer 306-1, the respective modulated signal from an analog signal to a digital data format by performing First-Nyquist sampling.

Figure 24B:
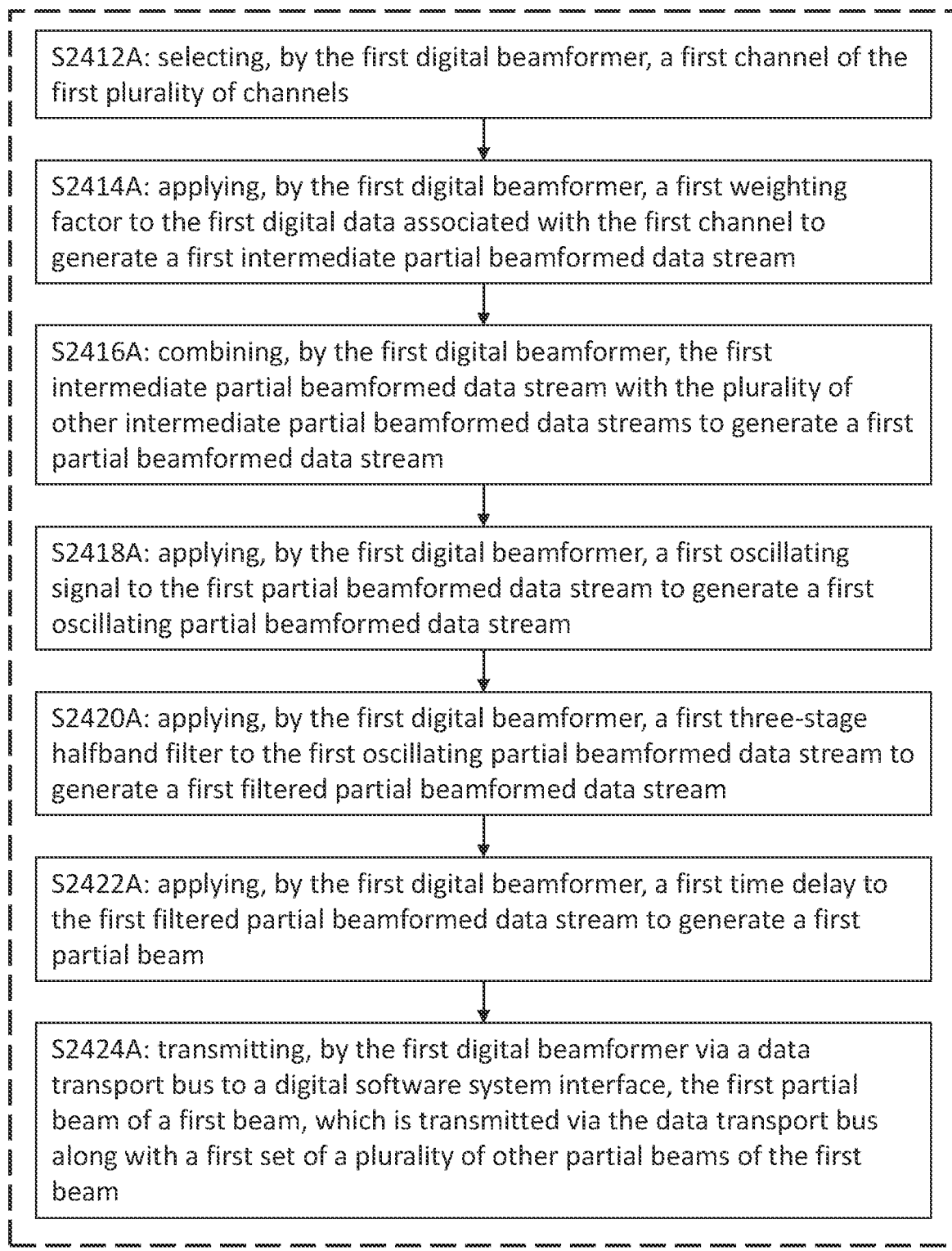
Figure 24D:
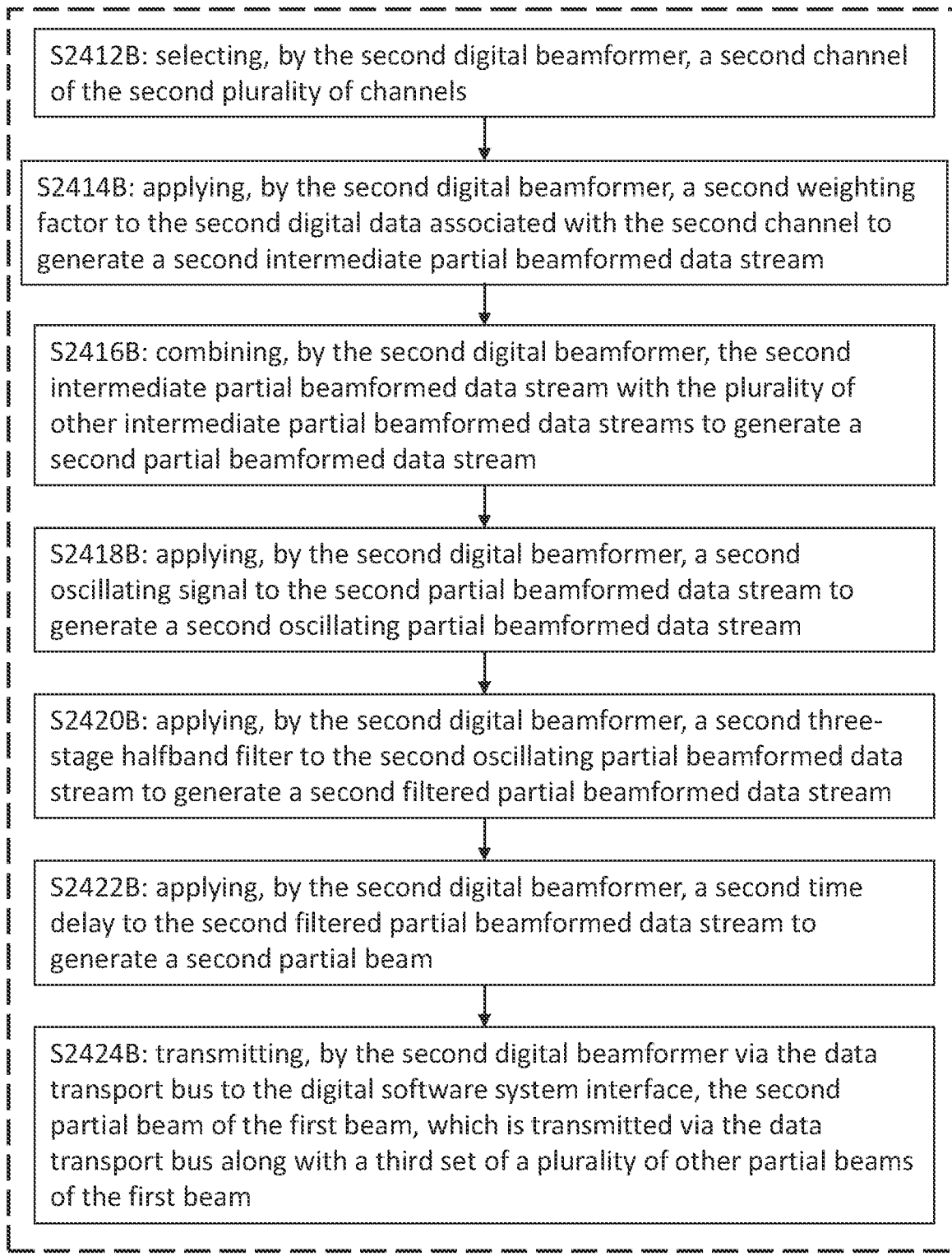

In embodiments, at step 2410A of FIG. 24A, the method may include generating, by the first digital beamformer 306-1, a first plurality of channels of first digital data by decimating the first digital data using a first polyphase channelizer and filtering using a first plurality of cascaded halfband filters (see also step S9003 of FIGS. 8 and 9). In embodiments, at step 2412A of FIG. 24B, the method may include selecting, by the first digital beamformer 306-1, a first channel of the first plurality of channels (see also step S9004 of FIGS. 8 and 9). In embodiments, the method may include selecting, by the first digital beamformer 306-1, the first channel of the first plurality of channels using a first multiplexer. In embodiments, the multiplexer selection may be provided by a system controller 412, discussed in further detail below with respect to FIG. 21. In embodiments, at step 2414A of FIG. 24B, the method may include applying, by the first digital beamformer 306-1, a first weighting factor to the first digital data associated with the first channel to generate a first intermediate partial beamformed data stream (see also step S9005 of FIGS. 8 and 9). In embodiments, at step 2416A of FIG. 24B, the method may further include combining, by the first digital beamformer 306-1, the first intermediate partial beamformed data stream with the plurality of other intermediate partial beamformed data streams to generate a first partial beamformed data stream (see also step S9006 of FIGS. 8 and 9). In embodiments, at step 2418A of FIG. 24B, the method may include applying, by the first digital beamformer 306-1, a first oscillating signal to the first partial beamformed data stream to generate a first oscillating partial beamformed data stream (see also step S9007 of FIGS. 8 and 9). In embodiments, the oscillating signal may be provided by the system controller 412, as discussed in further detail below with respect to FIG. 23. In embodiments, the method may include, at step 2420A of FIG. 24B, applying, by the first digital beamformer 306-1, a first three-stage halfband filter to the first oscillating partial beamformed data stream to generate a first filtered partial beamformed data stream (see also step S9008 of FIGS. 8 and 9). In embodiments, at step 2422A of FIG. 24B, the method may include applying, by the first digital beamformer 306-1, a first time delay to the first filtered partial beamformed data stream to generate a first partial beam (see also step S9009 of FIGS. 8 and 9). In embodiments, at step 2424A of FIG. 24B, the method may further include transmitting, by the first digital beamformer via a data transport bus 702 to a digital software system interface 704, the first partial beam of a first beam, which may be transmitted via the data transport bus 702 along with a first set of a plurality of other partial beams of the first beam (see also step S9010 of FIGS. 8 and 9). In embodiments, the method may further include transmitting, by the first digital beamformer 306-1 via the data transport bus 702 to the digital software system interface 704, the first partial beam of the first beam, which may be transmitted via the data transport bus 702 along with a second set of a plurality of other partial beams of a second beam.

In embodiments, at step S2402B of FIG. 24C, after the step of receiving the plurality of respective modulated signals associated with the plurality of respective radio frequencies, the method may further include receiving, by a first orthogonal polarization frequency converter 310-10 of the first pair of frequency converters 310-1 of the plurality of pairs of frequency converters 310 of the multi-band software defined antenna array tile 110, from a first orthogonal polarization component 304-10 of the first coupled dipole array antenna element 304-1 of the plurality of coupled dipole array antenna elements 304, respective third modulated signals associated with the respective radio frequencies of the plurality of respective radio frequencies (see also step S9001 of FIGS. 8 and 9). In embodiments, at step 2404B of FIG. 24C, the method may further include converting, by the first orthogonal polarization frequency converter 310-10 of the first pair of frequency converters 310-1, the respective third modulated signals associated with the respective radio frequencies of the plurality of frequencies into respective fourth modulated signals having the first intermediate frequency (see also step S9002 of FIGS. 8 and 9).

In embodiments, at step S2406B of FIG. 24C, the method may further include receiving, by a second digital beamformer 306-2 of a plurality of digital beamformers 306 of the multi-band software defined digital antenna array tile 110, from the first orthogonal polarization frequency converter 310-10 of the first pair of frequency converters 310-1, the respective fourth modulated signals associated with the first intermediate frequency (see also step S9001A of FIGS. 8 and 9). In embodiments, the plurality of digital beamformers 306 may be operatively connected to the plurality of pairs of frequency converters 310 and each digital beamformer 306-n may be operatively connected to one of a respective principal polarization frequency converter 310-P and a respective orthogonal polarization frequency converter 310-O.

In embodiments, at step S2408B of FIG. 24C, the method may include converting, by the second digital beamformer 306-2, the respective fourth modulated signal from an analog signal to a digital data format (see also step S9002A of FIGS. 8 and 9). In embodiments, the method may further include converting, by the second digital beamformer 306-2, the respective modulated signal from an analog signal to a digital data format by performing First-Nyquist sampling.

In embodiments, at step S2410B of FIG. 24C, the method may include generating, by the second digital beamformer 306-2, a second plurality of channels of second digital data by decimating the second digital data using a second polyphase channelizer and filtering using a second plurality of cascaded halfband filters (at step S9003A of FIGS. 8 and 9). In embodiments, at step S2412B of FIG. 24D, the method may include selecting, by the second digital beamformer 306-2, a second channel of the second plurality of channels (see also S9004A of FIGS. 8 and 9). In embodiments, the method may include selecting, by the second digital beamformer 306-2, the second channel of the second plurality of channels using a second multiplexer. In embodiments, the multiplexer selection may be provided by the system controller 412, as discussed in further detail below with respect to FIG. 21. In embodiments, the second channel selection may be the same as the first channel selection. In embodiments, at step S2414B of FIG. 24D, the method may include applying, by the second digital beamformer 306-2, a second weighting factor to the second digital data associated with the second channel to generate a second intermediate partial beamform data stream (see also step S9005A of FIGS. 8 and 9). In embodiments, at step S2416B of FIG. 24D, the method may further include combining, by the second digital beamformer 306-2, the second intermediate partial beamformed data stream with the plurality of other intermediate partial beamformed data streams to generate a second partial beamformed data stream (see also step S9006A of FIGS. 8 and 9). In embodiments, at step S2418B of FIG. 24D, the method may include applying, by the second digital beamformer 306-2, a second oscillating signal to the second partial beamformed data stream to generate a second oscillating partial beamformed data stream (see also step S9007A of FIGS. 8 and 9). In embodiments, the second oscillating signal may be provided by the system controller 412, as discussed in further detail below with respect to FIG. 23. In embodiments, the second oscillating signal may be the same as the first oscillating signal. In embodiments, the method may include, at step S2420B of FIG. 24D, applying, by the second digital beamformer 306-2, a second three-stage halfband filter to the second oscillating partial beamformed data stream to generate a second filtered partial beamformed data stream (see also step S9008A of FIGS. 8 and 9). In embodiments, at step S2422B of FIG. 24D, the method may include applying, by the second digital beamformer 306-2, a second time delay to the second filtered partial beamformed data stream to generate a second partial beam (see also step S9009A of FIGS. 8 and 9). In embodiments, at step S2424B of FIG. 24D, the method may further include transmitting, by the second digital beamformer via the data transport bus 702 to the digital software system interface 704, the second partial beam of the first beam, which may be transmitted via the data transport bus 702 along with a third set of a plurality of other partial beams of the first beam (see also step S9010A of FIGS. 8 and 9). In embodiments, the method may further include transmitting, by the second digital beamformer via the data transport bus 702 to the digital software system interface 704, the second partial beam of the second beam, which may be transmitted via the data transport bus 702 along with a fourth set of a plurality of other partial beams of the second beam.

In embodiments, each digital beamformer 306-*n* may have a transmit mode of operation. In embodiments, the method may further include receiving, by the first digital beamformer 306-1, the first partial beam of the first beam along with the first set of the plurality of other partial beams of the first beam from the digital software system interface 704 via the data transport bus 702. In embodiments, the method may further include receiving, by the first digital beamformer 306-1, the first partial beam of the first beam along with the second set of a plurality of other beams of the second beam from the digital software system interface 704 via the data transport bus 702. In embodiments, the method may further include applying, by the first digital beamformer 306-1, a third weighting factor to first transmit digital data associated with the first partial beam of the first beam of the plurality of beams. In embodiments, the method may further include transmitting, by the first digital beamformer 306-1, the first transmit digital data to a first digital to analog converter. In embodiments, the method may further include converting, by the first digital to analog converter of the first digital beamformer 306-1, the respective modulated signal from a digital signal to an analog signal having the first intermediate frequency. In embodiments, the method may further include converting, by the first digital to analog converter of the first digital beamformer 306-1, the respective modulated signal from a digital signal to an analog signal having the first intermediate frequency by performing First-Nyquist sampling.

In embodiments, each pair of frequency converters 310-*n* may have a transmit mode of operation. In embodiments, the method may further include receiving, by one of the respective principal polarization frequency converter 310-1P and the respective orthogonal polarization frequency converter 310-1O of the first pair of frequency converters 310-1, respective modulated signals associated with the first intermediate frequency from the first digital beamformer 306-1. In embodiments, the method may further include converting, by one of the respective principal polarization frequency converter 310-1P and the respective orthogonal polarization frequency converter 310-1O of the first pair of frequency converters 310-1, the respective modulated signals associated with the first intermediate frequency into respective modulated signals having a radio frequency. In embodiments, the method may further include transmitting, by one of the respective principal polarization frequency converter 310-1P and the respective orthogonal polarization frequency converter 310-1O of the first pair of frequency converters 310-1, respective modulated signals associated with the respective radio frequencies of the plurality of radio frequencies from the first pair of frequency converters 310-1 of the plurality of pairs of frequency converters 310 to the first coupled dipole array antenna element 304-1 of the plurality of coupled dipole array antenna elements 304.

In embodiments, the method may further include receiving, by a third digital beamformer 306-3, a third partial beam of a third beam along with a fifth set of a plurality of other partial beams of the third beam from the digital software system 704 interface via the data transport bus 702. In embodiments, the method may further include receiving, by the third digital beamformer 306-3, the third partial beam of the third beam along with a sixth set of a plurality of other beams of a fourth beam from the digital software system interface 704 via the data transport bus 702. In embodiments, the method may further include applying, by the third digital beamformer 306-3, a fourth weighting factor to second transmit digital data associated with the third partial beam of the third beam. In embodiments, the method may further include transmitting, by the third digital beamformer, the second transmit digital data to a second digital to analog converter. In embodiments, the method may further include converting, using the second digital to analog converter of the third digital beamformer 306-3, the respective modulated signal from a digital signal to an analog signal having a second intermediate frequency. In embodiments, the second intermediate frequency may be between 50 MHz and 1250 MHz. In embodiments, the second intermediate frequency may be same as the first intermediate frequency. In embodiments, the method may further include converting, using the second digital to analog converter of the third digital beamformer 306-3, the respective modulated signal from a digital signal to an analog signal having a second intermediate frequency by performing First-Nyquist sampling.

In embodiments, each pair of frequency converters 310-*n* may have a transmit mode of operation. In embodiments, the method may further include receiving, by one of the respective principal polarization frequency converter 310-2P and the respective orthogonal polarization frequency converter 310-2O of the second pair of frequency converters 310-2, respective modulated signals associated with the second intermediate frequency from the third digital beamformer 306-3 of the plurality of digital beamformers 306. In embodiments, the method may further include converting, by one of the respective principal polarization frequency converter 310-2P and the respective orthogonal polarization frequency converter 310-2O of the second pair of frequency converters 310-2, the respective modulated signals associated with the second intermediate frequency into respective modulated signals having a radio frequency. In embodiments, the method may further include transmitting, by one of the respective principal polarization frequency converter 310-2P and the respective orthogonal polarization frequency converter 310-2O of the second pair of frequency converters 310-2, respective modulated signals associated with the respective radio frequencies of the plurality of radio frequencies from the second pair of frequency converters 310-2 of the plurality of pairs of frequency converters 310 to a second coupled dipole antenna element 304-2 of the plurality of coupled dipole antenna elements 304.

In embodiments, each coupled dipole antenna array element 304-*n* may have a transmit mode of operation. In embodiments, the method may further include transmitting, by the second coupled dipole antenna array element 304-*n*, the plurality of respective modulated signals associated with the respective radio frequencies of the plurality of radio frequencies.

In embodiments, a respective intermediate frequency may be associated with a respective mission center radio frequency. Referring to FIG. 19, in embodiments, the process of obtaining the mission center radio frequency associated with a respective antenna coupled dipole array element 304 may begin with step S1902. At step S1902, in embodiments, the process may include receiving, from a digital software system interface 704 via the system controller 412 by memory of the digitally beamformed phased array system 210, for the respective coupled dipole array antenna element 304-*n* of the plurality of respective coupled dipole array antenna elements 304, the respective mission center radio frequency. At step S1904, in embodiments, the process of obtaining the mission center radio frequency may continue with step of storing, by memory operatively connected to the system controller 412, the respective mission center radio frequency for the respective coupled dipole antenna array element 304-*n*. At step S1906, in embodiments, the process of obtaining the mission center radio frequency may continue with the step of transporting, from the memory to the respective principal polarization frequency converter 310-P and the respective orthogonal polarization frequency converter 310-O, the respective mission center radio frequency for the respective coupled dipole array antenna element 304-*n*.

In embodiments, the respective intermediate frequency may be a mission intermediate frequency corresponding to the mission center radio frequency. Referring to FIG. 20, in embodiments, the process of obtaining the mission intermediate frequency associated with a respective antenna element 304 may begin with step S2002. At step S2002, in embodiments, the process may include receiving, from the digital software system interface 704 via the system controller 412 by memory of the digitally beamformed phased array system 210, for the respective coupled dipole array antenna element 304-*n* of the plurality of respective coupled dipole array antenna elements 304, the respective mission intermediate frequency. At step S2004, in embodiments, the process of obtaining the mission intermediate frequency may continue with step of storing, by memory operatively connected to the system controller 412, the respective mission intermediate frequency for the respective coupled dipole array antenna element 304-*n*. At step S1906, in embodiments, the process of obtaining the mission intermediate frequency may continue with the step of transporting, from the memory to the respective principal polarization frequency converter 310-P and the respective orthogonal polarization frequency converter 310-O, the respective mission intermediate frequency for the respective coupled dipole array antenna element 304-*n*.

Referring to FIG. 21, in embodiments, the process of selecting a respective channel may begin with step S2102. At step 2102, in embodiments, the process may include receiving, from the digital software system interface 704 via the system controller 412 by memory of the digitally beamformed phased array system 210, for the respective principal polarization component 304-P and the respective orthogonal polarization component 304-O of the respective coupled dipole array antenna element 304-*n* of the plurality of respective coupled dipole array antenna elements 304, the respective channel selection. At step S2104, in embodiments, the process of selecting the respective channel may continue with step of storing, by memory operatively connected to the system controller 412, the respective mission channel selection for the respective principal polarization component 310-P and the respective orthogonal polarization component 310-O of the respective coupled dipole antenna array element 304-*n*. At step S2106, in embodiments, the process of selecting the respective channel may continue with step of transporting, the respective channel selection for the respective principal polarization component 304-P and the respective orthogonal polarization component 304-O of the respective coupled dipole array antenna element 304-*n*. In embodiments, the respective channel selection may be associated with a respective tuner channel frequency. In embodiments, the respective tuner channel frequency may correspond to the respective mission intermediate frequency.

In embodiments, a respective weighting factor may be part of an array of weighting factors. Referring to FIG. 22, in embodiments, the process of obtaining the respective weighting factor may begin with step S2202. At step S2202, in embodiments, the process may include receiving, from the digital software system interface 704 via the system controller 412 by memory of the digitally beamformed array system 210, for the respective principal polarization component 304-P and the respective orthogonal polarization component 304-O of the respective coupled dipole array antenna element 304-*n* of the plurality of respective coupled dipole array antenna elements 304, the respective weighting factor. In embodiments, the array of weighting factors may be generated using a beam broadening tapering formula. In embodiments, the digital software system interface 704 may calculate and generate the array of weighting factors by using the formula:

$$w_{m,n} = \frac{A_{m,n}}{\left(A_{m,n}^{tap} * A_{m,n}^{cal}\right)} * e^{-j*\left(\theta_{m,n}^{steer} + \theta_{m,n}^{tap} + \theta_{m,n}^{cal}\right)}$$

wherein $w_{m,n}$ is a weighting factor associated with each position in the antenna array expressed as a horizontal position m and a vertical position n, $A_{m,n}$ is an amplitude weighting factor associated with each position in the antenna array expressed as a horizontal position m and a vertical position n, $A^{tap}$ P is a tapered amplitude weighting factor associated with each position in the antenna array expressed as a horizontal position m and a vertical position n, $A^{cal}$ is a calibration weighting factor associated with each position in the antenna array expressed as a horizontal position m and a vertical position n, $\theta_{m,n}$ is a phase factor associated with each position in the antenna array expressed as a horizontal position m and a vertical position n, $\theta^{steer}$ is a steering phase factor $\theta^{steer}$ associated with each position in the antenna array expressed as a horizontal position m and a vertical position n, $\theta^{tap}$ is a taper phase factor associated with each position in the antenna array expressed as a horizontal position m and a vertical position n and $\theta^{cal}$ is a calibration phase factor associated with each position in the antenna array expressed as a horizontal position m and a vertical position n.

In embodiments, each respective weighting factor may be generated using a beam broadening tapering formula. In embodiments, the digital software system interface 704 may calculate and generate the respective weighting factor by using the formula:

$$w(t) = \left(\frac{\cosh(\pi\alpha * \sqrt{1-4t^2})}{\cosh(\pi\alpha)}\right)^P$$

wherein w(t) is the respective weighting factor at a location t, where t is defined by an array associated with a location of the respective principal polarization component and the respective orthogonal polarization component of the respective coupled dipole array antenna element, a is the respective tuning parameter, and P is the respective power parameter. In embodiments, the respective tuning parameter and the respective power parameter may be applied by the beam broadening tapering formula in the two-dimensional x-y direction of the tapering plane in order to tune the respective digital data or respective transmit digital data to be specific to the desired frequency of operation (e.g., L-band, S-band, and/or C-band, to name a few) for the respective coupled dipole array antenna element 304-*n*. In embodiments, the respective tuning parameter and the respective power parameter may be applied by the beam broadening tapering formula in order to the tune the respective digital data based on the geometry of the parabolic surface that the digitally beamformed phased array system 210 may be applied to. In embodiments, by applying the beam broadening tapering formula above to generate the respective weighting factors, the system 210 may achieve maximum amplitude beam broadening for receiving and transmitting a plurality of modulated signals within any desired bandwidth simultaneously.

In embodiments, for example, FIGS. 15-16 depicts exemplary two-dimensional beam amplitude tapering plots illustrating beam amplitude tapering by a digitally beamformed phased array system 210 in accordance with embodiments of the present invention. In embodiments, by applying the beam broadening taper seen in FIG. 15B to the respective beam, the sum of the respective main lobe beam may be shaped so as to maximize the central lobe width of the main beam. Referring to FIG. 15A, by applying a uniform beam taper to the respective beam, the central lobe width of the main beam is drastically reduced compared to the beam broadening taper. Similarly, FIG. 16B depicts an exemplary three-dimensional beam amplitude tapering plot illustrating beam amplitude tapering by a digitally beamformed phased array system 210 in accordance with embodiments of the present invention. In embodiments, the uniform taper depicted by FIG. 16A shows a drastically reduced main central lobe width compared to the sum beam pattern created by the beam broadening taper shown in FIG. 16B. FIG. 17 depicts exemplary beam amplitude tapering plots illustrating beam amplitude tapering by a digitally beamformed phased array system with respect to the application of a uniform taper to a respective beam, and the application of a beam broadening taper to the respective beam. In embodiments, the beam broadening taper creates greater Fairfield directivity relative to the respective geometry of the respective parabolic surface than the uniform taper.

At step S2204, in embodiments, the process of obtaining the respective weighting factor may continue with the step of storing, by memory operatively connected to the system controller 412, the respective weighting factor for the respective principal polarization component 304-P and the respective orthogonal polarization component 304-O of the respective coupled dipole array antenna element 304-n of the plurality of respective coupled dipole array antenna elements 304. At step S2206, in embodiments, the process of obtaining the respective weighting factor may continue with the step of transporting, from the memory to the respective digital beamformer 306-n, the respective weighting factor for the respective principal polarization component 304-P and the respective orthogonal polarization component 304-O of the respective coupled dipole array antenna element 304-n of the plurality of respective coupled dipole array antenna elements 304. In embodiments, the digital software system interface 704 may receive specific mission parameters (e.g., the respective mission center radio frequency, the respective mission intermediate frequency, and/or the respective channel selection, to name a few) for the plurality of coupled dipole array antenna elements as an input. In embodiments, the digital software system interface 704 may use the specific mission parameters to generate the array of weighting factors.

In embodiments, a respective oscillating signal may be associated with a respective oscillating signal frequency. Referring to FIG. 23, in embodiments, the process of obtaining the respective oscillating signal frequency may begin with step S2302. At step S2302, in embodiments, the process of obtaining the respective oscillating signal frequency may include receiving, from the digital software system interface 704 via the system controller 412 by memory of the digitally beamformed phased array system 210, for the respective principal polarization component 304-P and the respective orthogonal polarization component 304-O of the respective coupled dipole array antenna element 304-n of the plurality of respective coupled dipole array antenna elements 304, the respective oscillating signal frequency. At step S2304, in embodiments, the process of obtaining the respective oscillating signal frequency may continue with the step of storing, by memory operatively connected to the system controller 412, the respective oscillating signal frequency for the respective principal polarization component 304-P and the respective orthogonal polarization component 304-O of the respective coupled dipole array element 304-n. At step S2306, in embodiments, the process of obtaining the respective oscillating signal frequency may continue with the step of transporting, from the memory to the respective digital beamformer 306-n, the respective oscillating signal frequency for the respective principal polarization component 304-P and the respective orthogonal polarization component 304-O of the respective coupled dipole array element 304-n. In embodiments, the respective oscillating signal frequency may correspond to the respective tuner channel frequency. In embodiments, a plurality of oscillating signal frequencies may be received for a plurality of principal polarization components and a plurality of orthogonal polarization components of the plurality of respective coupled dipole array antenna elements 304. In embodiments, the digital software system interface 704 may receive specific mission parameters (e.g., the respective mission center radio frequency, the respective mission intermediate frequency, and/or the respective channel selection, to name a few) for respective coupled dipole array antenna elements 304 as an input, the digital software system interface 704 may use the specific mission parameters to generate the respective oscillating signal frequency.

Figure 9A:
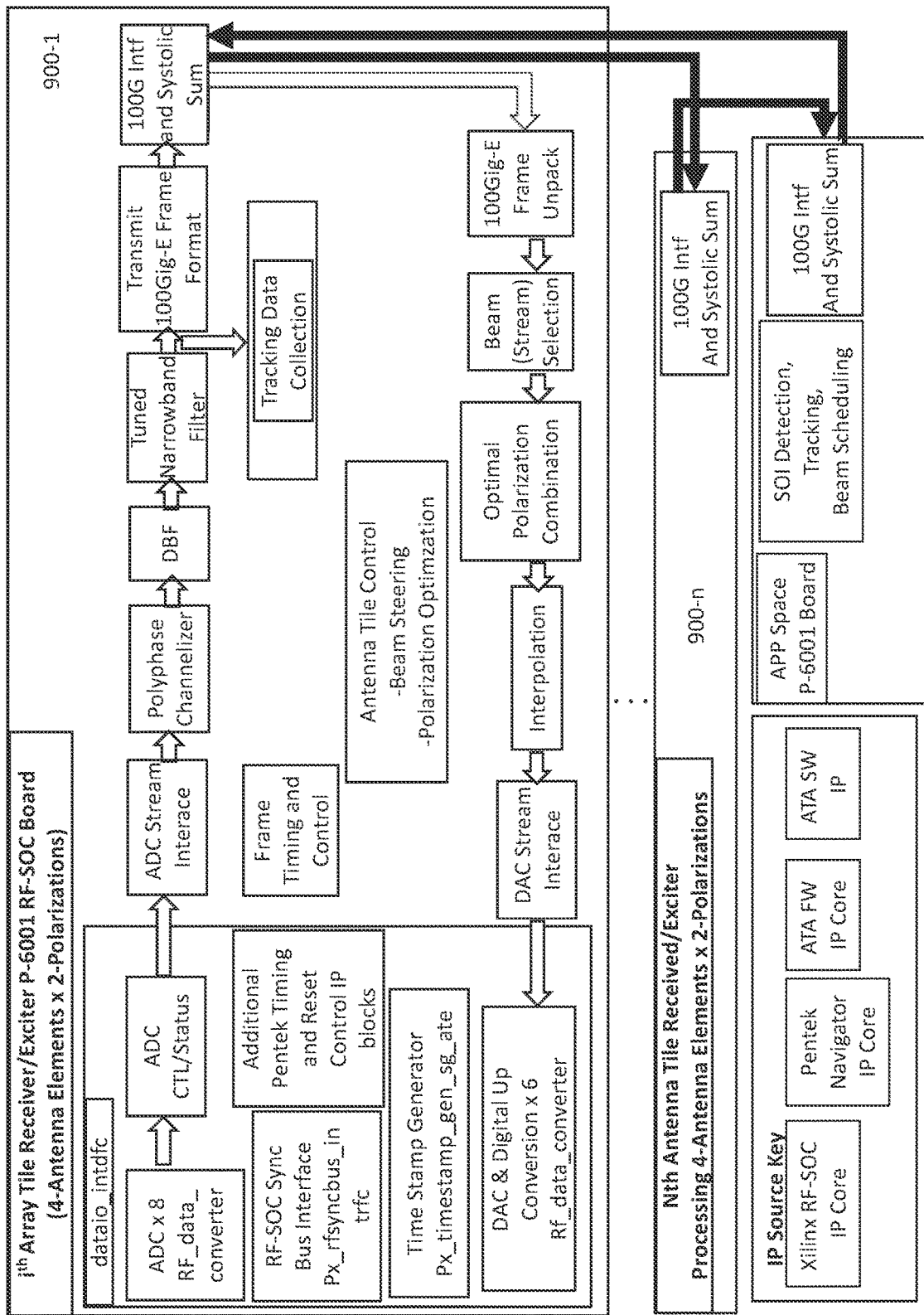
FIG. 9A is a schematic diagram of a process flow of a system for a digitally beamformed phased array feed in conjunction with a large form-factor phased array in accordance with embodiments of the present invention.

FIG. 9A is a schematic diagram of a process flow of a system for a digitally beamformed phased array feed in conjunction with a large form-factor phased array in accordance with embodiments of the present invention. In embodiments, the method for digital beamforming described with respect to FIGS. 7-9 may be repeated so as to combine a plurality of partial beams 900-n systolically in order to create a plurality of beams.

Figure 10:
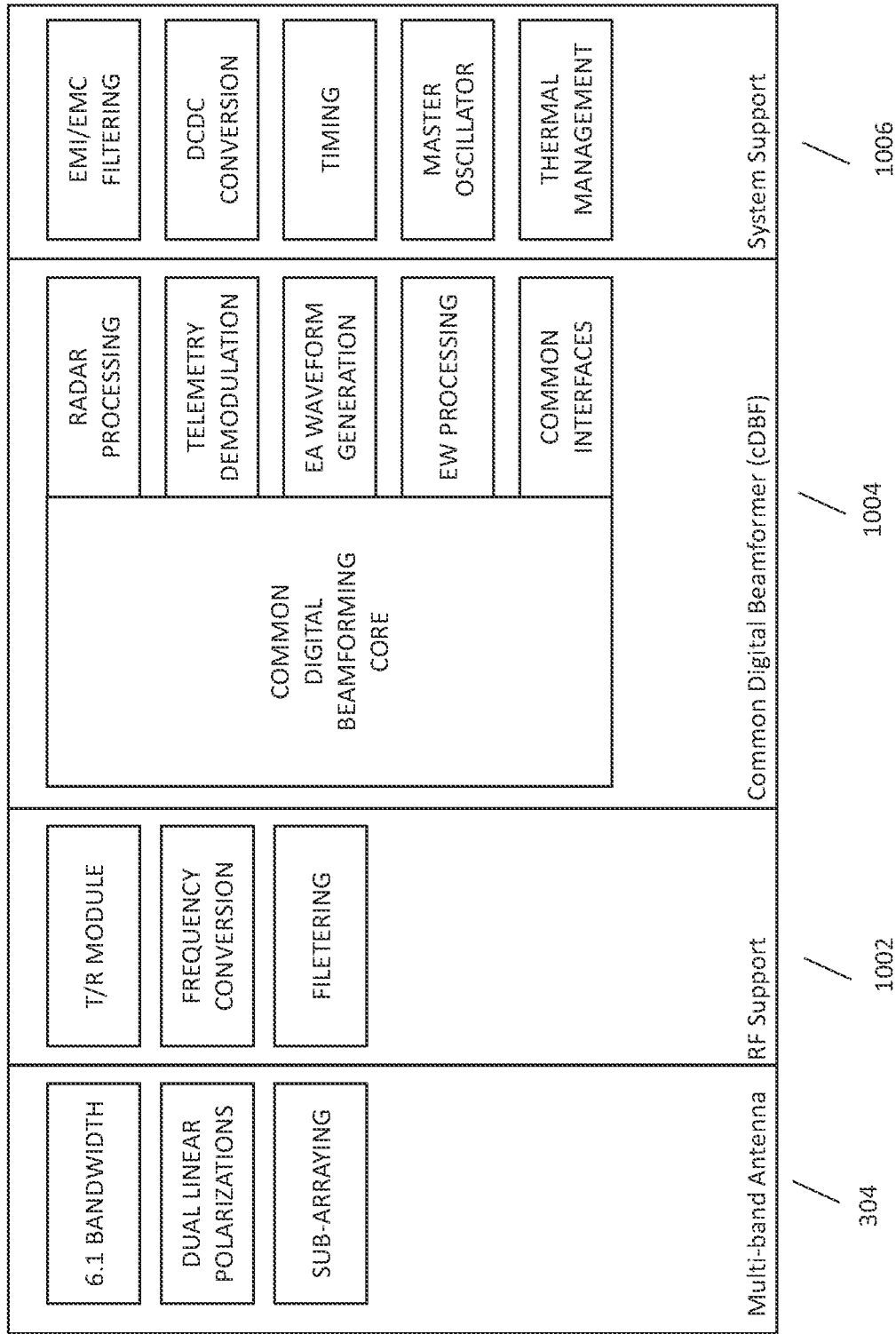
FIG. 10 is a schematic diagram of the system architecture of a multi-band software defined antenna array tile in accordance with embodiments of the present invention.

FIG. 10 is a schematic diagram of the system architecture of a multi-band software defined antenna array tile 110 in accordance with embodiments of the present invention. In embodiments, the components of the multi-band software defined antenna array tile 110 may include a plurality of coupled dipole array antenna elements 304, a plurality of radio frequency support subsystems 1002, and a plurality of common digital beamformers 1004, and a plurality of system support subsystems 1006. In embodiments, the plurality of coupled dipole array antenna elements 304 may have capabilities such as sub-arraying, dual linear polarizations, and a 6:1 bandwidth. In embodiments, the plurality of radio frequency support subsystems 1002 may include filtering, frequency conversion, and transmit and receive modules. In embodiments, the plurality of common digital beamformers 1004 may have capabilities such as radar processing, telemetry demodulation, Electronic Attack (EA) waveform modulation, and Electronic Warfare (EW) processing. In embodiments, the plurality of system support subsystems 1006 may have capabilities such as Electro-Magnetic Interference/Compatibility (EMI/EMC) filtering, DC-DC conversion, timing, master oscillation, and thermal management.

Figure 11:
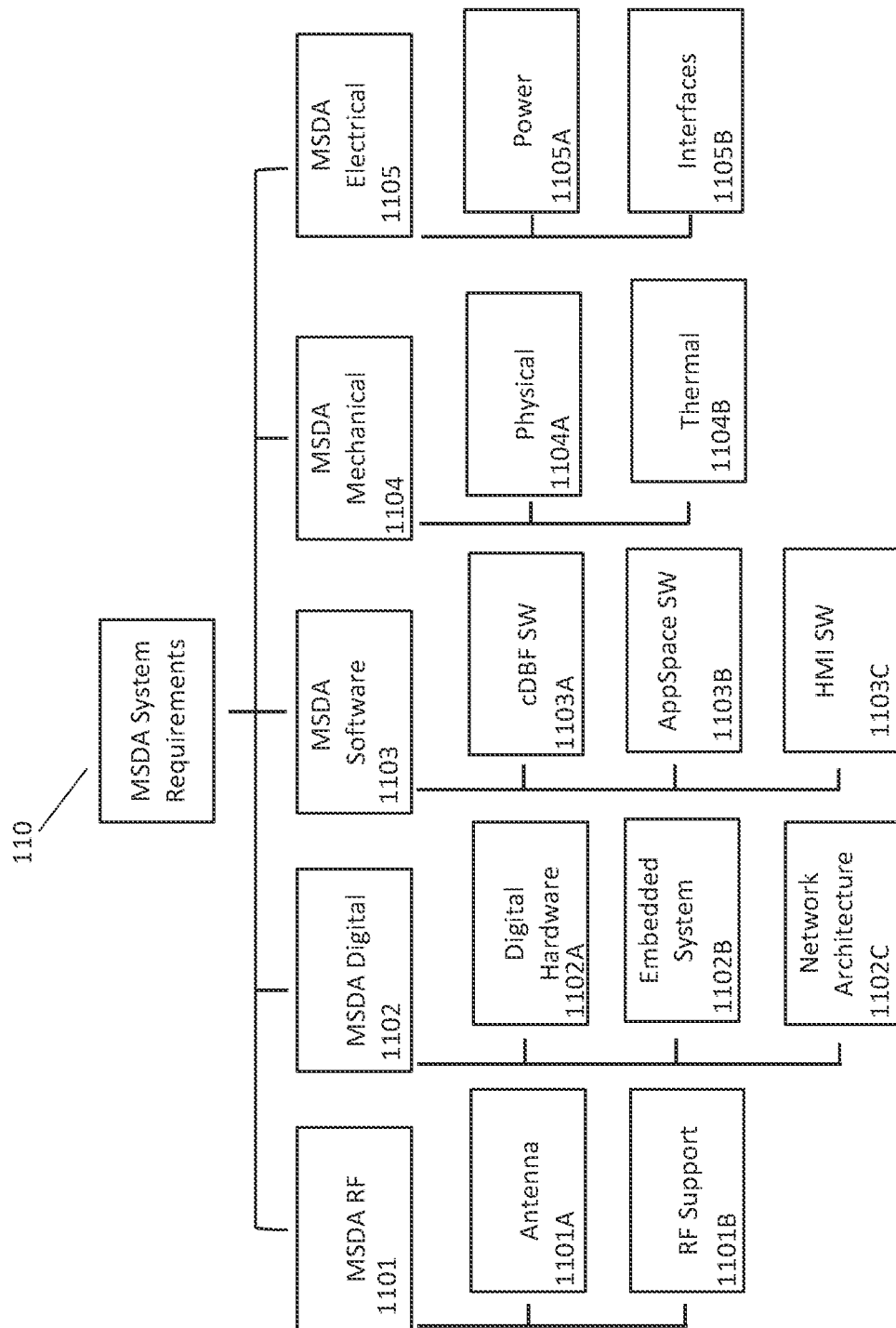
FIG. 11 is a schematic diagram of the system architecture of a system for a digitally beamformed phased array feed in accordance with embodiments of the present invention.

FIG. 11 is a schematic diagram of the system architecture of a multi-band software defined antenna array tile 110 in accordance with embodiments of the present invention. In embodiments, the multi-band software defined antenna array tile 110 may include an RF subsystem 1101, a digital subsystem 1102, a software system 1103, a mechanical subsystem 1104, and/or an electrical subsystem 1105. In embodiments, the RF subsystem 1101 may include a plurality of antenna elements 1101A and a plurality of RF support elements 1101B. In embodiments, the digital subsystem 1102 may include a plurality of digital hardware elements 1102A, a plurality of embedded system elements 1102B, and a plurality of network architecture elements 1102C. In embodiments, the software subsystem 1103 may include a plurality of common digital beamformer software elements 1103A, a plurality of AppSpace software elements 1103B, and a plurality of human machine interface (HMI) software elements 1103C. In embodiments, the mechanical subsystem 1104 may include a plurality of physical subsystem elements 1104A and a plurality of thermal subsystem elements 1104B. In embodiments, the electrical subsystem 1105 may include a plurality of power subsystem elements 1105A and a plurality of interface subsystem elements 1105B.

In embodiments, a digitally beamformed phased array system may include: (a) a radome configured to allow electromagnetic waves to propagate; (b) a multi-band software defined antenna array tile including: i. a plurality of coupled dipole array antenna elements, wherein each coupled dipole array antenna element includes a principal polarization component oriented in a first direction and an orthogonal polarization component oriented in a second direction, and is configured to receive and transmit a plurality of respective first modulated signals associated with a plurality of respective radio frequencies; ii. a plurality of pairs of frequency converters, each pair of frequency converters associated with a respective coupled dipole array antenna element and including a respective principal polarization converter corresponding to a respective principal polarization component and a respective orthogonal polarization converter corresponding to a respective orthogonal polarization component, and each principal polarization converter and each respective orthogonal polarization converter is configured to: (1) receive respective first modulated signals associated with the respective radio frequencies of the plurality of radio frequencies from the respective coupled dipole array antenna element; and (2) convert the respective first modulated signals associated with the respective radio frequencies of the plurality of radio frequencies into respective second modulated signals having a first intermediate frequency; iii. a plurality of digital beamformers operatively connected to the plurality of pairs of frequency converters wherein each digital beamformer is operatively connected to one of the respective principal polarization frequency converter and the respective orthogonal polarization frequency converter and each digital beamformer is configured to: (1) receive the respective second modulated signals associated with the first intermediate frequency; (2) convert the respective second modulated signal from an analog signal to a digital data format; (3) generate a plurality of channels of the digital data by decimation of the digital data using a polyphase channelizer and filter using a plurality of cascaded halfband filters; (4) select one of the plurality of channels; (5) apply a first weighting factor to the digital data associated with the selected one of the plurality of channels to generate a first intermediate partial beamformed data stream; (6) combine the first intermediate partial beamformed data stream with the plurality of other intermediate partial beamformed data streams to generate a first partial beamformed data stream; (7) apply an oscillating signal to the first partial beamformed data stream to generate a first oscillating partial beamformed data stream; (8) apply a three-stage halfband filter to the first oscillating partial beamformed data stream to generate a first filtered partial beamformed data stream; (9) apply a time delay to the first filtered partial beamformed data stream to generate a first partial beam; (10) transmit the first partial beam of a first beam along with a first set of a plurality of other partial beams of the first beam to a digital software system interface via a data transport bus; (c) a power and clock management subsystem configured to manage power and time of operation; (d) a thermal management subsystem configured to dissipate heat generated by the multi-band software defined antenna array tile; and (e) an enclosure assembly.

In embodiments, the plurality of coupled dipole array antenna elements are tightly coupled relative to the wavelength of operation.

In embodiments, the plurality of coupled dipole array antenna elements are spaced at less than half a wavelength.

In embodiments, the plurality of pairs of frequency converters further include thermoelectric coolers configured to actively manage thermally the system noise temperature and increase the system gain over temperature.

In embodiments, the plurality of pairs of frequency converters further include a plurality of spatially distributed high power amplifiers so as to increase the effective isotropic radiated power.

In embodiments, the first intermediate frequency is between 50 MHz and 1250 MHz.

In embodiments, the radio frequencies are between 900 MHz and 6000 MHz.

In embodiments, the radio frequencies are between 2000 MHz and 12000 MHz.

In embodiments, the radio frequencies are between 10000 MHZ and 50000 MHz.

In embodiments, each digital beamformer is configured to convert the respective second modulated signal from an analog signal to a digital data format by performing First-Nyquist sampling.

In embodiments, each digital beamformer is configured to select one of the plurality of channels using a multiplexer.

In embodiments, each digital beamformer is configured to transmit the first partial beam of the first beam along with a second set of a plurality of other partial beams of a second beam to the digital software system interface via the data transport bus.

In embodiments, each digital beamformer has a transmit mode of operation associated with converting a plurality of transmit digital data from a digital signal to an analog signal having a plurality of respective intermediate frequencies, and wherein each digital beamformer is further configured to: (11) receive the first partial beam of the first beam along with the first set of the plurality of other partial beams of the first beam from the digital software system interface via the data transport bus; (12) apply a second weighting factor to first transmit digital data associated with the first partial beam of the first beam of the plurality of beams; (13) transmit the first transmit digital data to a first digital to analog converter; and (14) convert, using the first digital to analog converter, the first transmit digital data from a digital signal to an analog signal having the first intermediate frequency.

In embodiments, each digital beamformer is further configured to receive the first partial beam of the first beam along with the second set of a plurality of other beams of the second beam from the digital software system interface via the data transport bus.

In embodiments, each digital beamformer is further configured to convert, using the first digital to analog converter, the first transmit digital data from a digital signal to an analog signal having the first intermediate frequency by performing First-Nyquist sampling.

In embodiments, each principal polarization converter and each respective orthogonal polarization converter have a transmit mode of operation associated with transmitting respective modulated signals associated with a plurality of radio frequencies, and wherein each principal polarization converter and its respective orthogonal polarization converter is further configured to: (3) receive respective third modulated signals associated with the first intermediate frequency from the respective digital beamformer of the plurality of digital beamformers; (4) convert the respective third modulated signals associated with the first intermediate frequency into respective fourth modulated signals having a radio frequency; and (5) transmit the respective fourth modulated signals associated with the respective radio frequencies of the plurality of radio frequencies from each principal polarization converter and each orthogonal polarization converter of the respective pair of frequency converters of the plurality of pairs of frequency converters to the respective coupled dipole array antenna element of the plurality of coupled dipole array antenna elements.

In embodiments, each digital beamformer has a transmit mode of operation associated with converting a plurality of transmit digital data from a digital signal to an analog signal having a plurality of respective intermediate frequencies, and wherein each digital beamformer is further configured to: (15) receive a third partial beam of a third beam along with a third set of a plurality of other partial beams of the third beam from the digital software system interface via the data transport bus; (16) apply a third weighting factor to second transmit digital data associated with the third partial beam of the third beam; (17) transmit the second transmit digital data to a second digital to analog converter; and (18) convert, using the second digital to analog converter, the second transmit digital data from a digital signal to an analog signal having a second intermediate frequency.

In embodiments, each digital beamformer is further configured to receive the third partial beam of the third beam along with a fourth set of a plurality of other beams of a fourth beam from the digital software system interface via the data transport bus.

In embodiments, the second intermediate frequency is between 50 MHz and 1250 MHz.

In embodiments, the second intermediate frequency is the same as the first intermediate frequency.

In embodiments, each digital beamformer is further configured to convert, using the second digital to analog converter, the second transmit digital data from a digital signal to an analog signal having a second intermediate frequency by performing First-Nyquist sampling.

In embodiments, each principal polarization converter and each respective orthogonal polarization converter have a transmit mode of operation associated with transmitting respective modulated signals associated with a plurality of radio frequencies, and wherein each principal polarization converter and its respective orthogonal polarization converter is further configured to: (6) receive respective fifth modulated signals associated with the second intermediate frequency from the respective digital beamformer of the plurality of digital beamformers; (7) convert the respective fifth modulated signals associated with the second intermediate frequency into respective sixth modulated signals having a radio frequency; and (8) transmit the respective sixth modulated signals associated with the respective radio frequencies of the plurality of radio frequencies from each principal polarization converter and each orthogonal polarization converter of the respective pair of frequency converters of the plurality of pairs of frequency converters to each principal polarization component and each orthogonal polarization component of the respective coupled dipole antenna element of the plurality of coupled dipole antenna elements.

In embodiments, each coupled dipole antenna array element has a transmit mode of operation associated with transmitting a plurality of respective radio frequencies, and wherein each principal polarization component and each orthogonal polarization component of the respective coupled dipole antenna array element is further configured to transmit the respective sixth modulated signals associated with the respective radio frequencies of the plurality of radio frequencies.

In embodiments, a respective intermediate frequency is associated with a respective mission center radio frequency.

In embodiments, the respective mission center radio frequency is obtained by the steps of: (a) receiving, from the digital software system interface via a system controller by memory of the digitally beamformed phased array system, for the respective coupled dipole array antenna element of the plurality of respective coupled dipole array antenna elements, the respective mission center radio frequency; (b) storing, by memory operatively connected to the system controller, the respective mission center radio frequency for the respective coupled dipole antenna array element; and (c) transporting, from the memory to the respective principal polarization frequency converter and the respective orthogonal polarization frequency converter, the respective mission center frequency for the respective coupled dipole array antenna element.

In embodiments, the respective intermediate frequency is a respective mission intermediate frequency corresponding to the respective mission center radio frequency and is obtained by the steps of: (a) receiving, from the digital software system interface via the system controller by memory of the digitally beamformed phased array system, for the respective coupled dipole array antenna element of the plurality of respective coupled dipole array antenna elements, the respective mission intermediate frequency; (b) storing, by memory operatively connected to the system controller, the respective mission intermediate frequency for the respective coupled dipole array antenna element; and (c) transporting, from the memory to the respective principal polarization frequency converter and the respective orthogonal polarization frequency converter, the respective mission intermediate frequency for the respective coupled dipole array antenna element.

In embodiments, a respective channel is selected by the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective channel selection; (b) storing, by memory operatively connected to the system controller, the respective channel selection for the respective principal polarization component and the respective orthogonal polarization component of the respective coupled dipole array antenna element; and (c) transporting, from the memory to the respective digital beamformer, the respective channel selection for the respective principal polarization component and the respective orthogonal polarization component of the respective coupled dipole array element.

In embodiments, the respective channel selection is associated with a respective tuner channel frequency.

In embodiments, the respective tuner channel frequency corresponds to the mission intermediate frequency.

In embodiments, a respective weighting factor is part of an array of weighting factors obtained by the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective weighting factor; (b) storing, by memory operatively connected to the system controller, the respective weighting factor for the respective principal polarization component and the respective orthogonal polarization component of the respective coupled dipole array antenna element of the plurality of respective coupled dipole array antenna elements; and (c) transporting, from the memory to the respective digital beamformer, the respective weighting factor for the respective principal polarization component and the respective orthogonal polarization component of the respective coupled dipole array antenna element of the plurality of respective coupled dipole array antenna elements.

In embodiments, the respective weighting factor is generated for the respective principal polarization component and the respective orthogonal polarization component of the respective coupled dipole array antenna element as a function of: i. a respective tuning parameter; ii. a respective power parameter; and iii. a respective location of the respective principal polarization component and the respective orthogonal polarization component of the respective coupled dipole array antenna element with respect to the center of the multi-band software defined antenna array tile.

In embodiments, the digital software system interface generates the array of weighting factors by using the formula:

$$w_{m,n} = \frac{A_{m,n}}{\left(A_{m,n}^{tap} * A_{m,n}^{cal}\right)} * e^{-j*\left(\theta_{m,n}^{steer}+\theta_{m,n}^{tap}+\theta_{m,n}^{cal}\right)}$$

wherein $w_{m,n}$ is a weighting factor associated with each position in the antenna array expressed as a horizontal position m and a vertical position n, $A_{m,n}$ is an amplitude weighting factor associated with each position in the antenna array expressed as a horizontal position m and a vertical position n, $A^{tap}$ is a tapered amplitude weighting factor associated with each position in the antenna array expressed as a horizontal position m and a vertical position n, $A^{cal}$ is a calibration weighting factor associated with each position in the antenna array expressed as a horizontal position m and a vertical position n, $\theta_{m,n}$ is a phase factor associated with each position in the antenna array expressed as a horizontal position m and a vertical position n, $\theta^{steer}$ is a steering phase factor associated with each position in the antenna array expressed as a horizontal position m and a vertical position n, $\theta^{tap}$ is a taper phase factor associated with each position in the antenna array expressed as a horizontal position m and a vertical position n, and $\theta^{cal}$ is a calibration phase factor associated with each position in the antenna array expressed as a horizontal position m and a vertical position n.

In embodiments, the digital software system interface generates the respective weighting factor by using the formula:

$$w(t) = \left(\frac{\cosh(\pi\alpha * \sqrt{1-4t^2})}{\cosh(\pi\alpha)}\right)^P$$

wherein w(t) is the respective weighting factor at a location t, where t is defined by an array associated with a location of the respective principal polarization component and the respective orthogonal polarization component of the respective coupled dipole array antenna element, a is the respective tuning parameter, and P is the respective power parameter.

In embodiments, the digital software system interface receives specific mission parameters for the plurality of coupled dipole array antenna elements as an input, and wherein the digital software system interface uses the specific mission parameters to generate the array of weighting factors.

In embodiments, the respective weighting factor is selected from the array of weighting factors.

In embodiments, a respective oscillating signal is associated with a respective oscillating signal frequency.

In embodiments, the respective oscillating signal frequency is obtained by performing the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective oscillating signal frequency; (b) storing, by memory operatively connected to the system controller, the respective oscillating signal frequency for the respective principal polarization component and the respective orthogonal polarization component of the respective coupled dipole array element; and (c) transporting, from the memory to the respective digital beamformer, the respective oscillating signal frequency for the respective principal polarization component and the respective orthogonal polarization component of the respective coupled dipole array element.

In embodiments, the respective oscillating signal frequency corresponds to the respective tuner channel frequency.

In embodiments, a plurality of oscillating signal frequencies may be received for a plurality of principal polarization components and a plurality of orthogonal polarization components of the plurality of respective coupled dipole array antenna elements.

In embodiments, the digital software system interface receives specific mission parameters for respective coupled dipole array antenna elements as an input, and wherein the digital software system interface uses the specific mission parameters to generate the respective oscillating signal frequency.

In embodiments, a large form factor phased array system may include a plurality of multi-band software defined antenna array tiles wherein each multi-band software defined antenna array tile includes: i. a plurality of coupled dipole array antenna elements, wherein each coupled dipole array antenna element includes a principal polarization component oriented in a first direction and an orthogonal polarization component oriented in a second direction, and is configured to receive and transmit a plurality of respective first modulated signals associated with a plurality of respective radio frequencies; ii. a plurality of pairs of frequency converters, each pair of frequency converters associated with a respective coupled dipole array antenna element and including a respective principal polarization converter corresponding to a respective principal polarization component and a respective orthogonal polarization converter corresponding to a respective orthogonal polarization component, and each principal polarization converter and each respective orthogonal polarization converter is configured to: (1) receive respective first modulated signals associated with the respective radio frequencies of the plurality of radio frequencies from the respective coupled dipole array antenna element; and (2) convert the respective first modulated signals associated with the respective radio frequencies of the plurality of radio frequencies into respective second modulated signals having a first intermediate frequency; iii. a plurality of digital beamformers operatively connected to the plurality of pairs of frequency converters wherein each digital beamformer is operatively connected to one of the respective principal polarization frequency converter and the respective orthogonal polarization frequency converter and each digital beamformer is configured to: (1) receive the respective second modulated signals associated with the first intermediate frequency; (2) convert the respective second modulated signal from an analog signal to a digital data format; (3) generate a plurality of channels of the digital data by decimation of the digital data using a polyphase channelizer and filter using a plurality of cascaded halfband filters; (4) select one of the plurality of channels; (5) apply a first weighting factor to the digital data associated with the selected one of the plurality of channels to generate a first intermediate partial beamformed data stream; (6) combine the first intermediate partial beamformed data stream with the plurality of other intermediate partial beamformed data streams to generate a first partial beamformed data stream; (7) apply an oscillating signal to the first partial beamformed data stream to generate a first oscillating partial beamformed data stream; (8) apply a three-stage halfband filter to the first oscillating partial beamformed data stream to generate a first filtered partial beamformed data stream; (9) apply a time delay to the first filtered partial beamformed data stream to generate a first partial beam; and (10) transmit the first partial beam of a first beam along with a first set of a plurality of other partial beams of the first beam to a digital software system interface via a data transport bus.

In embodiments, the plurality of coupled dipole array antenna elements are tightly coupled relative to the wavelength of operation.

In embodiments, the plurality of coupled dipole array antenna elements are spaced at less than half a wavelength.

In embodiments, the plurality of pairs of frequency converters further includes thermoelectric coolers configured to actively manage thermally the system noise temperature and increase the system gain over temperature.

In embodiments, the plurality of pairs of frequency converters further includes a plurality of spatially distributed high power amplifiers so as to increase the effective isotropic radiated power.

In embodiments, the first intermediate frequency is between 50 MHz and 1250 MHz.

In embodiments, the radio frequencies are between 900 MHz and 6000 MHz.

In embodiments, the radio frequencies are between 2000 MHz and 12000 MHz.

In embodiments, the radio frequencies are between 10000 MHZ and 50000 MHz.

In embodiments, each digital beamformer is configured to convert the respective second modulated signal from an analog signal to a digital data format by performing First-Nyquist sampling.

In embodiments, each digital beamformer is configured to select one of the plurality of channels using a multiplexer.

In embodiments, each digital beamformer is configured to transmit the first partial beam of the first beam along with a second set of a plurality of other partial beams of a second beam to the digital software system interface via the data transport bus.

In embodiments, each digital beamformer has a transmit mode of operation associated with converting a plurality of transmit digital data from a digital signal to an analog signal having a plurality of respective intermediate frequencies, and wherein each digital beamformer is further configured to: (11) receive the first partial beam of the first beam along with the first set of the plurality of other partial beams of the first beam from the digital software system interface via the data transport bus; (12) apply a second weighting factor to first transmit digital data associated with the first partial beam of the first beam of the plurality of beams; (13) transmit the first transmit digital data to a first digital to analog converter; and (14) convert, using the first digital to analog converter, the first transmit digital data from a digital signal to an analog signal having the first intermediate frequency.

In embodiments, each digital beamformer is further configured to receive the first partial beam of the first beam along with the second set of a plurality of other beams of the second beam from the digital software system interface via the data transport bus.

In embodiments, each digital beamformer is further configured to convert, using the first digital to analog converter, the first transmit digital data from a digital signal to an analog signal having the first intermediate frequency by performing First-Nyquist sampling.

In embodiments, each principal polarization converter and each respective orthogonal polarization converter have a transmit mode of operation associated with transmitting respective modulated signals associated with a plurality of radio frequencies, and wherein each principal polarization converter and its respective orthogonal polarization converter is further configured to: (3) receive respective third modulated signals associated with the first intermediate frequency from the respective digital beamformer of the plurality of digital beamformers; (4) convert the respective third modulated signals associated with the first intermediate frequency into respective fourth modulated signals having a radio frequency; and (5) transmit the respective fourth modulated signals associated with the respective radio frequencies of the plurality of radio frequencies from each principal polarization converter and each orthogonal polarization converter of the respective pair of frequency converters of the plurality of pairs of frequency converters to the respective coupled dipole array antenna element of the plurality of coupled dipole array antenna elements.

In embodiments, each digital beamformer has a transmit mode of operation associated with converting a plurality of transmit digital data from a digital signal to an analog signal having a plurality of respective intermediate frequencies, and wherein each digital beamformer is further configured to: (15) receive a third partial beam of a third beam along with a third set of a plurality of other partial beams of the third beam from the digital software system interface via the data transport bus; (16) apply a third weighting factor to second transmit digital data associated with the third partial beam of the third beam; (17) transmit the second transmit digital data to a second digital to analog converter; and (18) convert, using the second digital to analog converter, the second transmit digital data from a digital signal to an analog signal having a second intermediate frequency.

In embodiments, each digital beamformer is further configured to receive the third partial beam of the third beam along with a fourth set of a plurality of other beams of a fourth beam from the digital software system interface via the data transport bus.

In embodiments, the second intermediate frequency is between 50 MHz and 1250 MHz.

In embodiments, the second intermediate frequency is the same as the first intermediate frequency.

In embodiments, each digital beamformer is further configured to convert, using the second digital to analog converter, the second transmit digital data from a digital signal to an analog signal having a second intermediate frequency by performing First-Nyquist sampling.

In embodiments, each principal polarization converter and each respective orthogonal polarization converter have a transmit mode of operation associated with transmitting respective modulated signals associated with a plurality of radio frequencies, and wherein each principal polarization converter and its respective orthogonal polarization converter is further configured to: (6) receive respective fifth modulated signals associated with the second intermediate frequency from the respective digital beamformer of the plurality of digital beamformers; (7) convert the respective fifth modulated signals associated with the second intermediate frequency into respective sixth modulated signals having a radio frequency; and (8) transmit the respective sixth modulated signals associated with the respective radio frequencies of the plurality of radio frequencies from each principal polarization converter and each orthogonal polarization converter of the respective pair of frequency converters of the plurality of pairs of frequency converters to each principal polarization component and each orthogonal polarization component of the respective coupled dipole antenna element of the plurality of coupled dipole antenna elements.

In embodiments, each coupled dipole antenna array element has a transmit mode of operation associated with transmitting a plurality of respective radio frequencies, and wherein each principal polarization component and each orthogonal polarization component of the respective coupled dipole antenna array element is further configured to transmit the respective sixth modulated signals associated with the respective radio frequencies of the plurality of radio frequencies.

In embodiments, a respective intermediate frequency is associated with a respective mission center radio frequency.

In embodiments, the respective mission center radio frequency is obtained by the steps of: (a) receiving, from the digital software system interface via a system controller by memory of the digitally beamformed phased array system, for the respective coupled dipole array antenna element of the plurality of respective coupled dipole array antenna elements, the respective mission center radio frequency; (b) storing, by memory operatively connected to the system controller, the respective mission center radio frequency for the respective coupled dipole antenna array element; and (c) transporting, from the memory to the respective principal polarization frequency converter and the respective orthogonal polarization frequency converter, the respective mission center frequency for the respective coupled dipole array antenna element.

In embodiments, the respective intermediate frequency is a respective mission intermediate frequency corresponding to the respective mission center radio frequency and is obtained by the steps of: (a) receiving, from the digital software system interface via the system controller by memory of the digitally beamformed phased array system, for the respective coupled dipole array antenna element of the plurality of respective coupled dipole array antenna elements, the respective mission intermediate frequency; (b) storing, by memory operatively connected to the system controller, the respective mission intermediate frequency for the respective coupled dipole array antenna element; and (c) transporting, from the memory to the respective principal polarization frequency converter and the respective orthogonal polarization frequency converter, the respective mission intermediate frequency for the respective coupled dipole array antenna element.

In embodiments, a respective channel is selected by the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective channel selection; (b) storing, by memory operatively connected to the system controller, the respective channel selection for the respective principal polarization component and the respective orthogonal polarization component of the respective coupled dipole array antenna element; and (c) transporting, from the memory to the respective digital beamformer, the respective channel selection for the respective principal polarization component and the respective orthogonal polarization component of the respective coupled dipole array element.

In embodiments, the respective channel selection is associated with a respective tuner channel frequency.

In embodiments, the respective tuner channel frequency corresponds to the mission intermediate frequency.

In embodiments, a respective weighting factor is part of an array of weighting factors obtained by the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective weighting factor; (b) storing, by memory operatively connected to the system controller, the respective weighting factor for the respective principal polarization component and the respective orthogonal polarization component of the respective coupled dipole array antenna element of the plurality of respective coupled dipole array antenna elements; and (c) transporting, from the memory to the respective digital beamformer, the respective weighting factor for the respective principal polarization component and the respective orthogonal polarization component of the respective coupled dipole array antenna element of the plurality of respective coupled dipole array antenna elements.

In embodiments, the respective weighting factor is generated for the respective principal polarization component and the respective orthogonal polarization component of the respective coupled dipole array antenna element as a function of: i. a respective tuning parameter; ii. a respective power parameter; and iii. a respective location of the respective principal polarization component and the respective orthogonal polarization component of the respective coupled dipole array antenna element with respect to the center of the multi-band software defined antenna array tile.

In embodiments, the digital software system interface generates the array of weighting factors by using the formula:

$$w_{m,n} = \overline{\left(A_{m,n}^{tap} * A_{m,n}^{cal}\right)} * e^{-j*\overline{\left(\theta_{m,n}^{steer} + \theta_{m,n}^{tap} + \theta_{m,n}^{cal}\right)}}$$

wherein $w_{m,n}$ is a weighting factor associated with each position in the antenna array expressed as a horizontal position m and a vertical position n, $A_{m,n}$ is an amplitude weighting factor associated with each position in the antenna array expressed as a horizontal position m and a vertical position n, $A^{tap}$ is a tapered amplitude weighting factor associated with each position in the antenna array expressed as a horizontal position m and a vertical position n, $A^{cal}$ is a calibration weighting factor associated with each position in the antenna array expressed as a horizontal position m and a vertical position n, $\theta_{m,n}$ is a phase factor associated with each position in the antenna array expressed as a horizontal position m and a vertical position n, $\theta^{steer}$ is a steering phase factor associated with each position in the antenna array expressed as a horizontal position m and a vertical position n, $\theta^{tap}$ is a taper phase factor associated with each position in the antenna array expressed as a horizontal position m and a vertical position n, and $\theta^{cal}$ is a calibration phase factor associated with each position in the antenna array expressed as a horizontal position m and a vertical position n.

In embodiments, the digital software system interface generates the respective weighting factor by using the formula:

$$w(t) = \left(\frac{\cosh(\pi\alpha * \sqrt{1-4t^2})}{\cosh(\pi\alpha)}\right)^P$$

wherein w(t) is the respective weighting factor at a location t, where t is defined by an array associated with a location of the respective principal polarization component and the respective orthogonal polarization component of the respective coupled dipole array antenna element, a is the respective tuning parameter, and P is the respective power parameter.

In embodiments, the digital software system interface receives specific mission parameters for the plurality of coupled dipole array antenna elements as an input, and wherein the digital software system interface uses the specific mission parameters to generate the array of weighting factors.

In embodiments, the respective weighting factor is selected from the array of weighting factors.

In embodiments, a respective oscillating signal is associated with a respective oscillating signal frequency.

In embodiments, the respective oscillating signal frequency is obtained by performing the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective oscillating signal frequency; (b) storing, by memory operatively connected to the system controller, the respective oscillating signal frequency for the respective principal polarization component and the respective orthogonal polarization component of the respective coupled dipole array element; and (c) transporting, from the memory to the respective digital beamformer, the respective oscillating signal frequency for the respective principal polarization component and the respective orthogonal polarization component of the respective coupled dipole array element.

In embodiments, the respective oscillating signal frequency corresponds to the respective tuner channel frequency.

In embodiments, a plurality of oscillating signal frequencies may be received for a plurality of principal polarization components and a plurality of orthogonal polarization components of the plurality of respective coupled dipole array antenna elements.

In embodiments, the digital software system interface receives specific mission parameters for respective coupled dipole array antenna elements as an input, and wherein the digital software system interface uses the specific mission parameters to generate the respective oscillating signal frequency.

In embodiments, a wide area scanning parabolic apparatus may include: (a) a parabolic reflector mounted on a support pedestal; and (b) a digitally beamformed phased array including: i. a radome configured to allow electromagnetic waves to propagate; ii. a multi-band software defined antenna array tile including: (1) a plurality of coupled dipole array antenna elements, wherein each coupled dipole array antenna element includes a principal polarization component oriented in a first direction and an orthogonal polarization component oriented in a second direction, and is configured to receive and transmit a plurality of respective first modulated signals associated with a plurality of respective radio frequencies; (2) a plurality of pairs of frequency converters, each pair of frequency converters associated with a respective coupled dipole array antenna element and including a respective principal polarization converter corresponding to a respective principal polarization component and a respective orthogonal polarization converter corresponding to a respective orthogonal polarization component, and each principal polarization converter and each respective orthogonal polarization converter is configured to: a. receive respective first modulated signals associated with the respective radio frequencies of the plurality of radio frequencies from the respective coupled dipole array antenna element; and b. convert the respective first modulated signals associated with the respective radio frequencies of the plurality of radio frequencies into respective second modulated signals having a first intermediate frequency; (3) a plurality of digital beamformers operatively connected to the plurality of pairs of frequency converters wherein each digital beamformer is operatively connected to one of the respective principal polarization frequency converter and the respective orthogonal polarization frequency converter and each digital beamformer is configured to: a. receive the respective second modulated signals associated with the first intermediate frequency; b. convert the respective second modulated signal from an analog signal to a digital data format; c. generate a plurality of channels of the digital data by decimation of the digital data using a polyphase channelizer and filter using a plurality of cascaded halfband filters; d. select one of the plurality of channels; e. apply a first weighting factor to the digital data associated with the selected one of the plurality of channels to generate a first intermediate partial beamformed data stream; f. combine the first intermediate partial beamformed data stream with the plurality of other intermediate partial beamformed data streams to generate a first partial beamformed data stream; g. apply an oscillating signal to the first partial beamformed data stream to generate a first oscillating partial beamformed data stream; h. apply a three-stage halfband filter to the first oscillating partial beamformed data stream to generate a first filtered partial beamformed data stream; i. apply a time delay to the first filtered partial beamformed data stream to generate a first partial beam; j. transmit the first partial beam of a first beam along with a first set of a plurality of other partial beams of the first beam to a digital software system interface via a data transport bus; iii. a power and clock management subsystem configured to manage power and time of operation; iv. a thermal management subsystem configured to dissipate heat generated by the multi-band software defined antenna array tile; and v. an enclosure assembly.

In embodiments, In embodiments, the plurality of coupled dipole array antenna elements are tightly coupled relative to the wavelength of operation.

In embodiments, the plurality of coupled dipole array antenna elements are spaced at less than half a wavelength.

In embodiments, the plurality of pairs of frequency converters further includes thermoelectric coolers configured to actively manage thermally the system noise temperature and increase the system gain over temperature.

In embodiments, the plurality of pairs of frequency converters further includes a plurality of spatially distributed high power amplifiers so as to increase the effective isotropic radiated power.

In embodiments, the first intermediate frequency is between 50 MHz and 1250 MHz.

In embodiments, the radio frequencies are between 900 MHz and 6000 MHz.

In embodiments, the radio frequencies are between 2000 MHz and 12000 MHz.

In embodiments, the radio frequencies are between 10000 MHZ and 50000 MHz.

In embodiments, each digital beamformer is configured to convert the respective second modulated signal from an analog signal to a digital data format by performing First-Nyquist sampling.

In embodiments, each digital beamformer is configured to select one of the plurality of channels using a multiplexer.

In embodiments, each digital beamformer is configured to transmit the first partial beam of the first beam along with a second set of a plurality of other partial beams of a second beam to the digital software system interface via the data transport bus.

In embodiments, each digital beamformer has a transmit mode of operation associated with converting a plurality of transmit digital data from a digital signal to an analog signal having a plurality of respective intermediate frequencies, and wherein each digital beamformer is further configured to: (11) receive the first partial beam of the first beam along with the first set of the plurality of other partial beams of the first beam from the digital software system interface via the data transport bus; (12) apply a second weighting factor to first transmit digital data associated with the first partial beam of the first beam of the plurality of beams; (13) transmit the first transmit digital data to a first digital to analog converter; and (14) convert, using the first digital to analog converter, the first transmit digital data from a digital signal to an analog signal having the first intermediate frequency.

In embodiments, each digital beamformer is further configured to receive the first partial beam of the first beam along with the second set of a plurality of other beams of the second beam from the digital software system interface via the data transport bus.

In embodiments, each digital beamformer is further configured to convert, using the first digital to analog converter, the first transmit digital data from a digital signal to an analog signal having the first intermediate frequency by performing First-Nyquist sampling.

In embodiments, each principal polarization converter and each respective orthogonal polarization converter have a transmit mode of operation associated with transmitting respective modulated signals associated with a plurality of radio frequencies, and wherein each principal polarization converter and its respective orthogonal polarization converter is further configured to: (3) receive respective third modulated signals associated with the first intermediate frequency from the respective digital beamformer of the plurality of digital beamformers; (4) convert the respective third modulated signals associated with the first intermediate frequency into respective fourth modulated signals having a radio frequency; and (5) transmit the respective fourth modulated signals associated with the respective radio frequencies of the plurality of radio frequencies from each principal polarization converter and each orthogonal polarization converter of the respective pair of frequency converters of the plurality of pairs of frequency converters to the respective coupled dipole array antenna element of the plurality of coupled dipole array antenna elements.

In embodiments, each digital beamformer has a transmit mode of operation associated with converting a plurality of transmit digital data from a digital signal to an analog signal having a plurality of respective intermediate frequencies, and wherein each digital beamformer is further configured to: (15) receive a third partial beam of a third beam along with a third set of a plurality of other partial beams of the third beam from the digital software system interface via the data transport bus; (16) apply a third weighting factor to second transmit digital data associated with the third partial beam of the third beam; (17) transmit the second transmit digital data to a second digital to analog converter; and (18) convert, using the second digital to analog converter, the second transmit digital data from a digital signal to an analog signal having a second intermediate frequency.

In embodiments, each digital beamformer is further configured to receive the third partial beam of the third beam along with a fourth set of a plurality of other beams of a fourth beam from the digital software system interface via the data transport bus.

In embodiments, the second intermediate frequency is between 50 MHz and 1250 MHz.

In embodiments, the second intermediate frequency is the same as the first intermediate frequency.

In embodiments, each digital beamformer is further configured to convert, using the second digital to analog converter, the second transmit digital data from a digital signal to an analog signal having a second intermediate frequency by performing First-Nyquist sampling.

In embodiments, each principal polarization converter and each respective orthogonal polarization converter have a transmit mode of operation associated with transmitting respective modulated signals associated with a plurality of radio frequencies, and wherein each principal polarization converter and its respective orthogonal polarization converter is further configured to: (6) receive respective fifth modulated signals associated with the second intermediate frequency from the respective digital beamformer of the plurality of digital beamformers; (7) convert the respective fifth modulated signals associated with the second intermediate frequency into respective sixth modulated signals having a radio frequency; and (8) transmit the respective sixth modulated signals associated with the respective radio frequencies of the plurality of radio frequencies from each principal polarization converter and each orthogonal polarization converter of the respective pair of frequency converters of the plurality of pairs of frequency converters to each principal polarization component and each orthogonal polarization component of the respective coupled dipole antenna element of the plurality of coupled dipole antenna elements.

In embodiments, each coupled dipole antenna array element has a transmit mode of operation associated with transmitting a plurality of respective radio frequencies, and wherein each principal polarization component and each orthogonal polarization component of the respective coupled dipole antenna array element is further configured to transmit the respective sixth modulated signals associated with the respective radio frequencies of the plurality of radio frequencies.

In embodiments, a respective intermediate frequency is associated with a respective mission center radio frequency.

In embodiments, the respective mission center radio frequency is obtained by the steps of: (a) receiving, from the digital software system interface via a system controller by memory of the digitally beamformed phased array system, for the respective coupled dipole array antenna element of the plurality of respective coupled dipole array antenna elements, the respective mission center radio frequency; (b) storing, by memory operatively connected to the system controller, the respective mission center radio frequency for the respective coupled dipole antenna array element; and (c) transporting, from the memory to the respective principal polarization frequency converter and the respective orthogonal polarization frequency converter, the respective mission center frequency for the respective coupled dipole array antenna element.

In embodiments, the respective intermediate frequency is a respective mission intermediate frequency corresponding to the respective mission center radio frequency and is obtained by the steps of: (a) receiving, from the digital software system interface via the system controller by memory of the digitally beamformed phased array system, for the respective coupled dipole array antenna element of the plurality of respective coupled dipole array antenna elements, the respective mission intermediate frequency; (b) storing, by memory operatively connected to the system controller, the respective mission intermediate frequency for the respective coupled dipole array antenna element; and (c) transporting, from the memory to the respective principal polarization frequency converter and the respective orthogonal polarization frequency converter, the respective mission intermediate frequency for the respective coupled dipole array antenna element.

In embodiments, a respective channel is selected by the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective channel selection; (b) storing, by memory operatively connected to the system controller, the respective channel selection for the respective principal polarization component and the respective orthogonal polarization component of the respective coupled dipole array antenna element; and (c) transporting, from the memory to the respective digital beamformer, the respective channel selection for the respective principal polarization component and the respective orthogonal polarization component of the respective coupled dipole array element.

In embodiments, the respective channel selection is associated with a respective tuner channel frequency.

In embodiments, the respective tuner channel frequency corresponds to the mission intermediate frequency.

In embodiments, a respective weighting factor is part of an array of weighting factors obtained by the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective weighting factor; (b) storing, by memory operatively connected to the system controller, the respective weighting factor for the respective principal polarization component and the respective orthogonal polarization component of the respective coupled dipole array antenna element of the plurality of respective coupled dipole array antenna elements; and (c) transporting, from the memory to the respective digital beamformer, the respective weighting factor for the respective principal polarization component and the respective orthogonal polarization component of the respective coupled dipole array antenna element of the plurality of respective coupled dipole array antenna elements.

In embodiments, the respective weighting factor is generated for the respective principal polarization component and the respective orthogonal polarization component of the respective coupled dipole array antenna element as a function of: i. a respective tuning parameter; ii. a respective power parameter; and iii. a respective location of the respective principal polarization component and the respective orthogonal polarization component of the respective coupled dipole array antenna element with respect to the center of the multi-band software defined antenna array tile.

In embodiments, the digital software system interface generates the array of weighting factors by using the formula:

$$W_{m,n} = \frac{A_{m,n}}{\left(A_{m,n}^{tap} * A_{m,n}^{cal}\right)} * e^{-j*\left(\theta_{m,n}^{steer} + \theta_{m,n}^{tap} + \theta_{m,n}^{cal}\right)}$$

wherein $w_{m,n}$ is a weighting factor associated with each position in the antenna array expressed as a horizontal position m and a vertical position n, $A_{m,n}$ is an amplitude weighting factor associated with each position in the antenna array expressed as a horizontal position m and a vertical position n, $A^{tap}$ is a tapered amplitude weighting factor associated with each position in the antenna array expressed as a horizontal position m and a vertical position n, $A^{cal}$ is a calibration weighting factor associated with each position in the antenna array expressed as a horizontal position m and a vertical position n, $\theta_{m,n}$ is a phase factor associated with each position in the antenna array expressed as a horizontal position m and a vertical position n, $\theta^{steer}$ is a steering phase factor associated with each position in the antenna array expressed as a horizontal position m and a vertical position n, $\theta^{tap}$ is a taper phase factor associated with each position in the antenna array expressed as a horizontal position m and a vertical position n, and $\theta^{cal}$ is a calibration phase factor associated with each position in the antenna array expressed as a horizontal position m and a vertical position n.

In embodiments, the digital software system interface generates the respective weighting factor by using the formula:

$$w(t) = \left( \frac{\cosh(\pi\alpha * \sqrt{1-4t^2})}{\cosh(\pi\alpha)} \right)^P$$

wherein w(t) is the respective weighting factor at a location t, where t is defined by an array associated with a location of the respective principal polarization component and the respective orthogonal polarization component of the respective coupled dipole array antenna element, a is the respective tuning parameter, and P is the respective power parameter.

In embodiments, the digital software system interface receives specific mission parameters for the plurality of coupled dipole array antenna elements as an input, and wherein the digital software system interface uses the specific mission parameters to generate the array of weighting factors.

In embodiments, the respective weighting factor is selected from the array of weighting factors.

In embodiments, a respective oscillating signal is associated with a respective oscillating signal frequency.

In embodiments, the respective oscillating signal frequency is obtained by performing the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective oscillating signal frequency; (b) storing, by memory operatively connected to the system controller, the respective oscillating signal frequency for the respective principal polarization component and the respective orthogonal polarization component of the respective coupled dipole array element; and (c) transporting, from the memory to the respective digital beamformer, the respective oscillating signal frequency for the respective principal polarization component and the respective orthogonal polarization component of the respective coupled dipole array element.

In embodiments, the respective oscillating signal frequency corresponds to the respective tuner channel frequency.

In embodiments, a plurality of oscillating signal frequencies may be received for a plurality of principal polarization components and a plurality of orthogonal polarization components of the plurality of respective coupled dipole array antenna elements.

In embodiments, the digital software system interface receives specific mission parameters for respective coupled dipole array antenna elements as an input, and wherein the digital software system interface uses the specific mission parameters to generate the respective oscillating signal frequency.

In embodiments, a method for digital beamforming may include: (a) receiving, by a first coupled dipole array antenna element of a plurality coupled dipole array antenna elements of a multi-band software defined antenna array tile, a plurality of respective modulated signals associated with a plurality of respective radio frequencies, wherein each coupled dipole array antenna element of the plurality of coupled dipole array antenna elements includes a respective principal polarization component oriented in a first direction and a respective orthogonal polarization component oriented in a second direction; (b) receiving, by a first principal polarization frequency converter of a first pair of frequency converters of a plurality of pairs of frequency converters of the multi-band software defined antenna array tile, from a first principal polarization component of the first coupled dipole array antenna element of the plurality of coupled dipole array antenna elements, respective first modulated signals associated with the respective radio frequencies of the plurality of respective radio frequencies, wherein each pair of frequency converters of the plurality of pairs frequency converters is operatively connected to a respective coupled dipole array antenna element, and wherein each pair of frequency converters of the plurality of pairs frequency converters includes a respective principal polarization converter corresponding to a respective principal polarization component and a respective orthogonal polarization converter corresponding to a respective orthogonal polarization component; (c) converting, by the first principal polarization frequency converter of the first pair of frequency converters, the respective first modulated signals associated with the respective radio frequencies of the plurality of radio frequencies into respective second modulated signals having a first intermediate frequency; (d) receiving, by a first digital beamformer of a plurality of digital beamformers of the multi-band software defined antenna array tile, from the first principal polarization frequency converter, the respective second modulated signals associated with the first intermediate frequency, wherein the plurality of digital beamformers are operatively connected to the plurality of pairs of frequency converters, and wherein each digital beamformer is operatively connected to one of the respective principal polarization frequency converter and the respective orthogonal polarization frequency converter; (e) converting, by the first digital beamformer, the respective second modulated signal from an analog signal to a digital data format; (f) generating, by the first digital beamformer, a first plurality of channels of first digital data by decimating the first digital data using a first polyphase channelizer and filtering using a first plurality of cascaded halfband filters; (g) selecting, by the first digital beamformer, a first channel of the first plurality of channels; (h) applying, by the first digital beamformer, a first weighting factor to the first digital data associated with the first channel to generate a first intermediate partial beamformed data stream; (i) combining, by the first digital beamformer, the first intermediate partial beamformed data stream with the plurality of other intermediate partial beamformed data streams to generate a first partial beamformed data stream; (j) applying, by the first digital beamformer, a first oscillating signal to the first partial beamformed data stream to generate a first oscillating partial beamformed data stream; (k) applying, by the first digital beamformer, a first three-stage halfband filter to the first oscillating partial beamformed data stream to generate a first filtered partial beamformed data stream; (l) applying, by the first digital beamformer, a first time delay to the first filtered partial beamformed data stream to generate a first partial beam; and (m) transmitting, by the first digital beamformer via a data transport bus to a digital software system interface, the first partial beam of a first beam, which is transmitted via the data transport bus along with a first set of a plurality of other partial beams of the first beam.

In embodiments, the method further includes, prior to step (a), the steps of: reflecting, from a surface of a parabolic reflector mounted on a support pedestal, the plurality of respective modulated signals and transmitting the reflected plurality of respective modulated signals through a radome to the first coupled dipole array antenna element.

In embodiments, the plurality of coupled dipole array antenna elements are tightly coupled relative to the wavelength of operation.

In embodiments, the plurality of coupled dipole array antenna elements are spaced at less than half a wavelength.

In embodiments, the plurality of pairs of frequency converters further includes thermoelectric coolers configured to actively manage thermally the system noise temperature and increase the system gain over temperature.

In embodiments, the plurality of pairs of frequency converters further includes a plurality of spatially distributed high power amplifiers so as to increase the effective isotropic radiated power.

In embodiments, the first intermediate frequency is between 50 MHz and 1250 MHz.

In embodiments, the radio frequencies are between 900 MHz and 6000 MHz.

In embodiments, the radio frequencies are between 2000 MHz and 12000 MHz.

In embodiments, the radio frequencies are between 10000 MHZ and 50000 MHz.

In embodiments, the method further includes converting, by the first digital beamformer the respective modulated signal from an analog signal to a digital data format by performing First-Nyquist sampling.

In embodiments, the method further includes selecting, by the first digital beamformer, the first channel of the first plurality of channels using a first multiplexer.

In embodiments, the method further includes transmitting, by the first digital beamformer via the data transport bus to the digital software system interface, the first partial beam of the first beam, which is transmitted via the data transport bus along with a second set of a plurality of other partial beams of a second beam.

In embodiments, the method further includes, after step (a): (n) receiving, by a first orthogonal polarization frequency converter of the first pair of frequency converters of the plurality of pairs of frequency converters of the multi-band software defined antenna array tile, from a first orthogonal polarization component of the first coupled dipole array antenna element of the plurality of coupled dipole array antenna elements, respective third modulated signals associated with the respective radio frequencies of the plurality of respective radio frequencies; (o) converting, by the first orthogonal polarization frequency converter of the first pair of frequency converters, the respective third modulated signals associated with the respective radio frequencies of the plurality of radio frequencies into respective fourth modulated signals having the first intermediate frequency; (p) receiving, by a second digital beamformer of the plurality of digital beamformers of the multi-band software defined antenna array tile, from the first orthogonal polarization frequency converter of the first pair of frequency converters, the respective fourth modulated signals associated with the first intermediate frequency; (q) converting, by the second digital beamformer, the respective fourth modulated signal from an analog signal to a digital data format; (r) generating, by the second digital beamformer, a second plurality of channels of second digital data by decimating the second digital data using a second polyphase channelizer and filtering using a second plurality of cascaded halfband filters; (s) selecting, by the second digital beamformer, a second channel of the second plurality of channels; (t) applying, by the second digital beamformer, a second weighting factor to the second digital data associated with the second channel to generate a second intermediate partial beamformed data stream; (u) combining, by the second digital beamformer, the second intermediate partial beamformed data stream with the plurality of other intermediate partial beamformed data streams to generate a second partial beamformed data stream; (v) applying, by the second digital beamformer, a second oscillating signal to the second partial beamformed data stream to generate a second oscillating partial beamformed data stream; (w) applying, by the second digital beamformer, a second three-stage halfband filter to the second oscillating partial beamformed data stream to generate a second filtered partial beamformed data stream; (x) applying, by the second digital beamformer, a second time delay to the second filtered partial beamformed data stream to generate a second partial beam; and (y) transmitting, by the second digital beamformer via the data transport bus to the digital software system interface, the second partial beam of the first beam, which is transmitted via the data transport bus along with a third set of a plurality of other partial beams of the first beam.

In embodiments, the method further includes converting, by the second digital beamformer, the respective modulated signal from an analog signal to a digital data format by performing First-Nyquist sampling.

In embodiments, the method further includes selecting, by the second digital beamformer, the second channel of the second plurality of channels using a second multiplexer.

In embodiments, the second oscillating signal is the same as the first oscillating signal.

In embodiments, the second channel is the same as the first channel.

In embodiments, the method further includes transmitting, by the second digital beamformer via the data transport bus to the digital software system interface, the second partial beam of the second beam, which is transmitted via the data transport bus along with a fourth set of a plurality of other partial beams of the second beam.

In embodiments, a respective intermediate frequency is associated with a respective mission center radio frequency.

In embodiments, the respective mission center radio frequency is obtained by the steps of: (a) receiving, from the digital software system interface via a system controller by memory of the digitally beamformed phased array system, for the respective coupled dipole array antenna element of the plurality of respective coupled dipole array antenna elements, the respective mission center radio frequency; (b) storing, by memory operatively connected to the system controller, the respective mission center radio frequency for the respective coupled dipole antenna array element; and (c) transporting, from the memory to the respective principal polarization frequency converter and the respective orthogonal polarization frequency converter, the respective mission center frequency for the respective coupled dipole array antenna element.

In embodiments, the respective intermediate frequency is a respective mission intermediate frequency corresponding to the respective mission center radio frequency and is obtained by the steps of: (a) receiving, from the digital software system interface via the system controller by memory of the digitally beamformed phased array system, for the respective coupled dipole array antenna element of the plurality of respective coupled dipole array antenna elements, the respective mission intermediate frequency; (b) storing, by memory operatively connected to the system controller, the respective mission intermediate frequency for the respective coupled dipole array antenna element; and (c) transporting, from the memory to the respective principal polarization frequency converter and the respective orthogonal polarization frequency converter, the respective mission intermediate frequency for the respective coupled dipole array antenna element.

In embodiments, a respective channel is selected by the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective channel selection; (b) storing, by memory operatively connected to the system controller, the respective channel selection for the respective principal polarization component and the respective orthogonal polarization component of the respective coupled dipole array antenna element; and (c) transporting, from the memory to the respective digital beamformer, the respective channel selection for the respective principal polarization component and the respective orthogonal polarization component of the respective coupled dipole array element.

In embodiments, the respective channel selection is associated with a respective tuner channel frequency.

In embodiments, the respective tuner channel frequency corresponds to the respective mission intermediate frequency.

In embodiments, a respective weighting factor is part of an array of weighting factors obtained by the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective weighting factor; (b) storing, by memory operatively connected to the system controller, the respective weighting factor for the respective principal polarization component and the respective orthogonal polarization component of the respective coupled dipole array antenna element of the plurality of respective coupled dipole array antenna elements; and (c) transporting, from the memory to the respective digital beamformer, the respective weighting factor for the respective principal polarization component and the respective orthogonal polarization component of the respective coupled dipole array antenna element of the plurality of respective coupled dipole array antenna elements.

In embodiments, the respective weighting factor is generated for the respective principal polarization component and the respective orthogonal polarization component of the respective coupled dipole array antenna element as a function of: i. a respective tuning parameter; ii. a respective power parameter; and iii. a respective location of the respective principal polarization component and the respective orthogonal polarization component of the respective coupled dipole array antenna element with respect to the center of the multi-band software defined antenna array tile.

In embodiments, the digital software system interface generates the array of weighting factors by using the formula:

$$w_{m,n} = \overbrace{\left(A_{m,n}^{tap} * A_{m,n}^{cal}\right)}^{A_{m,n}} * e^{-j*\overbrace{\left(\theta_{m,n}^{steer}+\theta_{m,n}^{tap}+\theta_{m,n}^{cal}\right)}^{\theta_{m,n}}}$$

wherein $w_{m,n}$ is a weighting factor associated with each position in the antenna array expressed as a horizontal position m and a vertical position n, $A_{m,n}$ is an amplitude weighting factor associated with each position in the antenna array expressed as a horizontal position m and a vertical position n, $A^{tap}$ is a tapered amplitude weighting factor associated with each position in the antenna array expressed as a horizontal position m and a vertical position n, $A^{cal}$ is a calibration weighting factor associated with each position in the antenna array expressed as a horizontal position m and a vertical position n, $\theta_{m,n}$ is a phase factor associated with each position in the antenna array expressed as a horizontal position m and a vertical position n, $\theta^{steer}$ is a steering phase factor associated with each position in the antenna array expressed as a horizontal position m and a vertical position n, $\theta^{tap}$ is a taper phase factor associated with each position in the antenna array expressed as a horizontal position m and a vertical position n, and $\theta^{cal}$ is a calibration phase factor associated with each position in the antenna array expressed as a horizontal position m and a vertical position n.

In embodiments, the digital software system interface generates the respective weighting factor by using the formula:

$$w(t) = \left(\frac{\cosh(\pi\alpha * \sqrt{1-4t^2})}{\cosh(\pi\alpha)}\right)^P$$

wherein w(t) is the respective weighting factor at a location t, where t is defined by an array associated with a location of the respective principal polarization component and the respective orthogonal polarization component of the respective coupled dipole array antenna element, a is the respective tuning parameter, and P is the respective power parameter.

In embodiments, the digital software system interface receives specific mission parameters for the plurality of coupled dipole array antenna elements as an input, and wherein the digital software system interface uses the specific mission parameters to generate the array of weighting factors.

In embodiments, the respective weighting factor is selected from the array of weighting factors.

In embodiments, a respective oscillating signal is associated with a respective oscillating signal frequency.

In embodiments, the respective oscillating signal frequency is obtained by performing the steps of: (a) receiving, from the digital software system interface via the system controller by memory of the digitally beamformed phased array system, for the respective principal polarization component and the respective orthogonal polarization component of the respective coupled dipole array antenna element of the plurality of respective coupled dipole array antenna elements, the respective oscillating signal frequency; (b) storing, by memory operatively connected to the system controller, the respective oscillating signal frequency for the respective principal polarization component and the respective orthogonal polarization component of the respective coupled dipole array element; and (c) transporting, from the memory to the respective digital beamformer, the respective oscillating signal frequency for the respective principal polarization component and the respective orthogonal polarization component of the respective coupled dipole array element.

In embodiments, the respective oscillating signal frequency corresponds to the respective tuner channel frequency.

In embodiments, a plurality of oscillating signal frequencies may be received for a plurality of principal polarization components and a plurality of orthogonal polarization components of the plurality of respective coupled dipole array antenna elements.

In embodiments, the digital software system interface receives specific mission parameters for respective coupled dipole array antenna elements as an input, and wherein the digital software system interface uses the specific mission parameters to generate the respective oscillating signal frequency.

Fine Loop Pointing

Figure 26:
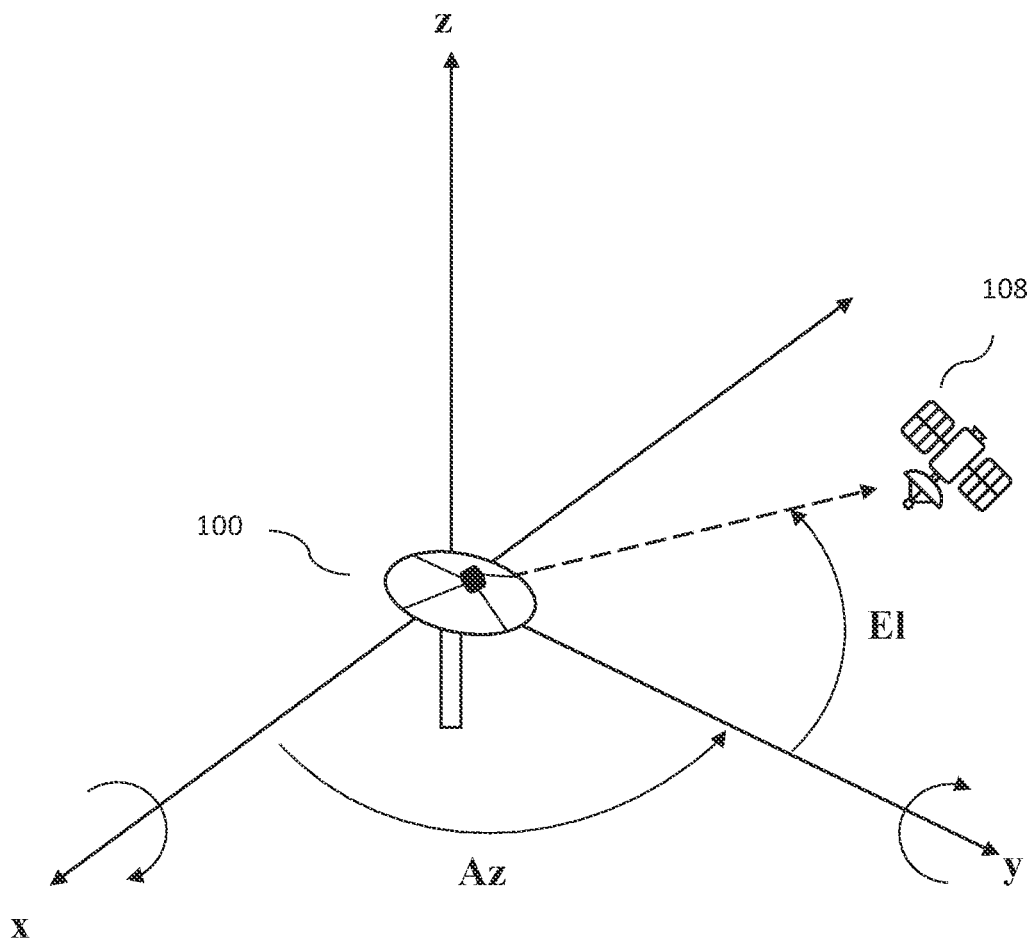
FIG. 26 is a schematic illustration of the three-dimensional movement axes associated with a traditional parabolic reflector.

In embodiments, the digitally beamformed phased array feed 210 of the wide area scanning parabolic apparatus 200, which includes the multi-band software defined antenna tile 110, may be used to achieve a higher overall motion profile for tracking flight objects than existing antenna systems. For example, existing satellite antennas 100 used with a parabolic reflector mounted on a support pedestal may be implemented in high seas environments, such as on ships or other water vessels. In those environments, the wave motion of the body of water beneath the water vessel may affect the operation of the antenna. For example, in order for the antenna to maintain the beam at a fixed point or on an object in the sky or on the horizon, the base of the antenna, including the reflector and support pedestal, must be continuously adjusted to counteract the movement of the water vessel and the base of the antenna caused by the force of the waves. Referring to FIG. 26, this requires moving and rotating the parabolic reflector 114 and support pedestal 112, respectively, about the Azimuth (Az) axis (measured in degrees, θ, or radians) and Elevation (El) axis (measured in degrees, θ, or radians) of the Az/El spherical coordinate system, to maintain the antenna beam's desired position on a flight object 108 in the sky. In many cases, the wave motion may be so severe that the entire existing antenna system, including the pedestal must be implemented such that it may be adjusted continuously so as to rotate around a roll axis, in addition to the Az/El axes. Referring to FIG. 26, this may require implementing the antenna system such that the pedestal may rotate about the x and y axes of a 3-dimensional coordinate system.

The current practice requires the implementation of highly agile, and often expensive, pedestals on water vessels. This is because existing antenna systems in the current state of practice use beam amplitude and phase control to taper antenna sidelobes at some expense to the antenna gain, while maintaining a narrow main lobe beamwidth for optimal directivity of the beam. However, if the system maintains a narrow main lobe beamwidth, the system's ability to steer the beam to compensate for the movement of the vessel or other volatile base system caused by wave motion is severely limited. The pointing authority of the antenna system that is under electronic control is defined as the inner loop of the antenna system. That is, the inner loop is the electronic ability to steer the beam. The outer loop of the system, on the other hand, includes the physical limits of the antenna system to steer the beam by moving and/or rotating the reflector and pedestal of the antenna system. As discussed above, the outer loop of the system may be increased or widened by implementing the base of the pedestal and/or any other component of the antenna system on a roll axis.

In embodiments of the present invention, the use of digital beamforming to steer and control a beam enables fine loop pointing across a wider inner loop allowing more physical leeway to the system. In embodiments, by using beam-broadening techniques, a digitally beamformed phased array feed 210 may enable a new or existing satellite antenna to scan a wider area of the sky while automatically adjusting and maintaining the physical position of the antenna. The current state of practice requires the use of highly agile, and thereby expensive, pedestals that may need to rotate at, for example, a maximum angular velocity of 40 degrees per second (Az/El), and a maximum angular acceleration of 10 degrees per second squared. Rotation of a parabolic reflector at high angular velocities and accelerations creates excessive kinetic energy and places a significant load and burden on the associated gear box. The system described in embodiments of the present invention allows the use of pedestals that may rotate, for example, at an angular velocity of 15 degrees per second (Az/El), and an angular acceleration of 3 degrees per second squared. However, in embodiments, because the broadened beam formed by the digitally beamformed phased array feed may be steered quickly and digitally, the effective angular velocity and acceleration of the system may exceed the maximum angular velocity and acceleration capabilities of existing pedestals. For example, in embodiments, the digitally beamformed phased array feed 210 may allow the lower agility pedestal having a maximum angular velocity of 15 degrees per second (Az/El), and a maximum angular acceleration of 3 degrees per second squared, to instead have a maximum effective angular velocity of 100 degrees per second (Az/El), and a maximum effective angular acceleration of 25 degrees per second squared.

Another problem facing current beamforming systems is the "keyhole" effect. The keyhole is a region above an antenna where the antenna is unable to adequately track an object due to either physical or digital constraints of the system. As an antenna approaches an elevation angle of 90 degrees, the system will fail, and the antenna will not be able to continue tracking an object through the "keyhole". In traditional narrow beam antenna systems, if a tracked object passes through a keyhole, an antenna must have high agility (requiring high angular velocity rotation) in order to rotate its support pedestal or gimbal on the azimuth axis and continue tracking the object. Additionally, when the object passes through the keyhole, the antenna will lose communication with the object because the narrow beam of the antenna tracks with the center of the pointing authority of the antenna. In embodiments of the present invention, the wide range of the beam allows for significantly more leeway as an object passes through the keyhole and does not require the system to abandon communication with the flight object at any point. In embodiments, the broad beam may allow a reflector and pedestal with low agility to rotate to avoid the keyhole while maintaining communication with the flight object while it moves through the keyhole. In embodiments, when the parabolic reflector 114 reaches a maximum elevation angle, the system will calculate the trajectory of the flight object 108 while it is in the blind region, and using this trajectory, will automatically rotate the parabolic reflector 114 such that flight object 108 may continue to be tracked by the beam while it is in the blind region. In embodiments, the system may maintain a constant flow of data without risking the mechanical integrity of the system.

In embodiments, the method for fine loop pointing may be implemented with a digitally beamformed phased array feed 210 described above, or it may be implemented with any other beamforming system.

In embodiments, the digital software system 704 may process the plurality of beams received from the plurality of digital beamformers 306 via the data transport bus 702 in order to generate a graphical display 340 displaying the plurality of beams. In embodiments, the plurality of beams may be assigned different tasks based on the mission parameters delivered to the system via the system controller 412. For example, in embodiments, a first beam may be assigned to acquire flight objects located within the range of the plurality of beams. In embodiments, a second beam may be assigned to a flight object 108 acquired by the acquisition beam in order to receive and process and/or transmit radio frequency signals from the flight object 108. In embodiments, a third beam may be assigned to track the movement of the flight object 108 so that the second beam may be adjusted so as to maintain communication with the flight object 108. In embodiments, the plurality of beams may include a plurality of acquisition beams, a plurality of receive and/or transmit beams, and/or a plurality of tracking beams, to name a few.

In embodiments, because the systolic digital beam formed by the digitally beamformed phased array feed 210 is significantly wider than beams formed by traditional beamforming systems (as shown in FIGS. 16A and 16B), the digital software system 704 may track a plurality of flight objects 108 using a plurality of beams simultaneously without requiring substantial physical adjustment of the parabolic reflector 114. FIGS. 30A-D are schematic illustrations of a graphical display 340 generated by a method for fine loop pointing in accordance with embodiments of the present invention. In embodiments, the graphical display 340 may display a plurality of flight objects 108 simultaneously. In embodiments, a user of the graphical display 340 may assign one or more beams to a flight object 108 in order to receive and/or transmit communications to and/or from the flight object 108 by the digital software system 704. In embodiments, the user may assign a tracking priority to an object 108 so that the system may prioritize the tracking of one flight object over another flight object.

Figure 31:
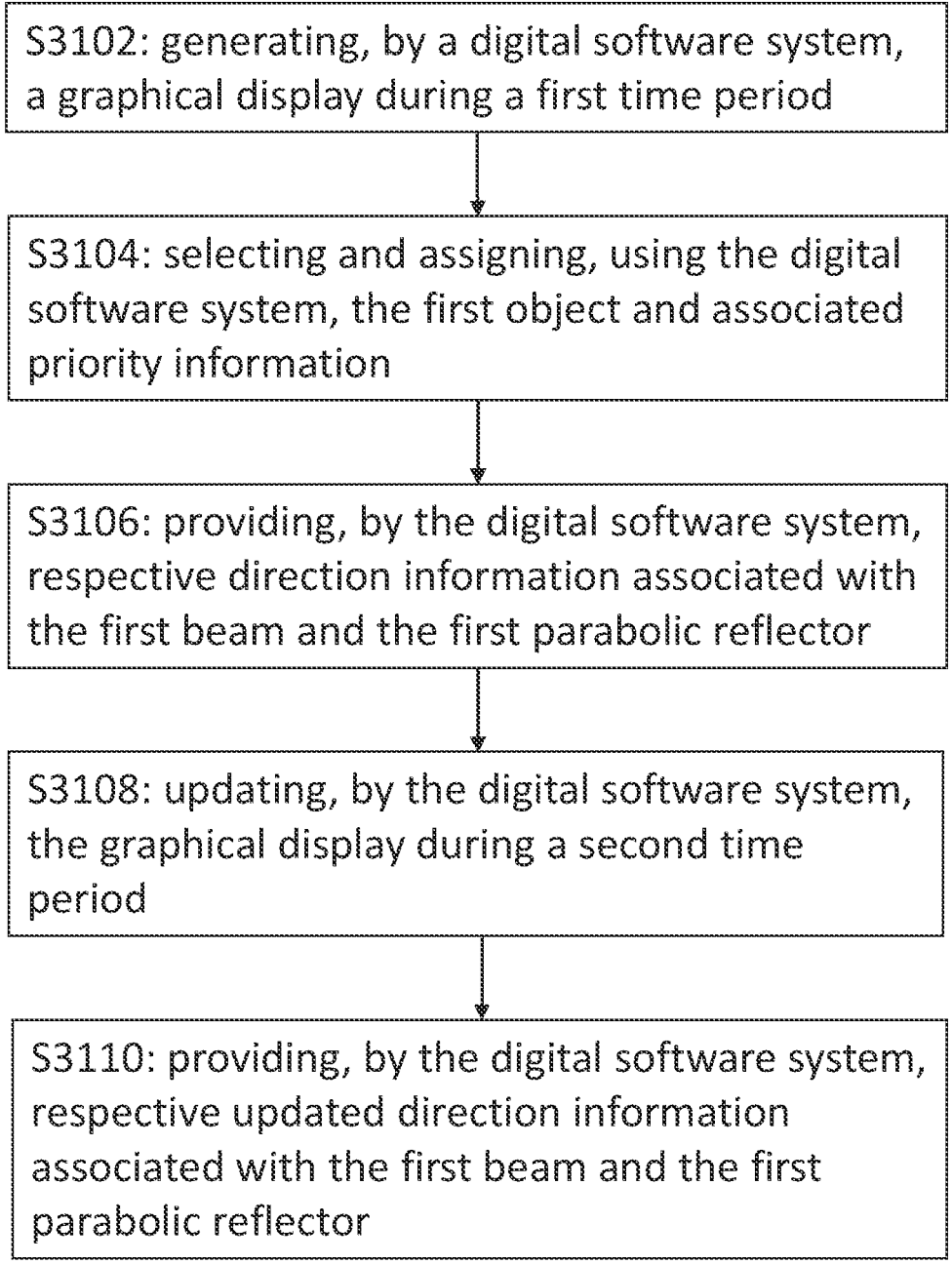

In embodiments, referring to FIG. 31, an exemplary process for generating a graphical display 340 using fine loop pointing may begin with step S3102. At step S3102, in embodiments, the digital software system 704 may generate a graphical display 340 during a first time period. In embodiments, the generating step may include a plurality of substeps. In embodiments, referring to FIG. 31A, the generating step may proceed with step S3102A. At step S3102A, the digital software system 704 may receive first angular direction information via a pedestal controller 124 operatively connected to a first parabolic reflector 114. In embodiments, the parabolic reflector 114 may be configured to automatically rotate about an elevation axis between a first range of a plurality of elevation angles between a range of a plurality of angular velocities. In embodiments, the rotation of the parabolic reflector 114 may be controlled electronically by the pedestal controller 124. In embodiments, the pedestal controller 124 may be operatively connected the digital software system 704. In embodiments, the pedestal controller 124 may be used to control the movement and rotation of the parabolic reflector 114 based on the angular direction information transmitted by the digital software system 704. In embodiments, the first angular direction information may include a first azimuth axis component and a first elevation axis component associated with the first parabolic reflector 114 during the first time period. In embodiments, the azimuth and elevation components may be in degrees, radians, or any other non-cartesian coordinate system. In embodiments, the first angular direction information may indicate the direction that the centroid 270 of the parabolic reflector 114 is pointing. In embodiments, the point at which the first azimuth axis and the first elevation axis intersect is the centroid 270 of the parabolic reflector 114. For example, in embodiments referring to FIG. 30A, the angular direction information may indicate that the parabolic reflector 114 is pointing at an azimuth angle component of 14 degrees, and an elevation angle component of 61 degrees. In embodiments, the centroid 270 of the parabolic reflector 114 is the direction of a center point of the parabolic reflector 114. In embodiments, the parabolic reflector 114 described with respect to fine loop pointing may include both the reflector 114 and a support pedestal 112. In embodiments, the parabolic reflector 114 may rotate about the elevation axis, and the support pedestal 112 may rotate about the azimuth axis. In embodiments, the parabolic reflector 114 may rotate about the elevation axis and the azimuth axis using a gimbal. For example, in embodiments, the reflector 114 may rotate using a gimbal, while the gimbal is positioned on a stationary support pedestal 112.

In embodiments, referring to FIG. 31A, the generating step may continue with step S3102B. At step 3102B, the digital software system 704 may receive a first set of respective first digital data streams associated with a first plurality of partial beams via a data transport bus 702. For example, in embodiments, the digital data streams may be transported via the digital transport bus 702 shown in FIG. 7. In embodiments, each respective partial beam may be associated with a respective first digital data stream and data in the respective first digital data stream may be associated with a first plurality of respective modulated radio frequency signals received by a plurality of antenna array elements 304. In embodiments, each partial beam may be formed by a respective digital beamformer 306-$n$ of the plurality of digital beamformers 306, described above with respective to at least FIG. 8.

In embodiments, referring again to FIG. 31A, the generating step may continue with step S3102C. At step 3102C, the digital software system 704 may process the first set of respective first digital data streams associated with the first plurality of partial beams to generate a second set of respective second digital data streams associated with the first plurality of beams associated with the first plurality of partial beams. In embodiments, each beam of the first plurality of beams is based on at least two respective first digital data streams. In embodiments, each beam may be based on 2 partial beams (for example, an orthogonal polarization component partial beam and a principal polarization component partial beam).

In embodiments, referring again to FIG. 31A, the generating step may continue with step S3102D. At step 3102D, the digital software system 704 may process the second set of respective second digital data streams associated with the first plurality of beams to determine respective location information for each object of a first set of objects 108-$n$ including at least a first object 108-1. In embodiments, the first set of objects may include simulation objects and tracking objects. In embodiments, simulation objects may be used to test and calibrate the digital software system 704. In embodiments, tracking objects may be real objects 108. In embodiments, an object 108 may be a satellite, plane, drone, or any other flight object, to name a few. In embodiments, the respective location information may include an azimuth component and an elevation component relative to the angular direction information associated with the parabolic reflector 114. For example, in embodiments referring to FIG. 30A, the first plurality of beams may indicate that the first object 108-1 is located at an azimuth angle of approximately 8 degrees, and an elevation angle of approximately 51 degrees. In embodiments, the plurality of beams may include the wide beam that is generated by the digitally beamformed array feed 210 using the beam broadening taper. In embodiments, the wide beam allows the other respective beams of the first plurality of beams to receive and transmit radio frequency signals associated with a plurality of flight objects 108 within the range of the wide beam.

In embodiments, the digital software system 704 may process the second set of respective second digital data streams associated with the first plurality of beams to determine respective location information for each object of the first set objects 108-n, including the first object 108-1 and a second object 108-2, for example. In embodiments, there may be additional objects located by the digital software system 704.

Figure 30A:
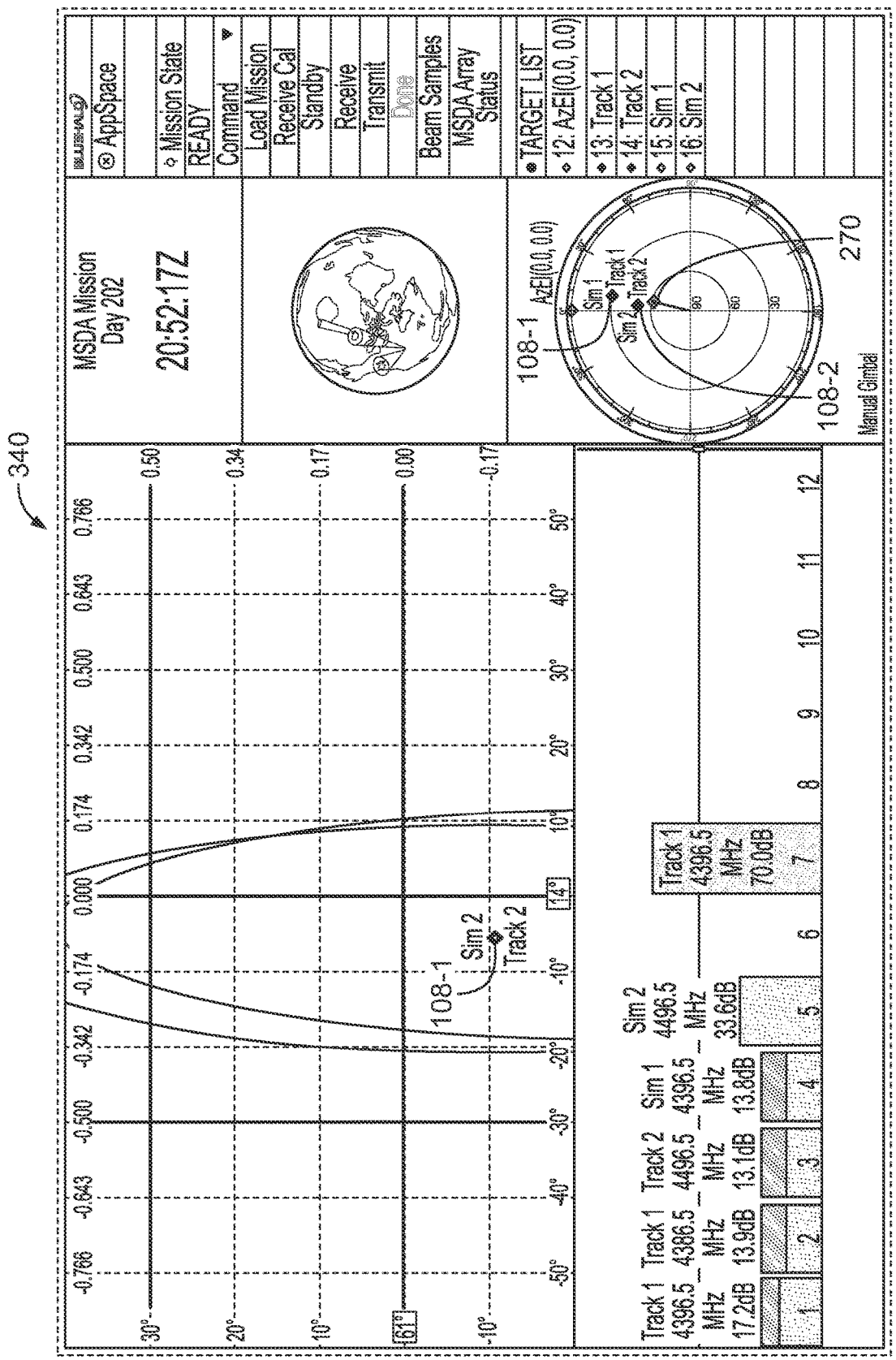
FIGS. 30A-D are schematic illustrations of a graphical user interface generated by a method for fine loop pointing in accordance with embodiments of the present invention.
Figure 30B:
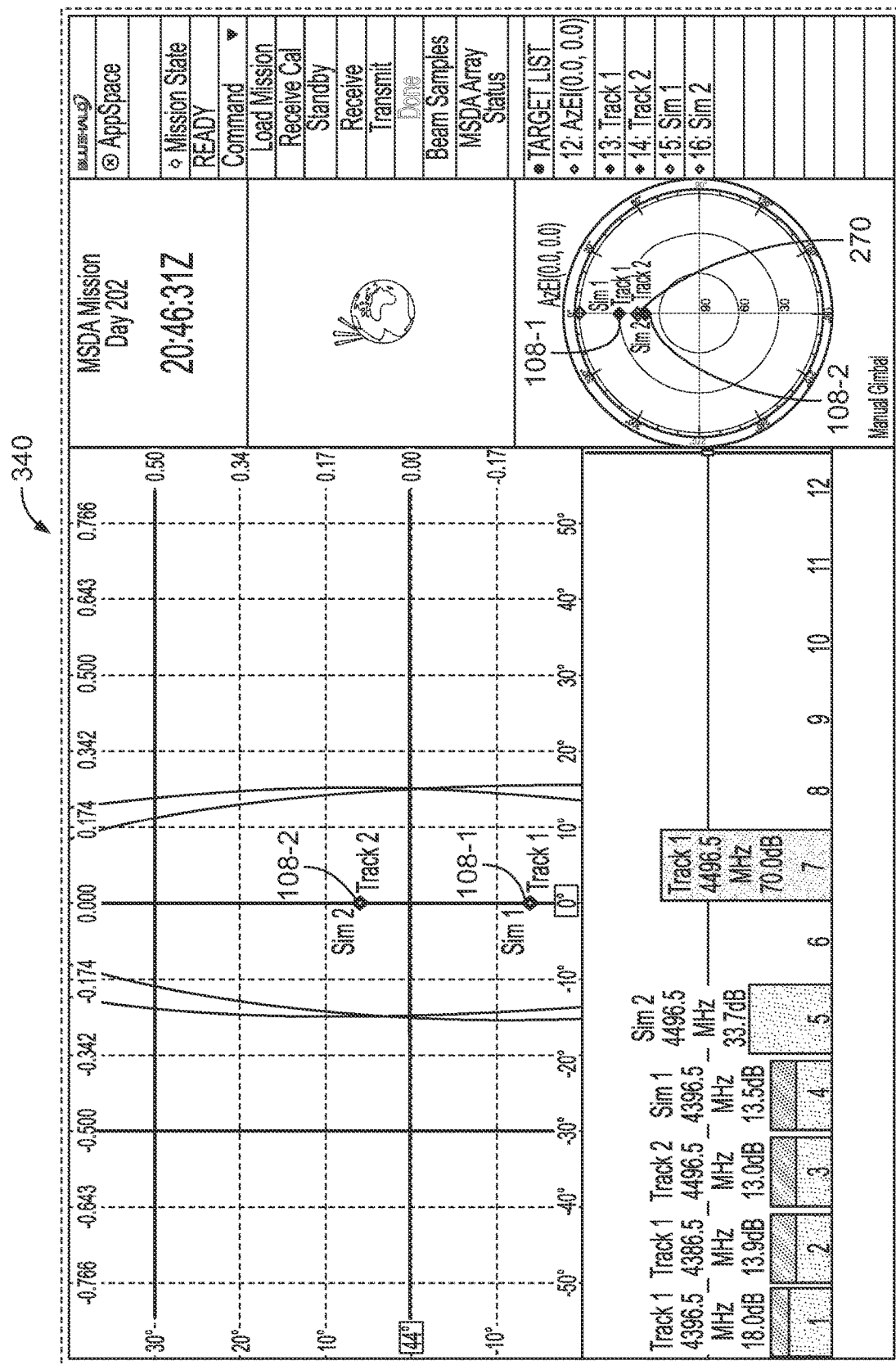
Figure 30C:
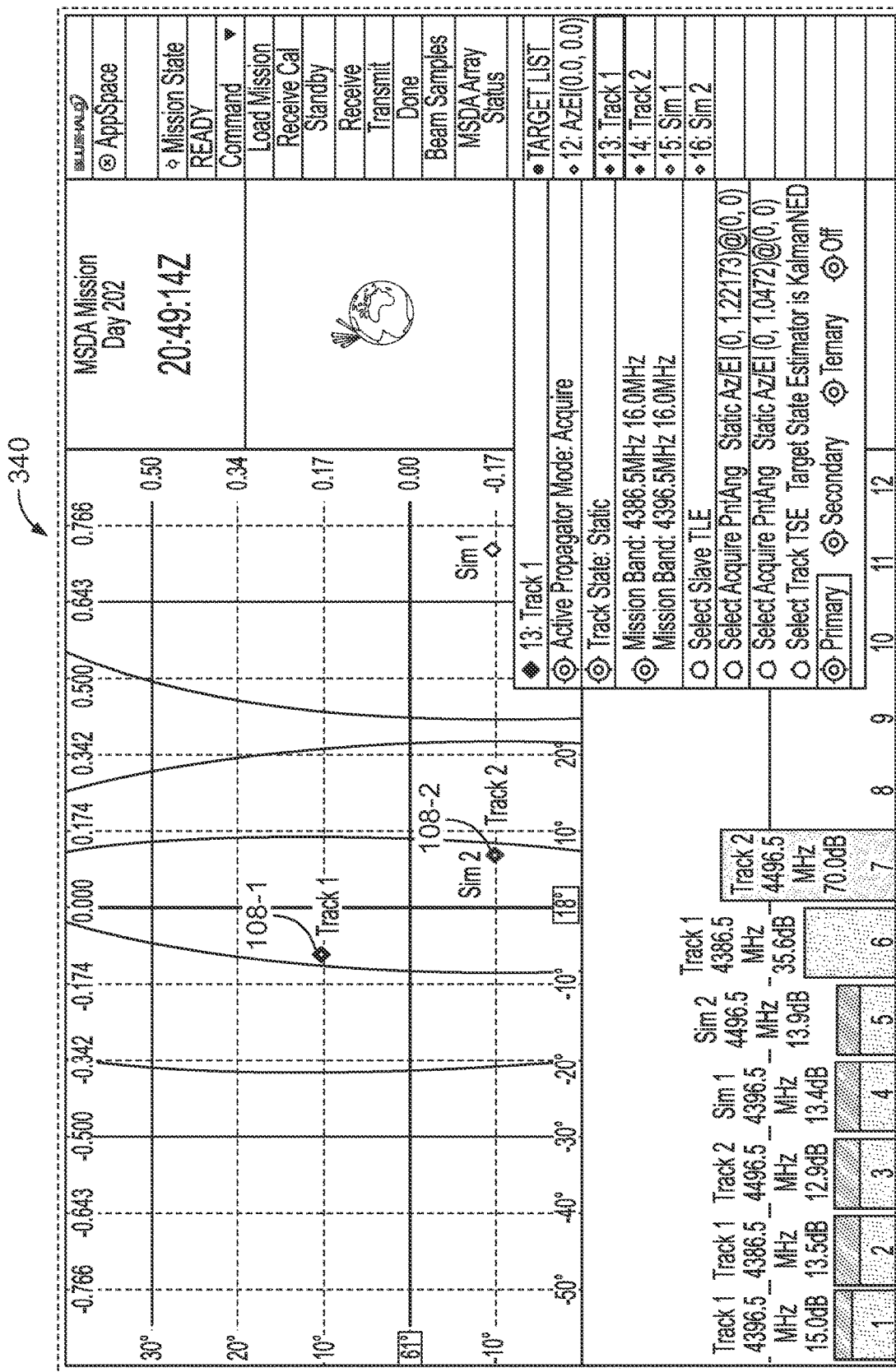
Figure 30D:
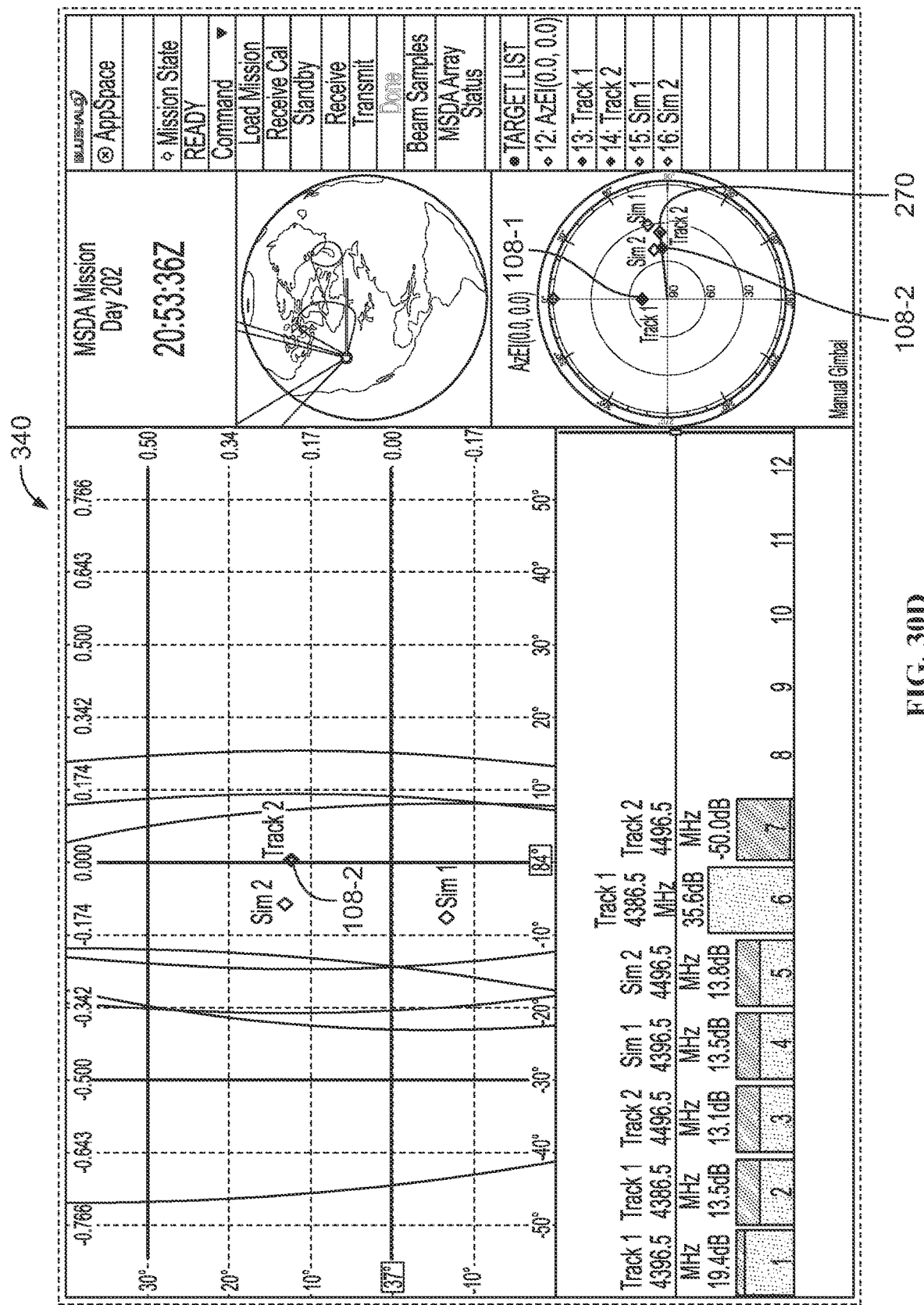

In embodiments, referring again to FIG. 31A, the generating step may continue with step S3102E. At step 3102E, the digital software system 704 may generate the graphical display 340. In embodiments, referring for example to FIG. 30A, the graphical display 340 may display the first plurality of beams, the first set of objects, including the first object 108-1, a first azimuth axis based on the first azimuth axis component, and a first elevation axis based on the first elevation axis component. In embodiments, in the case where the first set of objects includes the first object 108-1 and the second object 108-2, the graphical display 340 may display the first plurality of beams, the first set objects, including the first object 108-1 and the second object 108-2, the first azimuth axis, and the first elevation axis. FIGS. 30B and 30C are schematic illustrations of a graphical display 340 generated by a digital software system 704, where the display 340 shows the respective location of two objects in accordance with embodiments of the present invention. For example, in embodiments referring to FIG. 30B, the first plurality of beams may indicate that the first object 108-1 is located at an azimuth angle of approximately 0 degrees, and an elevation angle of approximately 30 degrees. Continuing this example, in embodiments, the first plurality of beams may indicate that the second object 108-2 is located at an azimuth angle of approximately 0 degrees, and an elevation angle of approximately 50 degrees.

In embodiments, referring again to FIG. 31A, the generating step may continue with step S3102F. At step 3102F, the digital software system 704 may provide for a display of at least a portion of the graphical display 340, as shown for example in FIG. 30A, on a display operably connected to the digital software system 704. In embodiments, the display may be a stationary device, mobile device, or any other type of display device. For example, in embodiments, the display may be on a desktop computer, laptop, mobile phone, radio system, or tablet, or any combination thereof, to name a few.

In embodiments, referring back to FIG. 31, the method may continue with step S3104. At step S3104, in embodiments, the first object 108-1 may be selected and assigned priority information using the digital software system 704. In the case where there are two objects the first object 108-1 and the second object 108-2 may be selected and assigned priority information using the digital software system 704 (discussed below with respect to multiple object tracking). In embodiments, referring to FIG. 31B, step S3104 may include a plurality of sub-steps. In embodiments, referring to FIG. 31B, the process may continue with step S3104A. At step S3104A, the first object 108-1 displayed by the graphical display 340 may be selected using the digital software system 704. In embodiments, the first object 108-1 may be selected automatically by the digital software system 704 based on characteristics of the first object. In embodiments, the characteristics may include object velocity, mass, and/or acceleration, to name a few. In embodiments, the first object 108-1 may be selected manually by a user using one or more input elements operably connected to the digital software system 704 via the graphical display 340. For example, in embodiments referring to FIGS. 30A-30D, the graphical display 340 may display a list of the objects included in the first set of objects. In embodiments, the user may select an object to track from the list. In embodiments, selection may be based on selection information provided by the user. In embodiments, the selection information may be provided using one or more input devices operatively connected to the digital software system. In embodiments, the input devices may include one or more of a keyboard, mouse, button, switch, and/or touchscreen, to name a few.

In embodiments, referring to FIG. 31B, the process may continue with step S3104B. At step S3104B, first priority information may be assigned to the first object 108-1 using the digital software system 704. In embodiments, the first priority information may be assigned to the first object 108-1 automatically by the digital software system 704 based on the selection in step S3104A, for example. In embodiments, the first priority information may be assigned to the first object 108-1 manually by a user of the digital software system 704 using the graphical display 340 or using any suitable input device. In embodiments, the first priority information may be a weight assigned to the first object 108-1. For example, in embodiments, the first priority information may be a primary object weight, a secondary object weight or a ternary object weight. In embodiments, for example the primary object weight may be 1, while the secondary object weight may be 0.5, and the ternary object weight may be 0.25. In embodiments, the weights may be used by the digital software system 704 when calculating angular direction information for the parabolic reflector 114, as described below. In embodiments, the priority information may be based on object characteristics, such as object velocity, mass, and/or acceleration, to name a few. In embodiments, multiple objects may be assigned the same weight. In embodiments, there may be additional object weights.

In embodiments, referring to FIG. 31B, the process may continue with step S3104C. At step S3104C, the digital software system 704 may assign a first beam of the plurality of beams to the first object 108-1. In embodiments, the first beam will be associated with the first object 108-1 in order to receive and/or transmit radio frequency signals to/from the object, as further described below.

Single Object Pointing

In embodiments, if the first set of objects includes only the first object 108-1, the process may proceed directly from step S3104C to step S3106 (referring to FIG. 31). In embodiments, referring back to FIG. 31, the method may continue from step S3104C with step S3106. At step S3106, the digital software system 704 may provide respective direction information associated with the first beam and the first parabolic reflector 114. In embodiments, step S3106 may include a plurality of sub-steps. In embodiments, referring to FIG. 31C, the process may continue with step S3106A. At step S3106A, the digital software system 704 may generate a respective first weighting factor associated with the first beam as part of a first array of weighting factors associated with the first plurality of beams. In embodiments, the respective first weighting factor may be generated based on the respective location information associated with the first object 108-1, the first azimuth axis, and the first elevation axis. In embodiments, the respective first weighting factor will be used by a respective digital beamformer 306-n, along with the first array of weighting factors, to direct the first beam to the first object 108-1. For example, in embodiments, the respective first weighting factor along with the first array of weighting factors may be generated by the using the formulas discussed above with respect to FIGS. 15A-15B, 16A-16B.

In embodiments, referring to FIG. 31C, the process may continue with step S3106B. At step S3106B, the digital software system 704 may generate second angular direction information associated with the parabolic reflector 114. In embodiments, the second angular direction information may include a second azimuth axis component and a second elevation axis component. In embodiments, as noted above, the point at which the second azimuth axis and the second elevation axis intersect is the centroid 270 of the parabolic reflector 114. In embodiments, the second angular direction information may be generated based on the first beam, the respective location information associated with the first object 108-1, the first azimuth axis, and the first elevation axis. In embodiments, in the case where there is one object being tracked, the second angular direction information will indicate that the centroid 270 of the parabolic reflector 114 will point directly toward the first object 108-1.

In embodiments, still referring to FIG. 31C, the process may continue with step S3106C. At step S3106C, the respective first weighting factor associated with first beam may be transmitted from the digital software system to a respective digital beamformer 306-n, for example, of a plurality of digital beamformers via a system controller 412. In embodiments, the respective digital beamformer 306-n may be operatively connected to the plurality of antenna array elements and the system controller 412. In embodiments, the system controller 412 may provide the respective first weighting factor to the respective digital beamformer 306-n so that the respective digital beamformer 306-n may direct the first beam to the first object 108-1. For example, in embodiments, the respective first weighting factor along with the first array of weighting factors may be transmitted to the plurality of digital beamformers 306-n as discussed above with respect to FIG. 22.

In embodiments, still referring to FIG. 31C, the process may continue with step S3106D. At step S3106D, the digital software system 704 may transmit the second angular direction information via the pedestal controller 124 to the first parabolic reflector 114. In embodiments, pedestal controller 124 may direct the movement and rotation of the parabolic reflector 114 based on the second angular direction information. For example, in embodiments, the second angular direction information may cause the pedestal controller 124 to rotate the parabolic reflector 114 in the elevation angular direction, the azimuth angular direction, or both.

In embodiments, referring back to FIG. 31, the method may continue with step S3108.

At step S3108, the digital software system 704 may update the graphical display 340 during a second time period. In embodiments, for example, the first time period may be 5 milliseconds, and the second time period may be the next 5 milliseconds. Therefore, in embodiments, the graphical display 340 may be updated every 5 milliseconds. In embodiments, the second time period may be different from the first time period. In embodiments, the graphical display 340 may be updated to reflect movement of the first set of objects 108 during the second time period.

In embodiments, the process may instead begin with step S3108. For example, in embodiments, the process may begin after a graphical display 340 has already been generated by a digital software system 704, and at least one object 108-1 is already being tracked by the system such that a first beam is already directed to the first object 108-1 prior to the start of the process. In embodiments, the process may begin with updating the graphical display 340 to reflect the movement of the object 108-1 during a time period.

In embodiments, step S3108 may include a plurality of sub-steps. In embodiments, referring to FIG. 31D, the process may continue with step S3108A. At step S3108A, the digital software system 704 may receive third angular direction information associated with first parabolic reflector 114 via the pedestal controller 124. In embodiments, the third angular direction information may include a third azimuth axis component and a third elevation axis component. In embodiments, the third angular direction information may be the same as the second angular direction transmitted to the parabolic reflector 114 in step S3106D. In embodiments, the third angular direction information may be different from the second angular direction transmitted to the parabolic reflector 114 in step S3106D.

In embodiments, referring to FIG. 31D, the process may continue with step S3108B. At step S3108B, the digital software system 704 may receive a third set of respective third digital data streams associated with the first plurality of partial beams. In embodiments, each respective partial beam of the first plurality of partial beams may be associated with a respective third digital data stream and data in the respective third digital data stream may be associated with a second plurality of respective modulated signals received by the plurality of antenna array elements 304. In embodiments, the second plurality of respective modulated signals are received by the plurality of antenna array elements, processed by the respective digital beamformer 306-n, and received by the digital software system 704 during the second time period.

In embodiments, still referring to FIG. 31D, the process may continue with step S3108C. At step S3108C, the digital software system 704 may process the third set of respective third digital data streams associated with the first plurality of partial beams to generate a fourth set of respective fourth digital data streams associated with the first plurality of beams. In embodiments, each beam of the first plurality of beams is based on at least two respective fourth digital data streams.

In embodiments, still referring to FIG. 31D, the process may continue with step S3108D. At step S3108D, the digital software system 704 may process the fourth set of respective fourth digital data streams associated with the first plurality of beams to generate first object movement information associated with the first object 108-1. In embodiments, the first object movement information may include a first object angular velocity and a first object angular direction. In embodiments, the first object angular direction may include a first object elevation angle component and a first object azimuth angle component. For example in embodiments, one beam of the first plurality of beams may be assigned to be a tracking beam, based on mission parameters received from the digital software system 704 via the system controller 412, as discussed above with respect to FIGS. 18-23. In embodiments, the tracking beam may be processed in order to determine the first object movement information during the second time period.

In embodiments, still referring to FIG. 31D, the process may continue with step S3108E. At step S3108E, the digital software system 704 may update the graphical display 340 to display the first plurality of beams, the first set of objects 108 including the first object 108-1, a second azimuth axis, and a second elevation axis. In embodiments, the first set of objects may be displayed based on at least the first object movement information. In embodiments, the second azimuth axis may be displayed based on the third azimuth axis component. In embodiments, the second elevation axis may be displayed based on the third elevation axis component. In embodiments, the updated graphical display may reflect the changes in the movement of the first set of objects and the centroid 270 of the parabolic reflector 114 during the second time period.

In embodiments, referring back to FIG. 31, the method may continue with step S3110.

At step S3110, the digital software system 704 may provide respective updated direction information associated with the first beam and the first parabolic reflector 114. In embodiments, step S3110 may include a plurality of substeps. In embodiments, referring to FIG. 31E, the process may continue with step S3110A. At step S3110A, the digital software system 704 may generate fourth angular direction information associated with the first parabolic reflector 114. In embodiments, the fourth angular direction information may include a fourth elevation axis component and a fourth azimuth axis component. In embodiments, in the case where there is one object being tracked, the second angular direction information will indicate that the centroid 270 of the parabolic reflector 114 will point directly toward the first object 108-1.

Figures 28A, 28B:
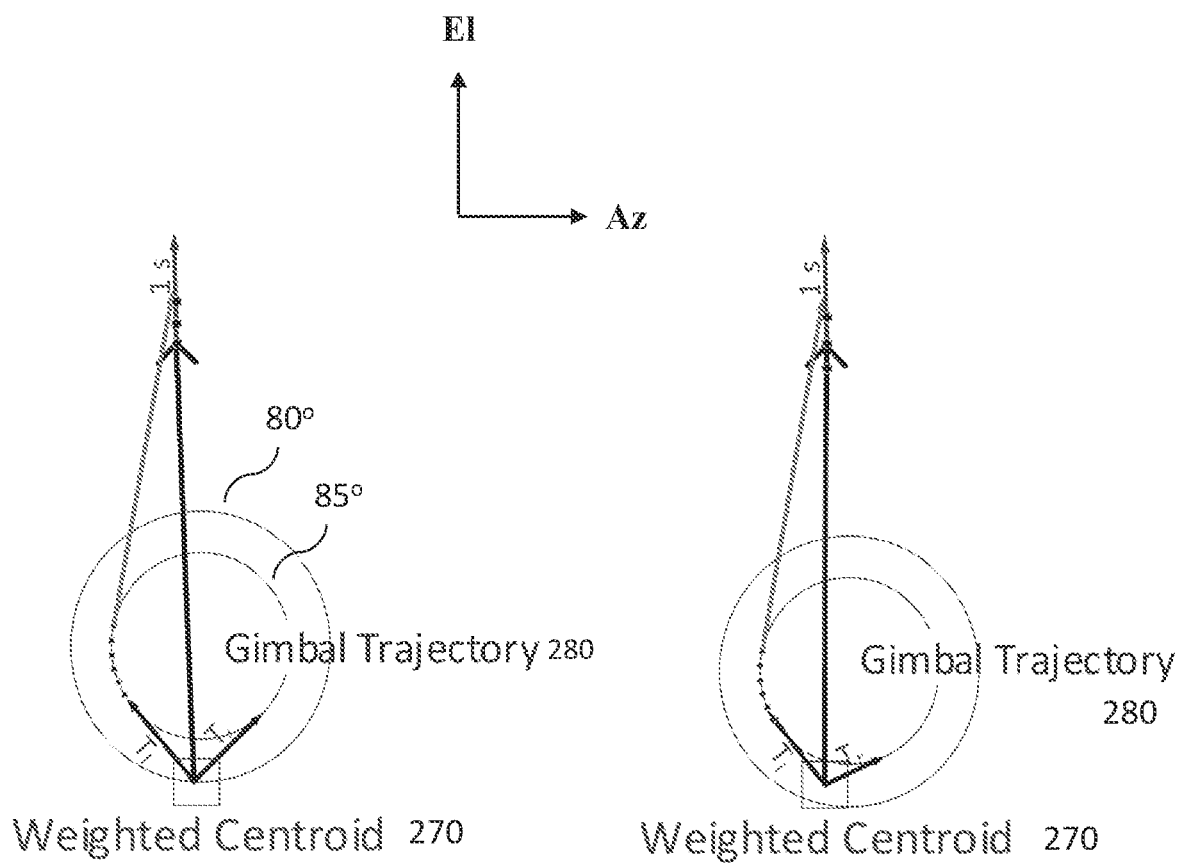
FIGS. 28A-B are schematic illustrations of a system and method for fine loop pointing in accordance with embodiments of the present invention.
Figure 29:
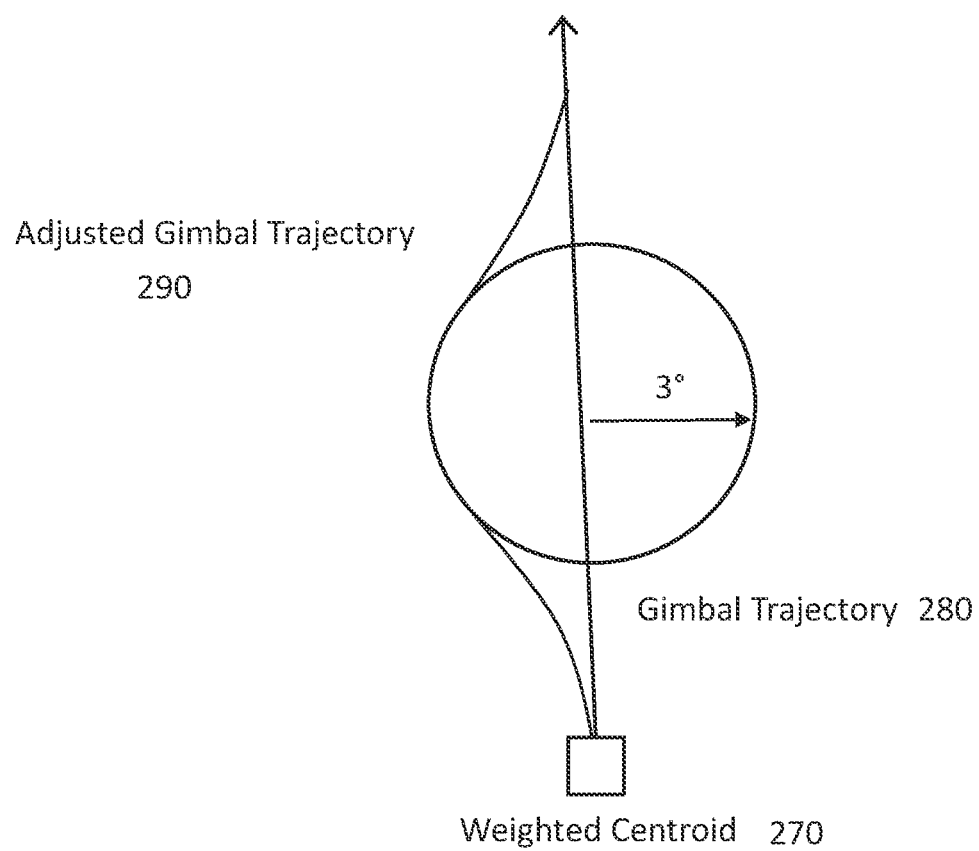
FIG. 29 is a schematic illustration of a system and method for fine loop pointing in accordance with embodiments of the present invention.

In embodiments, the fourth angular direction information may be determined by performing a "keyhole" analysis, which provides a technical solution to the technical "keyhole" problem discussed above in accordance with exemplary embodiments of the present invention. FIGS. 28A and 28B depict schematic illustrations of keyhole avoidance by a centroid 270 of a parabolic reflector 114 in accordance with embodiments of the present invention. FIG. 29 depicts a schematic illustration of the adjusted gimbal trajectory 280 associated with the centroid 270 of a parabolic reflector 114 generated based on keyhole avoidance in accordance with embodiments of the present invention. For example, in embodiments, the digital software system 704 may determine whether the first object 108-1 will pass through the keyhole associated with the range of motion of the parabolic reflector 114 based on its angular trajectory. In embodiments, referring to FIG. 31F, the process for keyhole avoidance may begin with step S3110A-1. At step S3110A-1, in embodiments, the digital software system 704 may determine a first angular trajectory (e.g., referred to in FIGS. 28A and 28B as gimbal trajectory 280) associated with the respective angular direction of the first parabolic reflector 114. In embodiments, the first angular trajectory may be determined based on the respective location information associated with the first object 108-1, the first object movement information, the third angular direction information, the second azimuth axis, and the second elevation axis. For example, in embodiments, the angular trajectory may be based on current location of the object, how the object moved since the last update of the graphical display 340, the direction that the parabolic reflector 114 was pointing during the second time period, and the location of the centroid 270 of parabolic reflector 114 during the second time period.

In embodiments, referring to FIG. 31F, the keyhole avoidance process may continue with step S3110A-2. In embodiments, the digital software system 704 may determine whether the first parabolic reflector 114 is projected to exceed a maximum elevation angle based on the first angular direction trajectory. In embodiments, the maximum elevation angle may be the angle where there the parabolic reflector 114 will mechanically or electronically fail such that the system will be unable to continue tracking an object. It is critical in antenna systems that the parabolic reflector does not exceed its maximum elevation angle. In embodiments, the maximum elevation angle may be, for example, 85 degrees. In embodiments, the maximum elevation angle may vary based on the specifications of the parabolic reflector 114.

In embodiments, referring to FIG. 31F, in the case where the first parabolic reflector is not projected to exceed the maximum elevation angle, the keyhole avoidance process may continue with step S3110A-3. At step S3110A-3, the digital software system 704 may generate the fourth angular direction information based on the first beam and the first angular direction trajectory. In embodiments, this step is completed if the angular direction trajectory indicates that the object 108-1 will not pass through the keyhole, and therefore the angular direction of the reflector 114 may be calculated by its standard process. After step S3110A-3, the process may continue with step S3110B.

In embodiments, referring to FIG. 31F, in the case where the first parabolic reflector is projected to exceed the maximum elevation angle, the keyhole avoidance process may continue with step S3110A-4, instead of step S3110A-3. In embodiments, at step S3110A-4, the digital software system 704 may determine whether the second elevation axis has exceeded a first threshold elevation angle. In embodiments, the threshold elevation angle may indicate a position of the reflector 114 where the centroid 270 of the reflector 114 is approaching the maximum elevation angle, and therefore the keyhole must be avoided by using alternative calculations for the angular direction of the reflector. For example, in embodiments, if the maximum elevation angle of the reflector 114 is 85 degrees, then the threshold elevation angle may be 80 degrees. In this example, this may indicate that, in embodiments, if the centroid 270 of the reflector 114 has passed 80 degrees of elevation, the digital software system 704 must make a keyhole avoidance determination. In embodiments, the threshold elevation angle may be set manually by a user of the graphical display 340. In embodiments, the threshold elevation angle may be set automatically by the digital software system based on received mission parameters or reflector specifications.

In embodiments, referring to FIG. 31F, in the case where the second elevation axis has not exceeded the first threshold elevation angle, the process may continue with step S3110A-5. At step S3110A-5, in embodiments, the digital software system 704 may generate the fourth angular direction information based on the first beam and the first angular direction trajectory. In embodiments, if the object is projected to pass through the keyhole but the threshold elevation angle has not yet been exceeded, the fourth angular direction information will be calculated by the standard process based on the angular trajectory of the object. After step S3110A-5, the process may continue with step S3110B.

In embodiments, referring to FIG. 31F, in the case where the second elevation axis has exceeded the first threshold elevation angle, the process may continue from step S3110A-4 with step S3110A-6 instead. At step S3110A-6, in embodiments, the digital software system 704 may calculate a first tangent trajectory (e.g., referred to in FIG. 29 as adjusted gimbal trajectory 290) associated with the respective angular direction of the first parabolic reflector based on the first angular direction trajectory. In embodiments, the first tangent trajectory may include a first azimuth trajectory and a first tangent trajectory. For example, referring to FIGS. 28A and 28B, in embodiments, when the centroid 270 exceeds the first maximum threshold angle, the angular direction of centroid 270 is calculated based on a tangential component of the angular direction. In embodiments, for example, when the centroid 270 exceeds threshold angle, the digital software system may calculate a nearest tangent, which may be a tangent line to the left of the angular trajectory (e.g., Ti), or a tangent line to the right of the angular trajectory (e.g., Tr). Continuing this example, in embodiments, the digital software system 704 may then generate the angular direction of the parabolic reflector 114 such that the angular direction follows the nearest tangent while the first beam maintains its direction toward the first object 108-1 even while it passes through the keyhole.

In FIG. 28A, as the centroid 270 exceeds the threshold elevation angle (e.g., 80 degrees in this example), the digital software system 704 determines that the nearest tangent is to the left (e.g., Ti) of the angular trajectory. In FIG. 28B, which may occur during a next time period after FIG. 28A, the centroid 270 of the reflector 114 moves along the tangent line to avoid crossing the maximum elevation angle (e.g., 85 degrees in this example). FIG. 29 depicts another exemplary embodiment of the process for keyhole avoidance where the maximum elevation angle is 87 degrees. In embodiments, the threshold elevation angle and the maximum elevation angle may be any set of angles. In embodiments, the keyhole avoidance using fine loop pointing allows reflector 114 to rotate over a longer period of time and at a slower rate because digital software system 704 is able to continue tracking the first object 108-1 with the first beam even while the centroid 270 is not pointing directly at the object.

In embodiments, referring to FIG. 31F, the process may continue from step S3110A-6 with step S3110A-7. In embodiments, at step S3110A-7, the digital software system 704 may generate the fourth angular direction information based on the first beam and the first tangent trajectory. In embodiments, this angular direction information may indicate that the centroid 270 will follow the tangent trajectory such that the maximum elevation angle is not exceeded, while maintaining the first beam in the direction of the first object 108-1.

In embodiments, the fourth angular direction information may be determined by the digital software system based on the following set of computer instructions:

```
static constexpr double T = 5.0;
  static constexpr double R = 3.0;
  { // Keyhole avoidance
    if gimbal-elevation > 90.0 - keyhole-radius-tolerance
      xy-pos-vector p is {sin (gimbal-azimuth) *gimbal-elevation,
      cos (gimbal-azimuth) *gimbal-elevation);
      xy-rate-vector r is {sin(target-azimuth-rate)*target-
      elevation-rate, cos (target-azimuth-rate)*target-elevation-
      rate};
    if p intersects circle (keyhole-radius)
      pos-vector t[2] is tangents (circle (keyhole-radius), p)
```

-continued

```
    if angle (t [0], gimbal-xy) < angle (t[1], gimbal)
      gimbal-xy += (t[0] - gimbal_xy)*gimbal-motion-rate
    else
      gimbal-xy += (t[1] - gimbal_x)*gimbal-motion-rate
```

For example, in embodiments, the computer instructions may be used to first determine whether the centroid 270 has reached the threshold elevation angle (e.g., "if gimbal-elevation >90.0–keyhole-radius-tolerance). In embodiments, if the threshold has been exceeded, the computer instructions may then be used to determine the left and right tangents of the trajectory of the centroid 270 (e.g., if angle(t[0], gimbal-xy)<angle(t[1], gimbal)). In embodiments, the computer instructions may then be used to determine the nearest tangent trajectory (e.g., if ((t0[1]*t1[0]−t0[0]*t1[1])*(t0[1]*r[0]−t0[0]*r[1])<0.0)). In embodiments, the computer instructions may then be used to instruct the digital software system 704 to adjust the centroid 270 of the parabolic reflector 114 to the nearest tangent trajectory (e.g., gimbal-xy+=(t[0]−gimbal xy)*gimbal-motion-rate).

In embodiments, referring back to FIG. 31E, the process may continue with step S3110B. At step S3110B, in embodiments, the digital software system 704 may generate a respective second weighting factor associated with the first beam as part of a second array of weighting factors associated with the first plurality of beams. In embodiments, the respective weighting factor may be determined based on the first angular direction trajectory, the fourth angular direction information, the first object movement information, the second azimuth axis, and the second elevation axis. In embodiments, the respective second weighting factor will be used by a respective digital beamformer 306-n, along with the second array of weighting factors, to direct the first beam to the first object 108-1. In the case where the centroid 270 is moved away from the direction of the first object 108-1 based on the tangent trajectory, in embodiments, the second weighting factor will be determined based on the first tangent trajectory such that the first beam will maintain its direction towards the first object 108-1. For example, in embodiments, the respective second weighting factor along with the second array of weighting factors may be generated by the using the formulas discussed above with respect to FIGS. 15A-15B, 16A-16B.

In embodiments, referring to FIG. 31E, the process may continue with step 3110C. At step S3110C, in embodiments, the digital software system 704 may transmit the fourth angular direction information to the first parabolic reflector 114 via the pedestal controller 124. In embodiments, the fourth angular direction information may cause the first parabolic reflector 114 to rotate based on the information received via the pedestal controller 124.

In embodiments, referring to FIG. 31E, the process may continue with step 3110D. At step S3110D, in embodiments, the digital software system 704 may transmit the respective second weighting factor to the respective digital beamformer 306-n via the system controller 412. In embodiments, the respective second weighting factor received along with the second array of weighting factors may cause an adjustment of the first beam such that the first beam maintains its direction toward the first object 108-1. For example, in embodiments, the respective second weighting factor along with the second array of weighting factors may be transmitted to the plurality of digital beamformers 306-n as discussed above with respect to FIG. 22.

Multiple Object Pointing

Figure 32A:
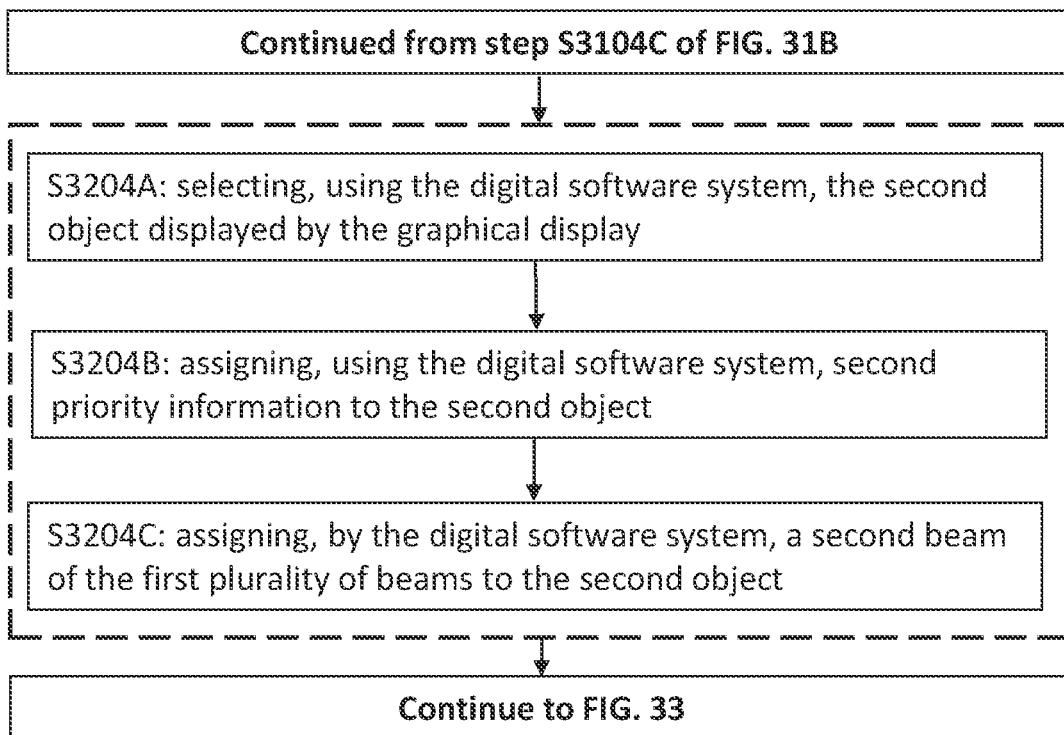
FIG. 32A is a schematic diagram for a process flow of a method for fine loop pointing in accordance with embodiments of the present invention.

In the case that there are two objects in the set of at least one object, referring to FIG. 32A in embodiments, the process may continue from step S3104C (of FIG. 31B) with step 3204A. In embodiments, there may be additional objects in the set of at least one object. At step 3204A, in embodiments, the second object 108-2 displayed by the graphical display 340 may be selected using the digital software system 704. In embodiments, the second object 108-2 may be selected automatically by the digital software system 704 based on characteristics of the second object. In embodiments, the characteristics may include object velocity, mass, and/or acceleration, to name a few. In embodiments, the second object 108-2 may be selected manually by a user using one or more input elements operably connected to the digital software system 704 via the graphical display 340. In embodiments, selection may be based on selection information provided by the user. In embodiments, the selection information may be provided using one or more input devices operatively connected to the digital software system. In embodiments, the input devices may include one or more of a keyboard, mouse, button, switch, and/or touchscreen, to name a few.

In embodiments, referring to FIG. 32A, in the case that there are two objects in the set of at least one object, the process may continue with step S3204B. At step S3204B, second priority information may be assigned to the second object 108-2 using the digital software system 704. In embodiments, the second priority information may be assigned to the second object 108-1 automatically by the digital software system 704 based on characteristics of the second object. In embodiments, the characteristics may include object velocity, mass, and/or acceleration, to name a few. In embodiments, the first priority information may be assigned to the second object 108-2 manually by a user using one or more input elements operably connected to the digital software system 704 via the graphical display 340. In embodiments, the second priority information may be a weight assigned to the second object 108-2. For example, in embodiments, the first priority information may be a primary object weight and the second priority information may be a primary object weight. In embodiments, the first priority information may be a primary object weight and the second priority information may be a secondary object weight. In embodiments, the first priority information may be a primary object weight and the second priority information may be a ternary object weight. In embodiments, the first priority information may be a secondary object weight and the second priority information may be a primary object weight. In embodiments, the first priority information may be a secondary object weight and the second priority information may be a secondary object weight. In embodiments, the first priority information may be a secondary object weight and the second priority information may be a ternary object weight. In embodiments, the first priority information may be a ternary object weight and the second priority information may be a primary object weight. In embodiments, the first priority information may be a ternary object weight and the second priority information may be a secondary object weight. In embodiments, the first priority information may be a ternary object weight and the second priority information may be a ternary object weight.

In embodiments, if a first object has a higher priority than a second object, the digital software system 704 will generate angular direction information such that the centroid 270 of the reflector 114 will be weighted toward the first object 108-1. In embodiments, if two objects have the same priority level, the digital software system will treat them the same and the angular direction information generated and sent to the reflector 114 will cause the centroid 270 to point equidistant from each object. For example, in embodiments, if the first object 108-1 is assigned a primary object weight of 1, and the second object 108-2 is assigned a secondary object weight of 0.5, the centroid 270 will be weighted toward the first object 108-1. However, in embodiments, if the first object 108-1 is assigned a primary object weight of 1, and the second object 108-2 is assigned a primary object weight of 1, the digital software system 704 will weigh the objects equally and direct the centroid 270 equidistant from the two objects. FIG. 30C is a schematic illustration of a graphical display 340 displaying 2 objects having equal weights. In embodiments, the graphical display 340 shows a list of the set of at least one object, and a list of options which allow the assignment of priority information (e.g., primary, secondary, and ternary).

In embodiments, additional objects may be selected and assigned priority information using the digital software system 704 and simultaneously tracked. In embodiments, the number of objects that may be tracked simultaneously may equal the number of beams included in the first plurality of beams generated by the respective plurality of digital beamformers 306-n.

In embodiments, referring to FIG. 32A, in the case that there are two objects in the set of at least one object, the process may continue from step S3204B with step S3204C. At step S3204C, the digital software system 704 may assign a second beam of the plurality of beams to the second object 108-2. In embodiments, the second beam will be directed to the second object 108-2 in order to receive and/or transmit radio frequency signals to/from the object, as further described below.

Figure 33:
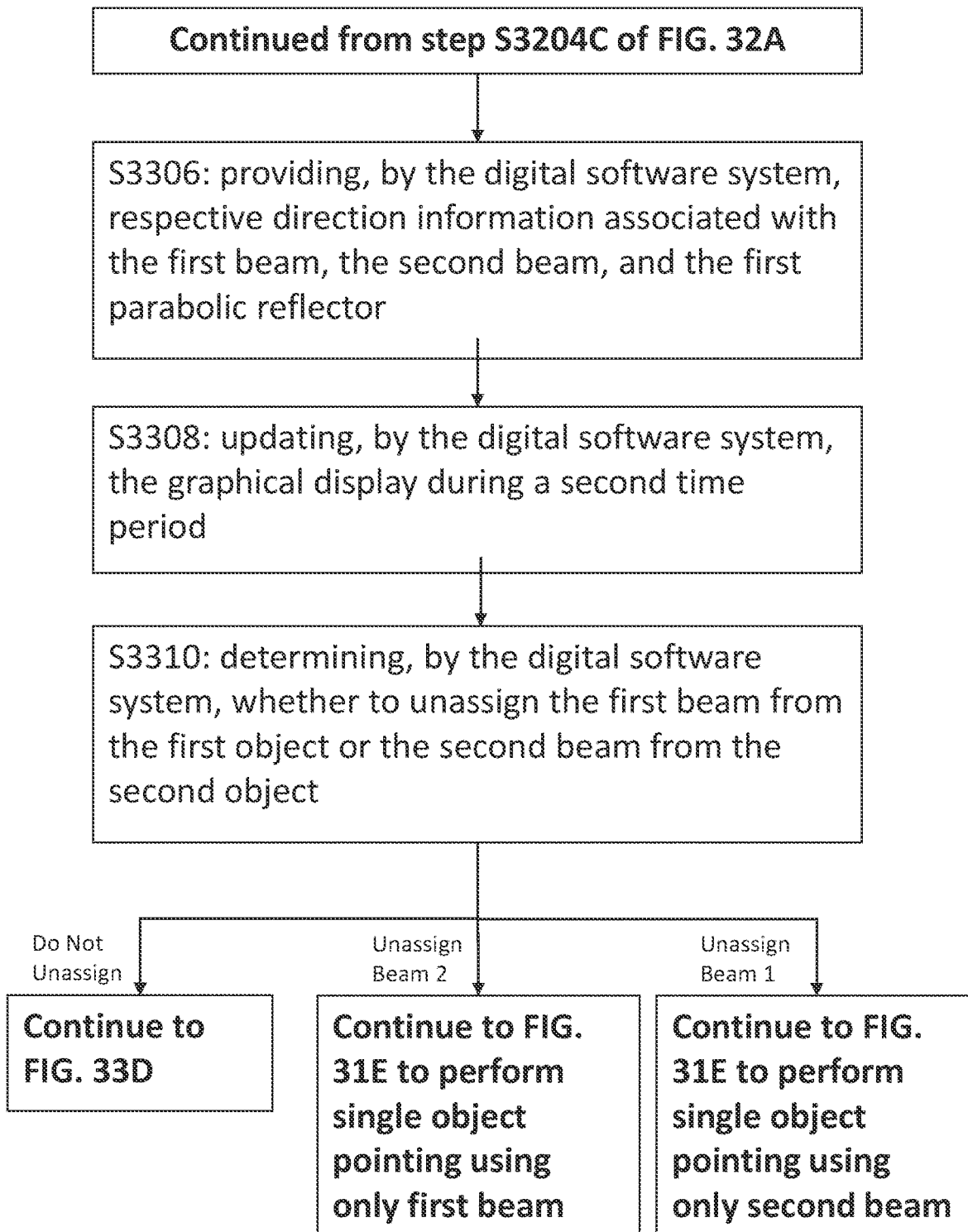

In embodiments, referring to FIG. 33, the process of multiple object pointing may continue with step S3306. At step S3306, the digital software system 704 may provide respective direction information associated with the first beam, the second beam, and the first parabolic reflector 114. In embodiments, step S3306 may include a plurality of sub-steps. In embodiments, referring to FIG. 33A, the process may continue with the sub-step S3306A. At step S3306A, the digital software system 704 may generate a respective first weighting factor associated with the first beam as part of a first array of weighting factors associated with the first plurality of beams. In embodiments, the respective first weighting factor may be generated based on the respective location information associated with the first object 108-1, the first azimuth axis, and the first elevation axis. In embodiments, the respective first weighting factor will be used by a first respective digital beamformer 306-1, along with the first array of weighting factors, to direct the first beam to the first object 108-1. For example, in embodiments, the respective first weighting factor along with the first array of weighting factors may be generated by the using the formulas discussed above with respect to FIGS. 15A-15B, 16A-16B.

In embodiments, referring to FIG. 33A, the process may continue with the sub-step S3306B. At step S3306B, the digital software system 704 may generate a respective second weighting factor associated with the second beam as part of the first array of weighting factors associated with the first plurality of beams. In embodiments, the respective second weighting factor may be generated based on the respective location information associated with the second object 108-2, the first azimuth axis, and the first elevation axis. In embodiments, the respective second weighting factor will be used by a second respective digital beamformer 306-2, along with the first array of weighting factors, to direct the second beam to the second object 108-2. For example, in embodiments, the respective second weighting factor along with the first array of weighting factors may be generated by the using the formulas discussed above with respect to FIGS. 15A-15B, 16A-16B.

In embodiments, still referring to FIG. 33A, the process may continue with sub-step S3306C. At step S3306C, the digital software system 704 may generate second angular direction information associated with the parabolic reflector 114. In embodiments, the second angular direction information may include a second azimuth axis component and a second elevation axis component. In embodiments, the second angular direction information may be generated based on the first beam, the second beam, the respective location information associated with the first object 108-1, the respective location information associated with the second object 108-2, the first priority information, the second priority information, the first azimuth axis, and the first elevation axis. In embodiments, in the case where there are two objects being tracked, the second angular direction information will indicate that the centroid 270 of the parabolic reflector 114 will point in a weighted position between the first object 108-1 and the second 108-1, based on the assigned first and second priority information. In embodiments, for example, if the first object 108-1 is assigned a higher priority than the second object, the centroid 270 will be weighted toward the first object 108-1. In embodiments, if there are many objects being tracked, the centroid 270 will be weighted based on the priority information of each object 108 being tracked.

In embodiments, still referring to FIG. 33A, the process may continue with step S3306D. At step S3306D, the respective first weighting factor associated with first beam may be transmitted from the digital software system 704 to a first respective digital beamformer 306-*n* of a plurality of digital beamformers via a system controller 412. In embodiments, the first respective digital beamformer 306-*n* may be operatively connected to the plurality of antenna array elements 304-*n* and the system controller 412. In embodiments, the system controller 412 may provide the respective first weighting factor to the respective digital beamformer 306-*n* so that the first respective digital beamformer 306-*n* may direct the first beam to the first object 108-1. For example, in embodiments, the respective first weighting factor along with the first array of weighting factors may be transmitted to the plurality of digital beamformers 306-*n* as discussed above with respect to FIG. 22.

In embodiments, still referring to FIG. 33A, the process may continue with step S3306E. At step S3306E, the respective second weighting factor associated with second beam may be transmitted from the digital software system 704 to a second respective digital beamformer 306-*n* of a plurality of digital beamformers via the system controller 412. In embodiments, the second respective digital beamformer 306-*n* may be operatively connected to the plurality of antenna array elements 304-*n* and the system controller 412. In embodiments, the system controller 412 may provide the respective second weighting factor to the second respective digital beamformer 306-*n* so that the second respective digital beamformer 306-*n* may direct the second beam to the second object 108-2. For example, in embodiments, the respective second weighting factor along with the first array of weighting factors may be transmitted to the plurality of digital beamformers 306-*n* as discussed above with respect to FIG. 22.

In embodiments, still referring to FIG. 33A, the process may continue with step S3306F. At step S3306F, the digital software system 704 may transmit the second angular direction information via the pedestal controller 124 to the first parabolic reflector 114. In embodiments, pedestal controller 124 may direct the movement and rotation of the parabolic reflector 114 based on the second angular direction information. For example, in embodiments, the second angular direction information may cause the pedestal controller 124 to rotate the parabolic reflector 114 up and down to change the elevation angle, and/or around the azimuth axis to change the azimuth angle.

In embodiments, referring back to FIG. 33, the method may continue with step S3308. At step S3308, the digital software system 704 may update the graphical display 340 during a second time period. In embodiments, for example, the first time period may be 5 milliseconds, and the second time period may be the next 5 milliseconds. Therefore, in embodiments for example, the graphical display 340 may be updated every 5 milliseconds. In embodiments, the second time period may be different from the first time period. In embodiments, the graphical display 340 may be updated to reflect movement of the set of at least one object 108 during the second time period.

In embodiments, the process may instead begin with step S3308. For example, in embodiments, the process may begin where a graphical display 340 has already been generated by a digital software system 740, and the first set of objects, including the first object 108-1 and the second object 108-2, is already being tracked by the system such that a first beam is directed to the first object 108-1 and a second beam is directed to the second object 108-2, prior to the start of the process. In embodiments, the process may begin with updating the graphical display 340 to reflect the movement of the first object 108-1 and the second object 108-2 during a next time period.

In embodiments, step S3308 may include a plurality of sub-steps. In embodiments, referring to FIG. 33B, the process may continue with step S3308A. At step S3308A, the digital software system 704 may receive third angular direction information associated with the first parabolic reflector 114 via the pedestal controller 124. In embodiments, the third angular direction information may include a third azimuth axis component and a third elevation axis component. In embodiments, the third angular direction information may be the same as the second angular direction transmitted to the parabolic reflector 114 in step S3306F. In embodiments, the third angular direction information may be different from the second angular direction transmitted to the parabolic reflector 114 in step S3306F.

In embodiments, referring to FIG. 33B, the process may continue with step S3308B. At step S3308B, the digital software system 704 may receive a third set of respective third digital data streams associated with the first plurality of partial beams. In embodiments, each respective partial beam of the first plurality of partial beams may be associated with a respective third digital data associated with a second plurality of respective modulated signals received by the plurality of antenna array elements 304. In embodiments, second plurality of respective modulated signals are received by the plurality of antenna array elements, processed by the respective digital beamformer 306-*n*, and received by the digital software system 704 during the second time period.

In embodiments, still referring to FIG. 33B, the process may continue with step S3308C. At step S3308C, the digital software system 704 may process the third set of respective third digital data streams associated with the first plurality of partial beams to generate a fourth set of a respective fourth digital data stream associated with the first plurality of beams. In embodiments, each beam of the first plurality of beams is based on at least two respective fourth digital data streams.

In embodiments, still referring to FIG. 33B, the process may continue with step S3308D. At step S3308D, the digital software system 704 may process the fourth set of respective fourth digital data streams associated with the first plurality of beams to generate first object movement information associated with the first object 108-1, and second object movement information associated with the second object 108-2. In embodiments, the first object movement information may include a first object angular velocity and a first object angular direction. In embodiments, the first object angular direction may include a first object elevation angle component and a first object azimuth angle component. In embodiments, the second object movement information may include a second object angular velocity and a second object angular direction. In embodiments, the second object angular direction may include a second object elevation angle component and a second object azimuth angle component. For example in embodiments, one beam of the first plurality of beams may be assigned to be a tracking beam, based on mission parameters received from the digital software system 704 via the system controller 412, as discussed above with respect to FIGS. 18-23. In embodiments, the tracking beam may be processed in order to determine the first object movement information and the second object movement information during the second time period.

In embodiments, still referring to FIG. 33B, the process may continue with step S3308E. At step S3308E, the digital software system 704 may update the graphical display 340 to display the first plurality of beams, the first set of objects 108, including the first object 108-1 and the second object 108-2, a second azimuth axis, and a second elevation axis. In embodiments, the first set of objects may be displayed based on at least the first object movement information and the second object movement information. In embodiments, the second azimuth axis may be displayed based on the third azimuth axis component. In embodiments, the second elevation axis may be displayed based on the third elevation axis component. In embodiments, the updated graphical display may reflect the changes in the movement of the first set of objects and the centroid 270 of the parabolic reflector 114 during the second time period.

In embodiments, referring back to FIG. 33, the process may continue with step S3310. At step S3310, the digital software system 704 may determine whether to unassign the first beam from the first object 108-1, or the second beam from the second object 108-2. In embodiments, referring to FIG. 33C, step S3310 may include a plurality of sub-steps. In embodiments, the process may continue with sub-step S3310A of FIG. 33C. At step S3310A, in embodiments, the digital software system 704 may determine whether one of the first object 108-1 or the second object 108-2 has exceeded a first maximum distance 272 from the second elevation axis and the second azimuth axis. In embodiments, the determination by the digital software system 704 as to whether one of the objects has exceeded the first maximum distance 272 may be based on the respective location information associated with the first object 108-1, the respective location information associated with the second object 108-2, the first object movement information, the second object movement information, the second azimuth axis, and the second elevation axis.

Figure 27A:
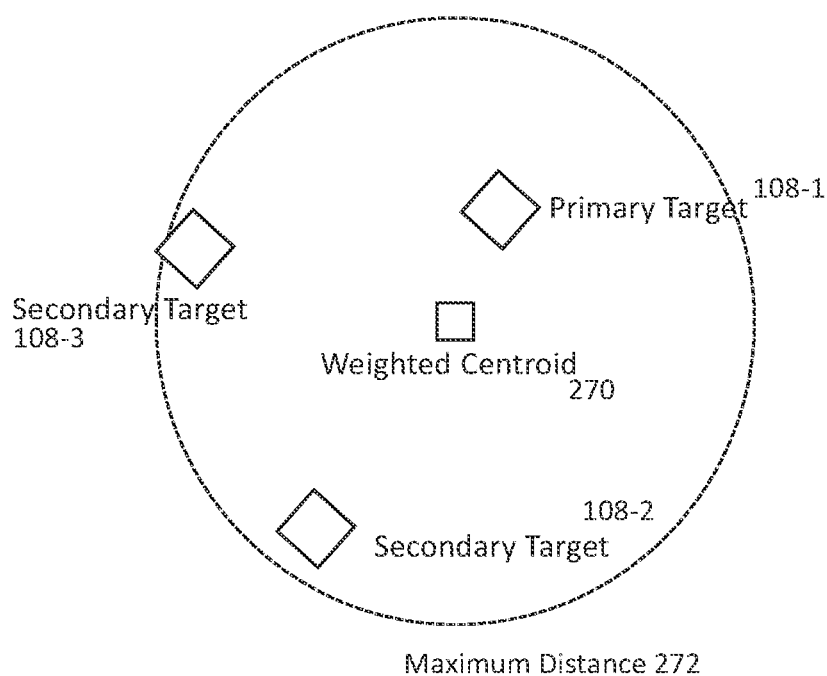
FIGS. 27A-B are schematic illustrations of a system and method for fine loop pointing in accordance with embodiments of the present invention.
Figure 27B:
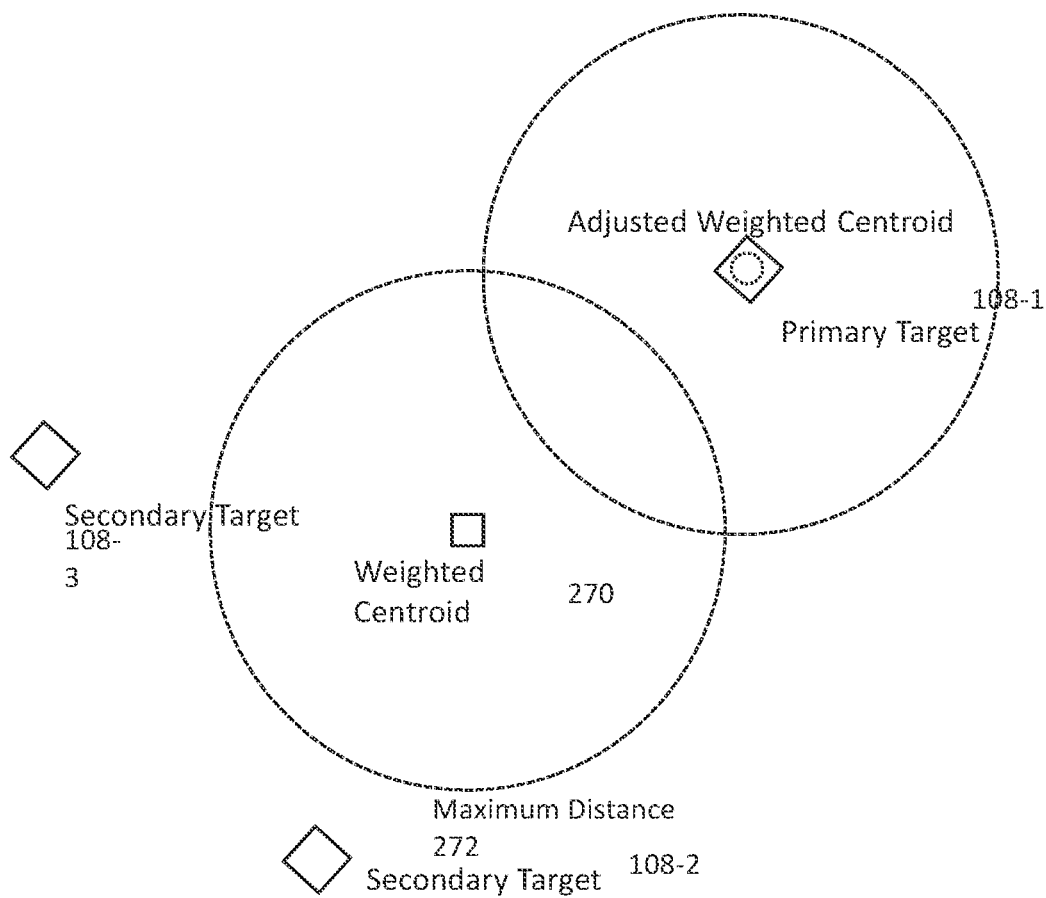

For example, in embodiments, if the digital software system 704 determines that one of the objects will fall outside the range of the wide beam, the system must determine which object to abandon tracking. FIGS. 27A and 27B are schematic illustrations of the process for multiple object tracking using fine loop pointing in accordance with embodiments of the present invention. In FIG. 27A, in embodiments, a primary target 108-1, a first secondary target 108-2, and a second secondary target 108-3 are each within the maximum distance 272 of the centroid 270 of a parabolic reflector 114. Therefore, in embodiments, the digital software system 704 weights each target based on its respective priority information and directs the centroid 270 accordingly in order to track each object using a plurality of beams. At some later time, in FIG. 27B in embodiments, the secondary objects have exceeded the maximum distance 272 from the centroid 270 and the secondary objects are abandoned in favor of the primary target 108-1. In embodiments, the centroid 270 is adjusted to point directly toward the primary target 108-1 so that the respective beam may continue pointing toward the primary target 108-1.

In embodiments, in the case where neither the first object 108-1 nor the second object 108-2 has exceeded the first maximum distance 272, the process may continue with step S3312 of FIG. 33D (as described in greater detail below).

Figure 33C:
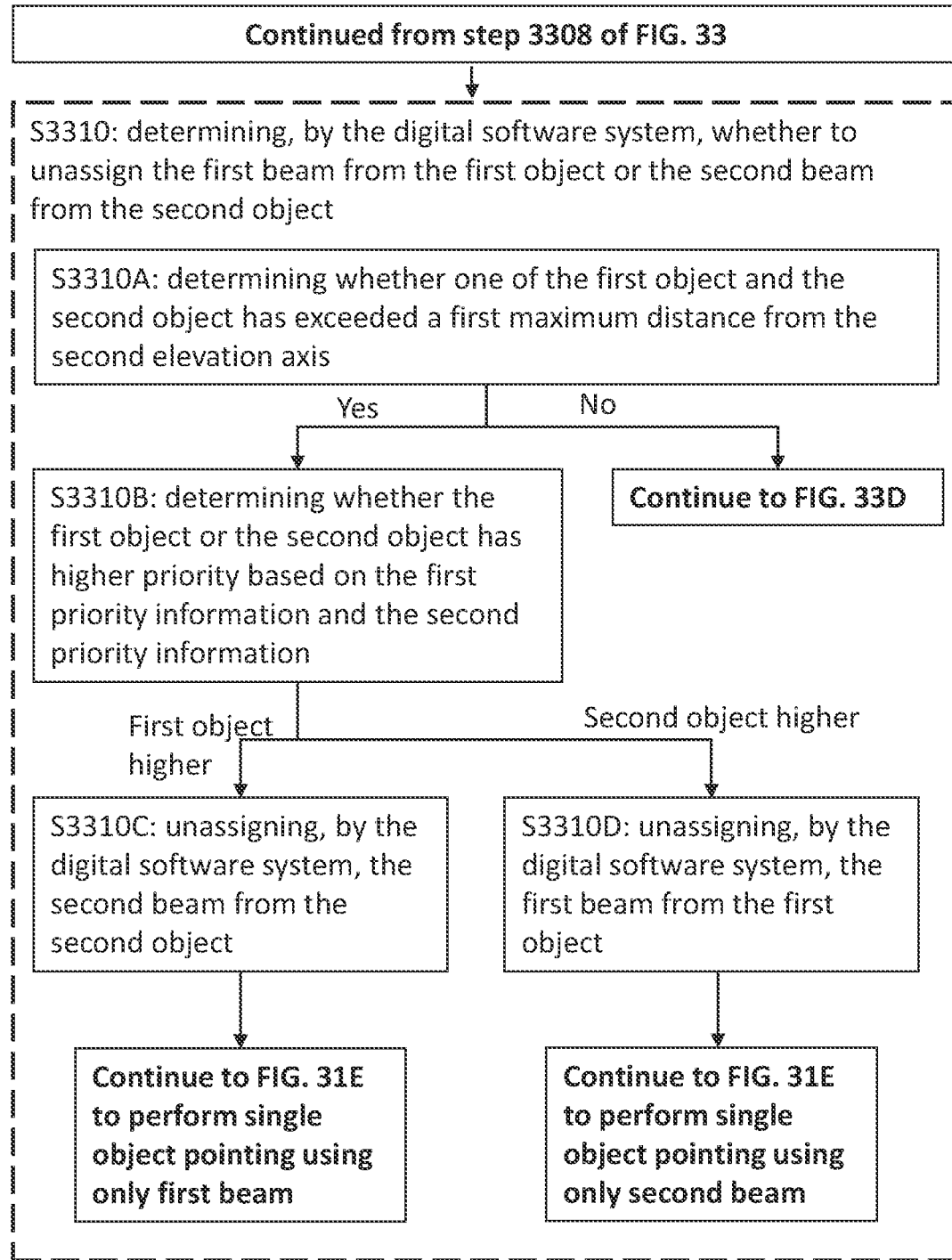

In embodiments, in the case where one of the first object 108-1 and the second object 108-2 has exceeded the first maximum distance 272, referring to FIG. 33C the process may instead continue with sub-step S3310B. At step S3310B, in embodiments, the digital software system 704 may determine whether the first object 108-1 or the second object 108-2 has higher priority based on the first priority information and the second priority information.

In embodiments, in the case where the first object 108-1 has a higher priority than the second object 108-2 based on the priority information, the process may continue from step S3310B with step S3310C. At step S3310C, in embodiments, the digital software system 704 may unassign the second beam from the second object 108-2. In embodiments, the digital software system 704 may then provide respective updated direction information associated with the first beam and the first parabolic reflector 114 as described with respect to step S3314 of FIG. 33F.

In embodiments, in the case where the second object 108-1 has a higher priority than the first object 108-1 based on the priority information, the process may continue from step S3310B instead with step S3310D. At step S3310D, in embodiments, the digital software system 704 may unassign the first beam from the first object 108-1. In embodiments, the digital software system 704 may then provide respective updated direction information associated with the second beam and the first parabolic reflector 114 as described with respect to step S3316 of FIG. 33H.

In embodiments, where either the first object 108-1 or the second object 108-2 has been unassigned, the process may then continue with the single object tracking process, as discussed with respect to the providing step S3110 in FIG. 31E. Therefore, in embodiments, after step S3310C in FIG. 33C, the process may continue to step S3110 in FIG. 31E using only the first object 108-1 and the first beam. And, in embodiments, after step S3310D in FIG. 33C, the process may continue to step S3110 in FIG. 31E using only the second object 108-2 and the second beam.

In embodiments, the determination of whether to unassign one of the objects may be based on the following set of computer instructions:

```
PntVect gimbal centroid (0) ;
  Target *primary_target = nullptr;
  float weight_sum = 0.0;
  // Sum the gimbal weights of all targets, and determine
    first primary target
  for (Target *target : targets_) {
    weight_sum += target->getGimbalWeightht ( ) ;
    if (primary_target == nullptr && target-
      >getGimbalWeight ( ) >= Target: : PRIMARY_TARGET)
      primary_target = target;
  }
  // If no targets have gimbal weights, do nothing
  if (weight_sum == 0.0)
    return;
  // Sum the product of the target pointing vector and its
    weight gain to determine the weighted centroid
  for (Target *target : targets_) {
    float magnitude = target->getPntVect ( ) .pos.mag ( ) ;
    float gain = magnitude > 0.0f ? 1.0f /
    (magnitude*weight sum) : 0.0f;
    gimbal_centroid += target->getPntVect ( ) *target-
    >getGimbalWeight ( ) *gain;
  }
  // If angle between the weighted centroid exceeds threshold,
    simply point at the first primary target
  if (primary target != nullptr && ang (primary_target-
    >getPntVect ( ) .pos, gimbal_centroid) >
    missionModel_.getPrimaryTargetMaxAngle ( ) )
    gimbal_centroid = primary_target->getPntVect ( ) .pos,
    gimbal_centroid) ;
  // Point gimbal to this weighted centroid
  pointingModel_.setGimbalTargetedPntVect (gimbal_centroid) ;
```

In embodiments, the computer instructions may be used to first determine the total of the priority information for each target (e.g., gimbal weights for all targets). In embodiments, if none of the targets are assigned priority information, then the system does nothing. In embodiments, the computer instructions may then be used to determine the angular direction information (e.g., the centroid 270 of the parabolic reflector 114) based on the location information associated with the objects and the priority information. In embodiments, if one of the objects (including the primary target) exceeds the threshold, the angular direction is calculated in order move the centroid 270 toward the primary target.

In embodiments, referring now to FIG. 33D, in the case where neither the first object 108-1 nor the second object 108-2 has exceeded the first maximum distance 272, the process may continue with step S3312. At step S3312, the digital software system 704 may provide respective updated direction information associated with the first beam, the second beam, and the first parabolic reflector 114. In embodiments, step S3112 may include a plurality of sub-steps. In embodiments, referring to sub-step 3312A, the process may continue with step S3110A. At step S3110A, the digital software system 704 may generate fourth angular direction information associated with the first parabolic reflector 114. In embodiments, the fourth angular direction information may include a fourth elevation axis component and a fourth azimuth axis component. In embodiments, in the case where there are two objects being tracked, the fourth angular direction information will indicate that the centroid 270 of the parabolic reflector 114 will be directed to a weighted point between the first object 108-1 and the second object 108-2 depending on the first and second priority information.

In embodiments, the fourth angular direction information may be determined by performing a "keyhole" analysis (discussed with respect to FIGS. 28A, 28B and 29 above). The same analysis may be applied to avoiding the keyhole while tracking two or more objects. For example, in embodiments, the digital software system 704 may determine whether the centroid 270 will pass through the keyhole of the antenna's pointing authority based on the angular trajectory of the set of at least one object. In embodiments, referring to FIG. 33E, the process for keyhole avoidance may begin with step S3312A-1. At step S3312A-1, in embodiments, the digital software system 704 may determine a first angular trajectory (e.g., referred to in FIGS. 28A and 28B as gimbal trajectory 280) associated with the respective angular direction of the first parabolic reflector 114. In embodiments, the first angular trajectory may be determined based on the respective location information associated with the first object 108-1, the respective location information associated with the second object 108-2, the first priority information, the second priority information, the first object movement information, the second object movement information, the third angular direction information, the second azimuth axis, and the second elevation axis. For example, in embodiments, the angular trajectory may be based on a current location of each object, the priority information associated with each object, how each object has moved since the last update of the graphical display 340, the direction that the parabolic reflector 114 was pointing during the second time period, and the location of the centroid 270 of parabolic reflector 114 during the second time period.

In embodiments, referring to FIG. 33E, the keyhole avoidance process may continue with step S3312A-2. In embodiments, the digital software system 704 may determine whether the first parabolic reflector 114 is projected to exceed a maximum elevation angle based on the first angular direction trajectory. In embodiments, the maximum elevation angle may be the angle where there the parabolic reflector 114 will mechanically or electronically fail such that the system will be unable to continue tracking an object. It is critical in antenna systems that the parabolic reflector does not exceed its maximum elevation angle. In embodiments, the maximum elevation angle may be, for example, 85 degrees. In embodiments, the maximum elevation angle may vary based on the specifications of the parabolic reflector 114.

In embodiments, referring to FIG. 33E, in the case where the first parabolic reflector 114 is not projected to exceed the maximum elevation angle, the keyhole avoidance process may continue with step S3312A-3. At step S3110A-3, the digital software system 704 may generate the fourth angular direction information based on the first beam, the second beam, and the first angular direction trajectory. In embodiments, this step is completed if the angular direction trajectory indicates that the centroid 270 will not pass through the keyhole, and therefore the angular direction of the reflector 114 may be calculated by its standard process. After step S3312A-3, the process may continue with step S3312B.

In embodiments, referring to FIG. 33E, in the case where the first parabolic reflector 114 is projected to exceed the maximum elevation angle, the keyhole avoidance process may continue with step S3312A-4, instead of step S3312A-3. In embodiments, at step S3312A-4, the digital software system 704 may determine whether the second elevation axis has exceeded a first threshold elevation angle. In embodiments, the first threshold elevation angle may indicate a position of the reflector 114 where the centroid 270 of the reflector 114 is approaching the maximum elevation angle, and therefore the keyhole must be avoided by using alternative calculations for generating the angular direction to transmit to the reflector. For example, in embodiments, if the maximum elevation angle of the reflector 114 is 85 degrees, then the threshold elevation angle may be 80 degrees. In this example, this may indicate that, in embodiments, if the centroid 270 of the reflector 114 has passed 80 degrees of elevation, the digital software system 704 must make a keyhole avoidance determination. In embodiments, the threshold elevation angle may be set manually by a user of the graphical display 340. In embodiments, the threshold elevation angle may be set automatically by the digital software system 704 based on received mission parameters or reflector specifications.

In embodiments, referring to FIG. 33E, in the case where the second elevation axis has not exceeded the first threshold elevation angle, the process may continue with step S3312A-5. At step S3312A-5, in embodiments, the digital software system 704 may generate the fourth angular direction information based on the first beam, the second beam, and the first angular direction trajectory. In embodiments, if the centroid 270 is projected to pass through the keyhole but the threshold elevation angle has not yet been exceeded, the fourth angular direction information will be calculated by the standard process based on the angular trajectory of the centroid 270. After step S3312A-5, the process may continue with step S3312B.

In embodiments, referring to FIG. 33E, in the case where the second elevation axis has exceeded the first threshold elevation angle, the process may continue from step S3110A-4 to step S3312A-6 instead. At step S3312A-6, in embodiments, the digital software system 704 may calculate a first tangent trajectory (e.g., referred to in FIG. 29 as adjusted gimbal trajectory 290) associated with the respective angular direction of the first parabolic reflector 114 based on the first angular direction trajectory. In embodiments, the first tangent trajectory may include a first azimuth trajectory and a first tangent trajectory. For example, referring to FIGS. 28A and 28B, in embodiments, when the centroid 270 exceeds the first maximum threshold angle, the angular direction of centroid 270 is calculated based on a tangential component of the angular direction. In embodiments, for example, when the centroid 270 exceeds threshold angle, the digital software system may calculate a nearest tangent, which may be a tangent line to the left of the angular trajectory (e.g., Ti), or a tangent line to the right of the angular trajectory (e.g., Tr). Continuing this example, in embodiments, the digital software system 704 may then generate the angular direction of the parabolic reflector 114 such that the angular direction follows the nearest tangent while the first beam maintains its direction toward the first object 108-1, and the second beam maintains its direction toward the second object 108-2, even while each object passes through the keyhole. As can be seen with reference to FIGS. 28A and 28B, for example, as the centroid 270 of the reflector 114 follows the tangent line, the elevation angle thereof stays at or below the maximum elevation angle.

In FIG. 28A, as the centroid 270 exceeds the threshold elevation angle (e.g., 80 degrees in this example), the digital software system 704 determines that the nearest tangent is to the left (e.g., Ti) of the angular trajectory. In FIG. 28B, which may occur during a next time period after FIG. 28A, the centroid 270 of the reflector 114 moves along the tangent line to avoid crossing the maximum elevation angle (e.g., 85 degrees in this example) while continuing communication with the first object 108-1 and the second object 108-2. FIG. 29 depicts another exemplary embodiment of the process for keyhole avoidance where the maximum elevation angle is 87 degrees. In embodiments, the threshold elevation angle and the maximum elevation angle may be any set of angles.

In embodiments, the keyhole avoidance using fine loop pointing allows reflector 114 to rotate over a longer period of time and at a slower rate because digital software system 704 is able to continue tracking the first object 108-1 with the first beam and the second object 108-2 (or more objects) even while the centroid 270 is not pointing at its normal weighted position between each object.

In embodiments, referring to FIG. 33E, the process may continue from step S3312A-6 with step S3312A-7. In embodiments, at step S3312A-7, the digital software system 704 may generate the fourth angular direction information based on the first beam, the second beam, and the first tangent trajectory. In embodiments, this angular direction information may indicate that the centroid 270 will follow the tangent trajectory such that the maximum elevation angle is not exceeded, while maintaining the first beam in the direction of the first object 108-1, and the second beam in the direction of the second object 108-2.

In embodiments, referring back to FIG. 33D, after performing a keyhole analysis the process may continue with step S3312B. At step S3312B, in embodiments, the digital software system 704 may generate a respective third weighting factor associated with the first beam as part of a second array of weighting factors associated with the first plurality of beams. In embodiments, the respective third weighting factor may be determined based on the first angular direction trajectory, the fourth angular direction information, the first object movement information, the second azimuth axis, and the second elevation axis. In embodiments, the respective third weighting factor will be used by the respective first digital beamformer 306-n, along with the second array of weighting factors, to direct the first beam to the first object 108-1. In the case where the centroid 270 is moved away from the direction of the first object 108-1 based on the tangent trajectory, in embodiments, the third weighting factor will be determined based on the first tangent trajectory such that the first beam will maintain its direction towards the first object 108-1. For example, in embodiments, the respective third weighting factor along with the second array of weighting factors may be generated by the using the formulas discussed above with respect to FIGS. 15A-15B, 16A-16B.

In embodiments, referring to FIG. 33D, the process may continue with step S3312C. At step S3312C, in embodiments, the digital software system 704 may generate a respective fourth weighting factor associated with the second beam as part of the second array of weighting factors associated with the first plurality of beams. In embodiments, the respective weighting factor may be determined based on the first angular direction trajectory, the fourth angular direction information, the second object movement information, the second azimuth axis, and the second elevation axis. In embodiments, the respective fourth weighting factor will be used by the respective second digital beamformer 306-n, along with the second array of weighting factors, to direct the second beam to the second object 108-2. In the case where the centroid 270 is moved away from the direction of the second object 108-2 based on the tangent trajectory, in embodiments, the fourth weighting factor will be determined based on the first tangent trajectory such that the second beam will maintain its direction towards the second object 108-2. For example, in embodiments, the respective fourth weighting factor along with the second array of weighting factors may be generated by the using the formulas discussed above with respect to FIGS. 15A-15B, 16A-16B.

In embodiments, referring to FIG. 33D, the process may continue with step 3312D. At step S3110C, in embodiments, the digital software system 704 may transmit the fourth angular direction information to the first parabolic reflector 114 via the pedestal controller 124. In embodiments, the fourth angular direction information may cause the first parabolic reflector 114 to rotate based on the information received via the pedestal controller 124.

In embodiments, referring to FIG. 33D, the process may continue with step 3312E. At step S3312E, in embodiments, the digital software system 704 may transmit the respective third weighting factor to the respective first digital beamformer 306-n via the system controller 412. In embodiments, the respective third weighting factor received along with the second array of weighting factors may cause an adjustment of the first beam such that the first beam maintains its direction toward the first object 108-1. For example, in embodiments, the respective third weighting factor along with the second array of weighting factors may be transmitted to the plurality of digital beamformers 306-n as discussed above with respect to FIG. 22.

In embodiments, referring to FIG. 33D, the process may continue with step 3312F. At step S3312F, in embodiments, the digital software system 704 may transmit the respective fourth weighting factor to the respective second digital beamformer 306-n via the system controller 412. In embodiments, the respective fourth weighting factor received along with the second array of weighting factors may cause an adjustment of the second beam such that the second beam maintains its direction toward the second object 108-2. For example, in embodiments, the respective fourth weighting factor along with the second array of weighting factors may be transmitted to the plurality of digital beamformers 306-n as discussed above with respect to FIG. 22.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

The invention claimed is:

1. A multi-band software defined antenna array tile comprising:
    (a) a digital software system interface operatively connected to a data transport bus and configured to receive a first partial beam of a first beam of a plurality of beams from the data transport bus;
    (b) a plurality of digital beamformers operatively connected to the digital software system interface,
        wherein a first digital beamformer of the plurality of digital beamformers operably connected to the digital software system interface is configured to:
            i. receive the first partial beam from the digital software system interface;
            ii. apply a first weighting factor to first transmit digital data associated with the first partial beam of the first beam of the plurality of beams;
            iii. provide an analog signal having a first intermediate frequency associated with weighted first transmit digital data;
    (c) a first principal polarization frequency converter of a first pair of frequency converters of a plurality of pairs of frequency converters, the first principal polarization frequency converter operably connected to the first digital beamformer and configured to:
        i. receive first modulated signals associated with the analog signal having the first intermediate frequency from the first digital beamformer, and
        ii. convert the first modulated signals associated with the first intermediate frequency into respective second modulated signals associated with a respective radio frequency,
    (d) a first respective coupled dipole array antenna element of a plurality of coupled dipole array antenna elements, the first respective coupled dipole array antenna element operatively connected to the first principal polarization frequency converter and configured to:
        i. receive the respective second modulated signals associated with the respective radio frequency from the first principal polarization frequency converter, and
        ii. transmit the respective second modulated signals associated with the respective radio frequency.

2. The multi-band software defined antenna array tile of claim 1, wherein the plurality of coupled dipole array antenna elements are tightly coupled relative to a wavelength of operation.

3. The multi-band software defined antenna array tile of claim 1, wherein the plurality of coupled dipole array antenna elements are spaced at less than half a wavelength.

4. The multi-band software defined antenna array tile of claim 1, wherein the plurality of pairs of frequency converters further comprise thermoelectric coolers configured to actively manage thermally a system noise temperature and increase a system gain over temperature.

5. The multi-band software defined antenna array tile of claim 4, wherein the plurality of pairs of frequency converters further comprise a plurality of spatially distributed high power amplifiers so as to increase the effective isotropic radiated power.

6. The multi-band software defined antenna array tile of claim 1, wherein the first intermediate frequency is between 50 MHz and 1250 MHz.

7. The multi-band software defined antenna array tile of claim 6, wherein the respective radio frequency is between 900 MHz and 6000 MHz.

8. The multi-band software defined antenna array tile of claim 6, wherein the respective radio frequency is between 2000 MHz and 12000 MHz.

9. The multi-band software defined antenna array tile of claim 6, wherein the respective radio frequency is between 10000 MHZ and 50000 MHz.

10. The multi-band software defined antenna array tile of claim 1, further comprising:
    (e) a second digital beamformer of the plurality of digital beamformers configure to:
        i. receive a second partial beam of the first beam of the plurality of beams from the digital software system interface via the data transport bus,
        ii. apply a second weighting factor to second transmit digital data associated with the second partial beam of the first beam of the plurality of beams,
        iii. provide a second analog signal having the first intermediate frequency;
    (f) a first orthogonal polarization frequency converter of the first pair of frequency converters of the plurality of pairs of frequency converters configured to
        i. receive respective third modulated signals associated with the first intermediate frequency from the second digital beamformer of the plurality of digital beamformers, ii. convert the respective third modulated signals associated with the first intermediate frequency into respective fourth modulated signals associated with the respective radio frequency,
iii. transmit the respective fourth modulated signals associated with the respective radio frequency to the first respective coupled dipole array antenna element of the plurality of coupled dipole array antenna elements,
(g) a second respective coupled dipole array antenna element, configured to transmit the respective fourth modulated signals associated with the respective radio frequency.

* * * * *